(12) United States Patent
Bakalash et al.

(10) Patent No.: US 7,944,450 B2
(45) Date of Patent: *May 17, 2011

(54) COMPUTING SYSTEM HAVING A HYBRID CPU/GPU FUSION-TYPE GRAPHICS PROCESSING PIPELINE (GPPL) ARCHITECTURE

(75) Inventors: Reuven Bakalash, Shdema (IL); Yaniv Leviathan, Savyon (IL)

(73) Assignee: Lucid Information Technology, Ltd., Kfar Netter (IL)

( * ) Notice: Subject to any disclaimer, the term of this patent is extended or adjusted under 35 U.S.C. 154(b) by 524 days.
This patent is subject to a terminal disclaimer.

(21) Appl. No.: 11/904,300

(22) Filed: Sep. 26, 2007

(65) Prior Publication Data
US 2008/0100629 A1 May 1, 2008

Related U.S. Application Data

(63) Continuation of application No. 11/897,536, filed on Aug. 30, 2007, which is a continuation-in-part of application No. 11/789,039, filed on Apr. 23, 2007, now abandoned, and a continuation-in-part of application No. 11/655,735, filed on Jan. 18, 2007, and a continuation-in-part of application No. 11/648,160, filed on Dec. 31, 2006, and a continuation-in-part of application No. 11/386,454, filed on Mar. 22, 2006, now Pat. No. 7,834,880, and a continuation-in-part of application No. 11/340,402, filed on Jan. 25, 2006, now Pat. No. 7,812,844, and a continuation-in-part of application No. 10/579,682, filed as application No. PCT/IL2004/001069 on Nov. 19, 2004, now Pat. No. 7,808,499.

(60) Provisional application No. 60/759,608, filed on Jan. 18, 2006, provisional application No. 60/647,146, filed on Jan. 25, 2005, provisional application No. 60/523,084, filed on Nov. 19, 2003.

(51) Int. Cl.
*G06F 15/80* (2006.01)
*G06F 15/00* (2006.01)
*G06F 9/46* (2006.01)
*G06T 1/00* (2006.01)
*G06T 1/20* (2006.01)
*G06K 9/54* (2006.01)

(52) U.S. Cl. ........ 345/505; 345/502; 345/506; 382/304; 712/32; 712/34; 718/102; 718/105

(58) Field of Classification Search ................ None
See application file for complete search history.

(56) References Cited

U.S. PATENT DOCUMENTS
5,475,856 A  12/1995  Kogge
(Continued)

FOREIGN PATENT DOCUMENTS
WO  WO 2004/070652 A2  8/2004

OTHER PUBLICATIONS
Powerpoint presentation entitled, "Go Multiple" by Dennis Yang, Conference Platform, 2007, 11 pages.
(Continued)

*Primary Examiner* — Xiao M Wu
*Assistant Examiner* — Tize Ma
(74) *Attorney, Agent, or Firm* — Thomas J. Perkowski, Esq., P.C.

(57) ABSTRACT

A computing system capable of parallelizing the operation of multiple graphics processing units (GPUs) supported on a hybrid CPU/GPU fusion-architecture chip and/or on an external graphics card, and employing a multi-mode parallel graphics rendering subsystem having software and hardware implemented components. The computing system includes (i) CPU memory space for storing one or more graphics-based applications, (ii) one or more CPUs for executing the graphics-based applications, (iii) a multi-mode parallel graphics rendering subsystem supporting multiple modes of parallel operation, (iv) a plurality of graphic processing pipelines (GPPLs), implemented using the GPUs, and (vi) an automatic mode control module. During the run-time of the graphics-based application, the automatic mode control module automatically controls the mode of parallel operation of the multi-mode parallel graphics rendering subsystem so that the GPUs are driven in a parallelized manner.

11 Claims, 84 Drawing Sheets

U.S. PATENT DOCUMENTS

| | | |
|---|---|---|
| 5,535,410 A | 7/1996 | Watanabe et al. |
| 5,687,357 A | 11/1997 | Priem |
| 5,740,464 A | 4/1998 | Priem et al. |
| 5,745,762 A | 4/1998 | Celi, Jr. et al. |
| 5,754,866 A | 5/1998 | Priem |
| 5,757,385 A | 5/1998 | Narayanaswami et al. |
| 5,758,182 A | 5/1998 | Rosenthal et al. |
| 5,794,016 A | 8/1998 | Kelleher |
| 5,841,444 A | 11/1998 | Mun et al. |
| 5,909,595 A | 6/1999 | Rosenthal et al. |
| 6,118,462 A | 9/2000 | Mergulis |
| 6,169,553 B1 | 1/2001 | Fuller et al. |
| 6,181,352 B1 | 1/2001 | Kirk et al. |
| 6,184,908 B1 | 2/2001 | Chan et al. |
| 6,188,412 B1 | 2/2001 | Morein |
| 6,191,800 B1 | 2/2001 | Arenburg et al. |
| 6,201,545 B1 | 3/2001 | Wong et al. |
| 6,212,261 B1 | 4/2001 | Meubus et al. |
| 6,212,617 B1 | 4/2001 | Hardwick |
| 6,259,460 B1 | 7/2001 | Gossett et al. |
| 6,288,418 B1 | 9/2001 | Reed et al. |
| 6,292,200 B1 | 9/2001 | Bowen et al. |
| 6,333,744 B1 | 12/2001 | Kirk et al. |
| 6,337,686 B2 | 1/2002 | Wong et al. |
| 6,352,479 B1 | 3/2002 | Sparks, II |
| 6,415,345 B1 | 7/2002 | Wu et al. |
| 6,442,656 B1 | 8/2002 | Alasti et al. |
| 6,462,737 B2 | 10/2002 | Lindholm et al. |
| 6,473,086 B1 | 10/2002 | Morein et al. |
| 6,473,089 B1 | 10/2002 | Wei et al. |
| 6,477,687 B1 | 11/2002 | Thomas |
| 6,492,987 B1 | 12/2002 | Morein |
| 6,496,187 B1 | 12/2002 | Deering et al. |
| 6,496,404 B1 | 12/2002 | Fiedler et al. |
| 6,502,173 B1 | 12/2002 | Aleksic et al. |
| 6,529,198 B1 | 3/2003 | Miyauchi |
| 6,532,013 B1 | 3/2003 | Papakipos et al. |
| 6,532,525 B1 | 3/2003 | Aleksic et al. |
| 6,535,209 B1 | 3/2003 | Abdalla et al. |
| 6,542,971 B1 | 4/2003 | Reed |
| 6,557,065 B1 | 4/2003 | Peleg et al. |
| 6,577,309 B2 | 6/2003 | Lindholm et al. |
| 6,577,320 B1 | 6/2003 | Kirk |
| 6,578,068 B1 | 6/2003 | Bowman-Amuah |
| 6,593,923 B1 | 7/2003 | Donovan et al. |
| 6,633,296 B1 | 10/2003 | Laksono et al. |
| 6,636,212 B1 | 10/2003 | Zhu |
| 6,636,215 B1 | 10/2003 | Greene |
| 6,646,639 B1 | 11/2003 | Greene et al. |
| 6,650,330 B2 | 11/2003 | Lindholm et al. |
| 6,650,331 B2 | 11/2003 | Lindholm et al. |
| 6,657,635 B1 | 12/2003 | Hutchins et al. |
| 6,662,257 B1 | 12/2003 | Caruk et al. |
| 6,664,960 B2 | 12/2003 | Goel et al. |
| 6,664,963 B1 | 12/2003 | Zatz |
| 6,670,958 B1 | 12/2003 | Aleksic et al. |
| 6,677,953 B1 | 1/2004 | Twardowski et al. |
| 6,683,614 B2 | 1/2004 | Walls et al. |
| 6,690,372 B2 | 2/2004 | Donovan et al. |
| 6,691,180 B2 | 2/2004 | Priem et al. |
| 6,700,583 B2 | 3/2004 | Fowler et al. |
| 6,704,025 B1 | 3/2004 | Bastos et al. |
| 6,724,394 B1 | 4/2004 | Zatz et al. |
| 6,725,457 B1 | 4/2004 | Priem et al. |
| 6,728,820 B1 | 4/2004 | Brian et al. |
| 6,731,298 B1 | 5/2004 | Moreton et al. |
| 6,734,861 B1 | 5/2004 | Van Dyke et al. |
| 6,734,874 B2 | 5/2004 | Lindholm et al. |
| 6,741,243 B2 | 5/2004 | Lewis et al. |
| 6,744,433 B1 | 6/2004 | Bastos et al. |
| 6,753,878 B1 | 6/2004 | Heirich et al. |
| 6,774,895 B1 | 8/2004 | Papakipos et al. |
| 6,778,176 B2 | 8/2004 | Lindholm et al. |
| 6,778,177 B1 | 8/2004 | Furtner |
| 6,778,181 B1 | 8/2004 | Kilgariff et al. |
| 6,778,189 B1 | 8/2004 | Kilgard |
| 6,779,069 B1 | 8/2004 | Treichler et al. |
| 6,789,154 B1 | 9/2004 | Lee et al. |
| 6,797,998 B2 | 9/2004 | Dewey et al. |
| 6,801,202 B2 | 10/2004 | Nelson et al. |
| 6,812,927 B1 | 11/2004 | Cutler et al. |
| 6,825,843 B2 | 11/2004 | Allen et al. |
| 6,828,980 B1 | 12/2004 | Moreton et al. |
| 6,828,987 B2 | 12/2004 | Swan |
| 6,831,652 B1 | 12/2004 | Orr |
| 6,842,180 B1 | 1/2005 | Maiyuran et al. |
| 6,844,879 B2 | 1/2005 | Miyaushi |
| 6,856,320 B1 | 2/2005 | Rubinstein et al. |
| 6,864,893 B2 | 3/2005 | Zatz |
| 6,864,984 B2 | 3/2005 | Naya et al. |
| 6,870,540 B1 | 3/2005 | Lindholm et al. |
| 6,876,362 B1 | 4/2005 | Newhall, Jr. et al. |
| 6,885,376 B2 | 4/2005 | Tang-Petersen et al. |
| 6,894,687 B1 | 5/2005 | Kilgard et al. |
| 6,894,689 B1 | 5/2005 | Greene et al. |
| 6,900,810 B1 | 5/2005 | Moreton et al. |
| 6,919,896 B2 | 7/2005 | Sasaki et al. |
| 6,938,176 B1 | 8/2005 | Alben et al. |
| 6,940,515 B1 | 9/2005 | Moreton et al. |
| 6,947,047 B1 | 9/2005 | Moy et al. |
| 6,947,865 B1 | 9/2005 | Mimberg et al. |
| 6,952,206 B1 | 10/2005 | Craighead |
| 6,959,110 B1 | 10/2005 | Danskin et al. |
| 6,961,057 B1 | 11/2005 | Van Dyke et al. |
| 6,975,319 B1 | 12/2005 | Donovan et al. |
| 6,980,209 B1 | 12/2005 | Donham et al. |
| 6,982,718 B2 | 1/2006 | Kigard et al. |
| 6,985,152 B2 | 1/2006 | Rubinstein et al. |
| 6,989,840 B1 | 1/2006 | Everitt et al. |
| 6,992,667 B2 | 1/2006 | Lindholm et al. |
| 6,995,767 B1 | 2/2006 | Donovan et al. |
| 6,999,076 B2 | 2/2006 | Morein |
| 7,002,588 B1 | 2/2006 | Lindholm et al. |
| 7,015,915 B1 | 3/2006 | Diard |
| 7,023,437 B1 | 4/2006 | Voorhies et al. |
| 7,027,972 B1 | 4/2006 | Lee |
| 7,038,678 B2 | 5/2006 | Bunnell |
| 7,038,685 B1 | 5/2006 | Lindholm |
| 7,038,692 B1 | 5/2006 | Priem et al. |
| 7,051,139 B2 | 5/2006 | Peleg et al. |
| 7,053,901 B2 | 5/2006 | Huang et al. |
| 7,064,763 B2 | 6/2006 | Lindholm et al. |
| 7,068,272 B1 | 6/2006 | Voorhies et al. |
| 7,068,278 B1 | 6/2006 | Williams et al. |
| 7,075,541 B2 | 7/2006 | Diard |
| 7,080,194 B1 | 7/2006 | Van Dyke |
| 7,081,895 B2 | 7/2006 | Papalopos et al. |
| 7,091,971 B2 | 8/2006 | Morein |
| 7,095,414 B2 | 8/2006 | Lindholm et al. |
| 7,098,922 B1 | 8/2006 | Bastos et al. |
| 7,119,808 B2 | 10/2006 | Goncalez et al. |
| 7,120,816 B2 | 10/2006 | Williams et al. |
| 7,123,266 B2 | 10/2006 | Wei et al. |
| 7,129,909 B1 | 10/2006 | Dong et al. |
| 7,130,316 B2 | 10/2006 | Kovacevic |
| 7,142,215 B1 | 11/2006 | Papakipos et al. |
| 7,145,565 B2 | 12/2006 | Everitt et al. |
| 7,170,513 B1 | 1/2007 | Voorhies et al. |
| 7,170,515 B1 | 1/2007 | Zhu |
| 7,224,359 B1 | 5/2007 | Papakipos et al. |
| 7,248,261 B1 | 7/2007 | Hakura |
| 7,289,125 B2 | 10/2007 | Diard et al. |
| 7,324,111 B2 | 1/2008 | Diamond |
| 7,324,547 B1 | 1/2008 | Alfieri et al. |
| 7,325,086 B2 | 1/2008 | Kong et al. |
| 7,372,465 B1 | 5/2008 | Tamasi et al. |
| 7,477,256 B1 | 1/2009 | Johnson |
| 7,545,380 B1 | 6/2009 | Diard et al. |
| 7,616,207 B1 | 11/2009 | Diard et al. |
| 7,721,118 B1 | 5/2010 | Tamasi et al. |
| 7,773,090 B1 | 8/2010 | Diard et al. |
| 2001/0029556 A1 | 10/2001 | Priem et al. |
| 2002/0015055 A1 | 2/2002 | Foran |
| 2002/0059302 A1 | 5/2002 | Ebihara |
| 2002/0085007 A1 | 7/2002 | Nelson et al. |
| 2002/0118308 A1 | 8/2002 | Dujmenovic |
| 2002/0145612 A1 | 10/2002 | Blythe et al. |

| | | |
|---|---|---|
| 2002/0180740 A1 | 12/2002 | Lindholm et al. |
| 2002/0196259 A1 | 12/2002 | Lindholm et al. |
| 2003/0020720 A1 | 1/2003 | Lindholm et al. |
| 2003/0034975 A1 | 2/2003 | Lindholm et al. |
| 2003/0038808 A1 | 2/2003 | Lindholm et al. |
| 2003/0080959 A1 | 5/2003 | Morein |
| 2003/0103054 A1 | 6/2003 | Montrym et al. |
| 2003/0112245 A1 | 6/2003 | Lindholm et al. |
| 2003/0112246 A1 | 6/2003 | Lindholm et al. |
| 2003/0117971 A1 | 6/2003 | Aubury |
| 2003/0128197 A1 | 7/2003 | Turner et al. |
| 2003/0128216 A1 | 7/2003 | Walls et al. |
| 2003/0151606 A1 | 8/2003 | Morein |
| 2003/0164832 A1 | 9/2003 | Alcorn |
| 2003/0164834 A1 | 9/2003 | Lefebvre et al. |
| 2003/0171907 A1 | 9/2003 | Gal-On et al. |
| 2003/0179220 A1 | 9/2003 | Dietrich, Jr. et al. |
| 2003/0188075 A1 | 10/2003 | Peleh et al. |
| 2003/0189565 A1 | 10/2003 | Lindholm et al. |
| 2003/0212735 A1 | 11/2003 | Hicok et al. |
| 2004/0012600 A1 | 1/2004 | Deering et al. |
| 2004/0036159 A1 | 2/2004 | Bruno |
| 2004/0153778 A1 | 8/2004 | Cheng |
| 2004/0169651 A1 | 9/2004 | Everitt et al. |
| 2004/0179019 A1 | 9/2004 | Sabella et al. |
| 2004/0196289 A1 | 10/2004 | Langendorf et al. |
| 2004/0207618 A1 | 10/2004 | William et al. |
| 2004/0210788 A1 | 10/2004 | Williams et al. |
| 2004/0223003 A1 | 11/2004 | Heirich et al. |
| 2005/0041031 A1 | 2/2005 | Diard |
| 2005/0081115 A1 | 4/2005 | Cheng et al. |
| 2005/0122330 A1 | 6/2005 | Boyd et al. |
| 2005/0162437 A1 | 7/2005 | Morein et al. |
| 2005/0166207 A1 | 7/2005 | Baba et al. |
| 2005/0190189 A1 | 9/2005 | Chefd'hotel et al. |
| 2005/0190190 A1 | 9/2005 | Diard et al. |
| 2005/0195186 A1 | 9/2005 | Mitchell et al. |
| 2005/0195187 A1 | 9/2005 | Seiler et al. |
| 2005/0206646 A1 | 9/2005 | Alcorn |
| 2005/0223124 A1 | 10/2005 | Reed |
| 2005/0225558 A1 | 10/2005 | Morein et al. |
| 2005/0237327 A1 | 10/2005 | Rubinstein et al. |
| 2005/0237329 A1 | 10/2005 | Rubinstein et al. |
| 2005/0243096 A1 | 11/2005 | Possley et al. |
| 2005/0243215 A1 | 11/2005 | Doswald et al. |
| 2005/0259103 A1 | 11/2005 | Kilgard et al. |
| 2005/0265064 A1 | 12/2005 | Ku et al. |
| 2005/0275760 A1 | 12/2005 | Gritz et al. |
| 2006/0005178 A1 | 1/2006 | Kilgard et al. |
| 2006/0028478 A1 | 2/2006 | Rubinstein et al. |
| 2006/0055695 A1 | 3/2006 | Abdalla et al. |
| 2006/0059494 A1 | 3/2006 | Wexler et al. |
| 2006/0101218 A1 | 5/2006 | Reed |
| 2006/0114260 A1 | 6/2006 | Diard |
| 2006/0119607 A1 | 6/2006 | Lindholm et al. |
| 2006/0120376 A1 | 6/2006 | Duncan et al. |
| 2006/0123142 A1 | 6/2006 | Duncan et al. |
| 2006/0156399 A1 | 7/2006 | Parmar et al. |
| 2006/0202941 A1 | 9/2006 | Morein et al. |
| 2006/0208960 A1 | 9/2006 | Glen |
| 2006/0221086 A1 | 10/2006 | Diard |
| 2006/0221087 A1 | 10/2006 | Diard |
| 2006/0225061 A1 | 10/2006 | Ludwig et al. |
| 2006/0248241 A1 | 11/2006 | Danilak |
| 2006/0267987 A1 | 11/2006 | Litchmanov |
| 2006/0268005 A1 | 11/2006 | Hutchins et al. |
| 2006/0271713 A1 | 11/2006 | Xie et al. |
| 2006/0274073 A1 | 12/2006 | Johnson et al. |
| 2006/0282604 A1 | 12/2006 | Temkine et al. |
| 2006/0290700 A1 | 12/2006 | Gonzalez et al. |
| 2007/0159488 A1 | 7/2007 | Danskin et al. |
| 2007/0195099 A1 | 8/2007 | Diard et al. |
| 2008/0007559 A1 | 1/2008 | Kalaiah et al. |
| 2008/0143731 A1 | 6/2008 | Cheng et al. |
| 2008/0256330 A1* | 10/2008 | Wang et al. .................... 712/24 |
| 2010/0026692 A1 | 2/2010 | Lew et al. |

OTHER PUBLICATIONS

Scientific publication entitled, "Chromium; A Stream-Processing Framework for Interactive Rendering on Clusters" from Stanford University, Lawrence Livermore National Laboratory, and IBM T.J. Watson Research Center, 2007, 10 pages.
Scientific publication entitled "Hybrid Sort-First and Sort-Last Parallel Rendering With a Cluster of PCs" by Rudrajit Samanta et al., Princeton University, 12 pages, c. 2000.
EP 04 79 9376, Oct. 14, 2008.
PCT/IB07/03464, Sep. 22, 2008.
PCT/US07/26466, Jul. 16, 2008.
PCT/IB06/01529, Dec. 31, 2007.
PCT/IL04/001069, Jun. 30, 2005.
Publication by TW Crockett entitled, "An Introduction to Parallel Rendering", in Parallel Computing, 1997, Elsevier Science, 29 Pages.
Silicon Graphics, Inc. pdf. document entitled "OpenGL Multipipe™ SDK White Paper", 2002,2003, pp. 1-32.
Silicon Graphics, Inc. online document entitled "Additional Information for: OpenGL Multipipe™ SDK White Paper (IRIX 6.5)", published Feb. 1, 2003, 2 pages.
Technical publication by Li et al entiteled "ParVox—A Parallel Splatting Volume Rendering System for Distributed Visualization," Oct. 1997, 7 Pages.
Department of Computer Science, University of North Carolina publication by Molnar et al. entitled, "PixelFlow: High-Speed Rendering Using Image Composition," 1992, 10 Pages.

* cited by examiner

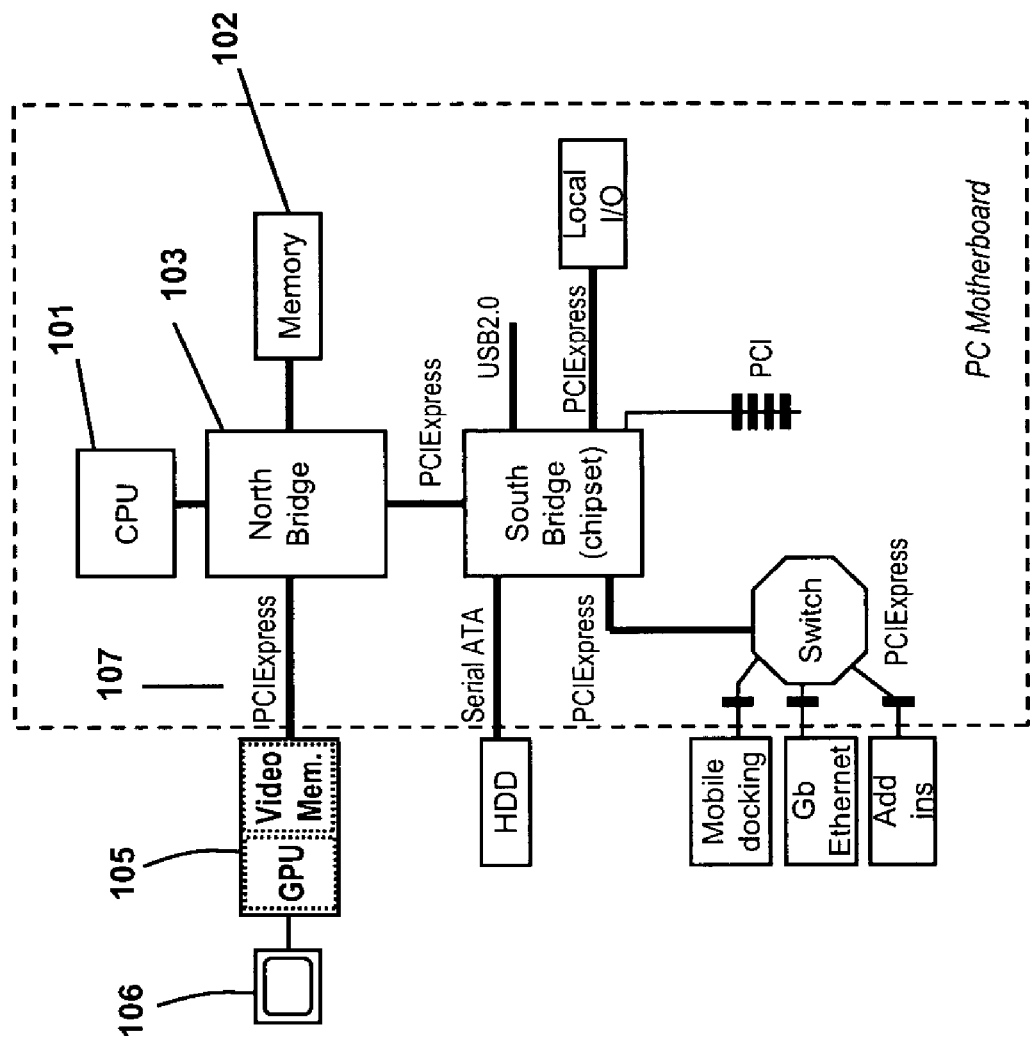
Fig. 1A1 (Prior Art)

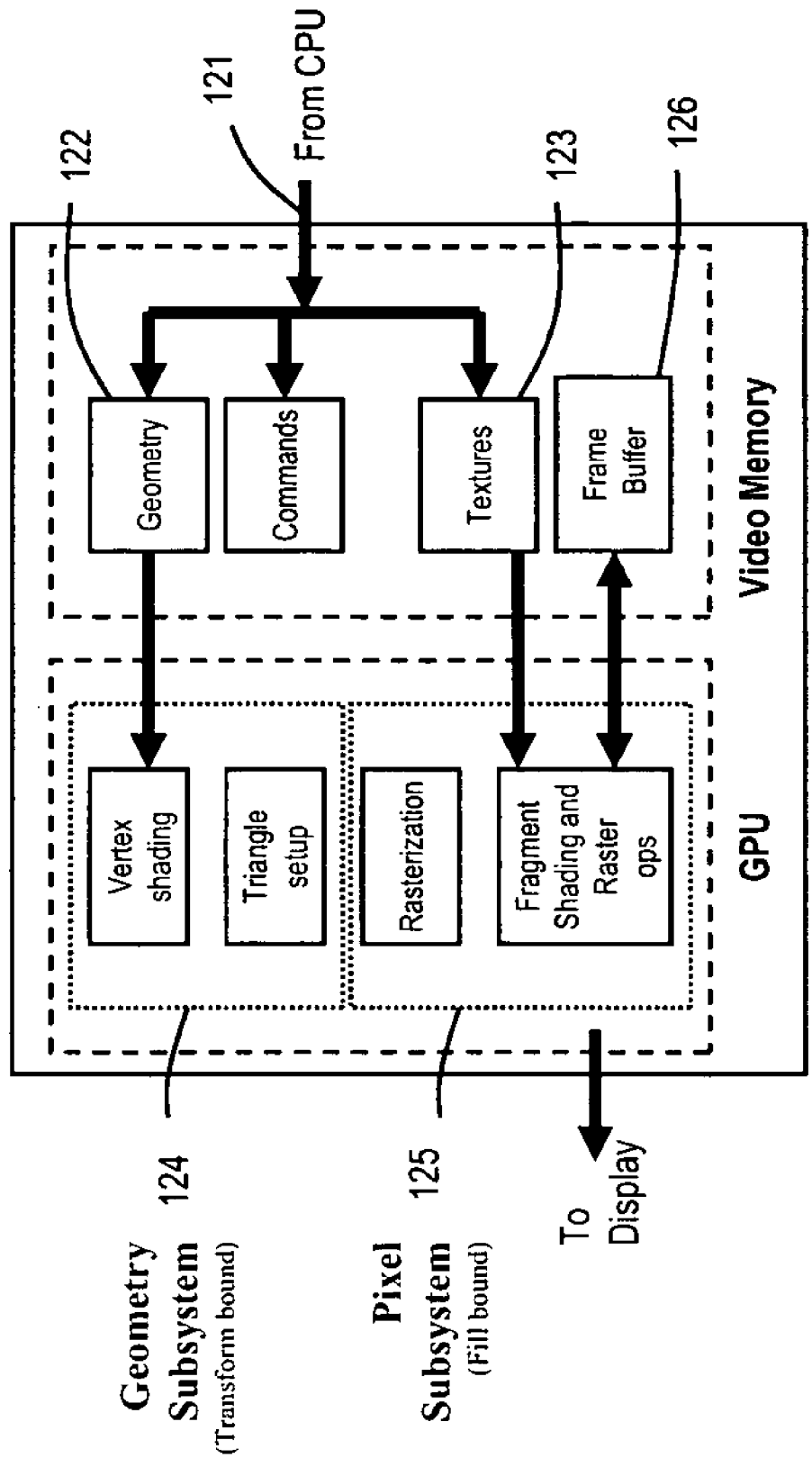
Fig. 1A2 (Prior Art)

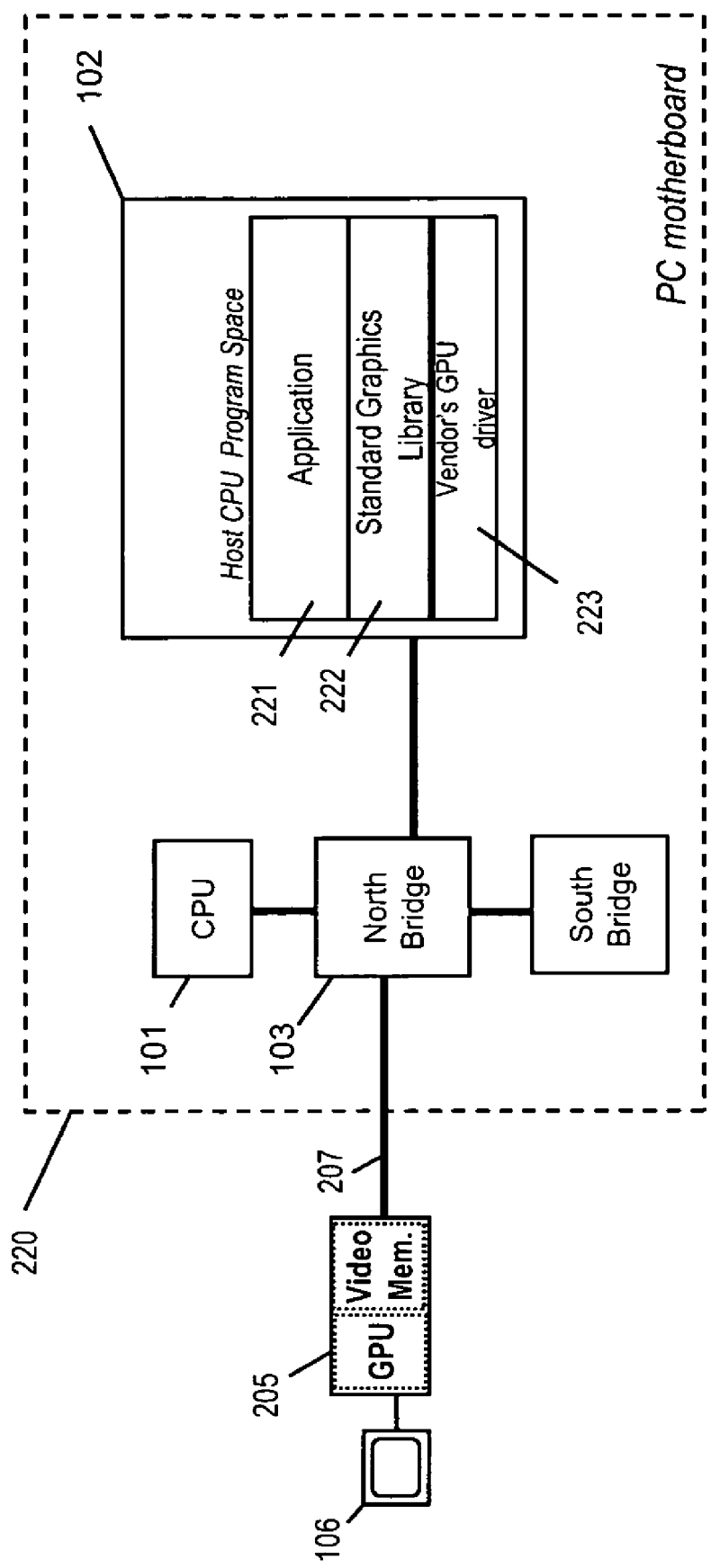
Fig. 1A3 (Prior Art)

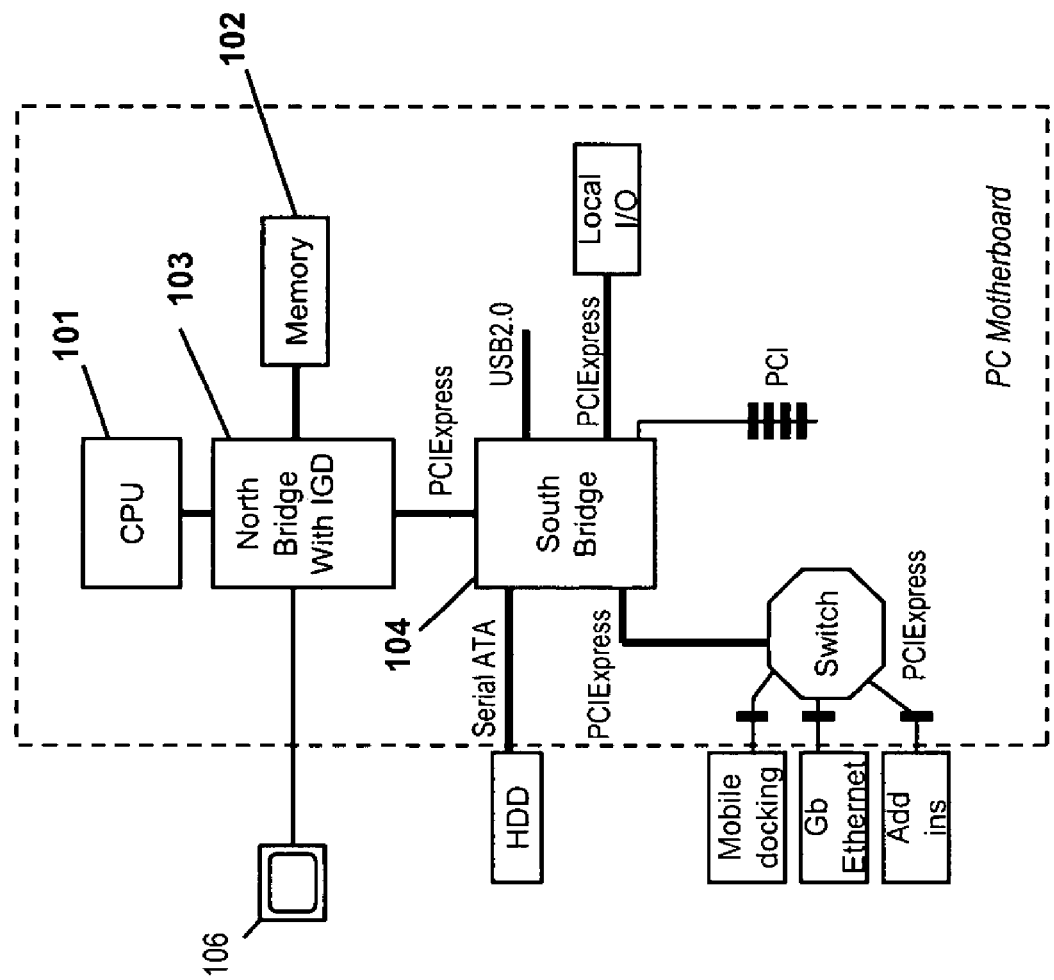
Fig. 1B1 (Prior Art)

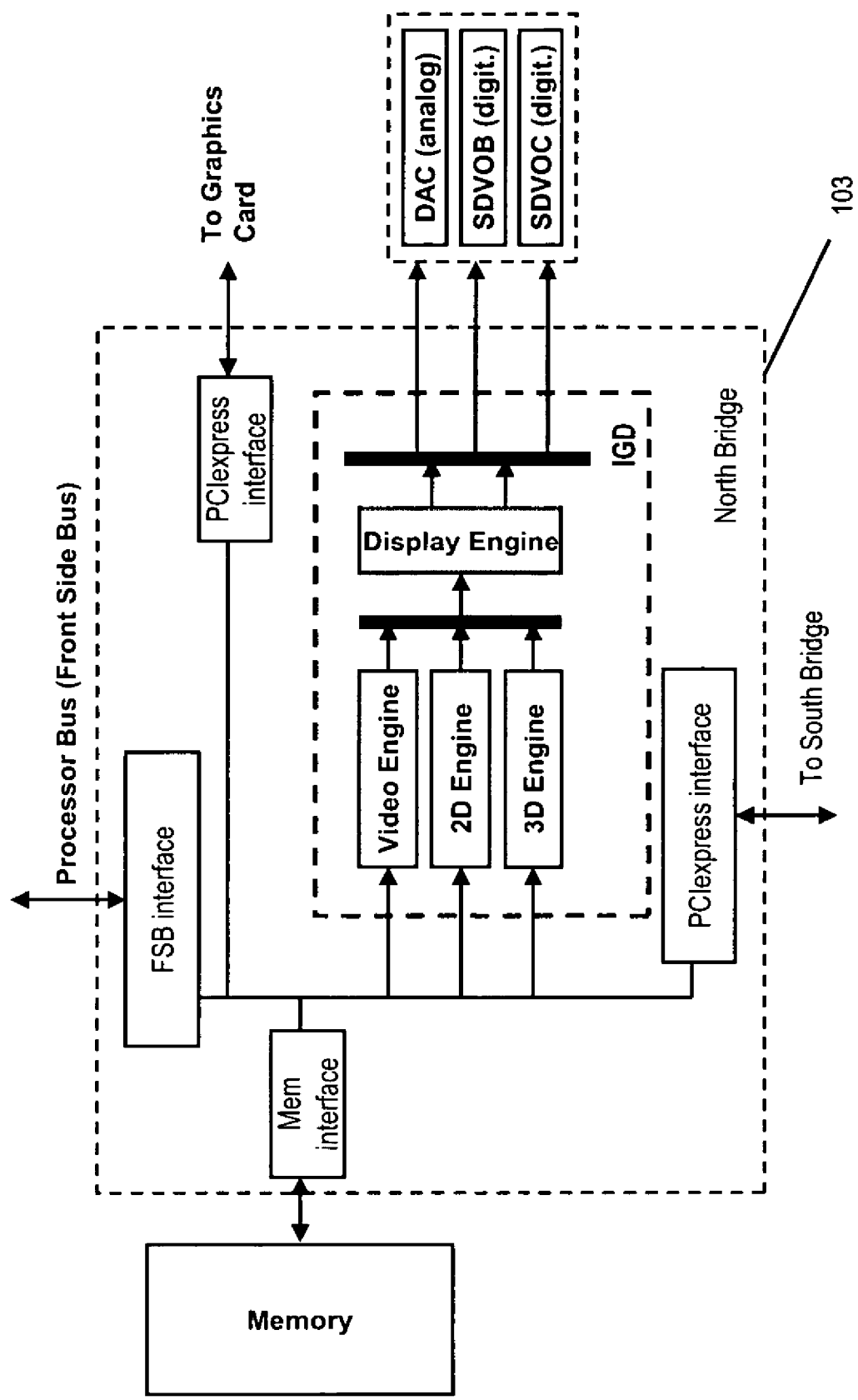
Fig. 1B2 (Prior Art)

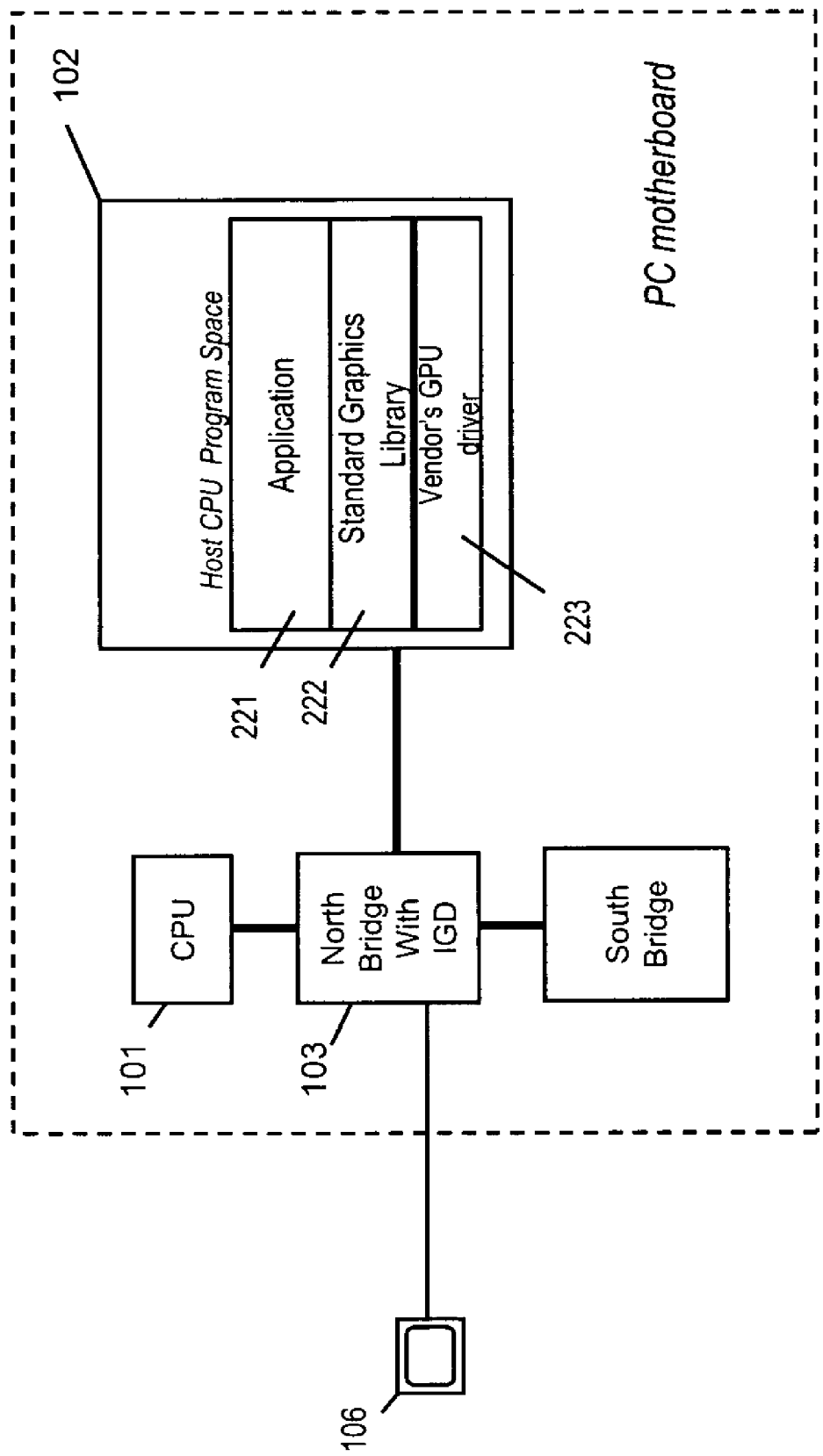
Fig. 1B3 (Prior Art)

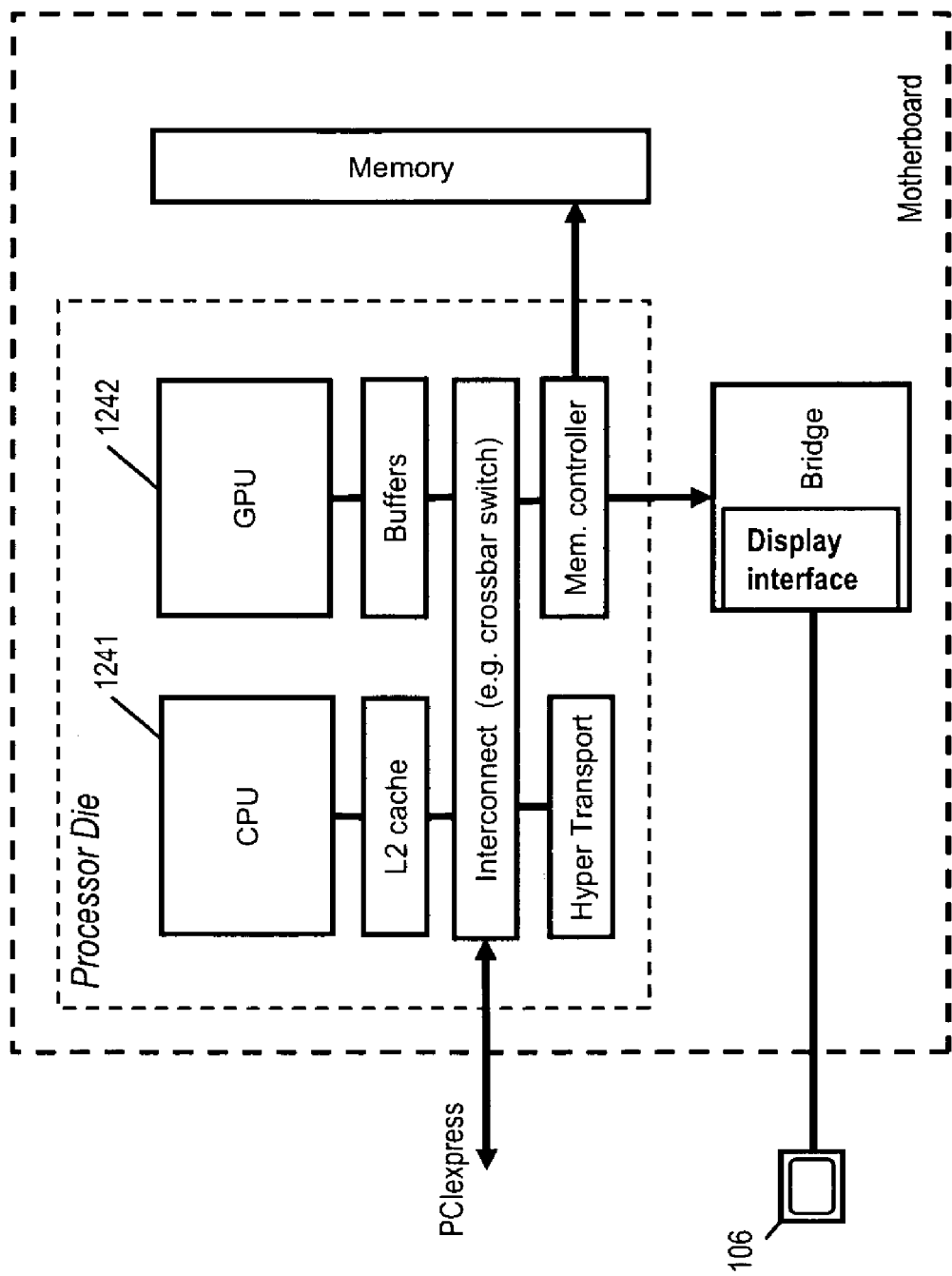
Fig. 1B4 (Prior Art)

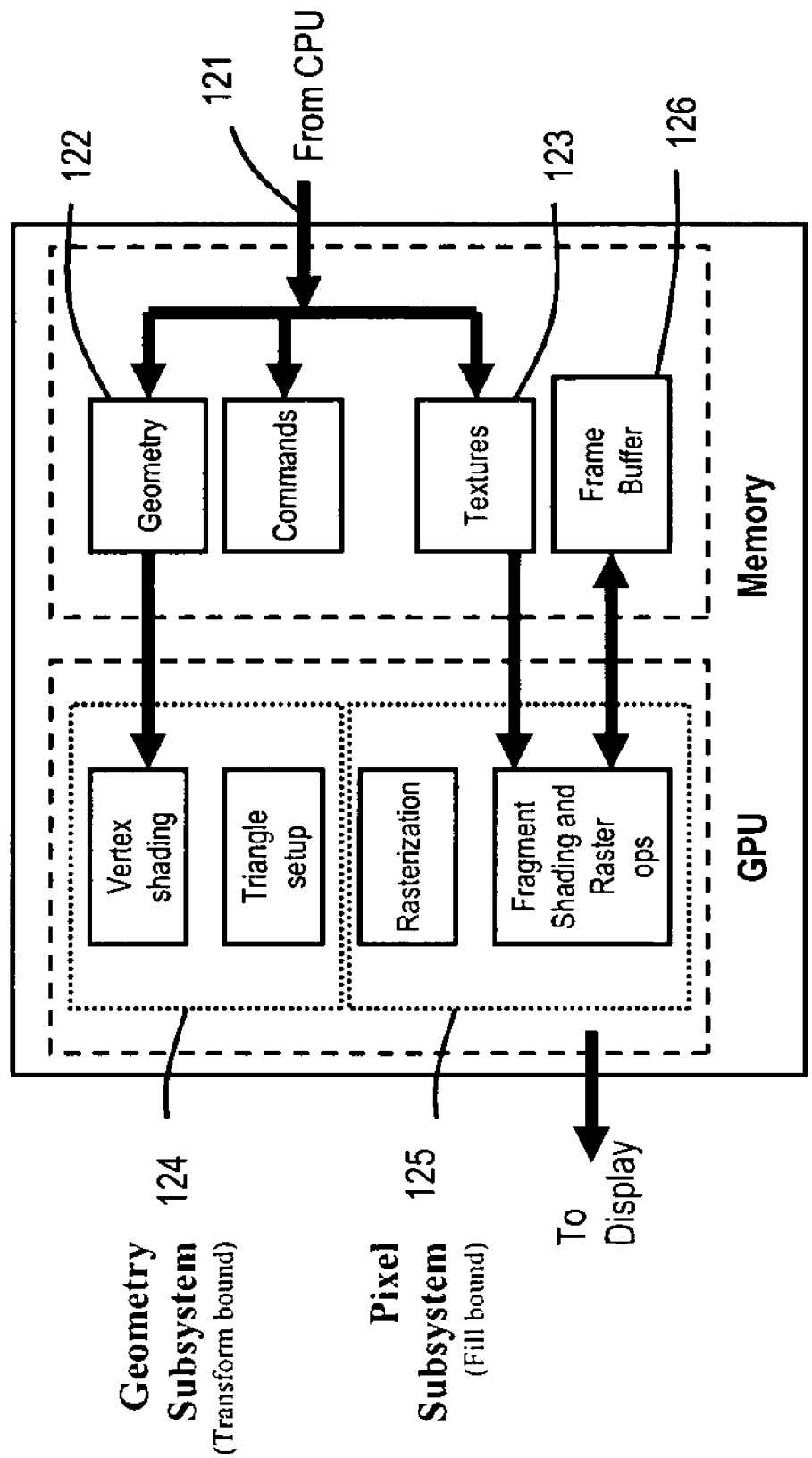
Fig.1B5 (Prior Art)

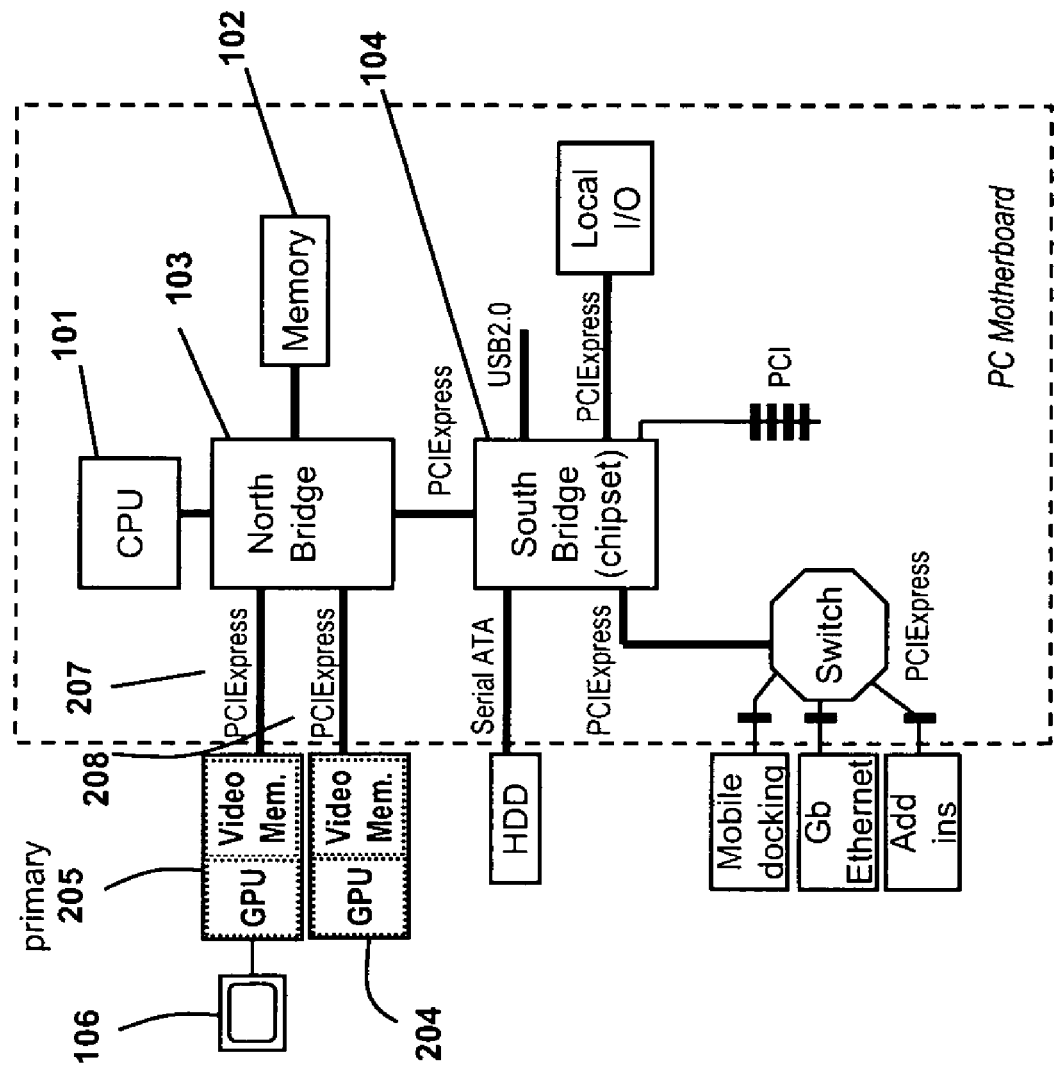
Fig. 2A1 (Prior Art)

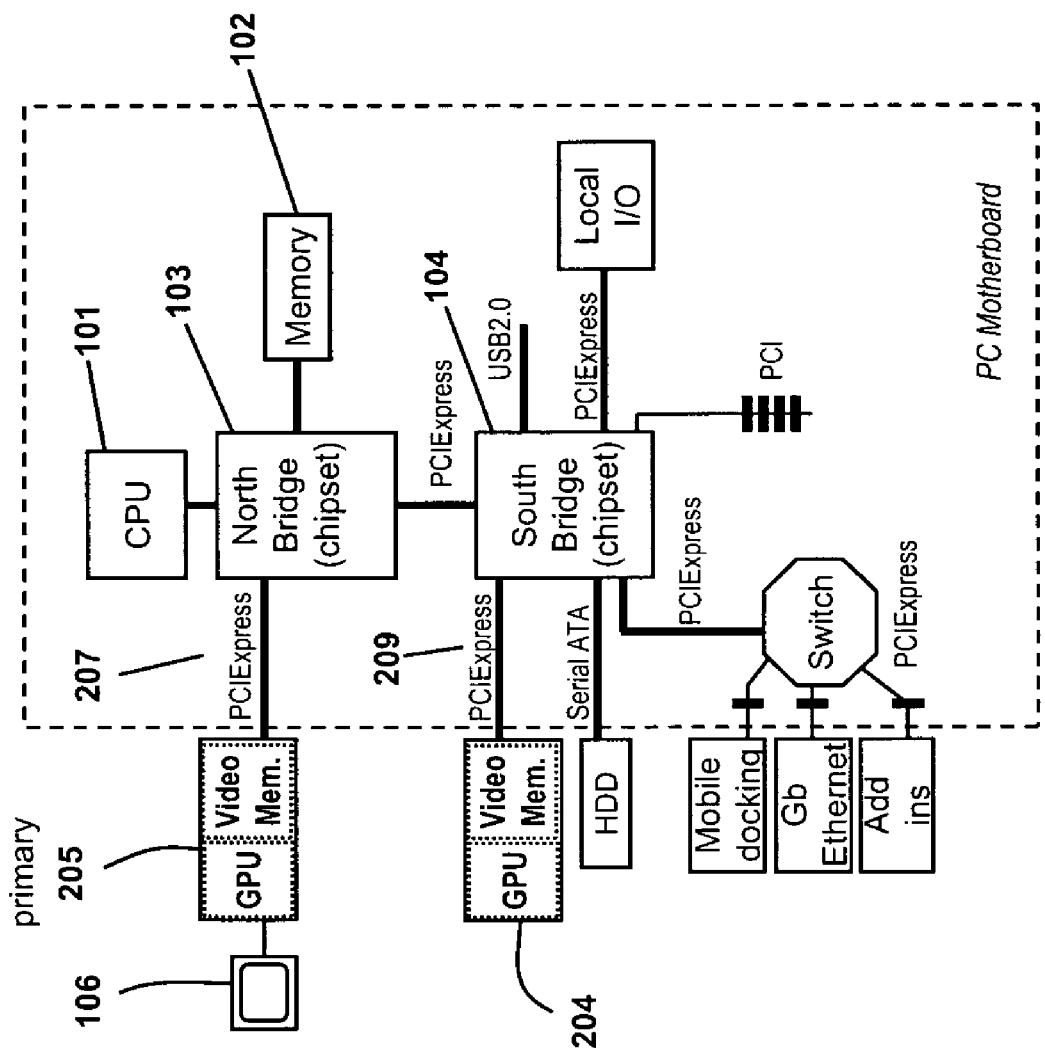
Fig. 2A2 (Prior Art)

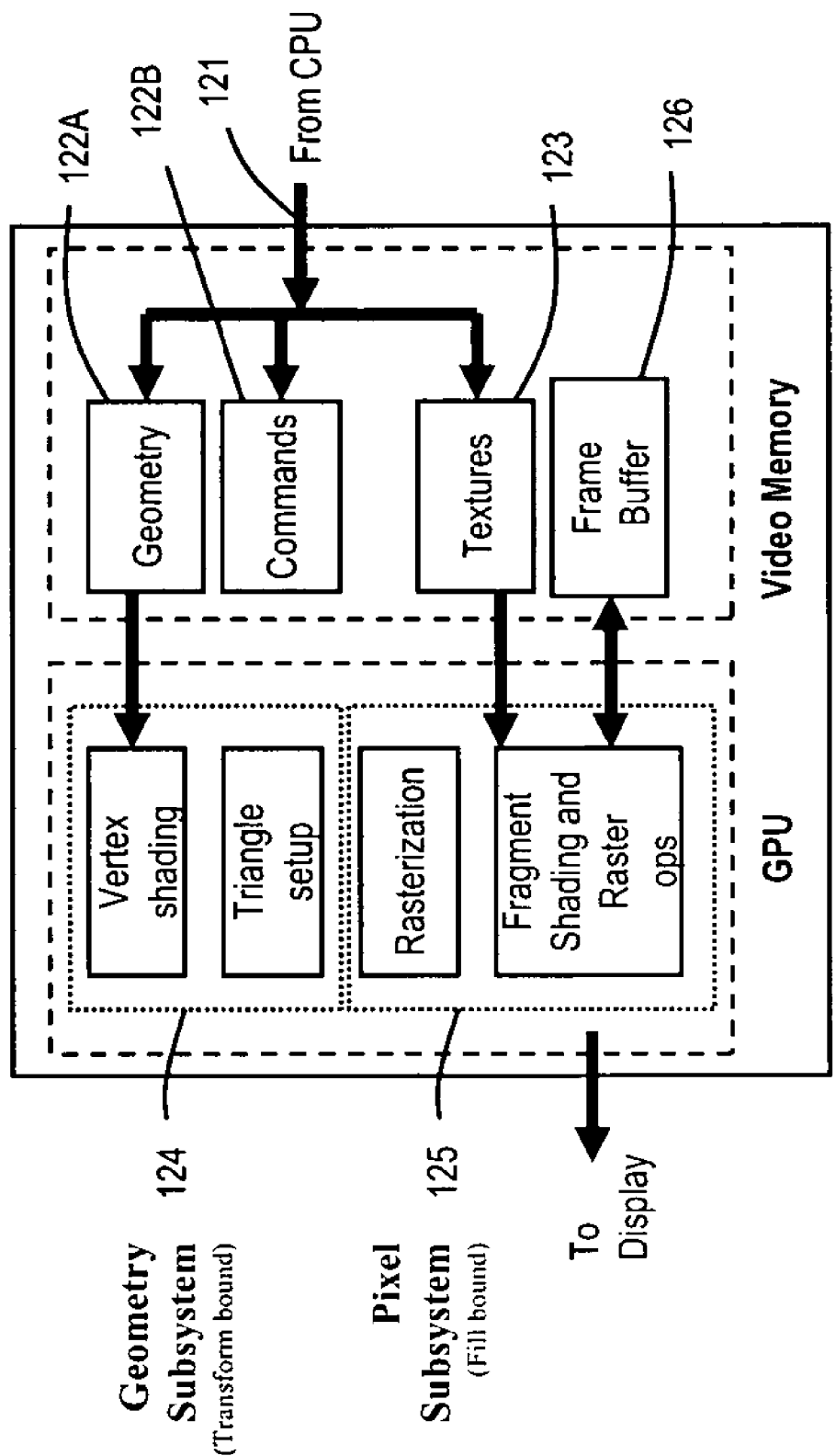
Fig.2A3 (Prior Art)

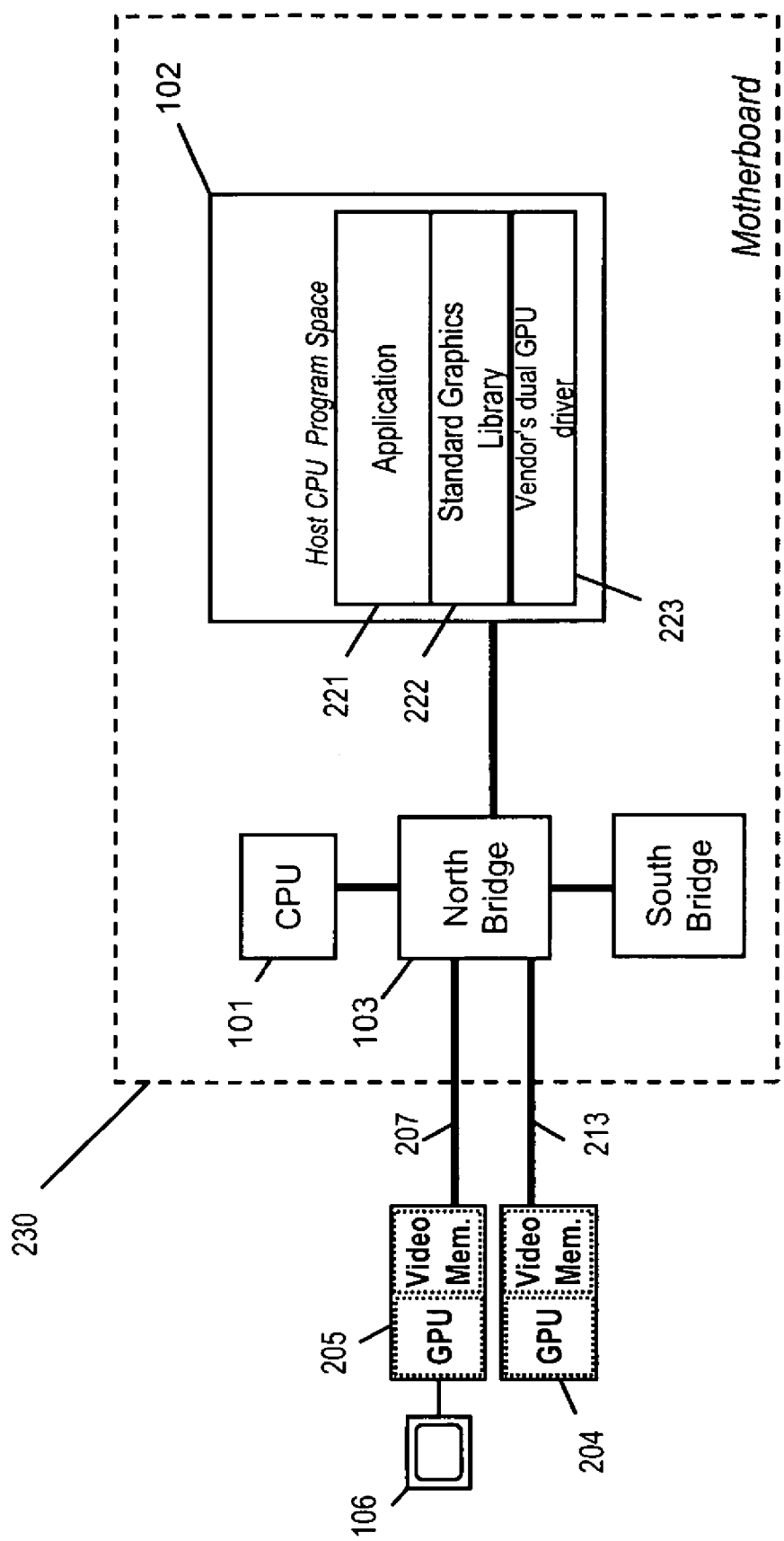
Fig. 2A4 (Prior Art)

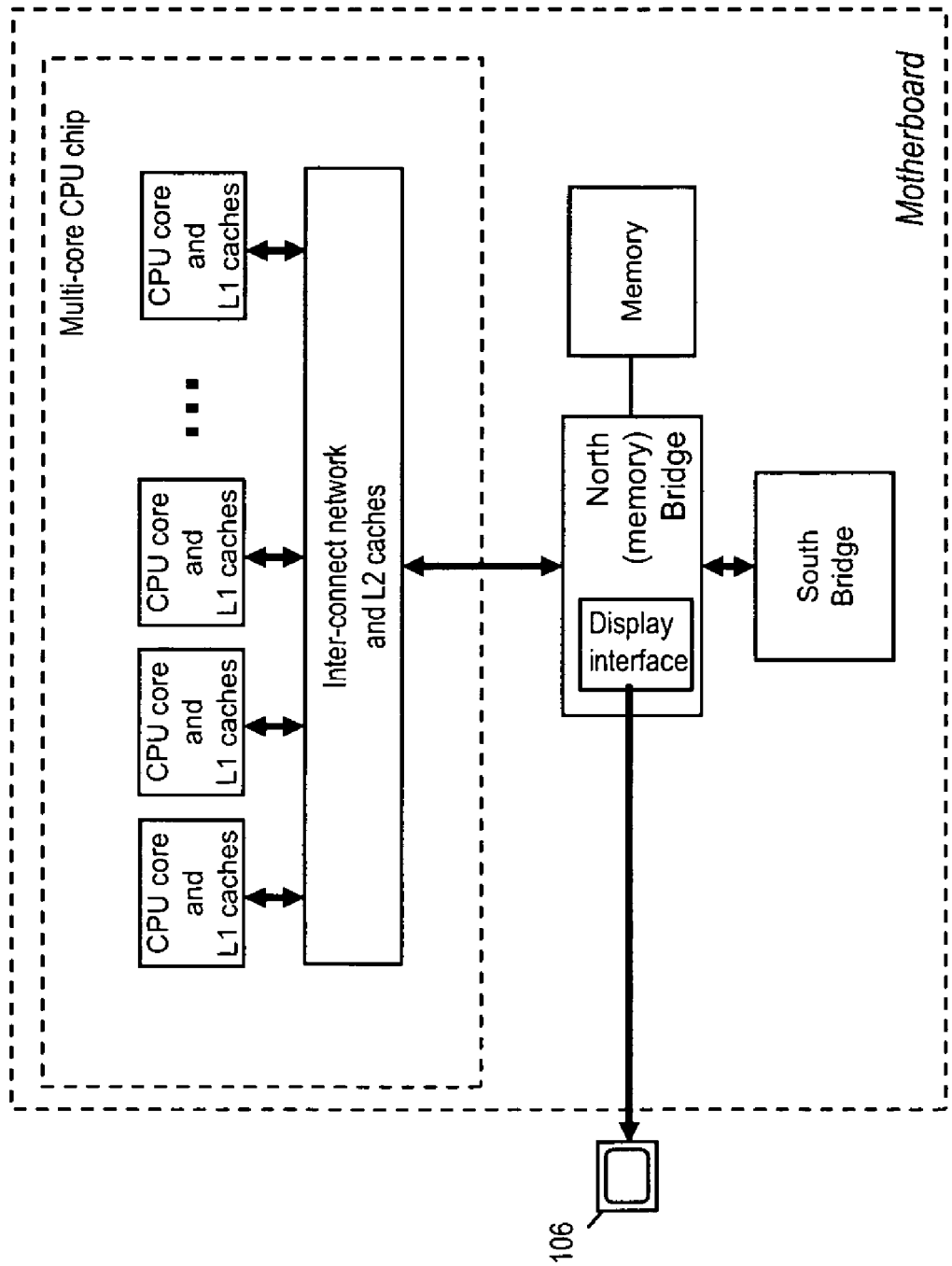
Fig. 2A5 (Prior Art)

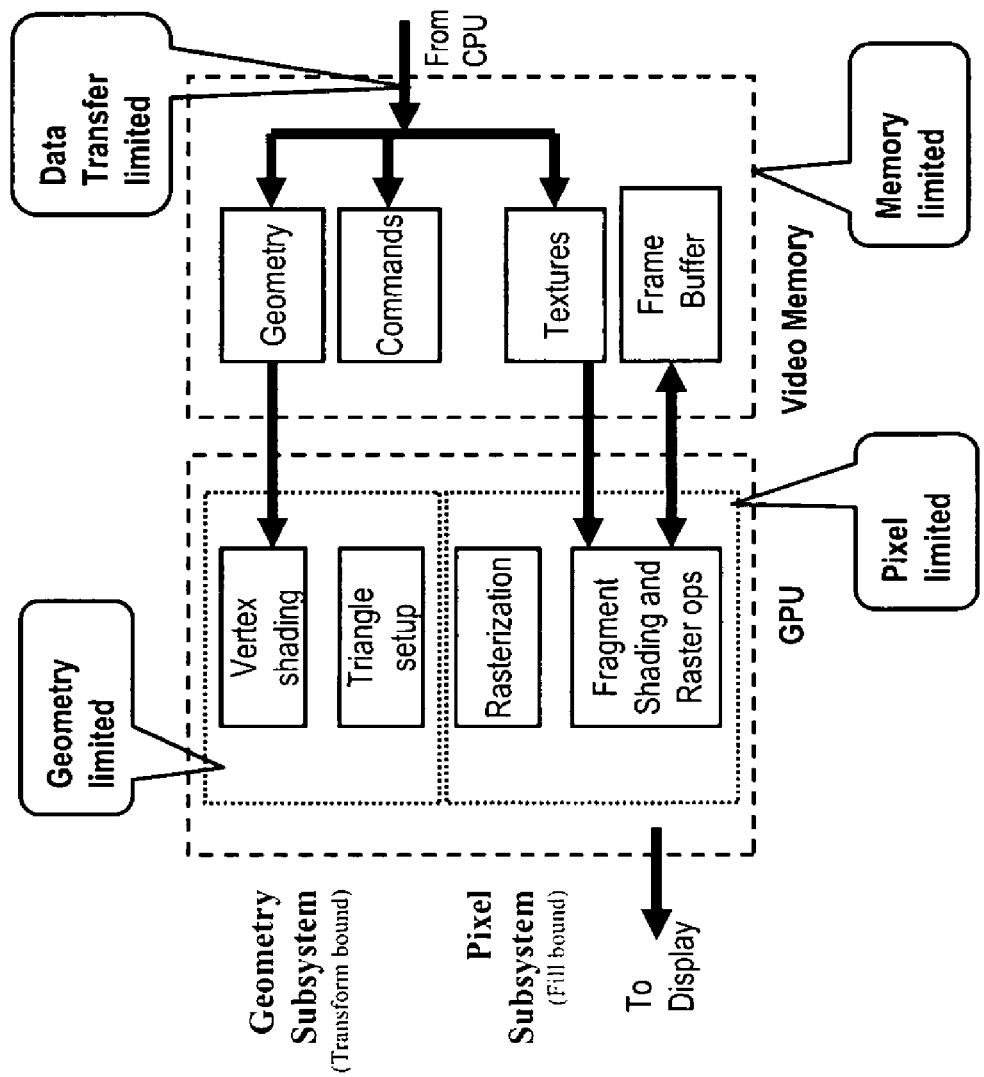
Fig. 3C1 (Prior Art)

| Parallel mode | Data Transfer | Memory | Geometry | Pixel |
|---|---|---|---|---|
| Image Division | | | | V |
| Time Division | | | V | V |
| Object Division | V | V | V | V |

Fig. 3C2 (Prior Art)

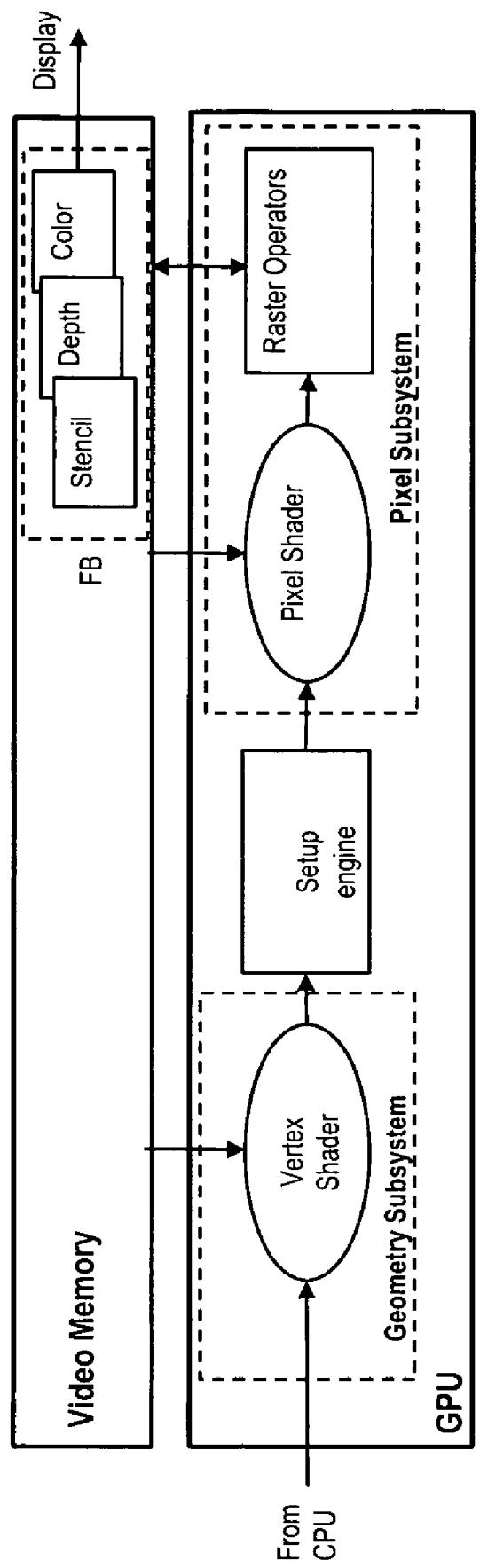
Fig. 4B1

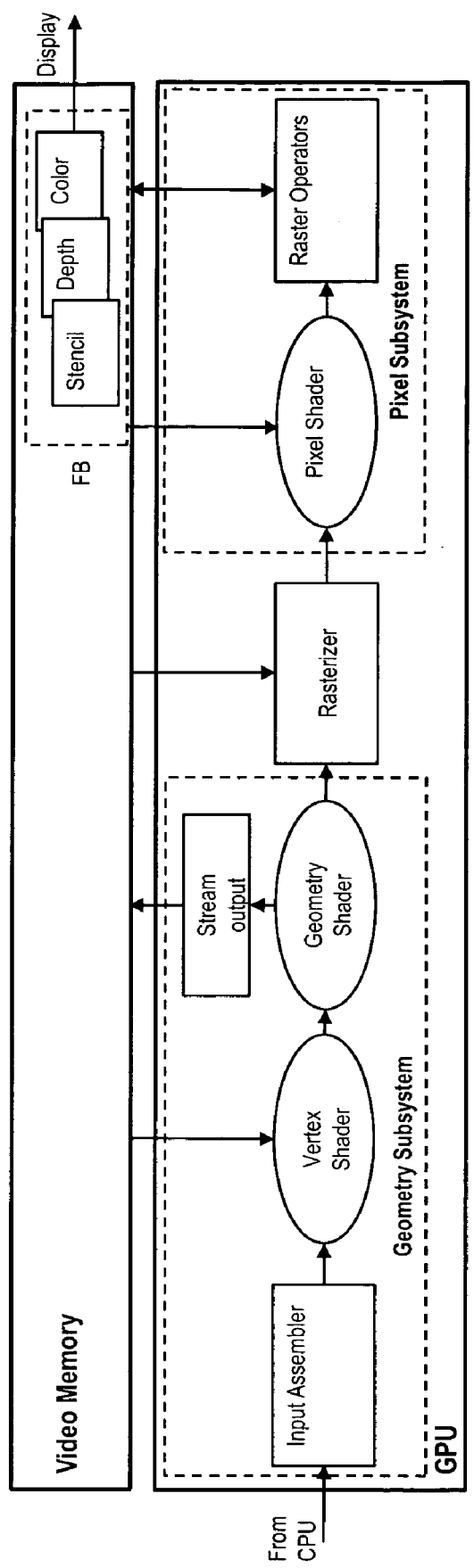
Fig. 4B2

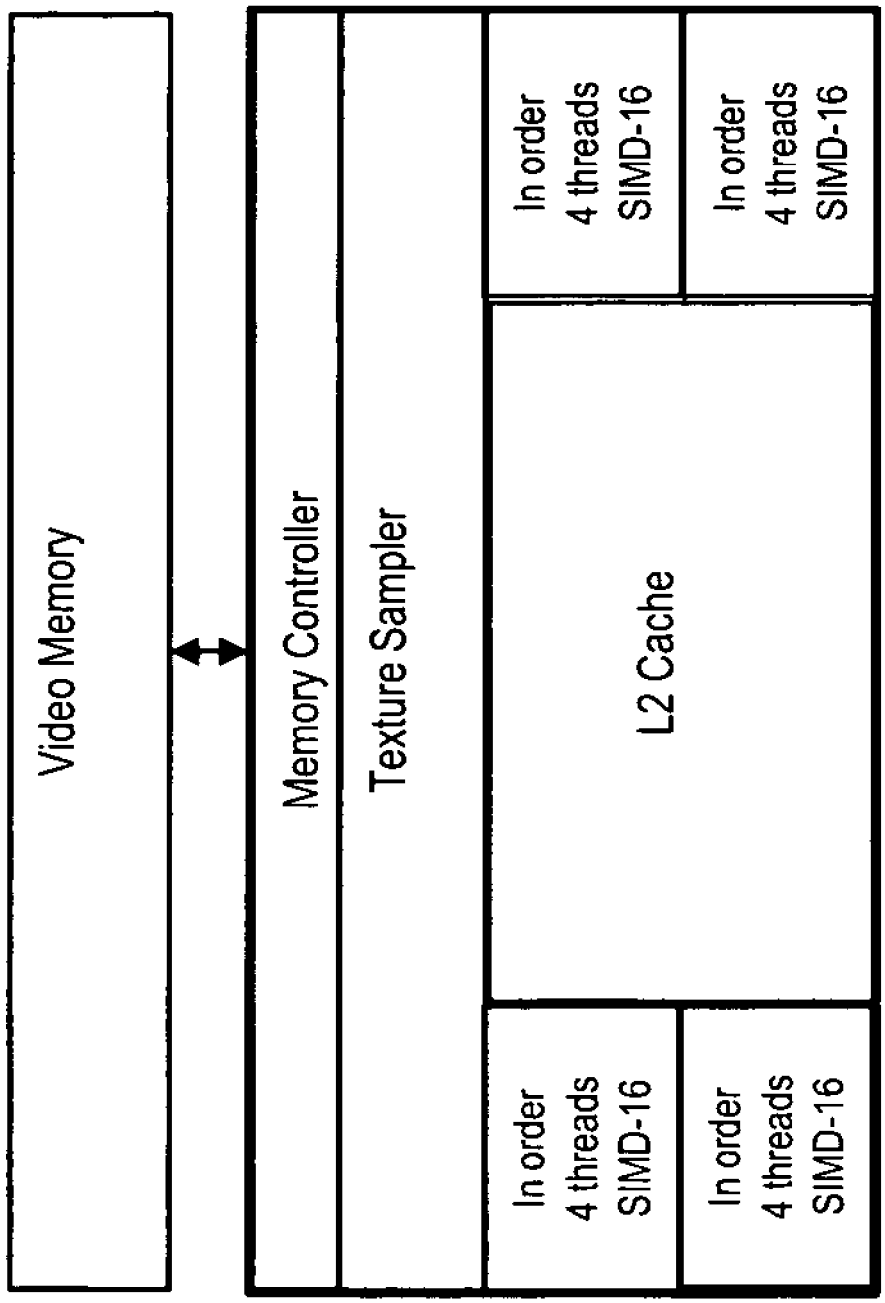
Fig. 4B3

Sub-states definitions

| Sub-state | Decomposition A | Distribution B | Recomposition C | Parallel mode |
|---|---|---|---|---|
| 1 | Object decomp. | Divide | Test based | Object div. |
| 2 | Image decomp. | Broadcast | Screen based | Image div. |
| 3 | Alternate frames | Single | None | Time div. |
| 4 | Single | | | Single GPU |

Fig. 4C

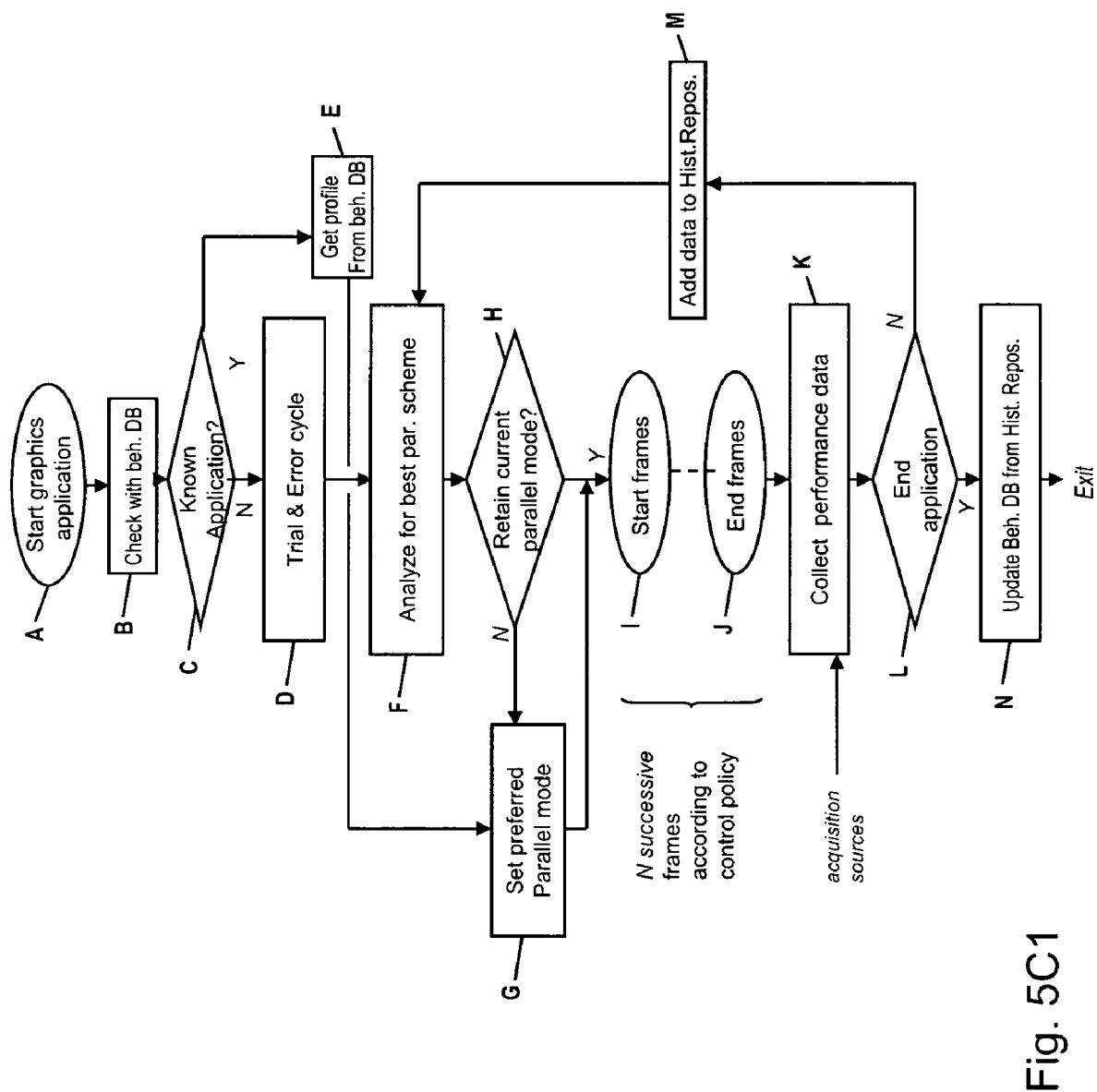
Fig. 5C1

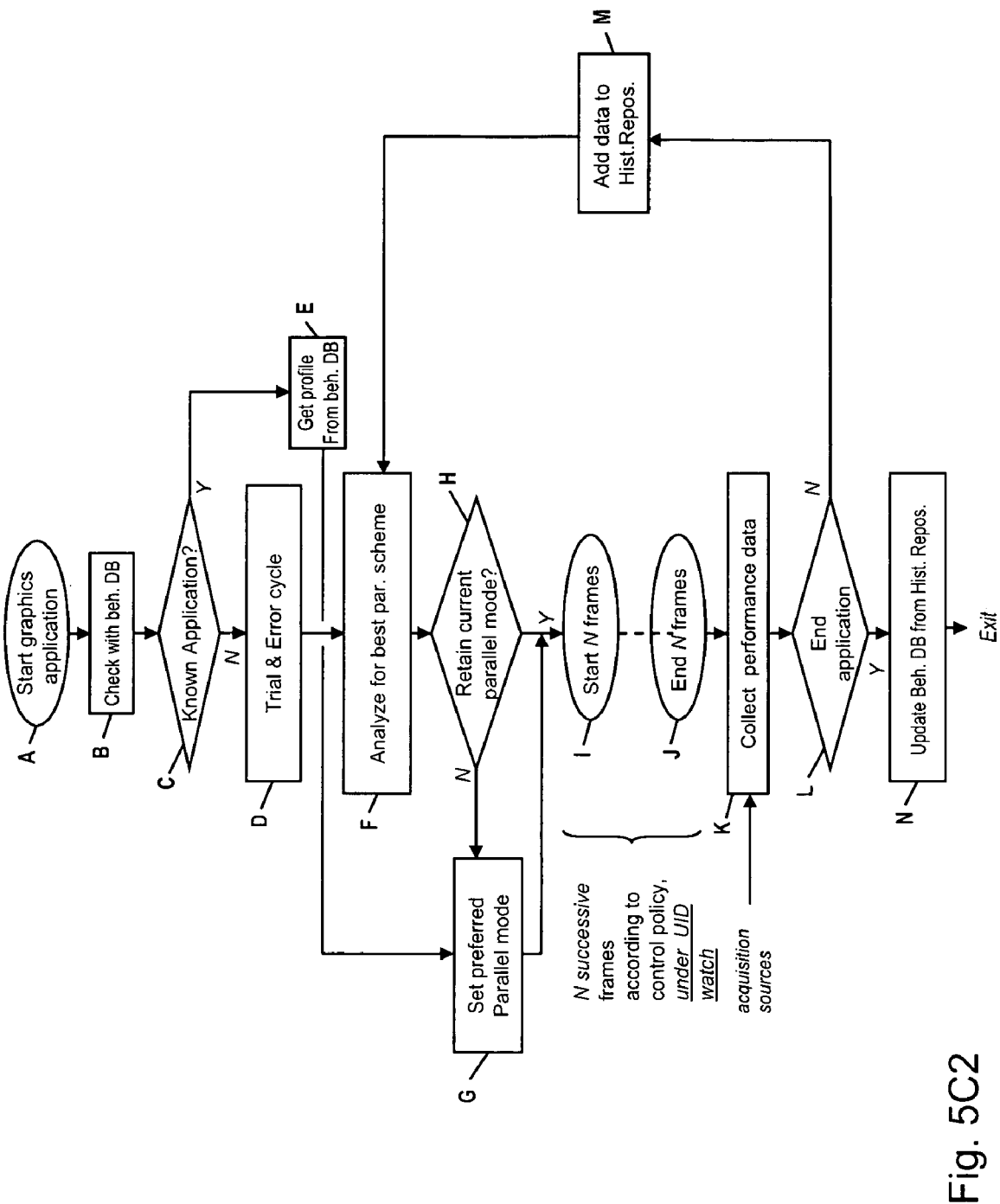
Fig. 5C2

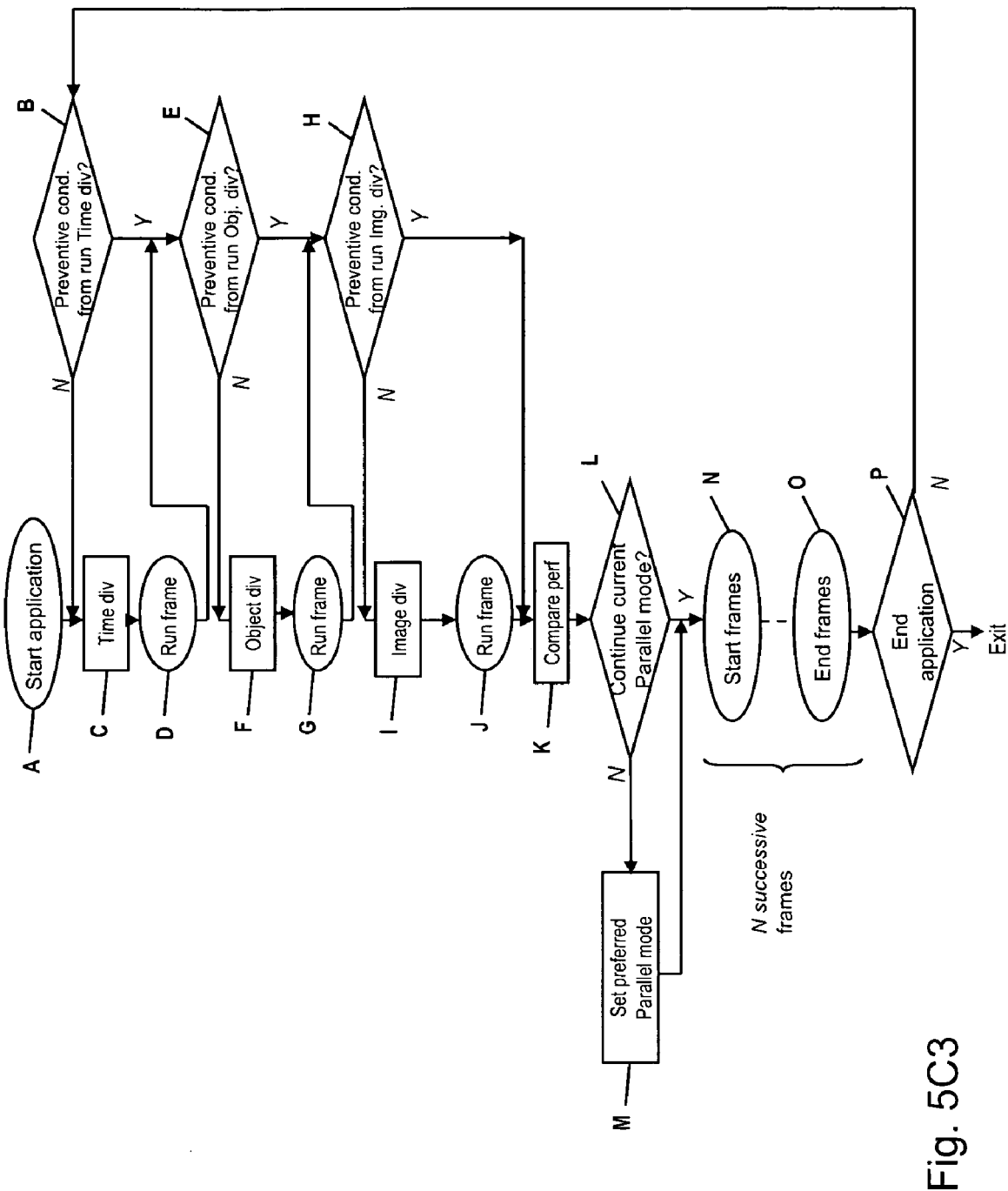
Fig. 5C3

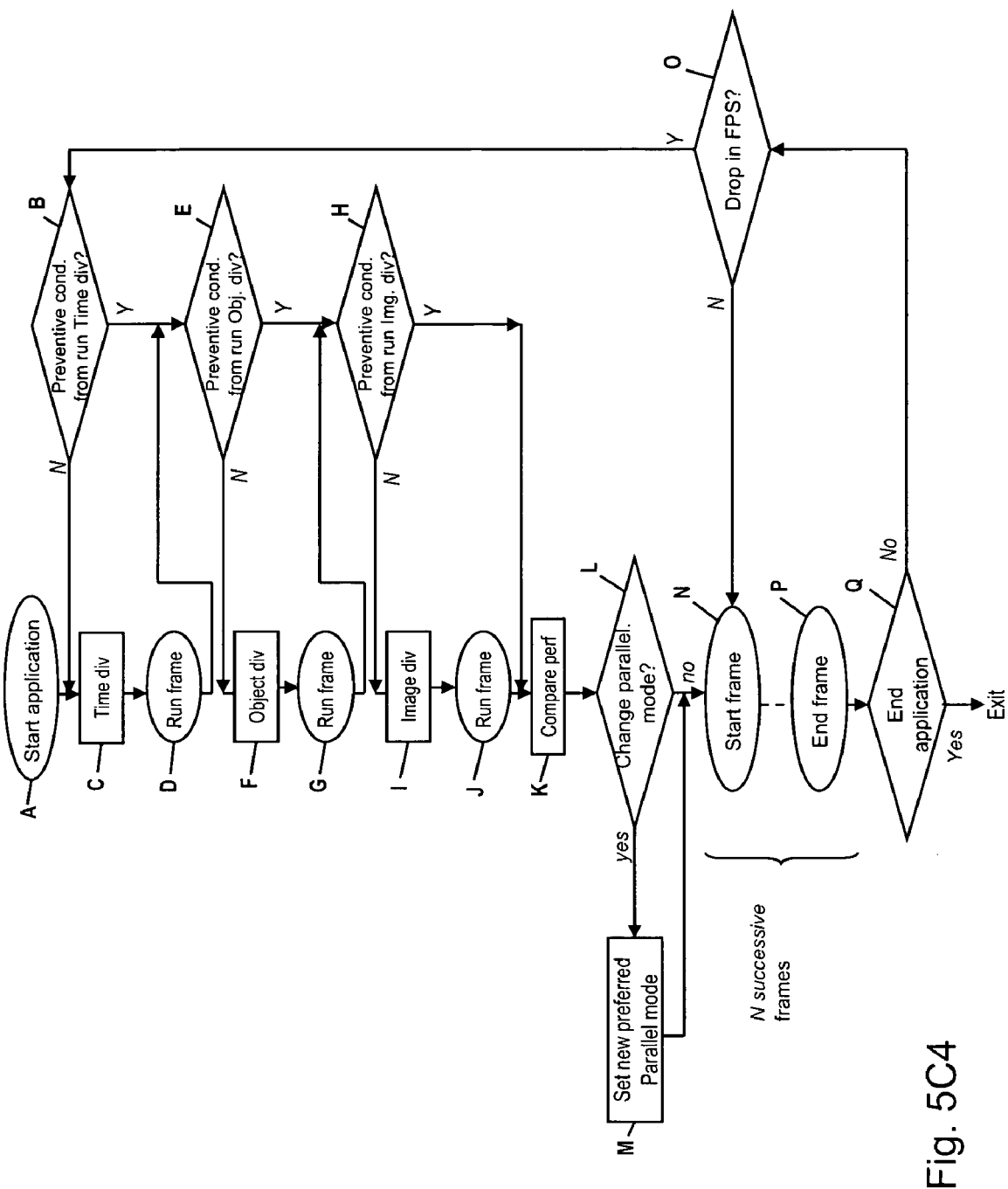
Fig. 5C4

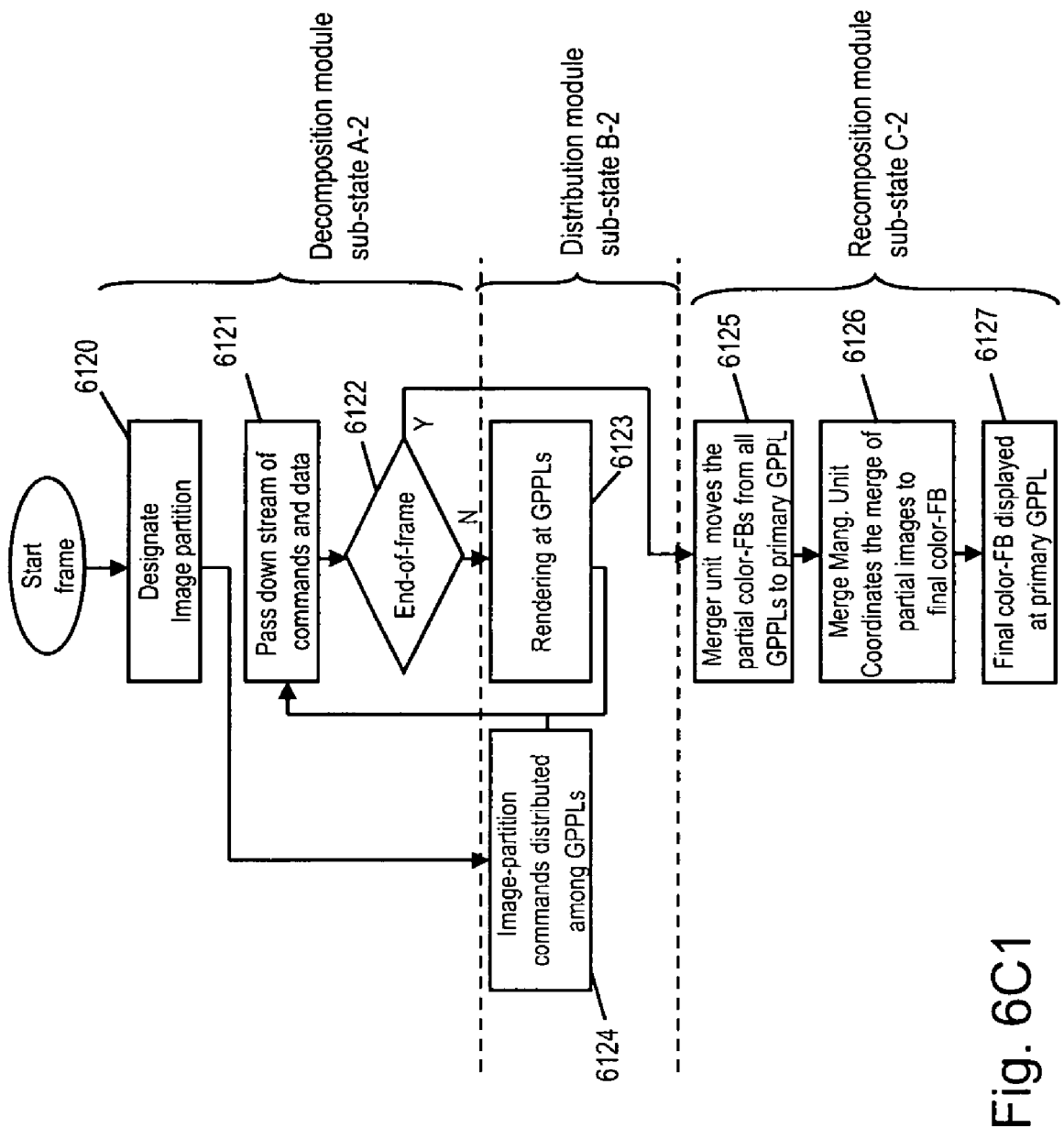
Fig. 6C1

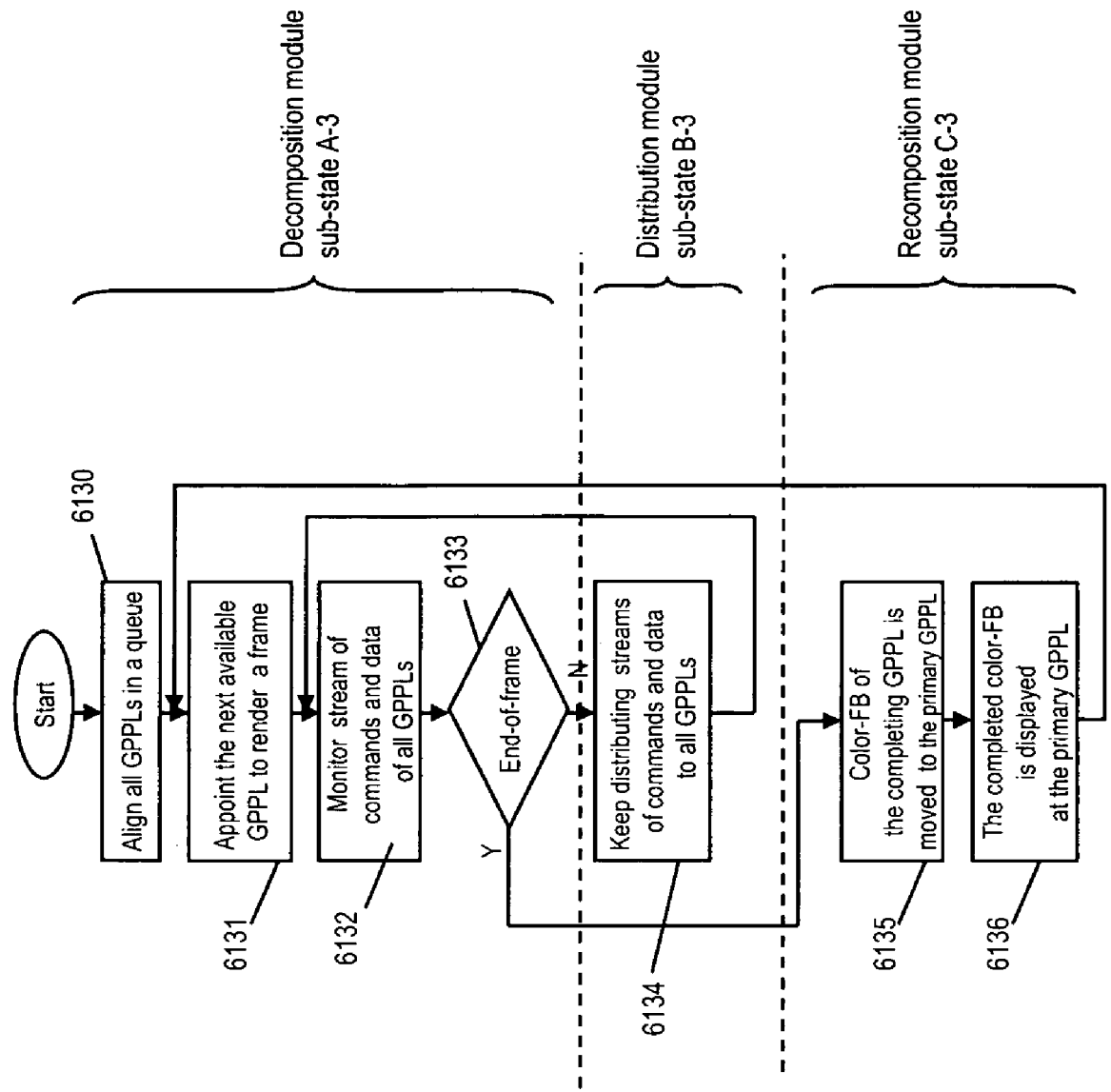
Fig. 6C2

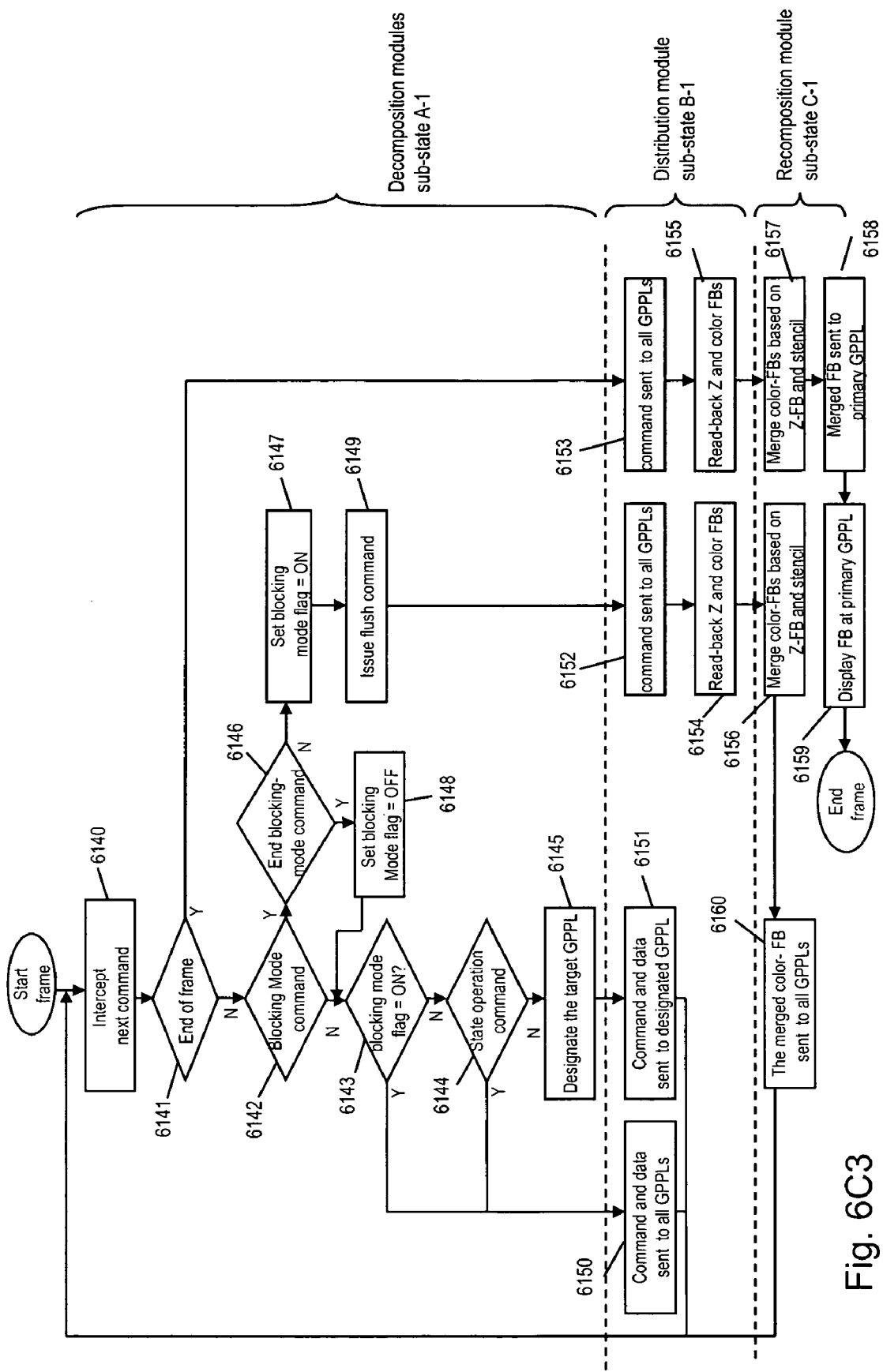
Fig. 6C3

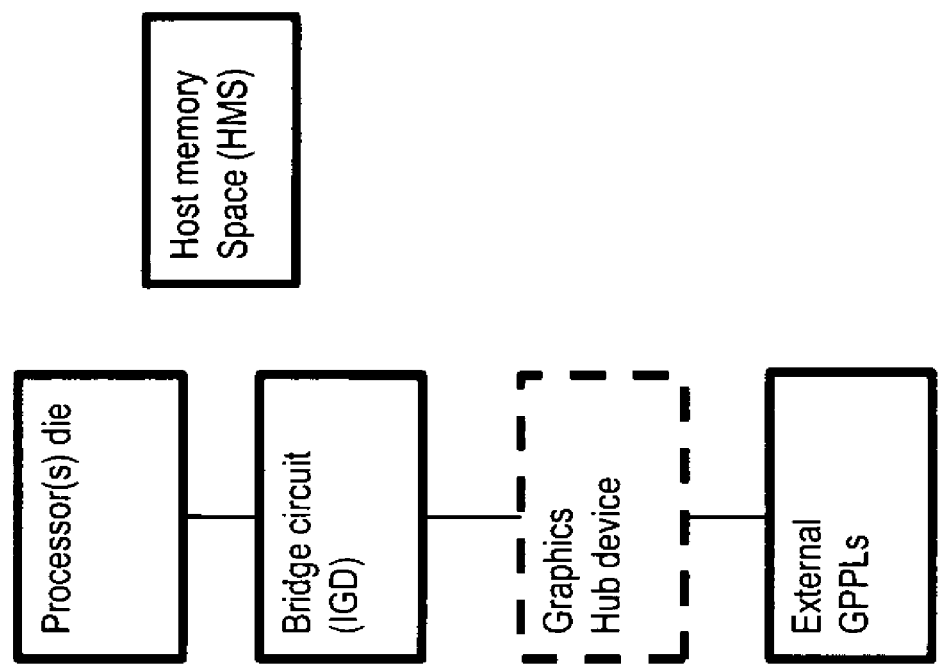
Fig. 7A1-1

| MMPGPS Architecture | Profiling and Control (PCM) | Decomp (1) | Decomp (2) | Distribution module | Cluster of GPPLs | Recomp. module |
|---|---|---|---|---|---|---|
| 1. HMS (software) | HMS | HMS | HMS | Bridge | Ext. GPU | HMS |
| 2. HMS + IGD | HMS | HMS | HMS | Bridge | Bridge (IGD) + ext. GPU | HMS |
| 3. HMS + Fusion | HMS | HMS | HMS | Bridge | Ext. GPU | GPU |
| 4. HMS + multicore | HMS | HMS | HMS | Processor die | Processor die + ext. GPU | Processor die |
| 5. HMS + GPU-recomp. | HMS | HMS | HMS | HMS | Ext. GPU | GPU |
| 6. Hub | HMS | HMS | Hub device | Hub device | Ext. GPU | Hub device |
| 7. Hub +GPU-recomp. | HMS | HMS | Hub device | Hub device | Ext. GPU | GPU |
| 8. Chipset | HMS | HMS | Bridge | Bridge | Bridge + Ext. GPU | Bridge or Ext. GPU |
| 9. CPU/GPU fusion | HMS or Processor die | HMS | Processor die | Processor die | Processor die + Ext. GPU | Processor die or Ext. GPU |
| 10. Multicore CPU | HMS or Processor die | HMS | Processor die | Processor die | Processor die + Ext. GPU | Processor die or Ext. GPU |
| 11. Game console | Hub device | Hub device | Hub device | Hub device | Consol internal | Hub device or GPU |

Fig. 7A1-2

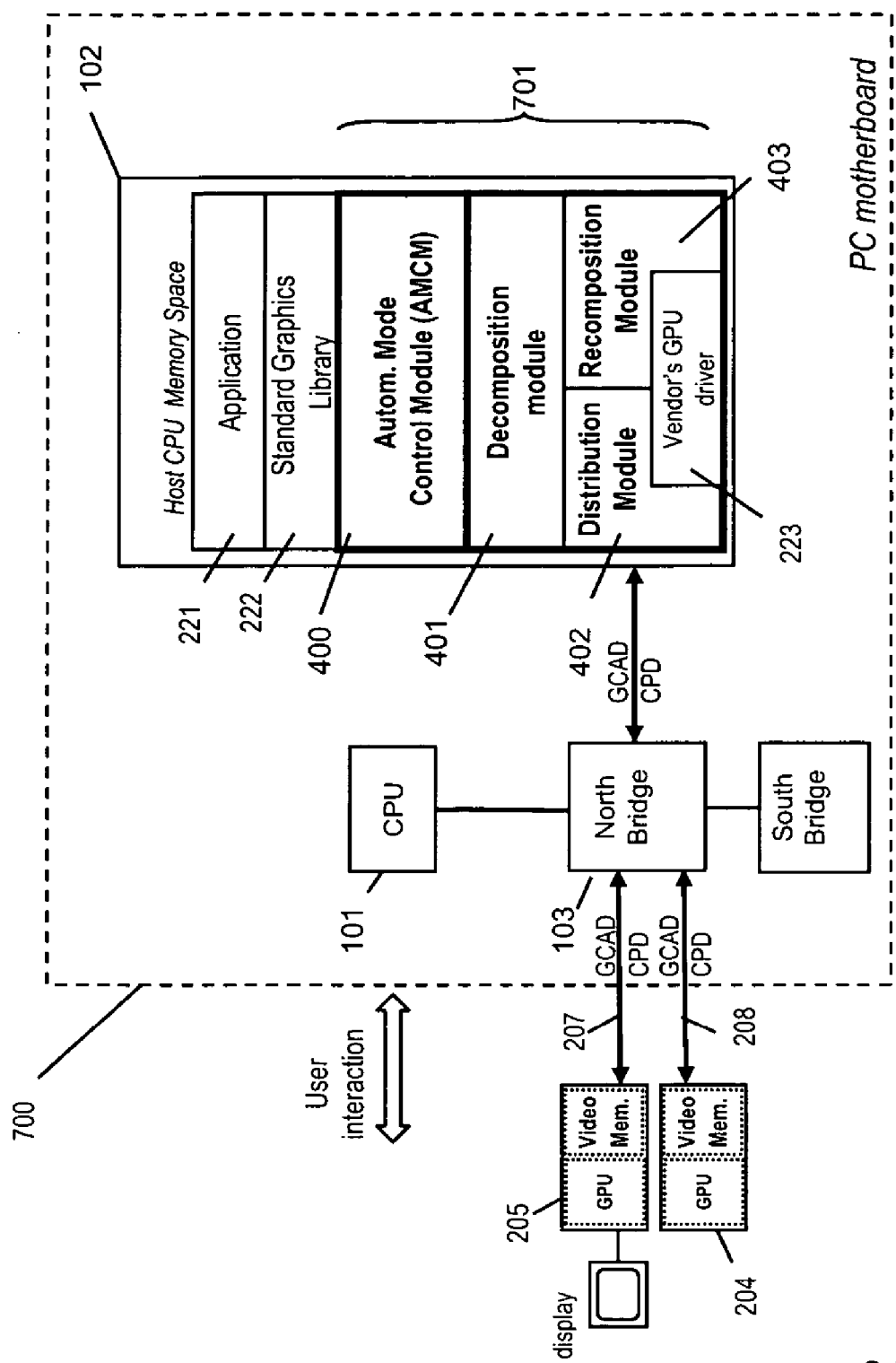
Fig. 7A2

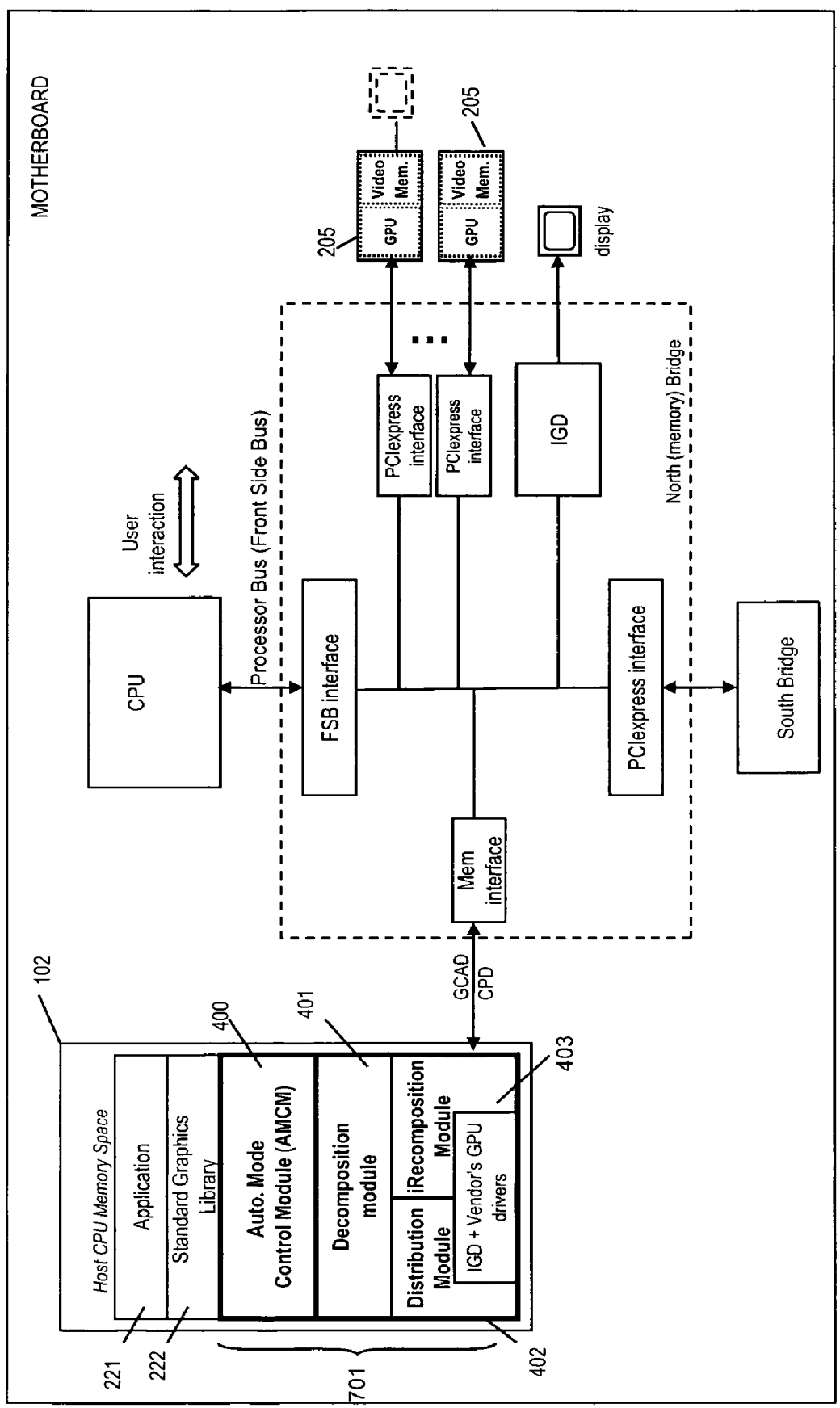
Fig. 7A3

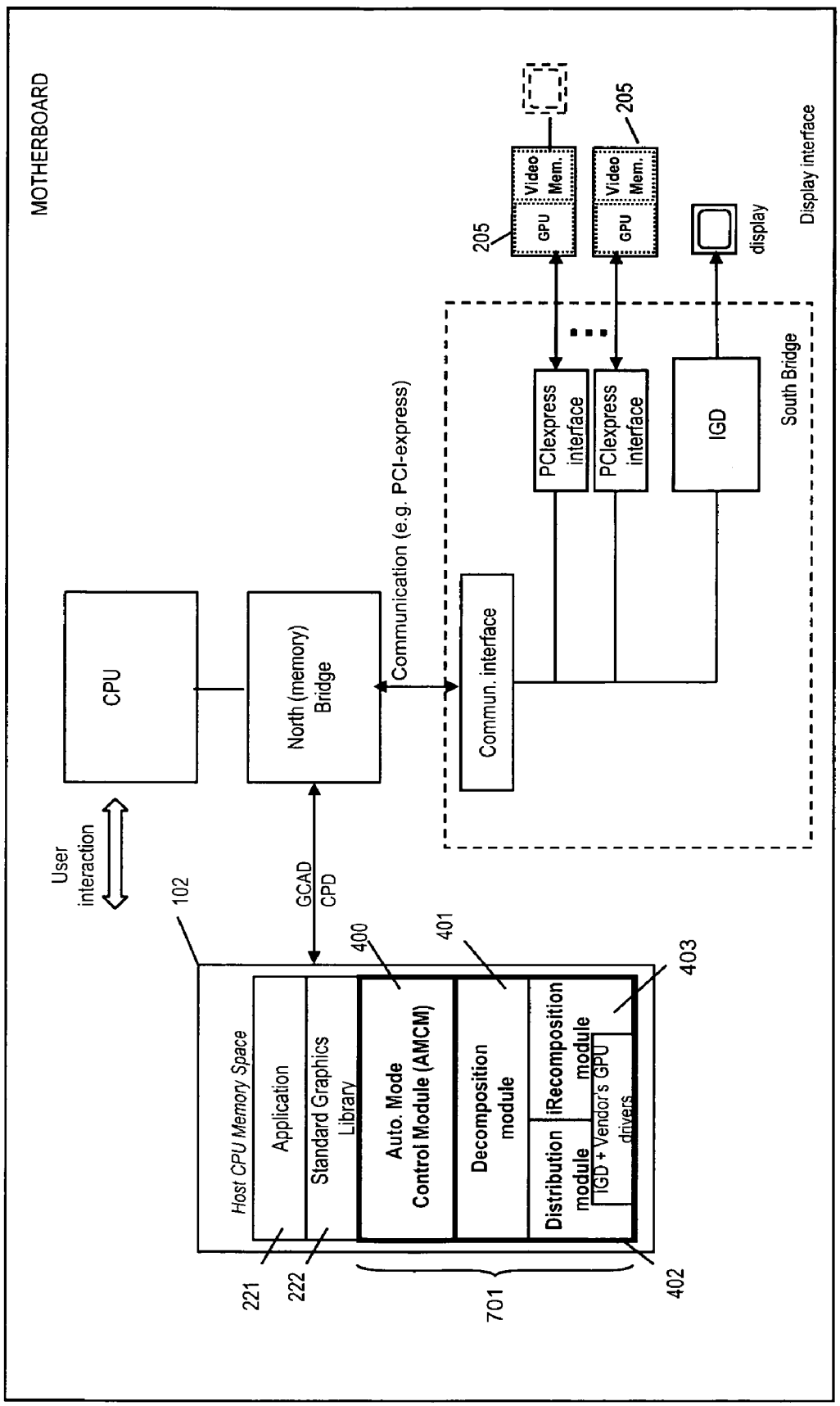
Fig. 7A4

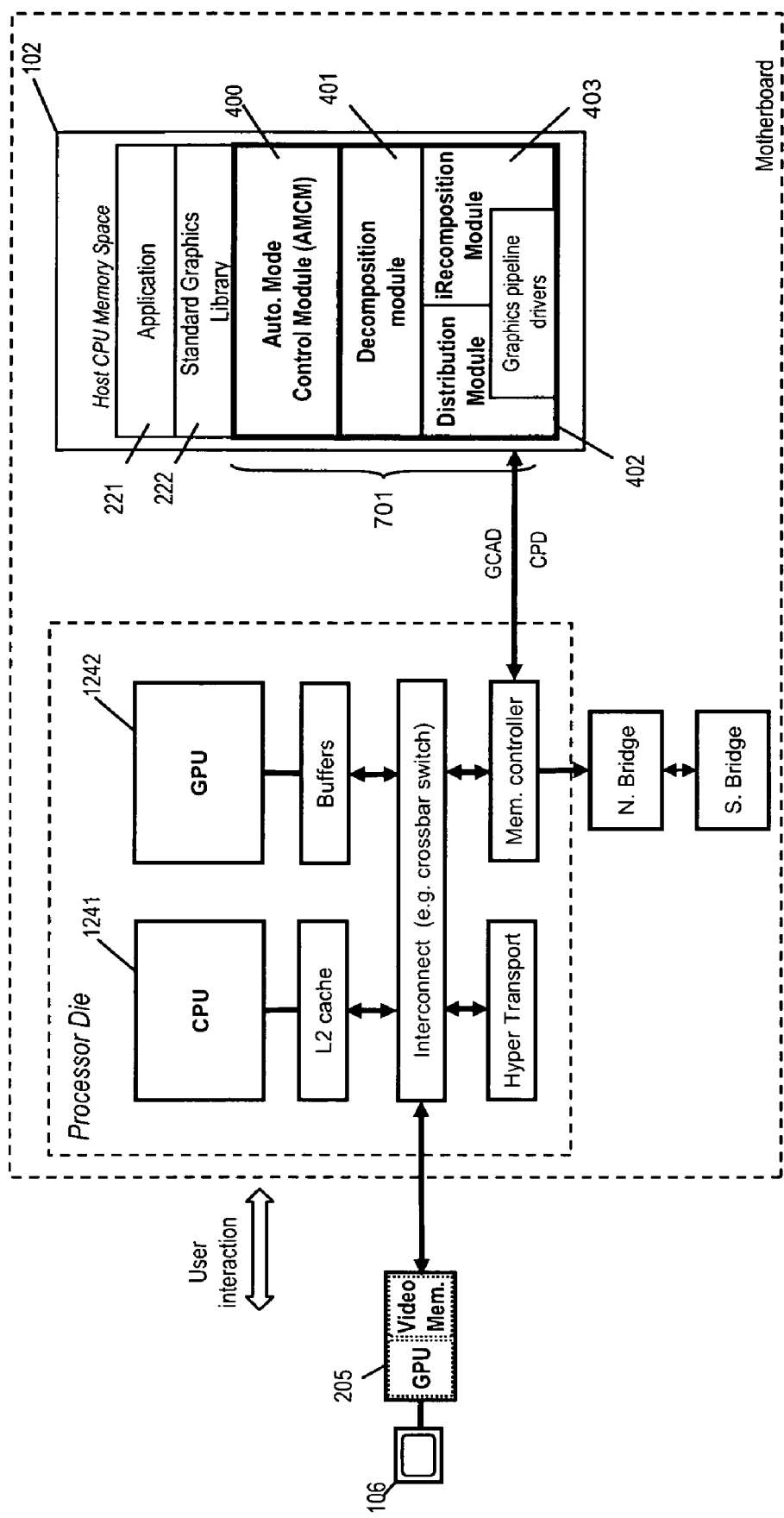
Fig. 7A5

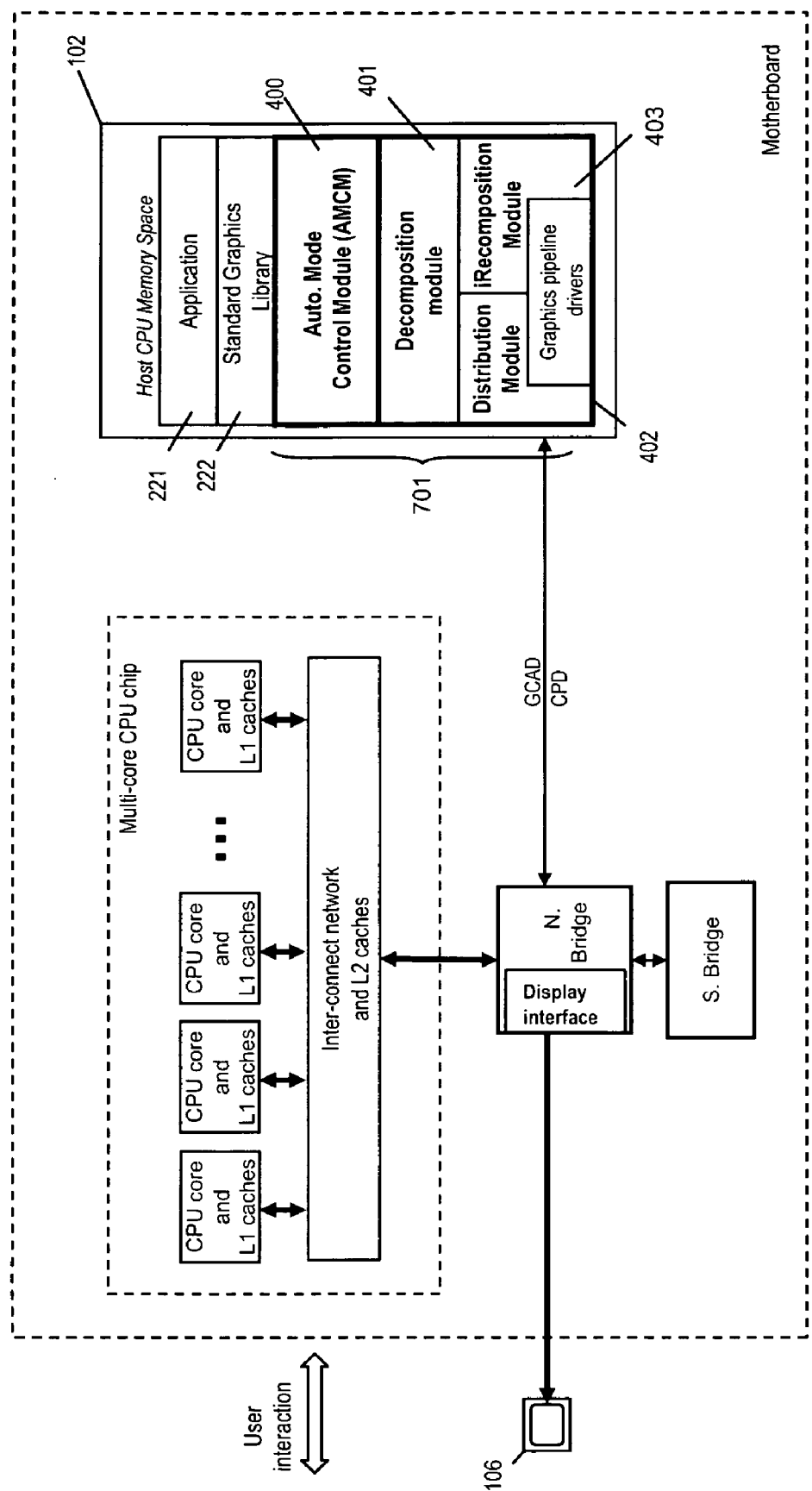
Fig. 7A6

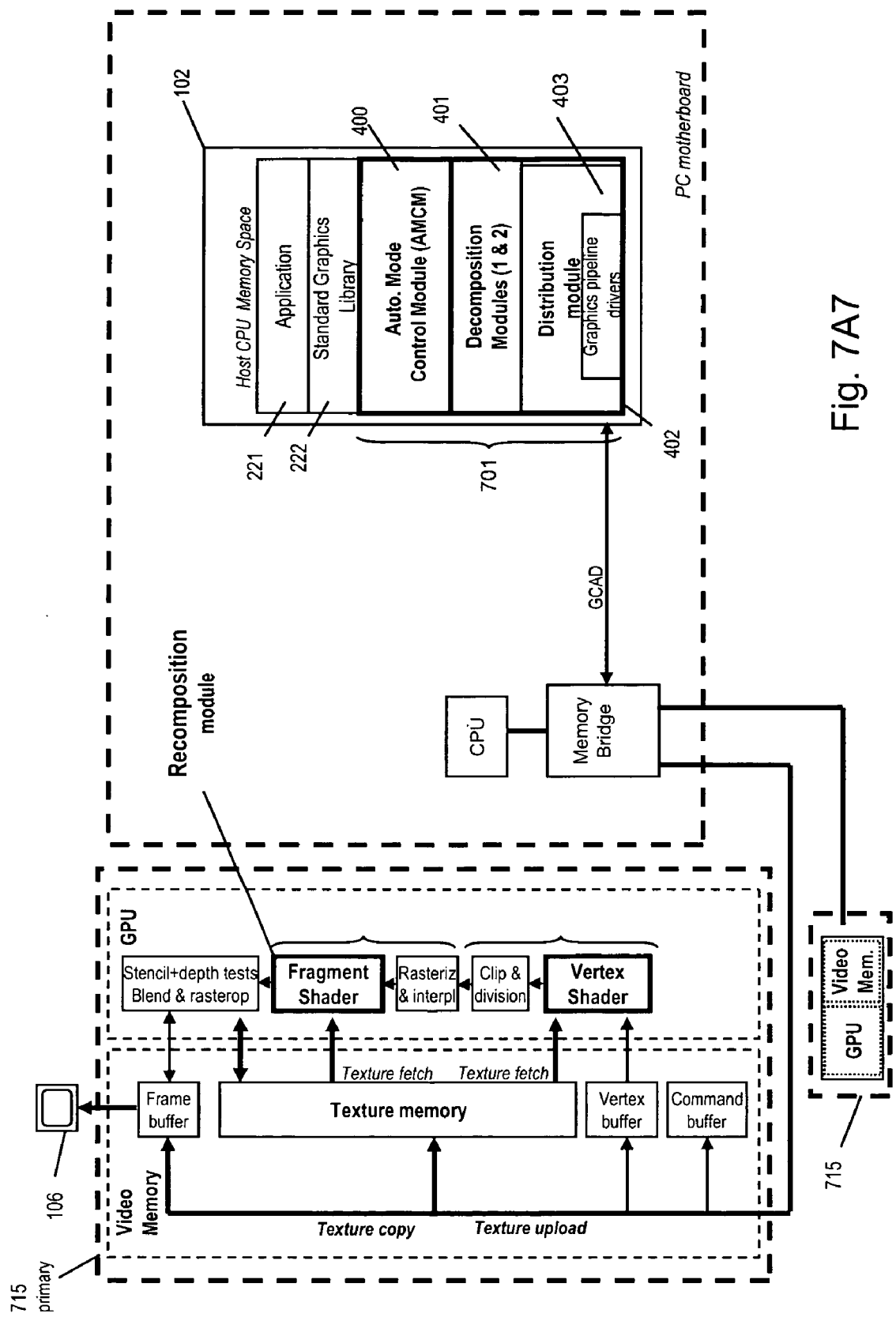
Fig. 7A7

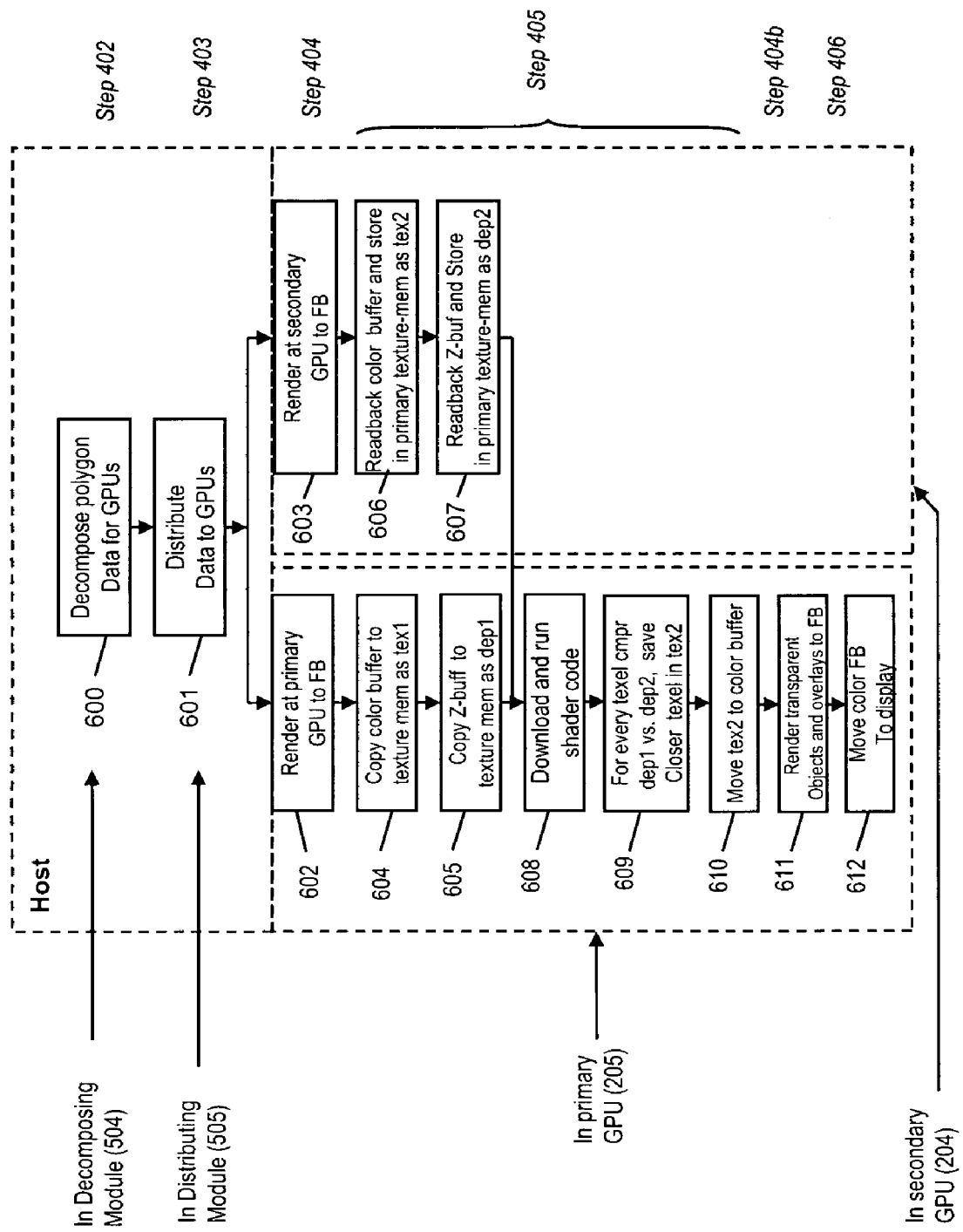
Fig. 7A7-1

```
uniform sampler2D tex1,tex2;
uniform sampler2D dep1,dep2;
void main(void)
{
    vec4 texel1 = texture2D(tex1,gl_TexCoord[0].st);
    vec4 texel2 = texture2D(tex2,gl_TexCoord[0].st);
    vec4 depth1 = texture2D(dep1,gl_TexCoord[0].st);
    vec4 depth2 = texture2D(dep2,gl_TexCoord[0].st);
    vec4 color = texel1;

if (depth1.r > depth2.r) {
        color = texel2;
    }
    else if ((depth1.r == depth2.r) && (depth1.g > depth2.g)) {
        color = texel2;
    }
    else if ((depth1.r == depth2.r) && (depth1.g == depth2.g) && (depth1.b > depth2.b)) {
        color = texel2;
    } gl_FragColor = (color);
}
```

Fig. 7A7-2

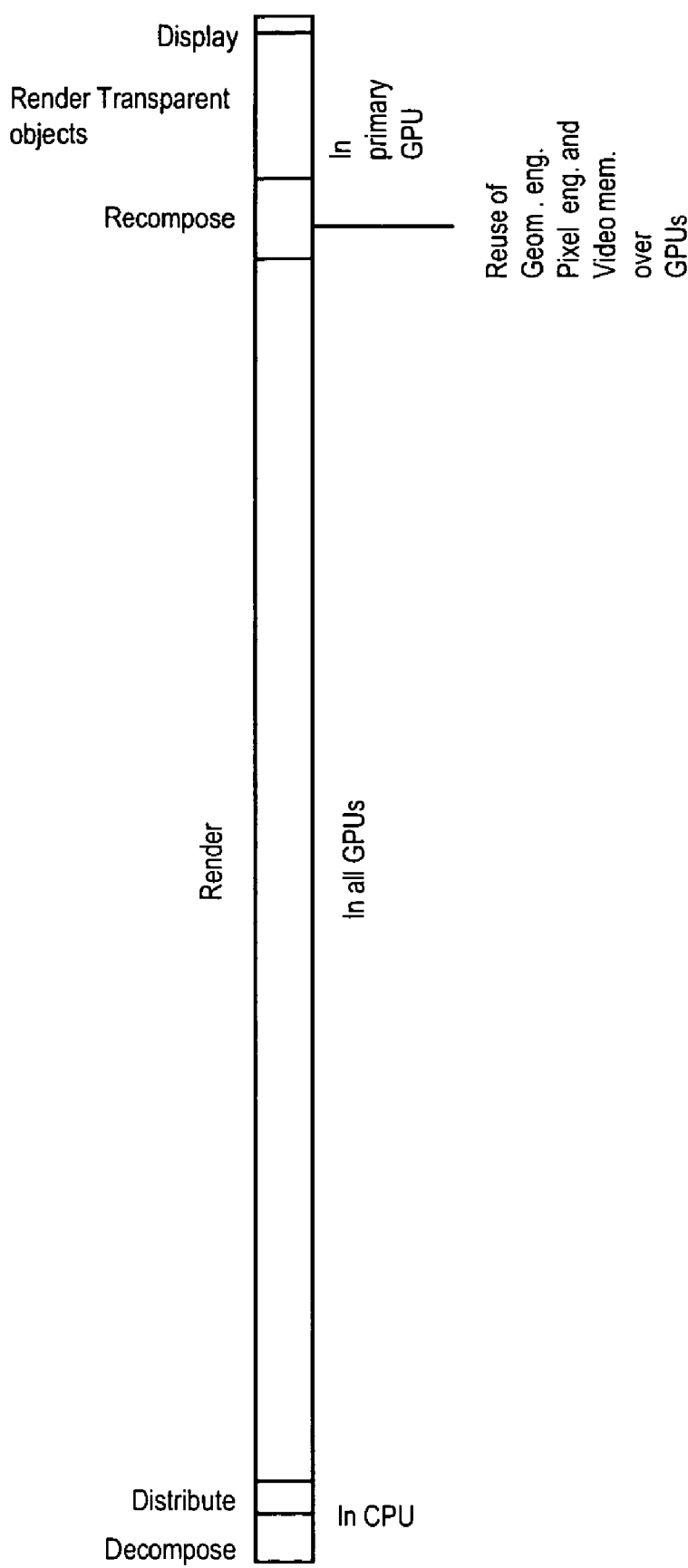
Fig. 7A7-3

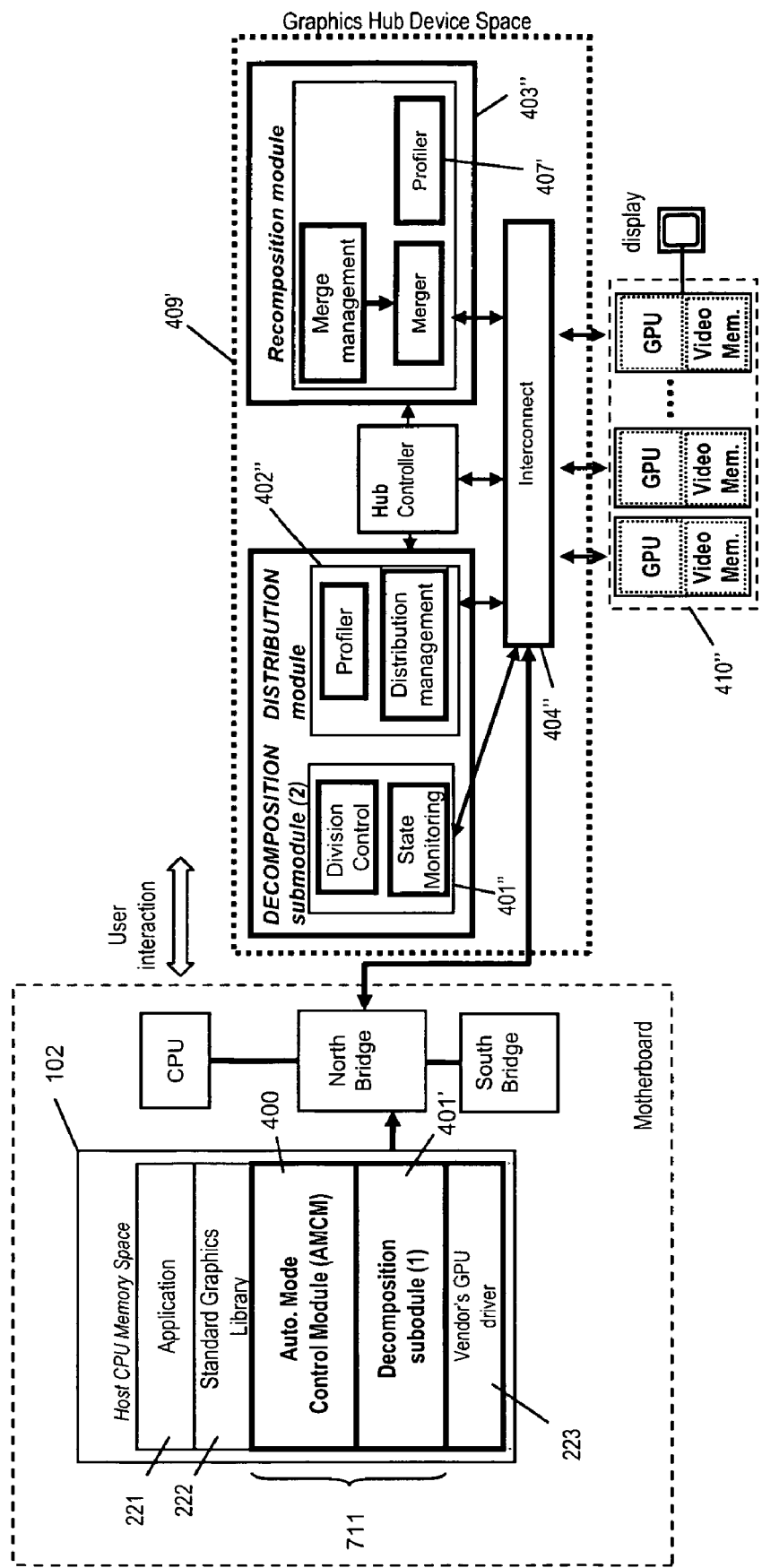
Fig. 7B1

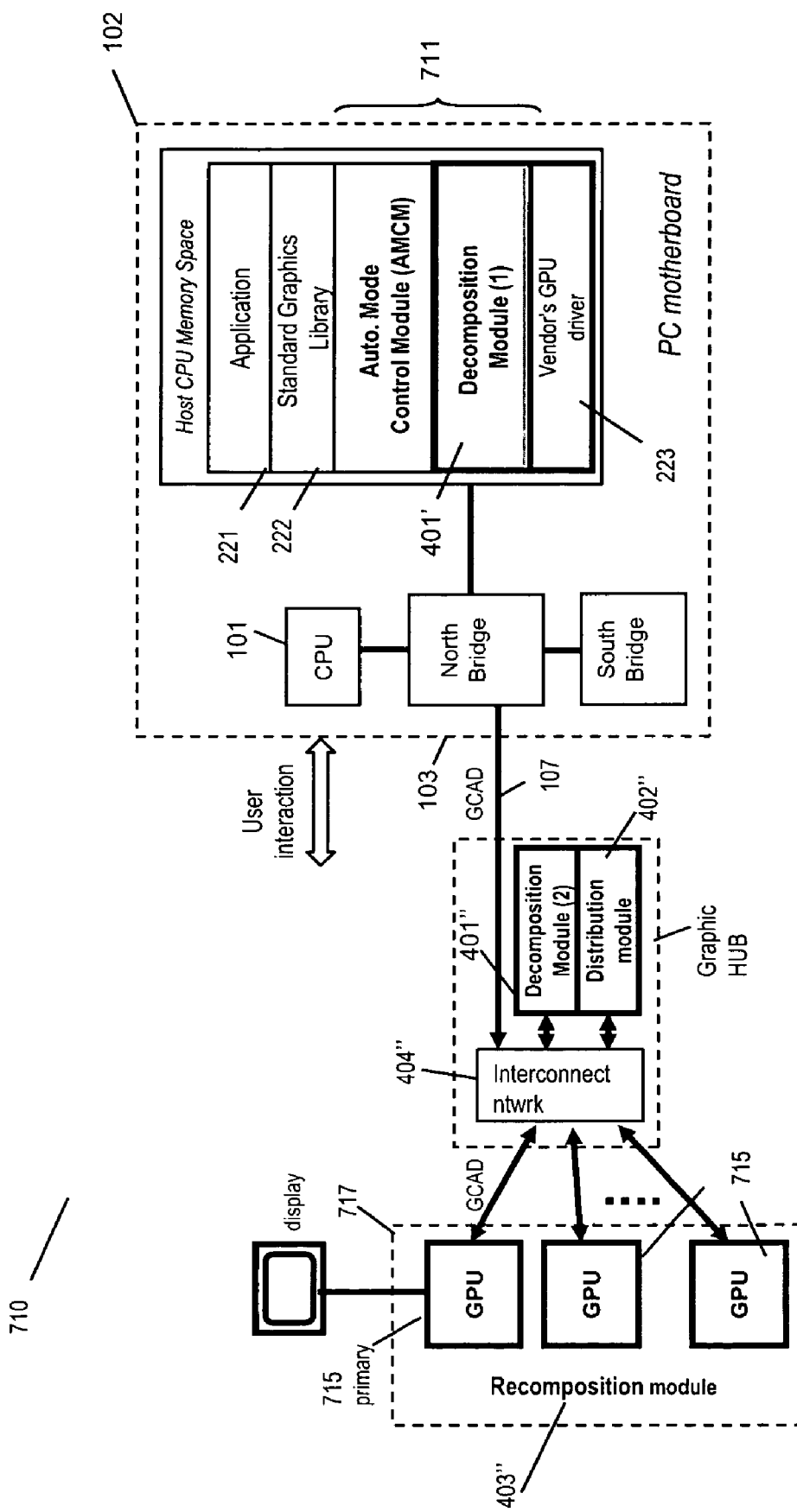
Fig. 7B2

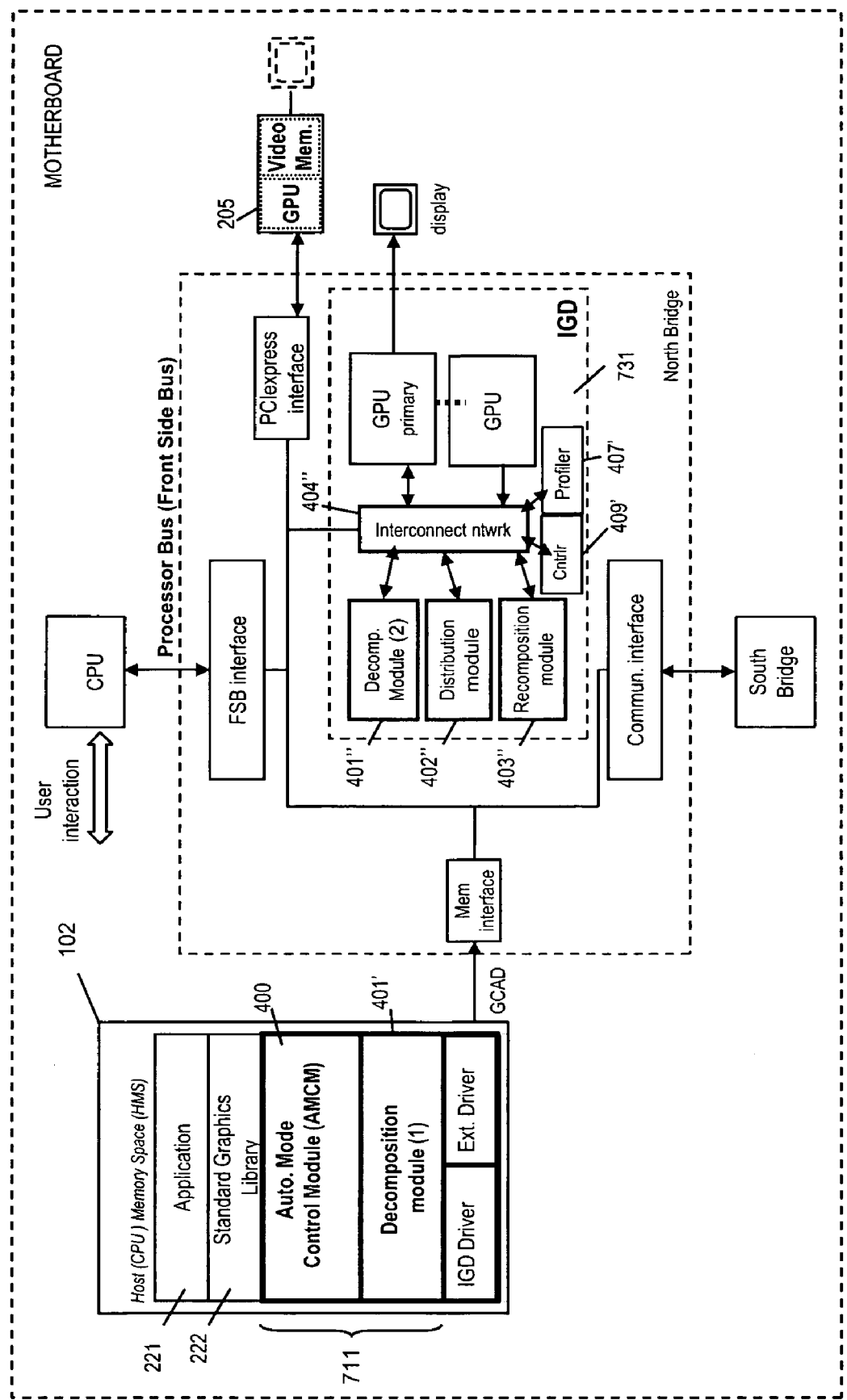
Fig. 7B3

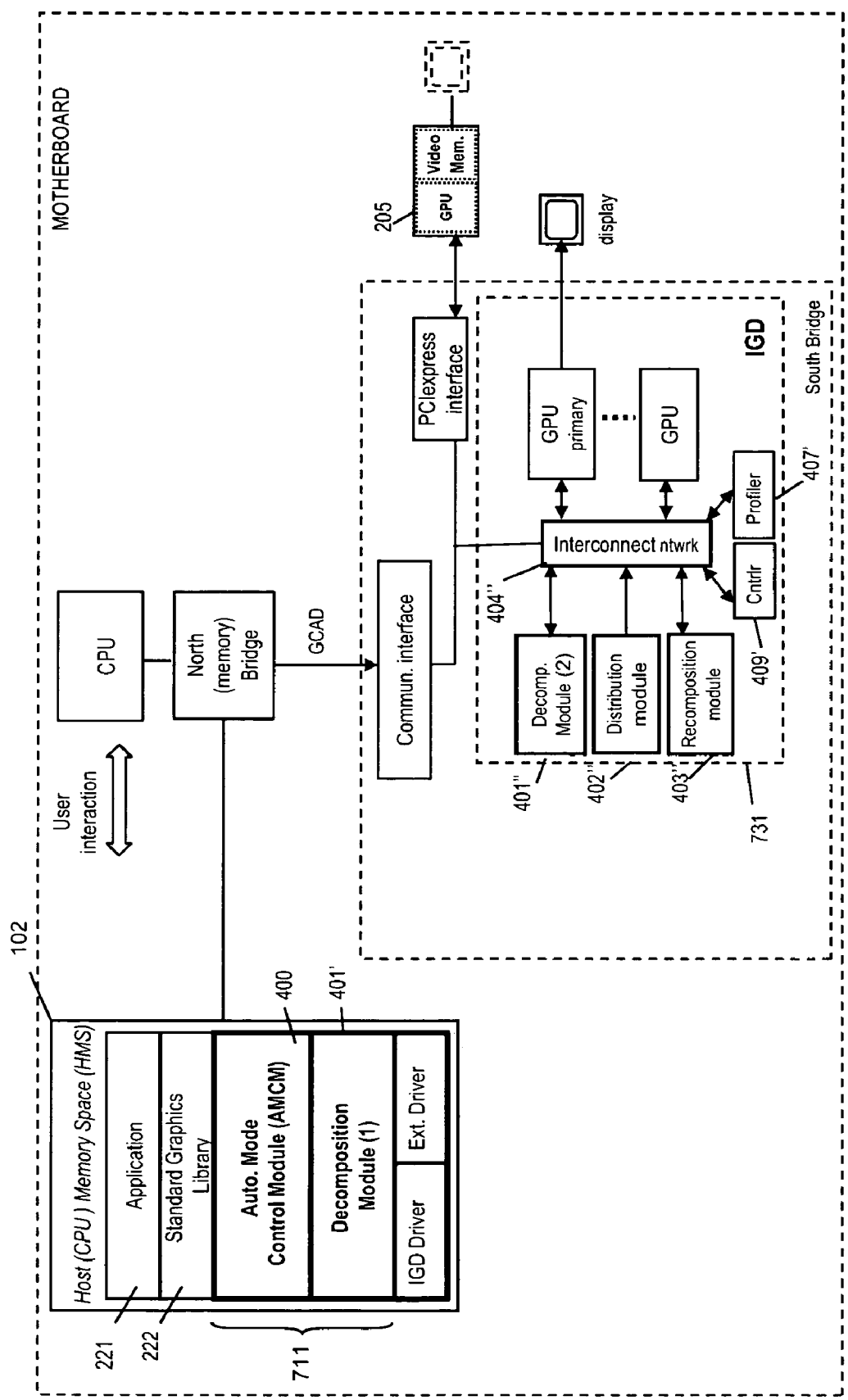
Fig. 7B4

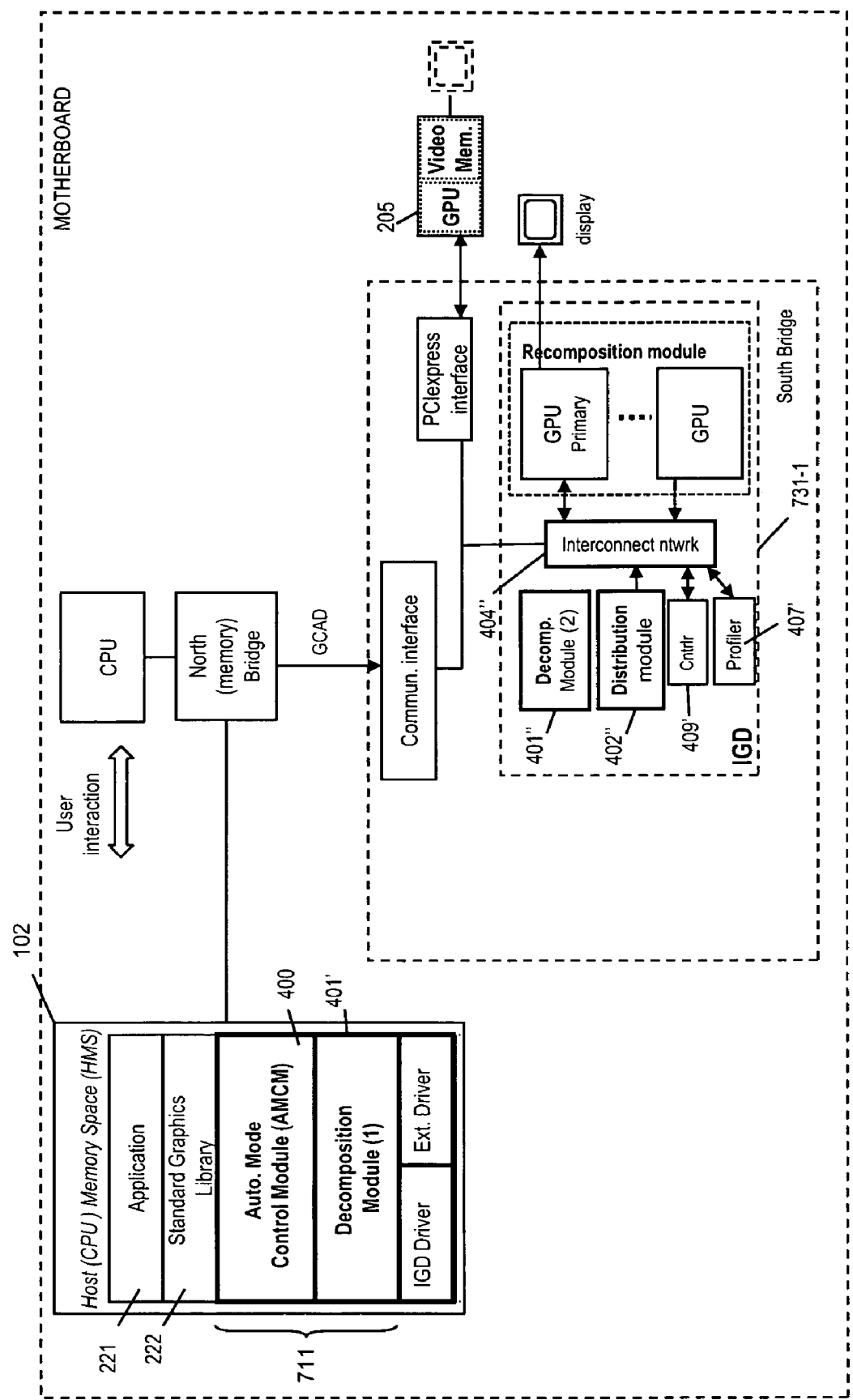
Fig. 7B4-1

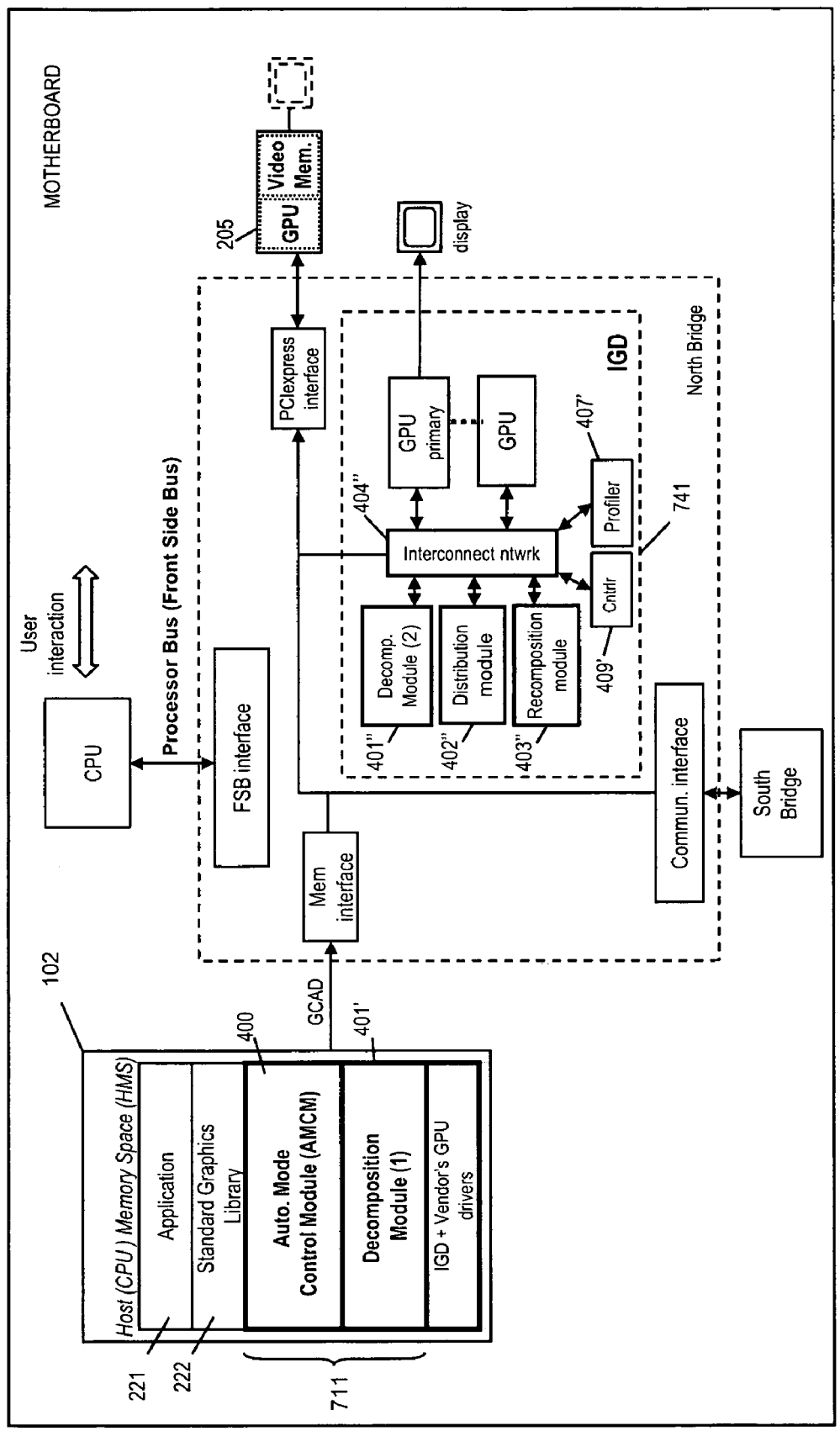
Fig. 7B5

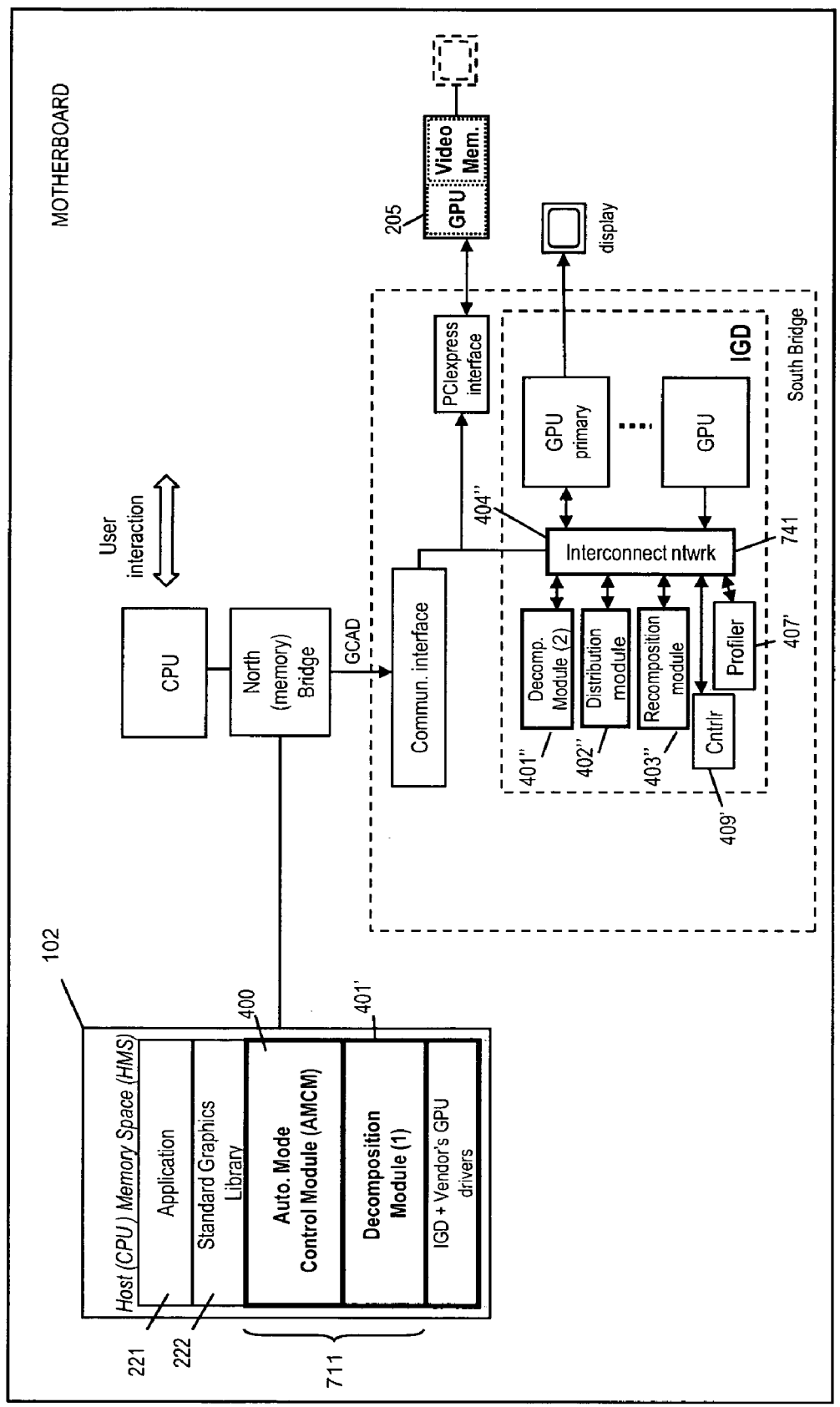
Fig. 7B6

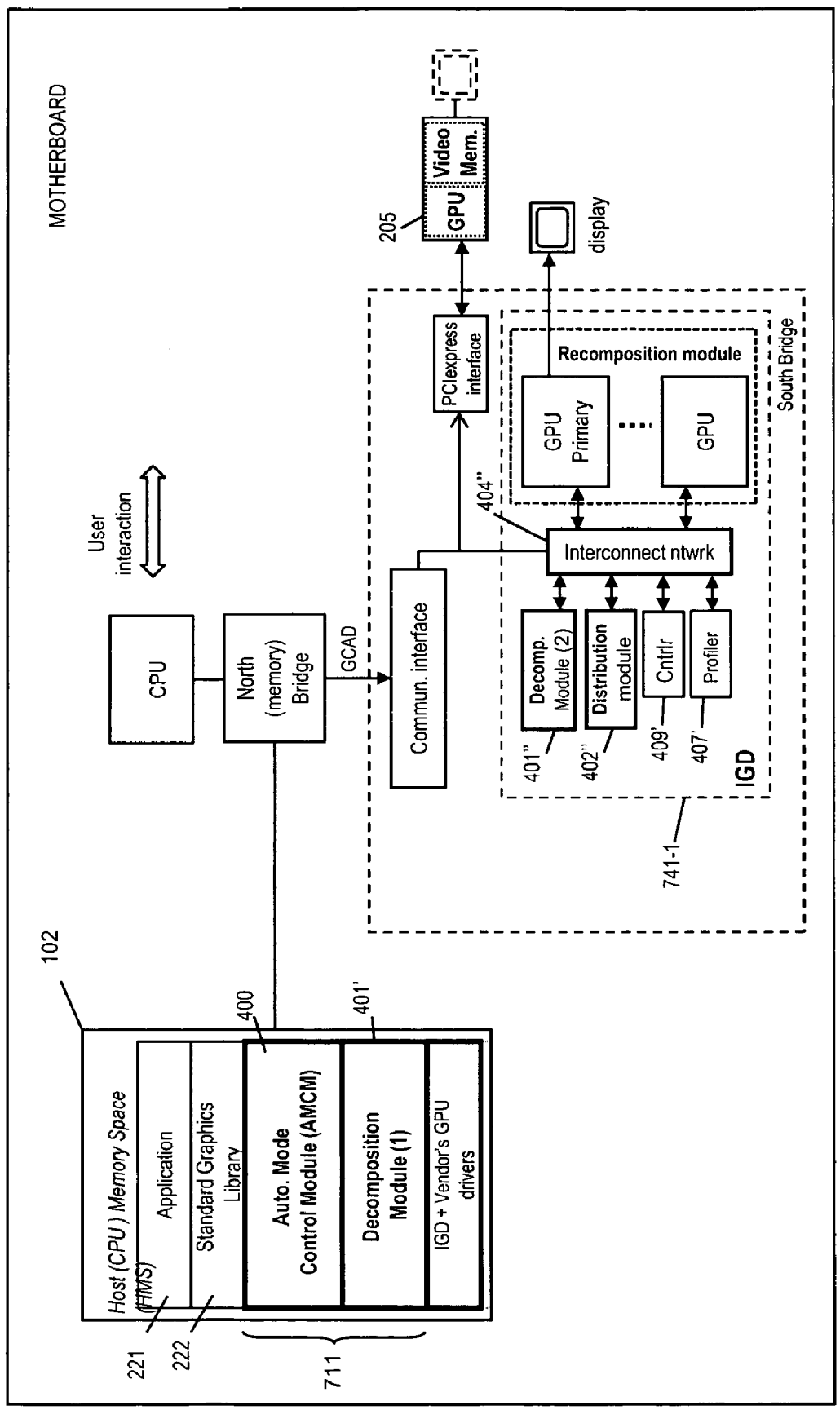
Fig. 7B6-1

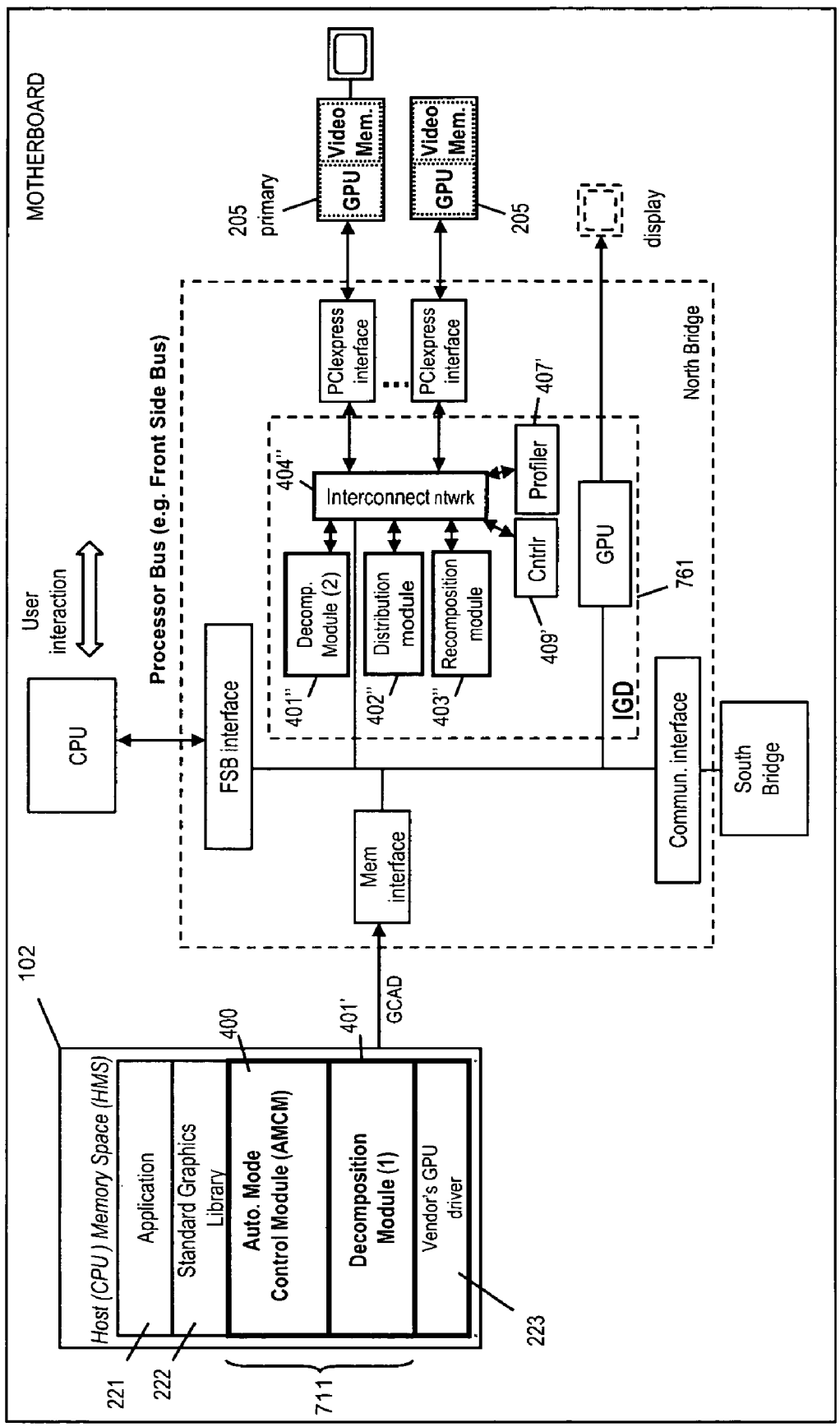
Fig. 7B7

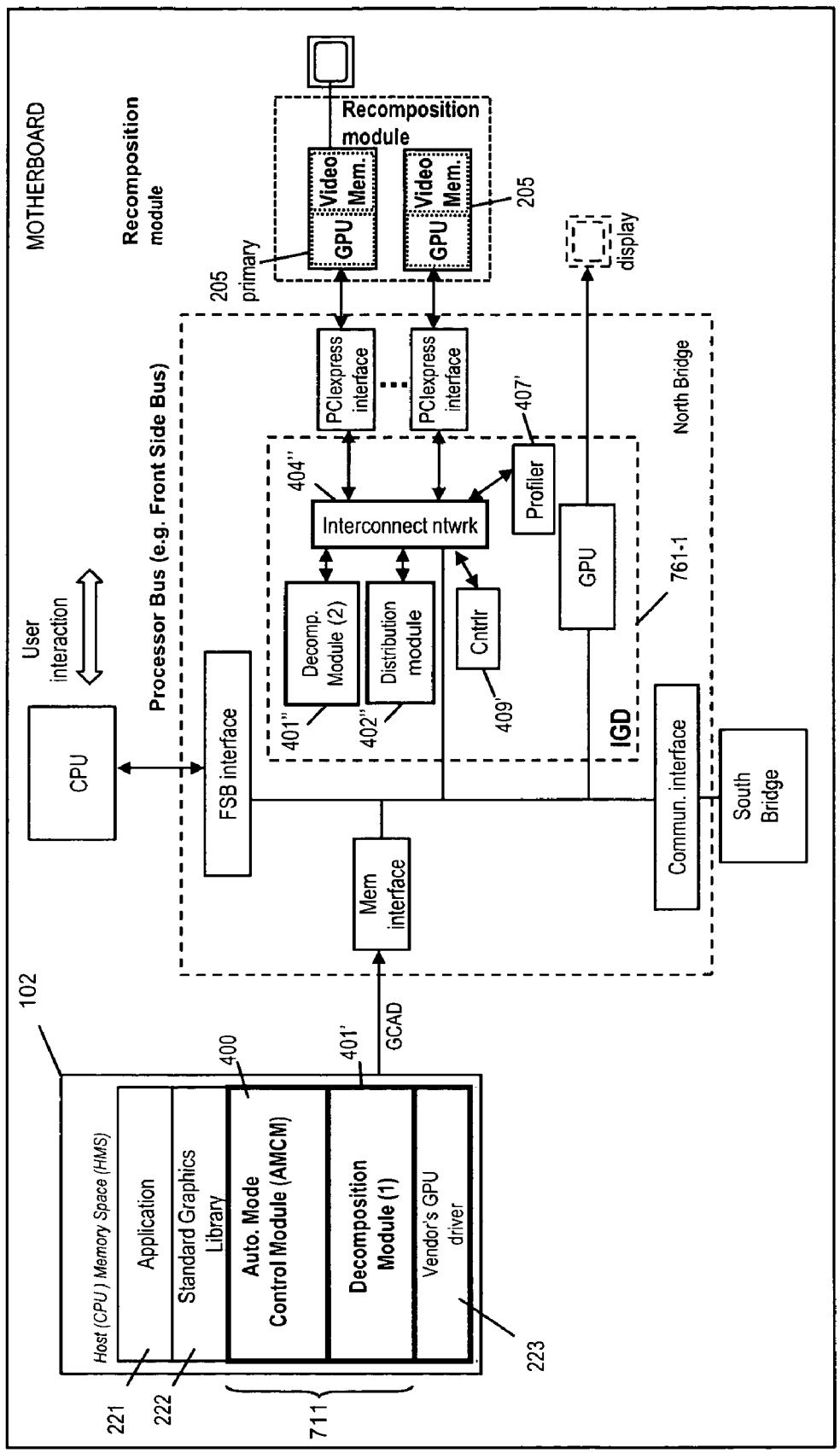
Fig. 7B7-1

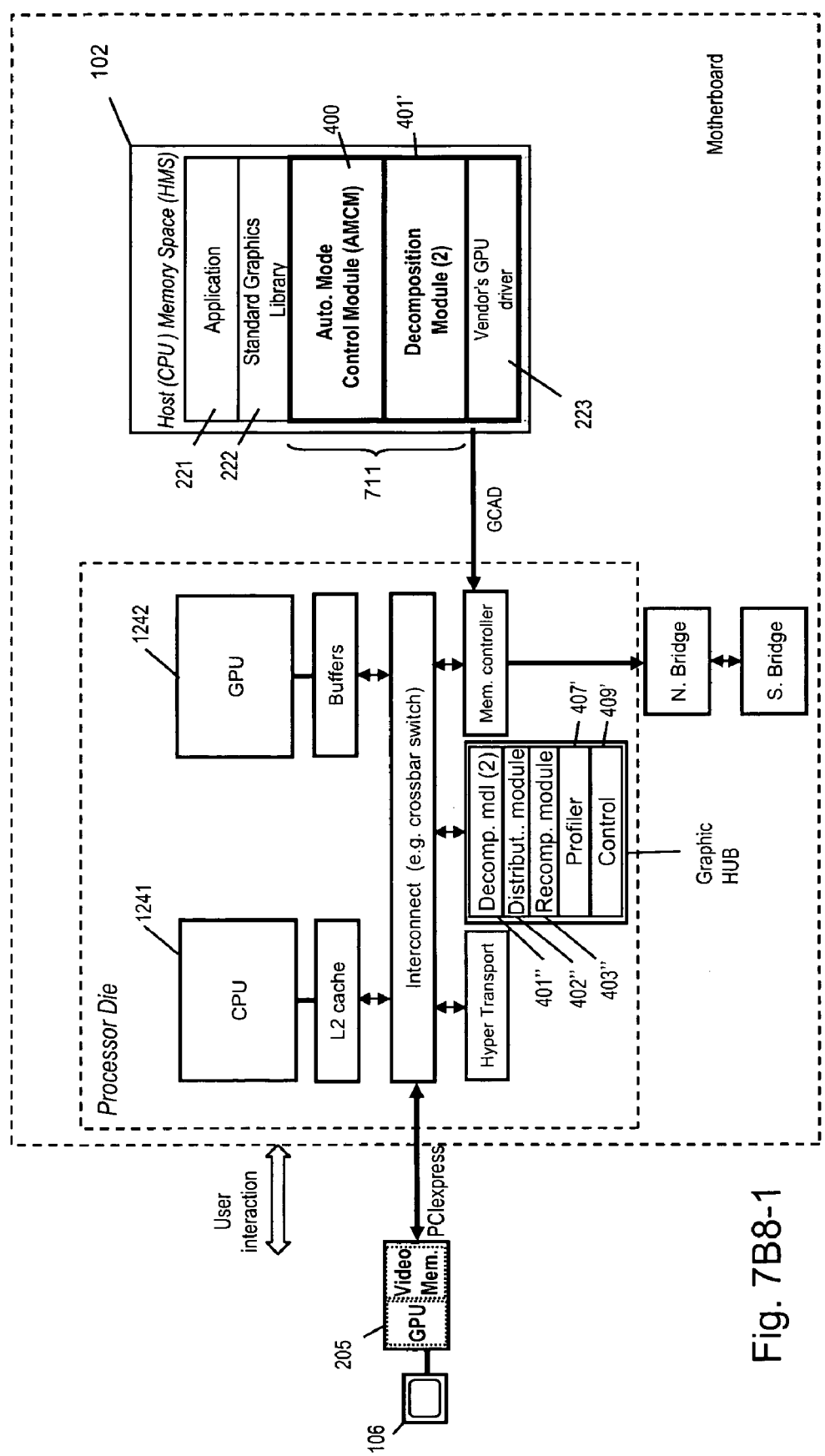
Fig. 7B8-1

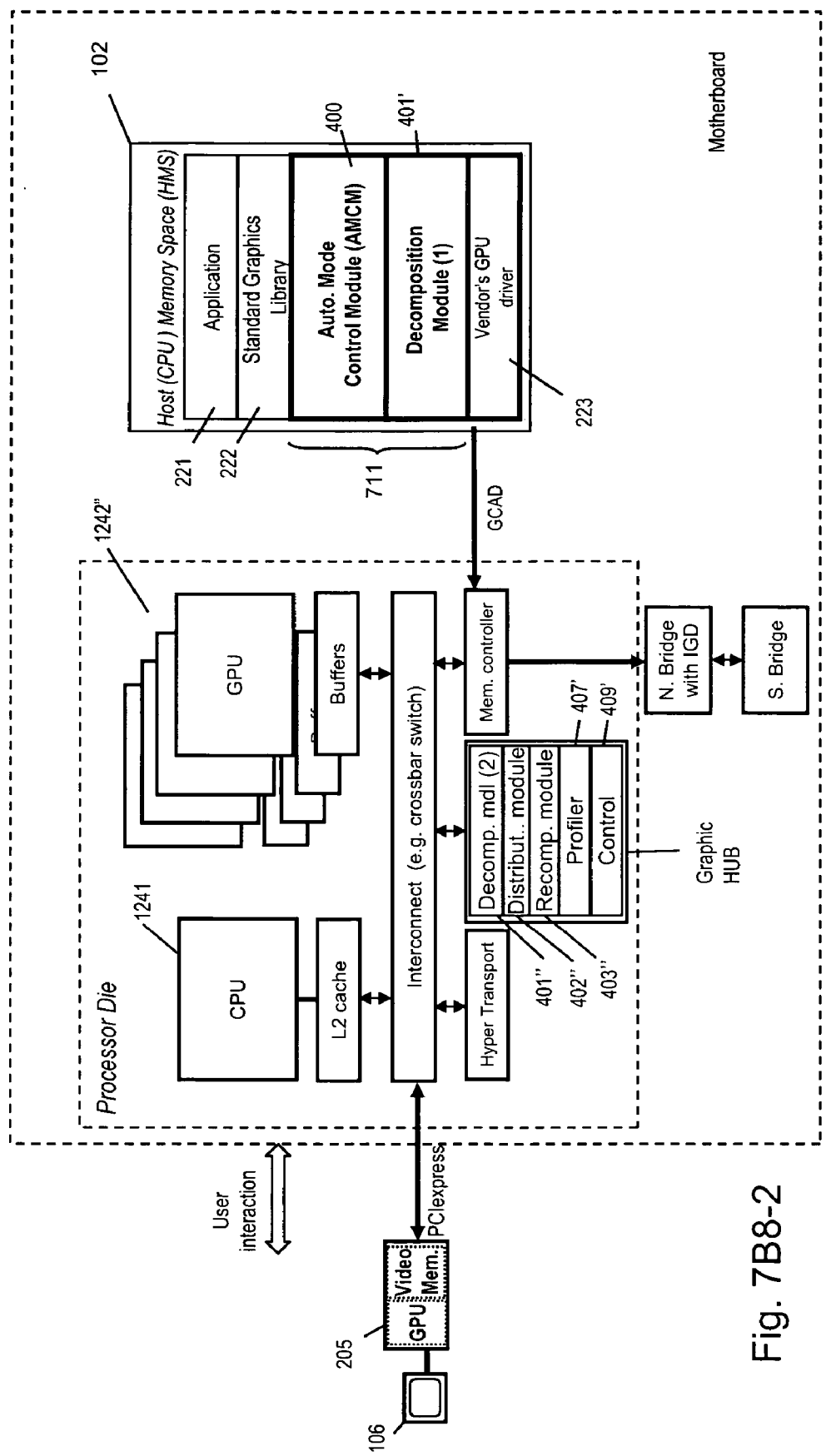
Fig. 7B8-2

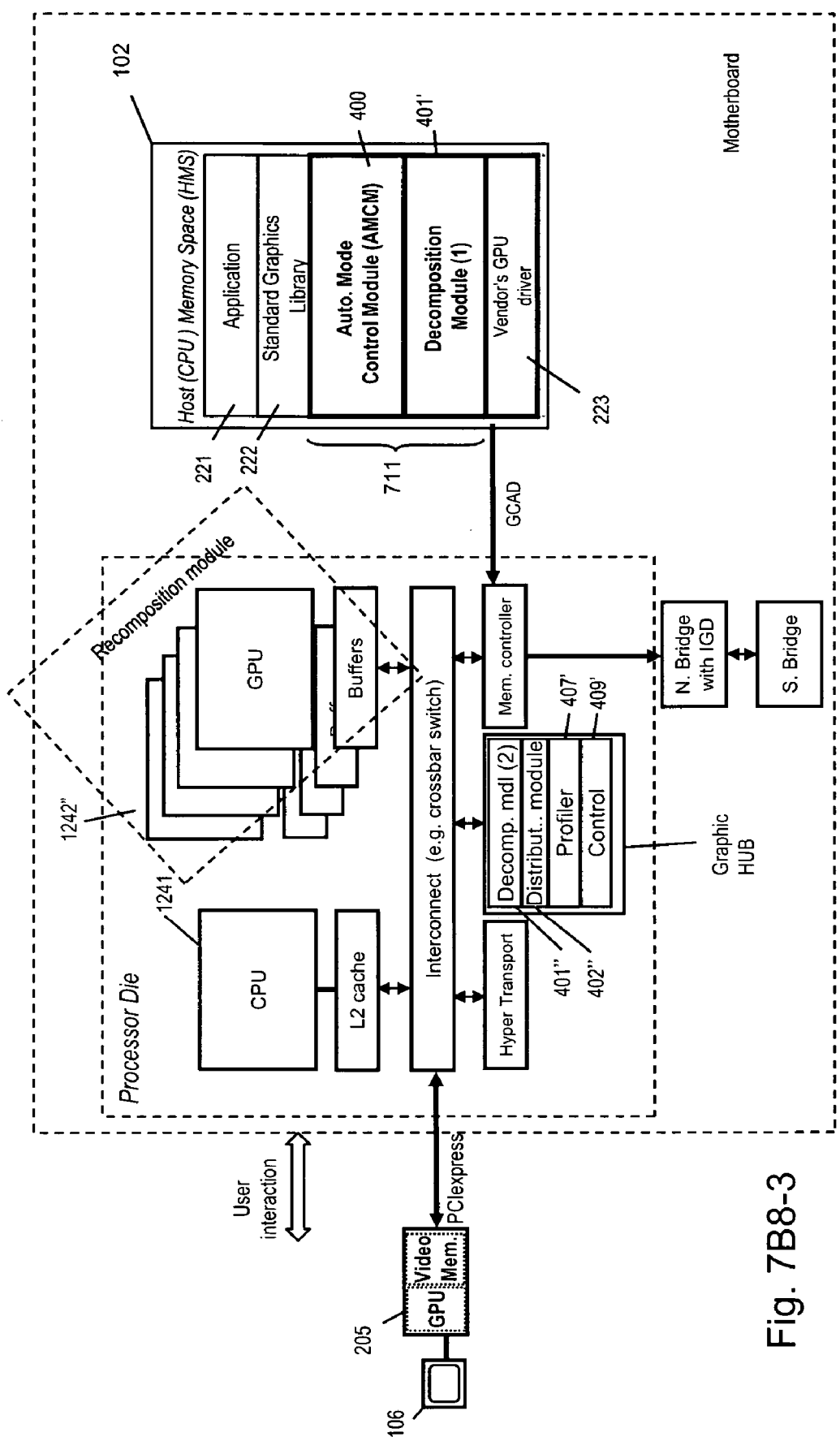
Fig. 7B8-3

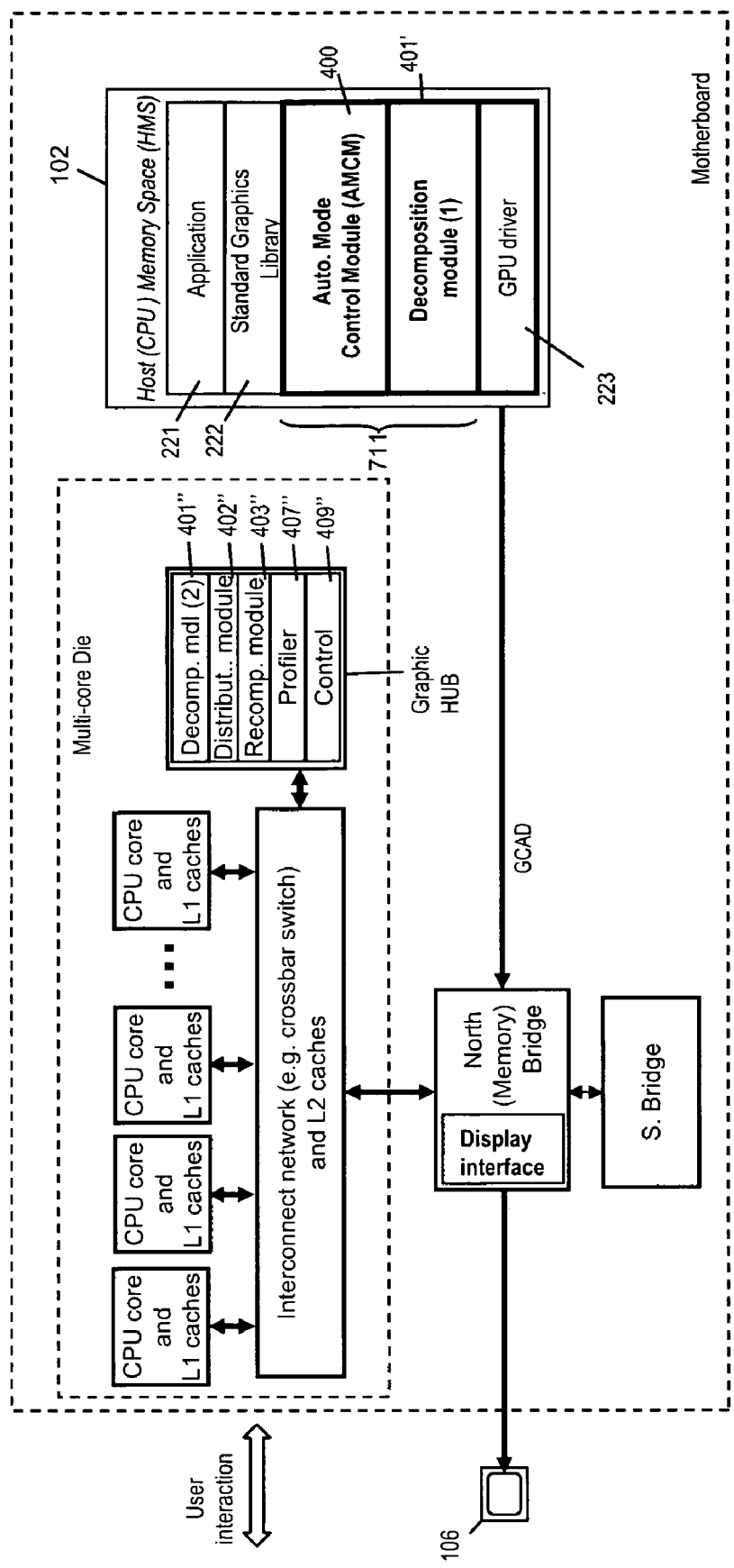
Fig. 7B9-1

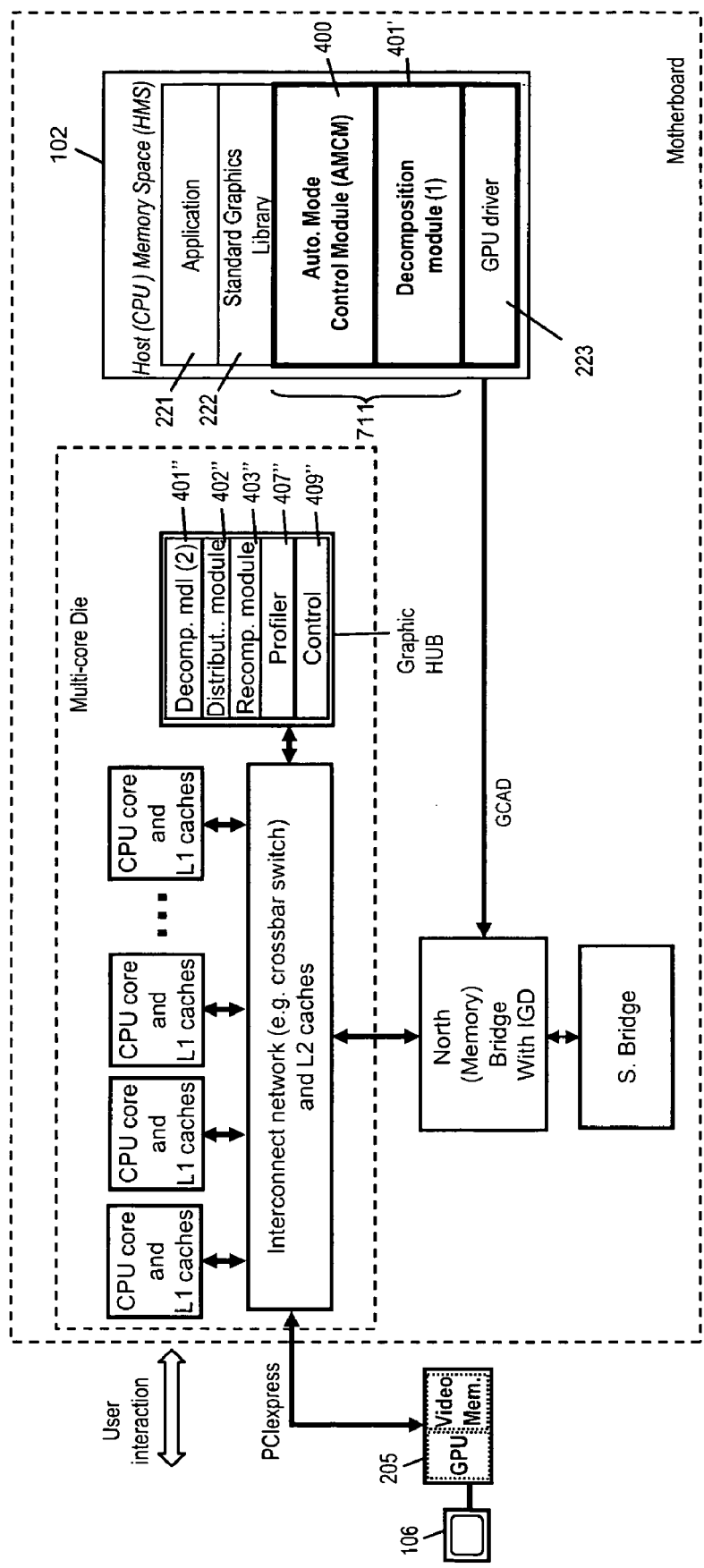
Fig. 7B9-2

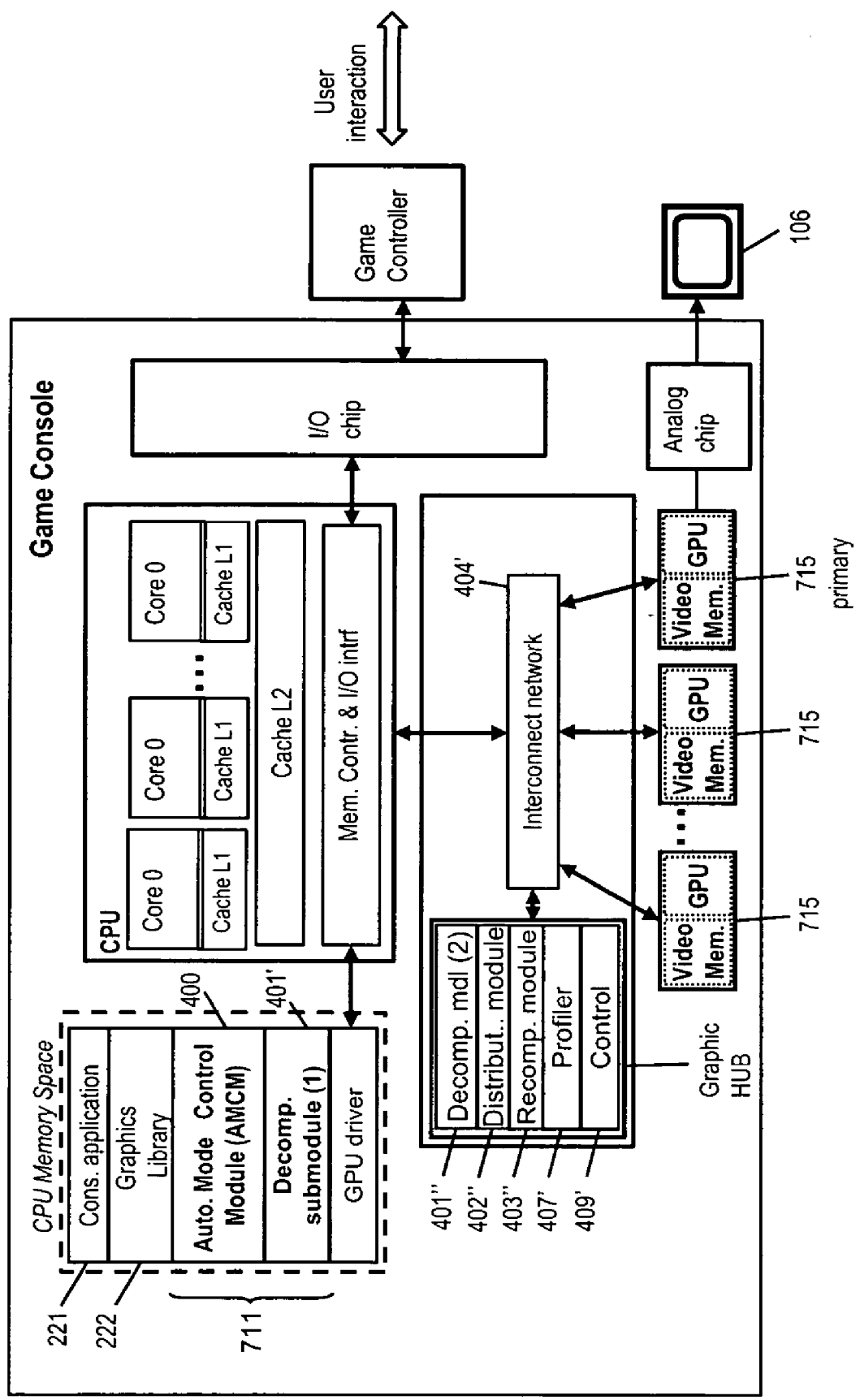
Fig. 7B10

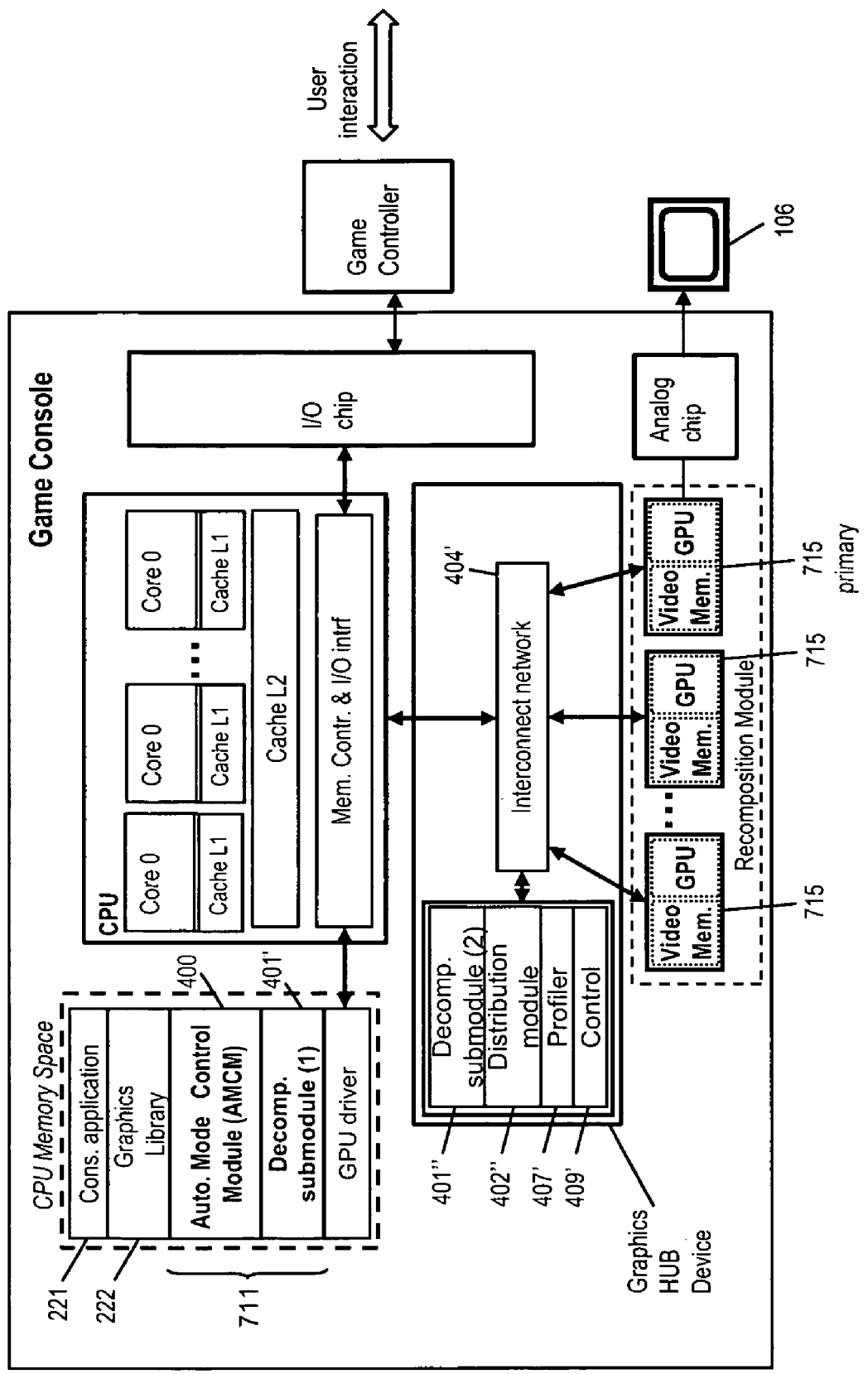
Fig. 7B11

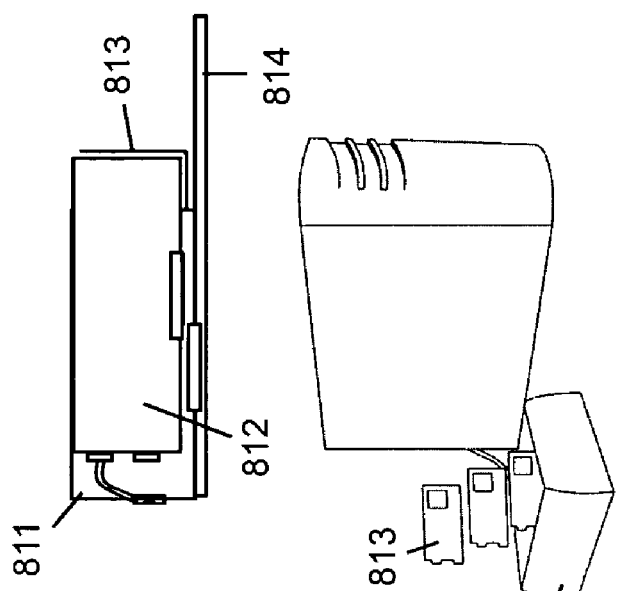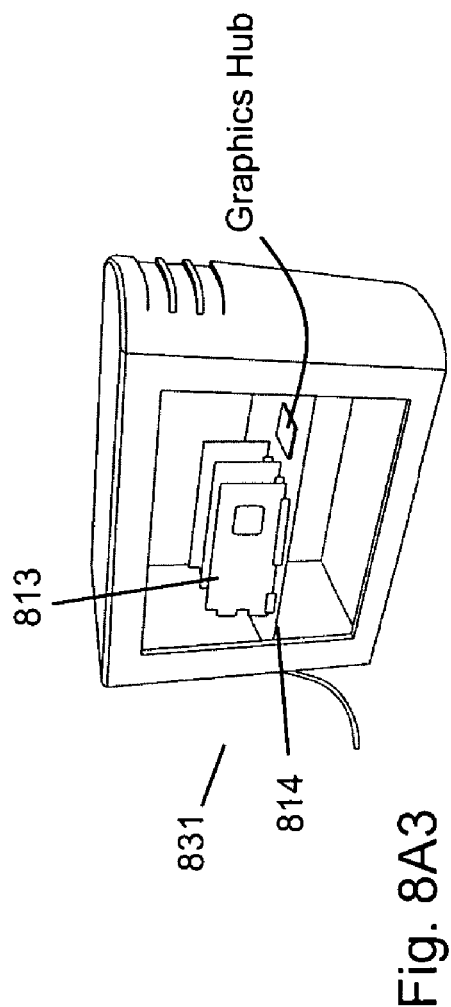
Fig. 8A1
Fig. 8A2
Fig. 8A3

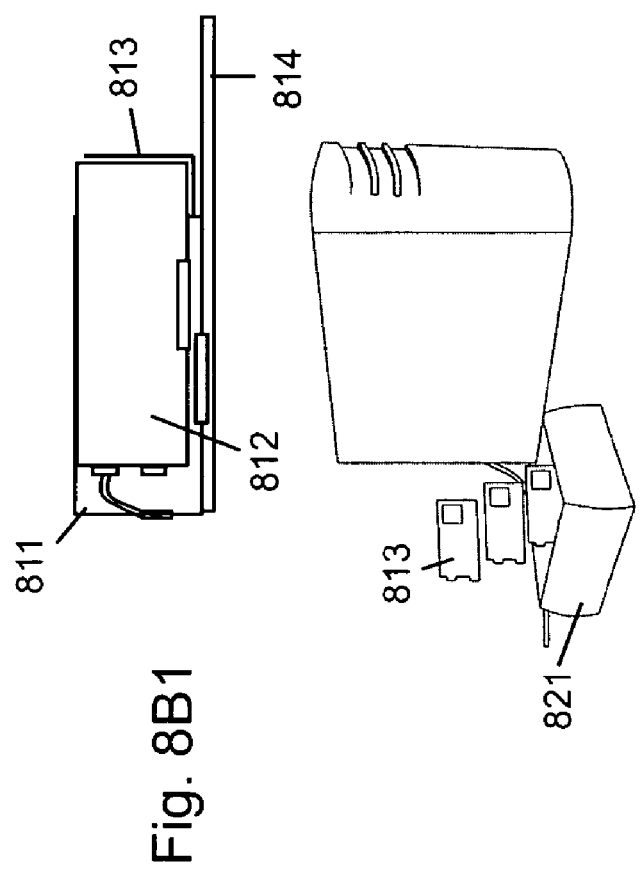
Fig. 8B1
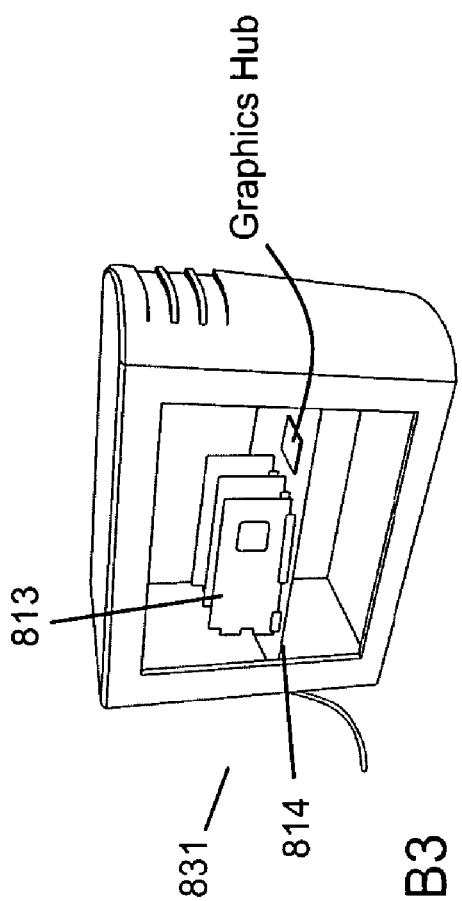
Fig. 8B2
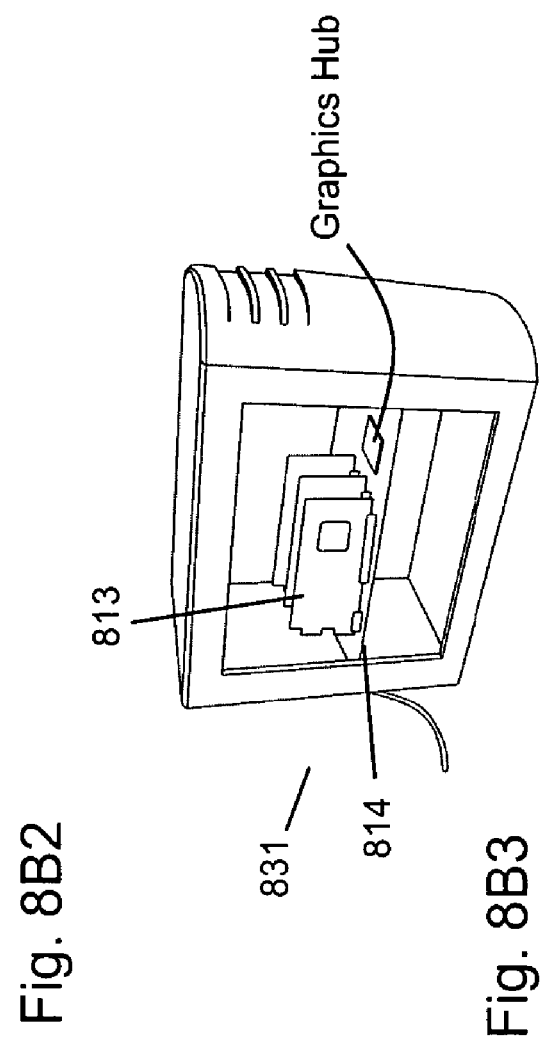
Fig. 8B3

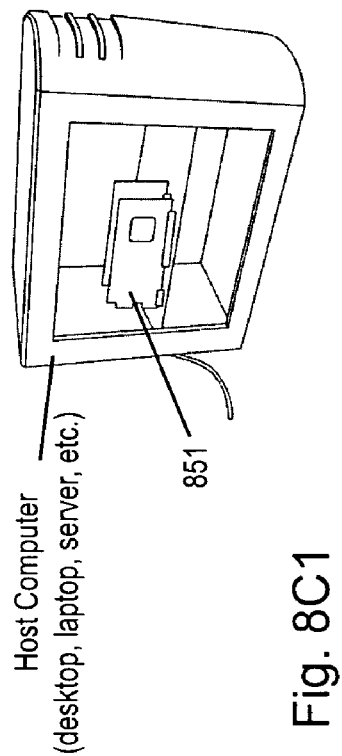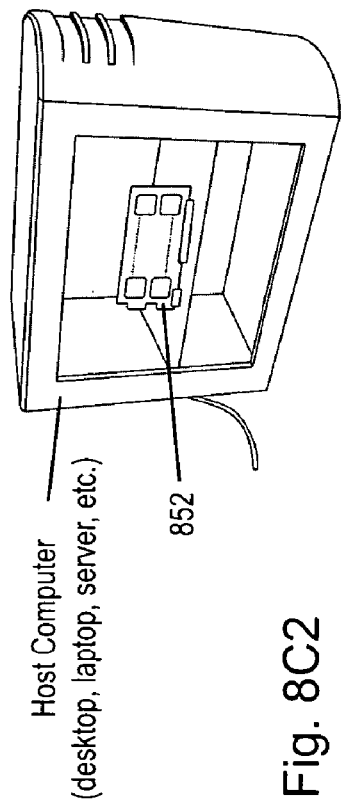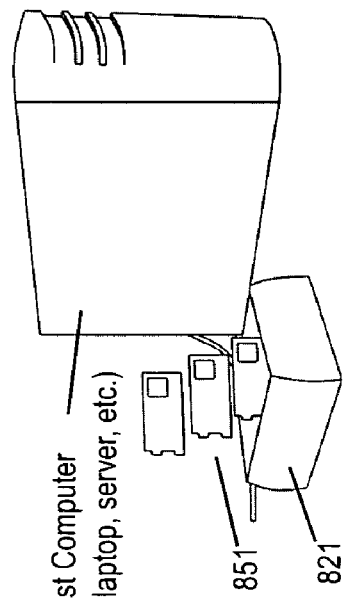
Fig. 8C1
Fig. 8C2
Fig. 8C3

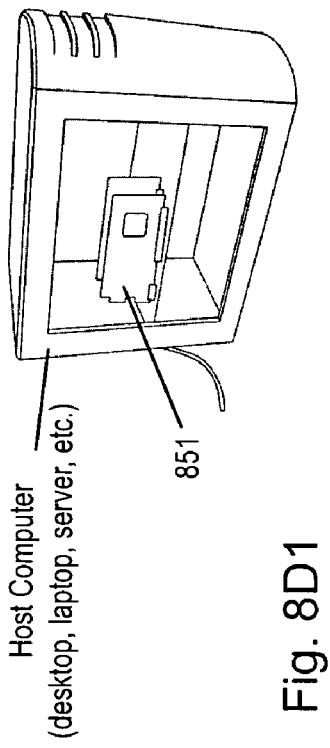
Fig. 8D1
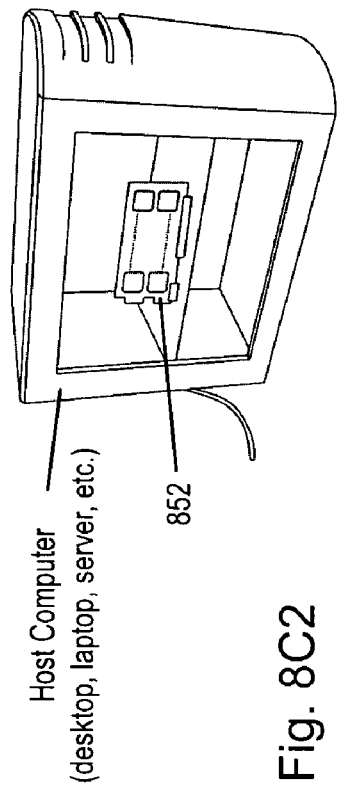
Fig. 8C2
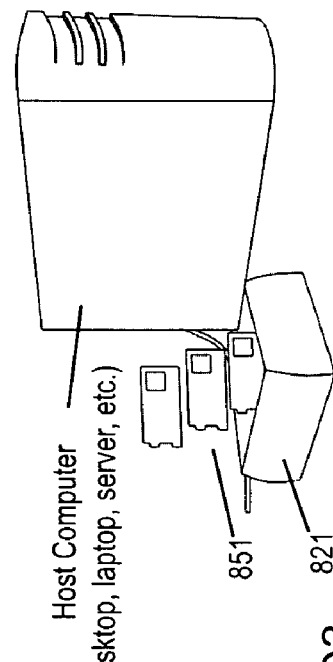
Fig. 8D3

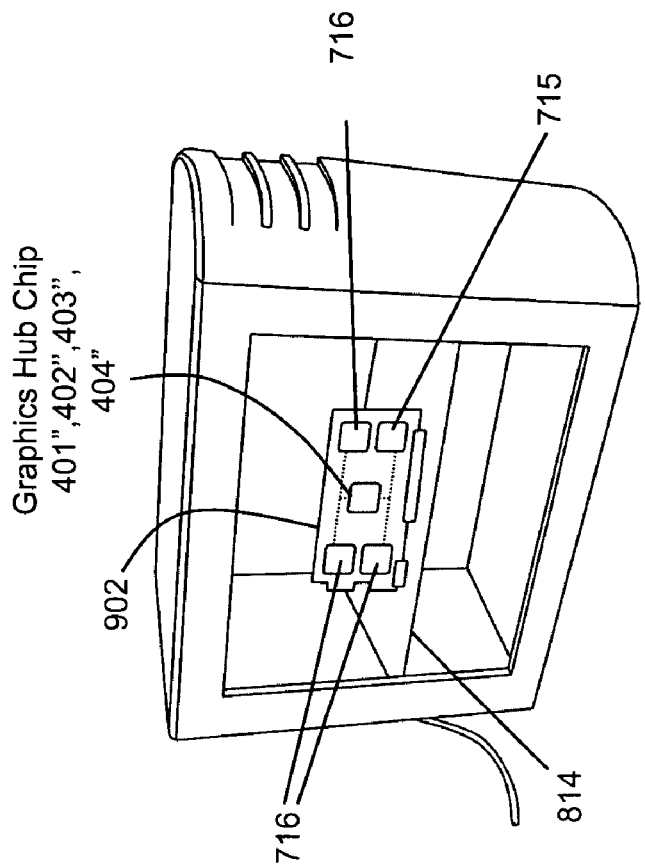
Fig. 9A1
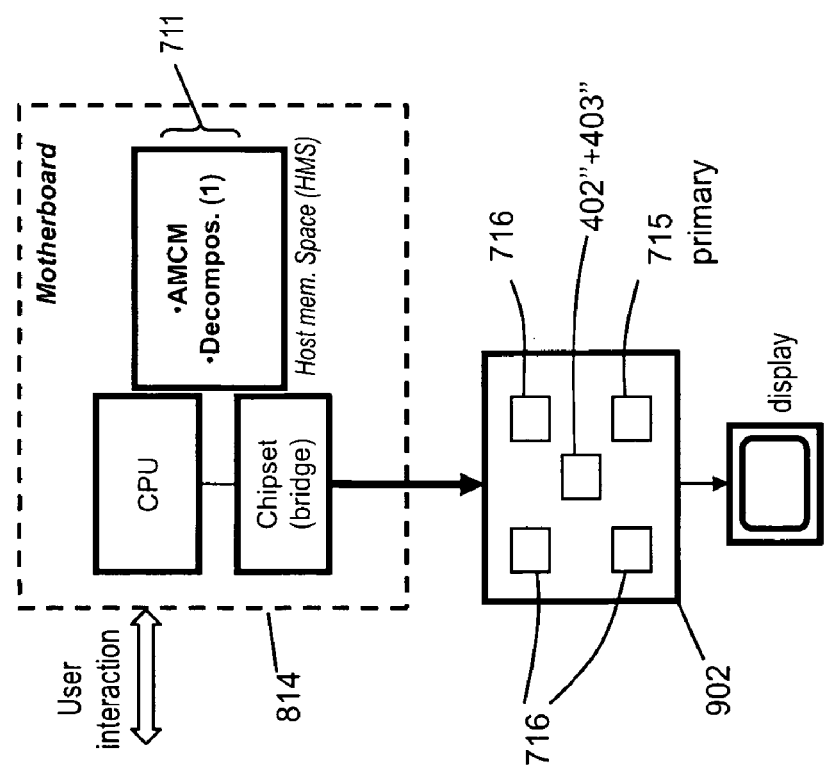
Fig. 9A

Fig. 10A1

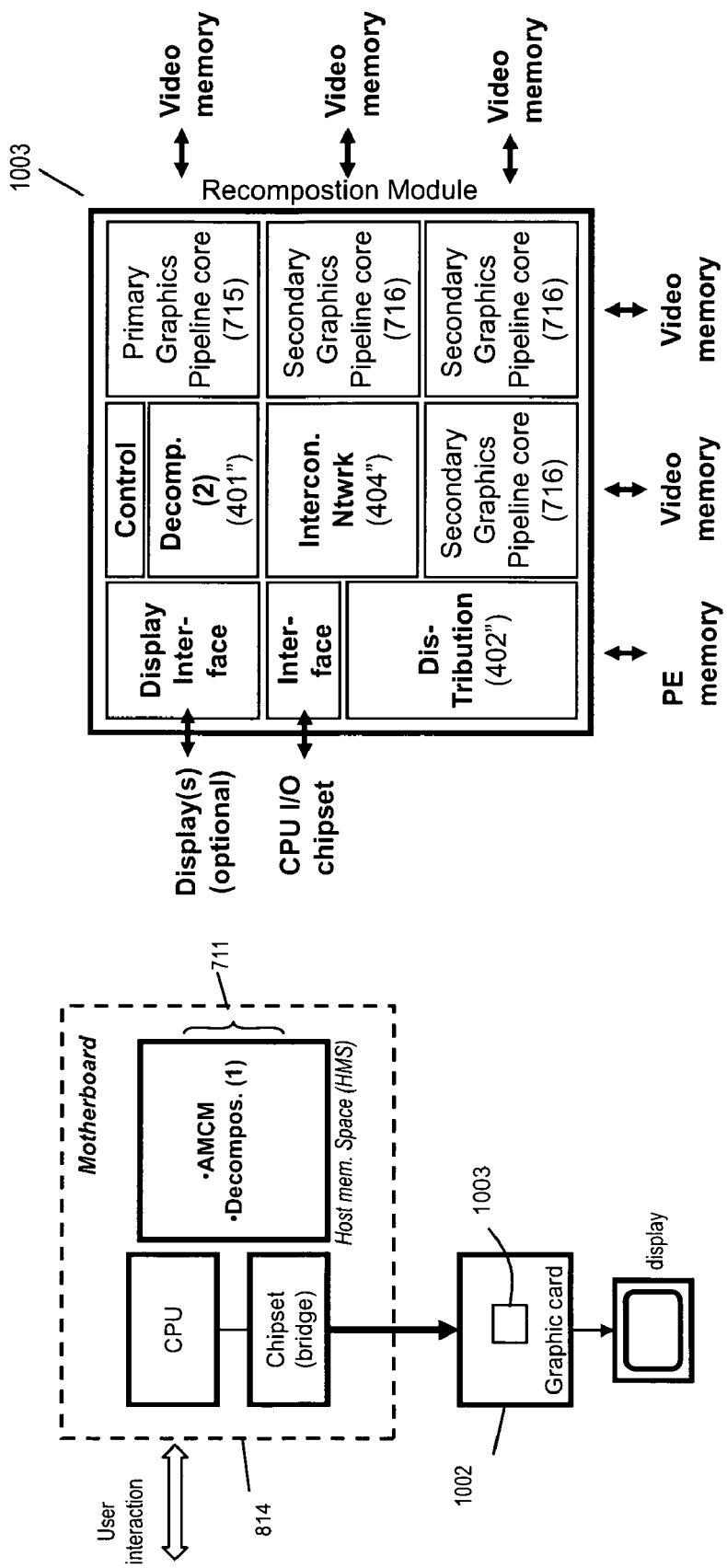

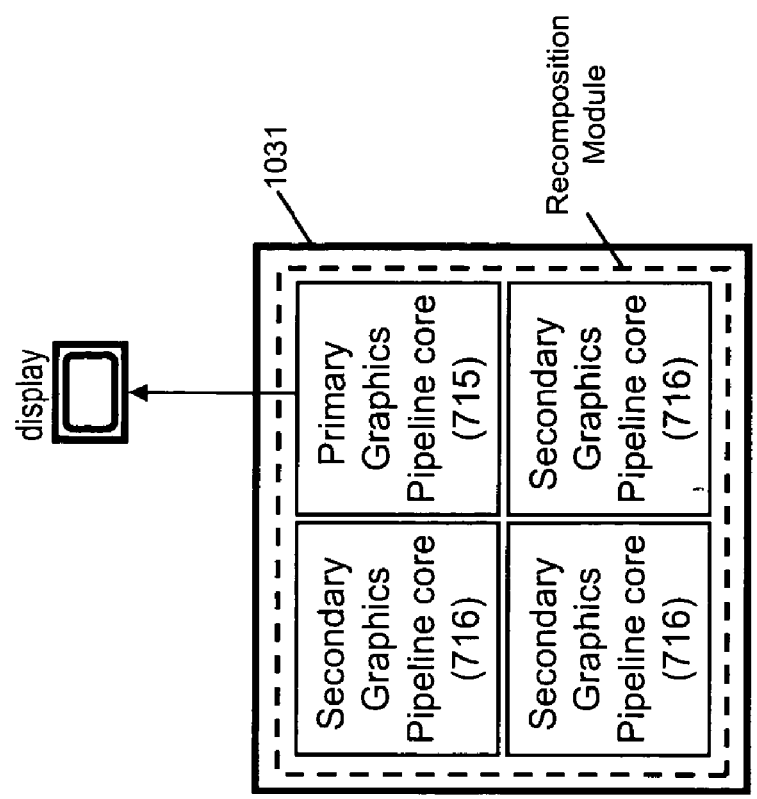
Fig. 10C1
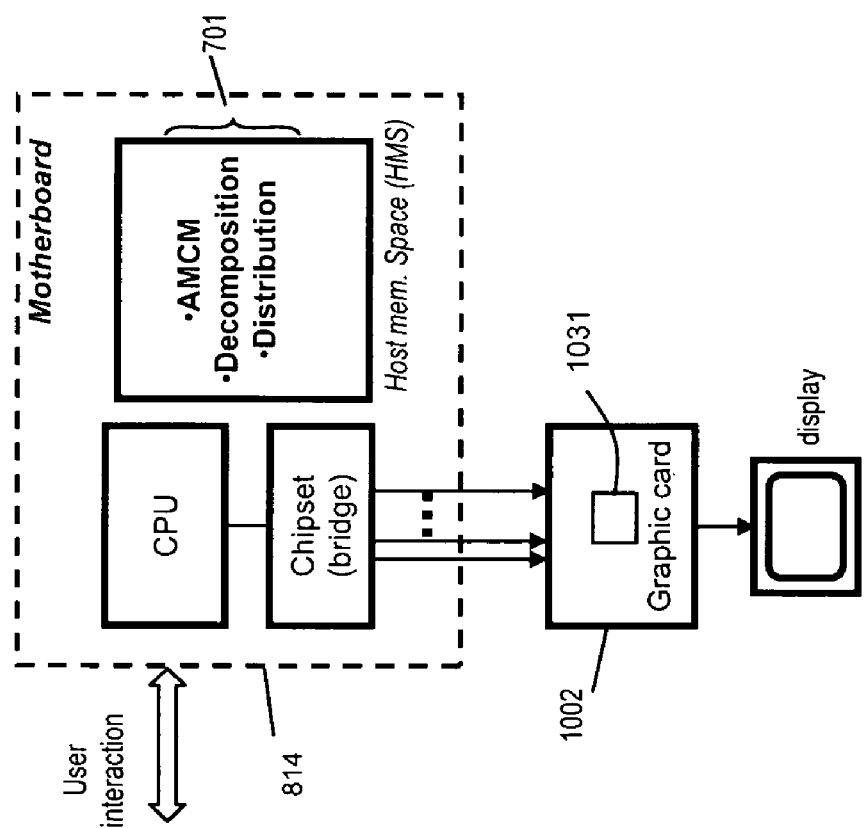
Fig. 10C

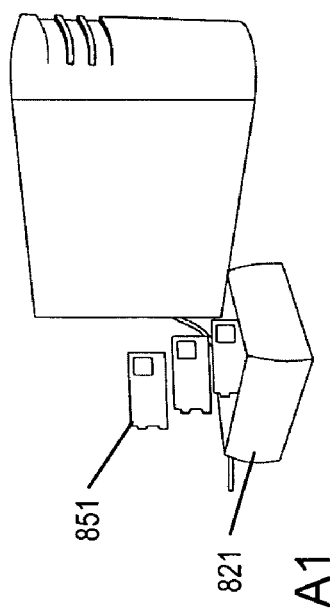
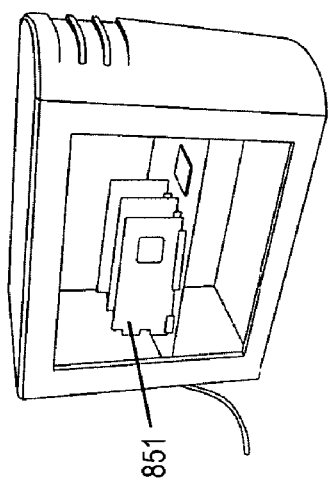
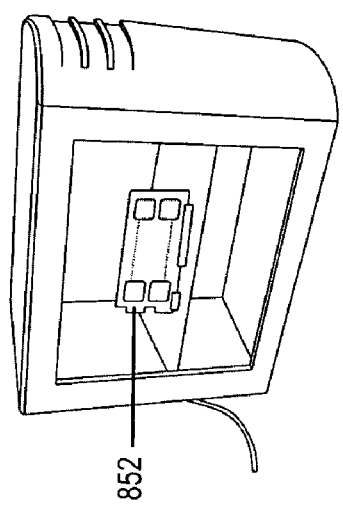
Fig. 11A1  Fig. 11A2  Fig. 11A3

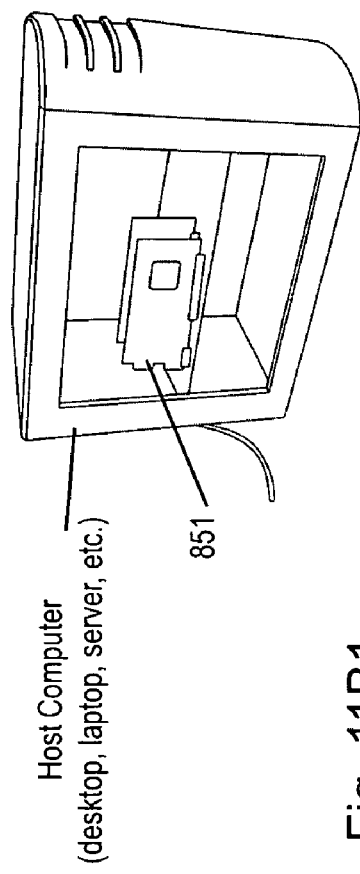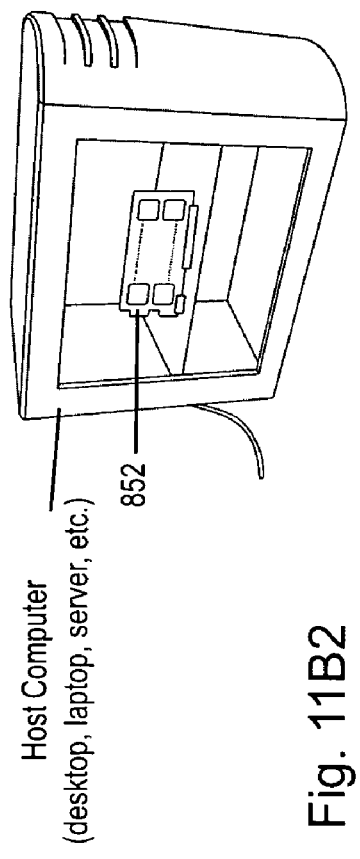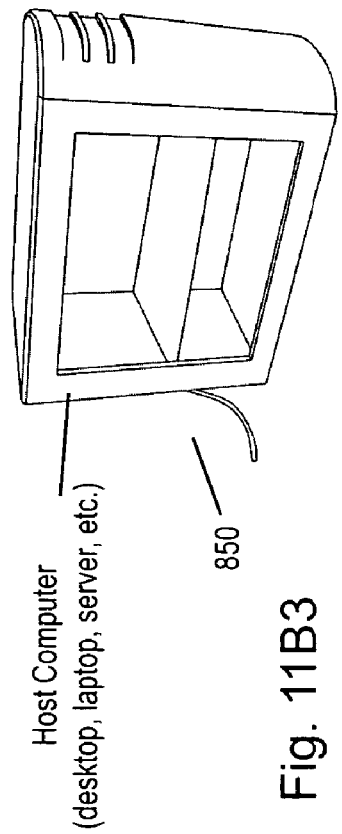
Fig. 11B1　Fig. 11B2　Fig. 11B3

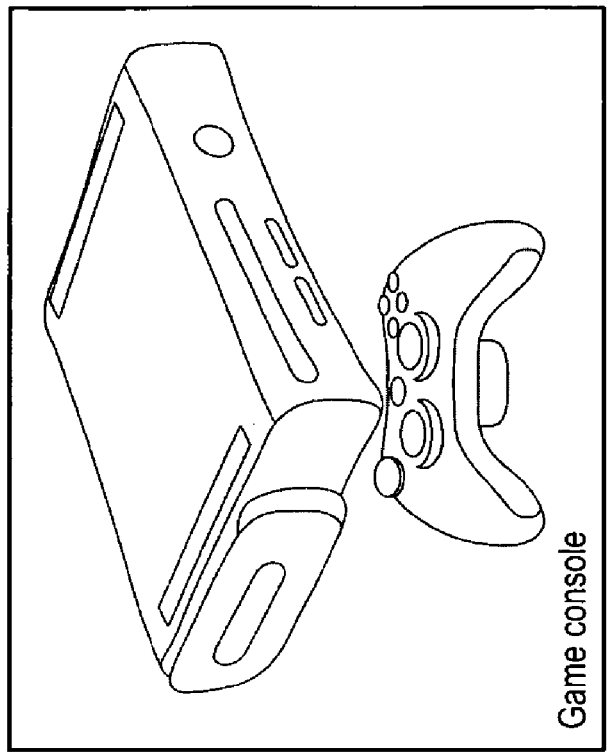
Fig. 11C1
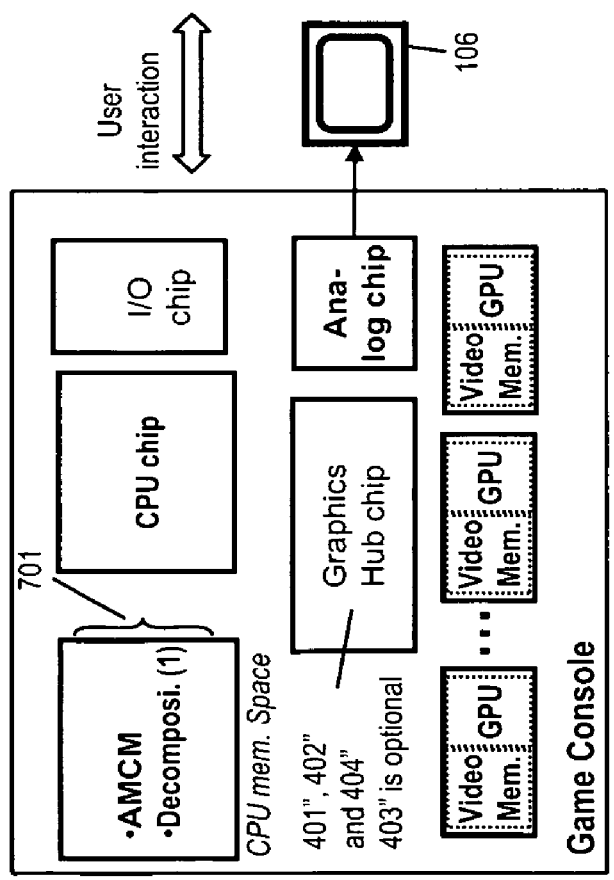
Fig. 11C

COMPUTING SYSTEM HAVING A HYBRID CPU/GPU FUSION-TYPE GRAPHICS PROCESSING PIPELINE (GPPL) ARCHITECTURE

CROSS-REFERENCE TO RELATED CASES

The present application is a Continuation of U.S. application Ser. No. 11/897,536 filed Aug. 30, 2007; which is a Continuation-in-Part (CIP) of the following Applications: U.S. application Ser. No. 11/789,039 filed Apr. 23, 2007; U.S. application Ser. No. 11/655,735 filed Jan. 18, 2007, which is based on Provisional Application Ser. No. 60/759,608 filed Jan. 18, 2006; U.S. application Ser. No. 11/648,160 filed Dec. 31, 2006; U.S. application Ser. No. 11/386,454 filed Mar. 22, 2006; U.S application Ser. No. 11/340,402 filed Jan. 25, 2006 which is based on Provisional Application No. 60/647,146 filed Jan. 25, 2005; U.S. application Ser. No. 10/579,682, which is a National Stage Entry of International Application No. PCT/IL2004/001069 filed Nov. 19, 2004, based on Provisional Application Ser. No. 60/523,084 filed Nov. 19, 2003; each said patent application being commonly owned by Lucid Information Technology, Ltd., and being incorporated herein by reference as if set forth fully herein.

BACKGROUND OF INVENTION

1. Field of Invention

The present invention relates generally to the field of computer graphics rendering, and more particularly, ways of and means for improving the performance of parallel graphics rendering processes supported on multiple 3D graphics processing pipeline (GPPL) platforms associated with diverse types of computing machinery, including, but not limited to, PC-level computers, game console systems, graphics-supporting application servers, and the like.

2. Brief Description of the State of Knowledge in the Art

There is a great demand for high performance three-dimensional (3D) computer graphics systems in the fields of product design, simulation, virtual-reality, video-gaming, scientific research, and personal computing (PC). Clearly a major goal of the computer graphics industry is to realize real-time photo-realistic 3D imagery on PC-based workstations, desktops, laptops, and mobile computing devices. In general, there are two fundamentally different classes of machines in the 3D computer graphics field, namely: (1) Object-Oriented Graphics Systems, wherein 3D scenes are represented as a complex of geometric objects (primitives) in 3D continuous geometric space, and 2D views or images of such 3D scenes are computed using geometrical projection, ray tracing, and light scattering/reflection/absorption modeling techniques, typically based upon laws of physics; and (2) VOlume ELement (VOXEL) Graphics Systems, wherein 3D scenes and objects are represented as a complex of voxels (x, y, z volume elements) represented in 3D Cartesian Space, and 2D views or images of such 3D voxel-based scenes are also computed using geometrical projection, ray tracing, and light scattering/reflection/absorption modeling techniques, again typically based upon laws of physics. Examples of early GDL-based graphics systems are disclosed in U.S. Pat. No. 4,862,155, whereas examples of early voxel-based 3D graphics systems are disclosed in U.S. Pat. No. 4,985,856, each incorporated herein by reference in its entirety. In the contemporary period, most PC-based computing systems include a 3D graphics subsystem based the "Object-Orient Graphics" system design. In such graphics system design, "objects" within a 3D scene are represented by 3D geometrical models, and these geometrical models are typically constructed from continuous-type 3D geometric representations including, for example, 3D straight line segments, planar polygons, polyhedra, cubic polynomial curves, surfaces, volumes, circles, and quadratic objects such as spheres, cones, and cylinders (i.e. geometrical data and commands). These 3D geometrical representations are used to model various parts of the 3D scene or object, and are expressed in the form of mathematical functions evaluated over particular values of coordinates in continuous Cartesian space. Typically, the 3D geometrical representations of the 3D geometric model are stored in the format of a graphical display list (i.e. a structured collection of 2D and 3D geometric primitives). Currently, planar polygons, mathematically described by a set of vertices, are the most popular form of 3D geometric representation.

Once modeled using continuous 3D geometrical representations, the 3D scene is graphically displayed (as a 2D view of the 3D geometrical model) along a particular viewing direction, by repeatedly scan-converting the stream of graphics commands and data (GCAD). At the current state of the art, the scan-conversion process can be viewed as a "computational geometry" process which involves the use of (i) a geometry processor (i.e. geometry processing subsystem or engine) as well as a pixel processor (i.e. pixel processing subsystem or engine) which together transform (i.e. project, shade and color) the graphics objects and bit-mapped textures, respectively, into an unstructured matrix of pixels. The composed set of pixel data is stored within a 2D frame buffer (i.e. Z buffer) before being transmitted to and displayed on the surface of a display screen.

A video processor/engine refreshes the display screen using the pixel data stored in the 2D frame buffer. Any changes in the 3D scene requires that the geometry and pixel processors repeat the whole computationally-intensive pixel-generation pipeline process, again and again, to meet the requirements of the graphics application at hand. For every small change or modification in viewing direction of the human system user, the graphical display list must be manipulated and repeatedly scan-converted. This, in turn, causes both computational and buffer contention challenges which slow down the working rate of the graphics system. To accelerate this computationally-intensive graphics processing pipeline process, custom hardware including geometry, pixel and video engines, have been developed and incorporated into most conventional graphics system designs.

In order to render a 3D scene (from its underlying graphics commands and data) and produce high-resolution graphical projections for display on a display device, such as a LCD panel, early 3D graphics systems attempted to relieve the host CPU of computational loading by employing a single graphics pipeline comprising a single graphics processing unit (GPU), supported by video memory.

As shown in FIGS. 1A1, 1A2 and 1A3, a typical PC based graphic architecture has an external graphics card 105 comprising a graphics processing unit (GPU) and video memory. As shown, the graphic card is connected to the display 106 on one side, and the CPU 101 through bus (e.g. PCI-Express) 107 and Memory Bridge 103 (termed also "chipset", e.g. 975 by Intel), on the other side. As shown in FIG. 1A3, the host CPU program/memory space stores the graphics applications, the standard graphics library, and the vendor's GPU drivers.

As shown in FIGS. 1B1, 1B2 and 1B3, a typical prior art PC-based computing system employs a conventional graphics architecture employing a North memory bridge with an integrated graphics device (IGD) 103. The IGD supports a single graphics pipeline process, and is operably coupled to a South bridge, via a PCI-express bus, for supporting the input/output ports of the system. As shown, the IGD includes a video engine, a 2D engine, a 3D engine, and a display engine.

As shown in FIG. 1B4, a prior art PC-based computing system employs a conventional Fusion-type CPU/GPU hybrid architecture, wherein a single GPU implemented on the same die as the CPU is used to support a graphics pipeline that drives an external display device. As shown, the motherboard supports the processor die, memory, a bridge with a display interface for connecting to a display device 106, and a PCI-express bus. As shown, the processor die supports a CPU 1241, a GPU 1242, L2 cache, buffers, an Interconnect (e.g. crossbar switch), a hyper transport mechanism and a memory controller.

As shown in FIG. 1C, the process of rendering three successive frames by a single GPU is graphically illustrated. Notably, this graphical rendering process may be supported using any of the single GPU-based computing systems described above. During operation, the application, assisted by the graphics library, creates a stream of graphics commands and data describing a 3D scene. The stream is then pipelined through the GPU's geometry and pixel subsystems so as to create a bitmap of pixels in the Frame Buffer, and finally a rendered image of the scene is displayed on a display screen. The generation of a sequence of successive frames produces a visual illusion of a dynamic picture.

While the performance of single-GPU powered computing systems has greatly improved, as shown in FIG. 1B5, the structure of a GPU subsystem 124 on a graphics card or in an IGD comprises: a video memory which is external to GPU, and two 3D engines: (i) a transform bound geometry subsystem 224 for processing 3D graphics primitives; (ii) and a fill bound pixel subsystem 225. The video memory shares its storage resources among geometry buffer 222 through which all geometric (i.e. polygonal) data is transferred, commands buffer, texture buffers 223, and Frame Buffer 226.

Limitations of a single graphics pipeline arise from its typical bottlenecks. The first potential bottleneck 221 stems from transferring data from CPU to GPU. Two other bottlenecks are video memory related: geometry data memory limits 222, and texture data memory limits 223. There are two additional bottlenecks inside the GPU: transform bound 224 in the geometry subsystem, and fragment rendering 225 in pixel subsystem. These bottlenecks determine overall throughput. In general, the bottlenecks vary over the course of a graphics application.

In high-performance graphics applications, the number of computations required to render a 3D scene and produce high-resolution graphical projections, greatly exceeds the capabilities of systems employing a single GPU graphics subsystem. Consequently, the use of parallel graphics pipelines, and multiple graphics processing units (GPUs), have become the rule for high-performance graphics system architecture and design, in order to relieve the overload presented by the different bottlenecks associated with single GPU graphics subsystems.

In FIG. 2A, there is shown an advanced chipset (e.g. Bearlake by Intel) having two buses 107, 108 instead of one, and allowing the interconnection of two external graphics cards in parallel: primary card 105 and secondary card 104, to share the computation load associated with the 3D graphics rendering process. As shown, the display 106 is attached to the primary card 105. It is anticipated that even more advanced commercial chipsets with greater than two buses will appear in the future, allowing the interconnection of more than two graphic cards.

As shown in FIG. 2B, the general software architecture of prior art graphic system 200 comprises: the graphics application 201, standard graphics library 202, and the vendor's GPU drivers (203). This graphic software environment resides in the "program space" of main memory 102 on the host computer system. As shown, the graphic application 201 runs in the program space (i.e. memory space), building up the 3D scene, typically as a data base of polygons, where each polygon is represented as a set of vertices. The vertices and others components of these polygons are transferred to the graphic card(s) for rendering, and displayed as a 2D image, on the display screen.

In FIG. 2C, the structure of a GPU subsystem on the graphics card is shown comprising: a video memory disposed external to the GPU, and two 3D engines: (i) a transform bound geometry subsystem 224 for processing 3D graphics primitives; and (ii) a fill bound pixel subsystem 225. The video memory shares its storage resources among geometry buffer 222, through which all geometric (i.e. polygonal) data is transferred to the commands buffer, texture buffers 223, and Frame Buffer FB 226.

As shown in FIG. 2C, the division of graphics data among GPUs reduces (i) the bottleneck 222 posed by the video memory footprint at each GPU, (ii) the transform bound processing bottleneck 224, and (iii) the fill bound processing bottleneck 225.

However, when using a multiple GPU graphics architecture of the type shown in FIGS. 2A through 2C, there is a need to distribute the computational workload associated with interactive parallel graphics rendering processes. To achieve this objective, two different kind of parallel rendering methods have been applied to PC-based dual GPU graphics systems of the kind illustrated in FIGS. 2A through 2C, namely: the Time Division Method of Parallel Graphics Rendering illustrated in FIG. 2D; and the Image Division Method of Parallel Graphics Rendering illustrated in FIG. 2E.

Notably, a third type of method of parallel graphics rendering, referred to as the Object Division Method, has been developed over the years and practiced exclusively on complex computing platforms requiring complex and expensive hardware platforms for compositing the pixel output of the multiple graphics processing pipelines (GPPLs). The Object Division Method, illustrated in FIG. 3A, can be found applied on conventional graphics platforms of the kind shown in FIG. 3, as well as on specialized graphics computing platforms as described in U.S. Patent Application Publication No. US 2002/0015055, assigned to Silicon Graphics, Inc. (SGI), published on Feb. 7, 2002, and incorporated herein by reference.

While the differences between the Image, Frame and Object Division Methods of Parallel Graphics Rendering will be described below, it will be helpful to first briefly describe the five (5) basic stages or phases of the parallel graphics rendering process, which all three such methods of parallel rendering have in common, namely:

(1) the Decomposition Phase, wherein the 3D scene or object is analyzed and its corresponding graphics display list data and commands are assigned to particular graphics pipelines available on the parallel multiple GPU-based graphics platform;

(2) the Distribution Phase, wherein the graphics data and commands are distributed to particular available graphics processing pipelines determined during the Decomposition Phase;

(3) the Rendering Phase, wherein the geometry processing subsystem/engine and the pixel processing subsystem/engine along each graphics processing pipeline of the parallel graphics platform uses the graphics data and commands distributed to its pipeline, and transforms (i.e. projects, shades and colors) the graphics objects and bit-mapped textures into a subset of unstructured matrix of pixels;

(4) the Recomposition Phase, wherein the parallel graphics platform uses the multiple sets of pixel data generated by each graphics pipeline to synthesize (or compose) a final set of pixels that are representative of the 3D scene (taken along the specified viewing direction), and this final set of pixel data is then stored in a frame buffer (FB); and (5) the Display Phase, wherein the final set of pixel data retrieved from the frame buffer, and provided to the screen of the device of the system.

As will be explained below with reference to FIGS. 3B through 3D, each of these three different methods of parallel graphics rendering has both advantages and disadvantages.

Image Division Method of Parallel Graphics Rendering

As illustrated in FIG. 2D, the Image Division (Sort-First) Method of Parallel Graphics Rendering distributes all graphics display list data and commands to each of the graphics pipelines, and decomposes the final view (i.e. projected 2D image) in Screen Space, so that, each graphical contributor (e.g. graphics pipeline and GPU) renders a 2D tile of the final view. This mode has a limited scalability due to the parallel overhead caused by objects rendered on multiple tiles. There are two image domain modes, all well known in prior art. They differ by the way the final image is divided among GPUs.

(1) The Split Frame Rendering mode divides up the screen among GPUs by continuous segments. e.g. two GPUs each one handles about one half of the screen. The exact division may change dynamically due to changing load across the screen image. This method is used in nVidia's SLI™ multiple-GPU graphics product.

(2) Tiled Frame Rendering mode divides up the image into small tiles. Each GPU is assigned tiles that are spread out across the screen, contributing to good load balancing. This method is implemented by ATI's Crossfire™ multiple GPU graphics card solution.

In image division, the entire database is broadcast to each GPU for geometric processing. However, the processing load at each Pixel Subsystem is reduced to about 1/N. This way of parallelism relieves the fill bound bottleneck 225. Thus, the image division method ideally suits graphics applications requiring intensive pixel processing.

Time Division (DPlex) Method of Parallel Graphics Rendering

As illustrated in FIG. 2F, the Time Division (DPlex) Method of Parallel Graphics Rendering distributes all display list graphics data and commands associated with a first scene to the first graphics pipeline, and all graphics display list data and commands associated with a second/subsequent scene to the second graphics pipeline, so that each graphics pipeline (and its individual rendering node or GPU) handles the processing of a full, alternating image frame. Notably, while this method scales very well, the latency between user input and final display increases with scale, which is often irritating for the user. Each GPU is give extra time of N time frames (for N parallel GPUs) to process a frame. Referring to FIG. 3, the released bottlenecks are those of transform bound 224 at geometry subsystem, and fill bound 225 at pixel subsystem. Though, with large data sets, each GPU must access all of the data. This requires either maintaining multiple copies of large data sets or creating possible access conflicts to the source copy at the host swelling up the video memory bottlenecks 222, 223 and data transfer bottleneck 221.

Object Division (Sort-Last) Method of Parallel Graphics Rendering

As illustrated in FIG. 3B, the Object Division (Sort-Last) Method of Parallel Graphics Rendering decomposes the 3D scene (i.e. rendered database) and distributes graphics display list data and commands associated with a portion of the scene to the particular graphics pipeline (i.e. rendering unit), and recombines the partially rendered pixel frames, during recomposition. The geometric database is therefore shared among GPUs, reducing the load on the geometry buffer, the geometry subsystem, and even to some extent, the pixel subsystem. The main concern is how to divide the data in order to keep load balance. An exemplary multiple-GPU platform of FIG. 3B for supporting the object-division method is shown in FIG. 3A. The platform requires complex and costly pixel compositing hardware which prevents its current application in a modern PC-based computer architecture.

Today, real-time graphics applications, such as advanced video games, are more demanding than ever, utilizing massive textures, abundance of polygons, high depth-complexity, anti-aliasing, multi-pass rendering, etc., with such robustness growing exponentially over time.

Conventional PC-level dual-mode parallel graphics systems employing multiple-GPUs, such as nVidia's SLI™ multiple-GPU graphics platform, support either the Time Division Mode (termed Alternate Frame Rendering) of parallelism, or the Image Division Mode (termed Split Frame Rendering) of parallelism, which is automatically selected during application set-up (e.g. by the vendor's driver). However, once a graphics-based application is set-up and the time or image division mode of parallel operation selected, the selected mode of parallel operation is fixed during application run-time.

Clearly, conventional PC-based graphics systems fail to address the dynamically changing needs of modern graphics applications. By their very nature, prior art PC-based graphics systems are unable to resolve the variety of bottlenecks (e.g. geometry limited, pixel limited, data transfer limited, and memory limited) summarized in FIG. 3C1, that dynamically arise along 3D graphic pipelines. Consequently, such prior art graphics systems are often unable to maintain a high and steady level of performance throughout a particular graphics application.

Indeed, a given graphics processing pipeline along a parallel graphics rendering system is only as strong as the weakest link of it stages, and thus a single bottleneck determines the overall throughput along the graphics pipelines, resulting in unstable frame-rate, poor scalability, and poor performance.

And while each parallelization mode described above and summarized in FIG. 3C2 solves only part of the bottleneck dilemma currently existing along the PC-based graphics pipelines, no one parallelization method, in and of itself, is sufficient to resolve all bottlenecks in demanding graphics applications, and enable quantum leaps in graphics performance necessary for photo-realistic imagery demanded in real-time interactive graphics environments.

Thus, there is a great need in the art for a new and improved way of and means for practicing parallel 3D graphics rendering processes in modern multiple-GPU based computer graphics systems, while avoiding the shortcomings and drawbacks of such prior art methodologies and apparatus.

SUMMARY AND OBJECTS OF THE PRESENT INVENTION

Accordingly, a primary object of the present invention is to provide a new and improved method of and apparatus for practicing parallel 3D graphics rendering processes in modern multiple-GPU based computer graphics systems, while avoiding the shortcomings and drawbacks associated with prior art apparatus and methodologies.

Another object of the present invention is to provide a novel multi-mode parallel graphics rendering system (MMPGRS) embodied within a host computing system having (i) host memory space (HMS) for storing one or more graphics-based applications and a graphics library for generating graphics commands and data (GCAD) during the run-time (i.e. execution) of the graphics-based application, (ii) one or more CPUs for executing said graphics-based applications, and (iii) a display device for displaying images containing graphics during the execution of said graphics-based applications.

Another object of the present invention is to provide such a multi-mode parallel graphics rendering and display system comprising: a multi-mode parallel graphics rendering subsystem supporting multiple modes of parallel operation selected from the group consisting of object division, image division, and time division; a plurality of graphic processing pipelines (GPPLs) supporting a parallel graphics rendering process that employs one of the object division, image division and/or time division modes of parallel operation in order to execute graphic commands and process graphics data (GCAD) render pixel-composited images containing graphics for display on a display device during the run-time of the graphics-based application; and an automatic mode control module (AMCM) for automatically controlling the mode of parallel operation during the run-time of the graphics-based application.

Another object of the present invention is to provide such a multi-mode parallel graphics rendering and display system, wherein the automatic mode control module employs the profiling of scenes in said graphics-based application.

Another object of the present invention is to provide such a multi-mode parallel graphics rendering and display system, wherein the automatic mode control module employs the profiling of scenes in the graphics-based application, on an image frame by image frame basis.

Another object of the present invention is to provide such a multi-mode parallel graphics rendering and display system, wherein the profiling of scenes in the graphics-based application, is carried out in real-time, during run-time of the graphics-based application, on an image frame by image frame basis.

Another object of the present invention is to provide such a multi-mode parallel graphics rendering and display system, wherein said real-time profiling of scenes in the graphics-based application involves (i) collecting and analyzing performance data associated with the MMPGRS and the host computing system, during application run-time, (ii) constructing scene profiles for the image frames associated with particular scenes in the particular graphics-based application, and (iii) maintaining the scene profiles in a application/scene profile database that is accessible to the automatic mode control module during run-time, so that during the run-time of the graphics-based application, the automatic mode control module can access and use the scene profiles maintained in the application/scene profile database and determine how to dynamically control the modes of parallel operation of the MMPGRS to optimize system performance.

Another object of the present invention is to provide such a multi-mode parallel graphics rendering and display system, wherein the automatic mode control module employs real-time detection of scene profile indices directly programmed within pre-profiled scenes of the graphics-based application; wherein the pre-profiled scenes are analyzed prior to run-time, and indexed with the scene profile indices; and wherein the mode control parameters (MCPs) corresponding to the scene profile indices, are stored within an application/scene profile database accessible to the automatic mode control module during application run-time.

Another object of the present invention is to provide such a multi-mode parallel graphics rendering and display system, wherein during run-time, the automatic mode control module automatically detects the scene profile indices and uses the detected said scene profile indices to access corresponding MCPs from the application/scene profile database so as to determine how to dynamically control the modes of parallel operation of the MMPGRS to optimize system performance.

Another object of the present invention is to provide such a multi-mode parallel graphics rendering and display system, wherein the automatic mode control module employs real-time detection of mode control commands (MCCs) directly programmed within pre-profiled scenes of the graphics-based application; wherein the pre-profiled scenes are analyzed prior to run-time, and the MCCs are directly programmed within the individual image frames of each scene; and wherein during run-time, the automatic mode control module automatically detects the MCCs along the graphics command and data stream, and uses the MCCs so as to determine how to dynamically control the modes of parallel operation of the MMPGRS to optimize system performance.

Another object of the present invention is to provide such a multi-mode parallel graphics rendering and display system, wherein the automatic mode control module employs a user interaction detection (UID) mechanism for real-time detection of the user's interaction with the host computing system.

Another object of the present invention is to provide such a multi-mode parallel graphics rendering and display system, wherein, in conjunction with scene profiling, the automatic mode control module also uses said UID mechanism to determine how to dynamically control the modes of parallel operation of the MMPGRS to optimize system performance, at any instance in time during run-time of the graphics-based application.

Another object of the present invention is to provide a multi-mode parallel graphics rendering system (MMPGRS), having multiple graphics processing pipelines (GPPLs) with multiple GPUs supporting a parallel graphics rendering process having time, frame and object division modes of operation, wherein each GPPL comprises video memory and a GPU having a geometry processing subsystem and a pixel processing subsystem, and wherein 3D scene profiling is performed in real-time, and the parallelization state/mode of the system is dynamically controlled to meet graphics application requirements.

Another object of the present invention is to provide a multi-mode parallel graphics rendering and display system having multiple graphics processing pipelines (GPPLs), each having a GPU and video memory, and supporting multiple modes of parallel graphics rendering using real-time graphics application profiling and automatic configuration of the multiple graphics processing pipelines supporting multiple modes of parallel graphics rendering, including a time-division mode, a frame-division mode, and an object-division mode of parallel operation.

Another object of the present invention is to provide such a multi-mode parallel graphics rendering and display system, which is capable of dynamically handling bottlenecks that are automatically detected during any particular graphics application running on the host computing system.

Another object of the present invention is to provide such a multi-mode parallel graphics rendering system, wherein different parallelization schemes are employed to reduce pipeline bottlenecks, and increase graphics performance.

Another object of the present invention is to provide such a multi-mode parallel graphics rendering system, wherein image, time and object division methods of parallelization are implemented on the same parallel graphics platform.

Another object of the present invention is to provide a method of multi-mode parallel graphics rendering that can be practiced on a multiple GPU-based PC-level graphics system, and which, during application run-time, dynamically alternates among Time, Frame/Image and Object division modes of parallel operation, adapting the optimal method of parallel operation to the real time needs of the graphics application.

Another object of the present invention is to provide such a multi-mode parallel graphics rendering system, which is capable of supervising the performance level of a graphic application by dynamically adapting different parallelization schemes to solve instantaneous bottlenecks along the graphic pipelines thereof.

Another object of the present invention is to provide such a multi-mode parallel graphics rendering system, having run-time configuration flexibility for various parallel schemes to achieve the best system performance.

Another object of the present invention is to provide such a multi-mode parallel graphics rendering system having architectural flexibility and real-time profiling and control capabilities which enable utilization of different modes of parallel operation for high and steady performance along the application running on the associated host system.

Another object of the present invention is to provide a novel method of multi-mode parallel graphics rendering on a multiple GPU-based graphics system, which achieves improved system performance by using adaptive parallelization of multiple graphics processing units (GPUs), on conventional and non-conventional platform architectures, as well as on monolithic platforms, such as multiple GPU chips or integrated graphic devices (IGD).

Another object of the present invention is to provide a multi-mode parallel graphics rendering system, wherein bottlenecks are dynamically handled.

Another object of the present invention is to provide such a multi-mode parallel graphics rendering system, wherein stable performance is maintained throughout course of a graphics application.

Another object of the present invention to provide a multi-mode parallel graphics rendering system supporting software-based adaptive graphics parallelism for the best performance, seamlessly to the graphics application, and compliant with graphic standards (e.g. OpenGL and Direct3D).

Another object of the present invention is to provide a multi-mode parallel graphics rendering system, wherein all parallel modes are implemented in a single architecture.

Another object of the present invention is to provide a multi-mode parallel graphics rendering system, wherein the architecture is flexible, supporting fast inter-mode transitions.

Another object of the present invention is to provide a multi-mode parallel graphics rendering system which is adaptive to changing to meet the needs of any graphics application during the course of its operation.

Another object of the present invention is to provide a multi-mode parallel graphics rendering system which employs a user interaction detection (UID) subsystem for enabling the automatic and dynamic detection of the user's interaction with the host computing system.

Another object of the present invention is to provide such a multi-mode parallel graphics rendering system, which continuously processes user-system interaction data, and automatically detects user-system interactivity (e.g. mouse click, keyboard depression, eye-movement, etc).

Another object of the present invention is to provide such a multi-mode parallel graphics rendering system the system, wherein absent preventive conditions (such as CPU bottlenecks and need for the same FB in successive frames), the user interaction detection (UID) subsystem enables timely implementation of the Time Division Mode only when no user-system interactivity is detected so that system performance is automatically optimized.

Another object of the present invention is to provide a multi-mode parallel graphics rendering system, which can be implemented using a software implementation of present invention.

Another object of the present invention is to provide a multi-mode parallel graphics rendering system, which can be realized using a hardware implementation.

Another object of the present invention is to provide a multi-mode parallel graphics rendering system, which can be realized as chip implementation.

Another object of the present invention is to provide a multi-mode parallel graphics rendering system, which can be realized as an integrated monolithic implementation.

Another object of the present invention is to provide a multi-mode parallel graphics rendering system, which can be implemented using IGD technology.

Another object of the present invention is to provide a multi-mode parallel graphics rendering system, characterized by run-time configuration flexibility for various parallel schemes to achieve the best parallel performance.

Another object of the present invention is to provide a multi-mode parallel graphics rendering system that operates seamlessly to the application and is compliant with graphic standards (e.g. OpenGL and Direct3D).

Another object of the present invention is to provide a multi-mode parallel graphics rendering system, which can be implemented on conventional multi-GPU platforms replacing image division or time division parallelism.

Another object of the present invention is to provide a multi-mode parallel graphics rendering system, which enables the multiple GPU platform vendors to incorporate the solution in their systems supporting only image division and time division modes of operation.

Another object of the present invention is to provide such multiple GPU-based graphics system, which enables implementation using low cost multi-GPU cards.

Another object of the present invention is to provide a multi-mode parallel graphics rendering system implemented using IGD technology, and wherein it is impossible for the IGD to get disconnected by the BIOS when an external graphics card is connected and operating.

Another object of the present invention is to provide a multiple GPU-based graphics system, wherein a new method of dynamically controlled parallelism improves the system's efficiency and performance.

Another object of the present invention is to provide a multi-mode parallel graphics rendering system, which can be implemented using an IGD supporting more than one external GPU.

Another object of the present invention is to provide a multi-mode parallel graphics rendering system, which can be implemented using an IGD-based chipset having two or more IGDs.

Another object of the present invention is to provide a multi-mode parallel graphics rendering system, which employs a user interaction detection (UID) subsystem that enables automatic and dynamic detection of the user's interaction with the system, so that absent preventive conditions (such as CPU bottlenecks and need for the same FB in successive frames), this subsystem enables timely implementation of the Time Division Mode only when no user-system interactivity is detected, thereby achieving the highest performance mode of parallel graphics rendering at runtime, and automatically optimizing the graphics performance of the host computing system.

Another object of the present invention is to provide a parallel graphics rendering system employing multiple graphics processing pipelines supporting the object division mode of parallel graphics rendering using pixel processing resources provided therewithin.

Another object of the present invention is to provide a parallel graphics rendering system for carrying out the object division method of parallel graphics rendering on multiple GPU-based graphics platforms associated with diverse types of computing machinery.

Another object of the present invention is to provide a novel method having multiple graphics processing pipelines (GPPLs) with multiple GPUs or CPU-cores supporting a parallel graphics rendering process having an object division mode of operation, wherein each GPPL includes video memory, a geometry processing subsystem, and a pixel processing subsystem, wherein pixel (color and z depth) data buffered in the video memory of each GPPL is communicated to the video memory of a primary GPPL, and wherein the video memory and the pixel processing subsystem in the primary GPPL are used to carry out the image recomposition phase of the object division mode of parallel graphics rendering process.

Another object of the present invention is to provide a parallel graphics rendering system having multiple graphics processing pipelines (GPPLs) with multiple GPUs or CPU-cores supporting a parallel graphics rendering process having an object division mode of operation, wherein each GPU comprises video memory, a geometry processing subsystem and a pixel processing subsystem, wherein pixel (color and z depth) data buffered in the video memory of each GPPL is communicated to the video memory of a primary GPPL, and wherein the video memory and the pixel processing subsystem in the primary GPPL are used to carry out the image recomposition phase of the object division mode of the parallel graphics rendering process.

Another object of the present invention is to provide a parallel graphics rendering system having multiple graphics processing pipelines (GPPLs) with multiple GPUs supporting a parallel graphics rendering process having an object division mode of operation, wherein each GPU comprises video memory, a geometry processing subsystem and a pixel processing subsystem, wherein pixel (color and z depth) data buffered in the video memory of each GPU is communicated to the video memory of a primary GPU, and wherein the video memory and both the geometry and pixel processing subsystems in the primary GPU are used to carry out the image recomposition phase of the object division mode of parallel graphics rendering process.

Another object of the present invention is to provide a parallel rendering graphics system having multiple graphics processing pipelines (GPPLs) with multiple GPUs supporting a parallel graphics rendering process having an object division mode of operation, wherein the video memory of each GPPL includes texture memory and a pixel frame buffer, wherein the geometry processing subsystem includes a vertex shading unit, wherein the pixel processing subsystem includes a fragment/pixel shading unit, wherein pixel (color and z depth) data buffered in the video memory of each GPPL is communicated to the video memory of a primary GPPL, and wherein the texture memory and the fragment/pixel shading unit are used to carry out the image recomposition phase of the object division mode of the parallel graphics rendering process.

Another object of the present invention is to provide a parallel graphics rendering system having multiple graphics processing pipelines (GPPLs) with multiple GPUs supporting a parallel graphics rendering process having an object division mode of operation, wherein the video memory of each GPPL includes texture memory and a pixel frame buffer, wherein the geometry processing subsystem includes a vertex shading unit, wherein the pixel processing subsystem includes a fragment/pixel shading unit, wherein pixel (color and z depth) data buffered in the video memory of each GPPL is communicated to the video memory of a primary GPPL, and wherein the texture memory and the vertex shading unit are used to carry out the image recomposition phase of the object division mode of the parallel graphics rendering process.

Another object of the present invention is to provide a parallel graphics rendering system having multiple graphics processing pipelines (GPPLs) with multiple GPUs supporting a parallel graphics rendering process having an object division mode of operation, which does not require compositing in main, shared or distributed memory of the host computing system (e.g. involving the movement of pixel data from the frame buffers or FBs to main memory, processing the pixel data in the CPU of the host for composition, and moving the result out to the primary GPPL for display) thereby avoiding the use of expensive procedure and resources of the system (e.g. buses, caches, memory, and CPU bandwidth).

Another object of the present invention is to provide a novel method of operating a parallel graphics rendering system having multiple graphics processing pipelines (GPPLs) with multiple GPUs supporting a parallel graphics rendering process having an object division mode of operation, wherein implementation of the pixel composition phase of the parallel graphics rendering process is carried out using the computational resources within the GPUs, thereby avoiding the need for dedicated or specialized pixel image compositing hardware and/or software based apparatus.

Another object of the present invention is to provide a novel method of object division parallel graphics rendering carried out on a multi-mode parallel graphics rendering system (MMPGRS) or platform supporting multiple graphical processing pipelines (GPPLs) with multiple graphical processing units (GPUs), wherein the recomposition stage of the rendering process is carried out using computational resources (e.g. video memory and the geometry and/or pixel processing subsystems/engines) supplied by the GPPLs employed on the MMPGRS platform.

Another object of the present invention is to provide a novel method of object division parallel rendering of pixel-composited images for graphics-based applications running on a host computing system embodying a multi-mode parallel graphics rendering system or platform (MMPGRS), wherein the movement and merging of composited pixel data occurs during the recomposition stage of the parallel graphics rendering process in a manner that is transparent to the graphics-based application.

Another object of the present invention is to provide a novel parallel rendering graphics system having multiple graphics processing pipelines (GPPLs) supporting a parallel graphics rendering process having an object division mode of operation, wherein each GPPL comprises video memory, a geometry processing subsystem and a pixel processing subsystem, wherein pixel (color and z depth) data buffered in the video memory of each GPPL is communicated (via an inter-GPPL communication process) to the video memory of a primary GPPL, and wherein the video memory and the geometry and/or pixel processing subsystems in the primary GPPL are used to carry out the image recomposition phase of the object division mode of the parallel graphics rendering process.

Another object of the present invention is to provide a novel parallel graphics rendering system supporting multiple modes of parallel operation during graphical rendering, which allows users to enjoy sharp videos and photos, smooth video playback, astonishing effects, and vibrant colors, as well as texture-rich 3D performance in next-generation games.

Another object of the present invention is to provide a novel multi-user computer network supporting a plurality of client machines, wherein each client machine employs the MMGPRS of the present invention based on a software architecture and responds to user-interaction input data streams from one or more network users who might be local to each other as over a LAN, or be remote to each other, as when operating over a WAN or the Internet infrastructure.

Another object of the present invention is to provide a novel multi-user computer network supporting a plurality of client machines, wherein each client machine employs the MMGPRS of the present invention based on a hardware architecture and responds to user-interaction input data streams from one or more network users who might be local to each other as over a LAN, or be remote to each other, as when operating over a WAN or the Internet infrastructure.

Another object of the present invention is to provide an Internet-based central application profile database server system for automatically updating, over the Internet, graphic application profiles (GAPs) within the MMPGRS of client machines.

Another object of the present invention is to provide such Internet-based Central Application Profile Database Server System which ensures that each MMPGRS is optimally programmed at all possible times so that it quickly and continuously offers users high graphics performance through its adaptive multi-modal parallel graphics operation.

Another object of the present invention is to provide such an Internet-based Central Application Profile Database Server System which supports a Web-based Game Application Registration and Profile Management Application, that provides a number of Web-based services, including:
 (1) the registration of Game Application Developers within the RDBMS of the Server System;
 (2) the registration of game applications with the RDBMS of the Central Application Profile Database Server System, by registered game application developers;
 (3) the registration of each MMPGRS deployed on a client machine or server system having Internet-connectivity, and requesting subscription to periodic/automatic Graphic Application Profile (GAP) Updates (downloaded to the MMPGRS over the Internet) from the Central Application Profile Database Server System; and
 (4) the registration of each deployed MMPGRS requesting the periodic uploading of its Game Application Profiles (GAPS)—stored in an Application/Scene Profile Database and Historical Repository—to the Central Application Profile Database Server System for the purpose of automated analysis and processing so as to formulate "expert" Game Application Profiles (GAPs) that have been based on robust user-experience and which are optimized for particular client machine configurations.

Another object of the present invention is to provide such an Internet-based Central Application Profile Database Server System that enables the MMGPRS of registered client computing machines to automatically and periodically upload, over the Internet, Graphic Application Profiles (GAPs) for storage and use within the Application/Scene Profile Database of the MMPGRS.

Another object of the present invention is to provide such an Internet-based Central Application Profile Database Server System which, by enabling the automatic uploading of expert GAPs into the MMPGRS, graphic application users (e.g. gamers) can immediately enjoy high performance graphics on the display devices of their client machines, without having to develop a robust behavioral profile based on many hours of actual user-system interaction.

Another object of the present invention is to provide such an Internet-based Central Application Profile Database Server System, wherein "expert" GAPs are automatically generated by the Central Application Profile Database Server System by analyzing the GAPs of thousands of different game application users connected to the Internet, and participating in the system.

Another object of the present invention is to provide such an Internet-based Central Application Profile Database Server System, wherein for MMPGRS users subscribing to the Automatic GAP Management Services, each such MMPGRS runs an application profiling and control algorithm that uses the most recently uploaded expert GAP loaded into its automatic mode control mechanism (AMCM), and then allow system-user interaction, user behavior, and application performance to modify the expert GAP profile over time until the next update occurs.

Another object of the present invention is to provide such an Internet-based Central Application Profile Database Server System, wherein the Application Profiling and Analysis Module in each MMPGRS subscribing to the Automatic GAP Management Services supported by the Central Application Profile Database Server System of the present invention, modifies and improves the downloaded expert GAP within particularly set limits and constraints, and according to particular criteria, so that the expert GAP is allowed to evolve in an optimal manner, without performance regression.

These and other objects of the present invention will become apparent hereinafter and in the claims to invention.

BRIEF DESCRIPTION OF DRAWINGS OF PRESENT INVENTION

For a more complete understanding of how to practice the Objects of the Present Invention, the following Detailed Description of the Illustrative Embodiments can be read in conjunction with the accompanying Drawings, briefly described below:

FIG. 1A1 is a graphical representation of a typical prior art PC-based computing system employing a conventional graphics architecture driving a single external graphic card 105;

FIG. 1A2 a graphical representation of a conventional GPU subsystem supported on the graphics card of the PC-based graphics system of FIG. 1A1;

FIG. 1A3 is a graphical representation illustrating the general software architecture of the prior art computing system shown in FIG. 1A2;

FIG. 1B1 is a graphical representation of a typical prior art PC-based computing system employing a conventional graphics architecture employing a North memory bridge circuit (i.e. semiconductor chip of monolithic construction) with an integrated graphics device (IGD) 103 supporting a single graphics pipeline process, and being operably coupled to a South bridge circuit (i.e. semiconductor chip of monolithic construction) supporting the input/output ports of the system;

FIG. 1B2 is graphical representation of the North memory bridge employed in the system of FIG. 1B1, showing in greater detail the micro-architecture of the IGD supporting the single graphics pipeline process therewithin;

FIG. 1B3 is a graphical representation illustrating the general software architecture of the prior art PC-based IGD-driven computing system shown in FIGS. 1B1 and 1B2;

FIG. 1B4 is a graphical representation of a prior art PC-based computing system employing a conventional Fusion-type CPU/GPU hybrid architecture, wherein a single GPU 1242 implemented on the same semiconductor die as the CPU 1241 is used to support a graphics pipeline that drives an external display device, e.g. LCD panel, projection display or the like 106, via a bridge circuit, with display interface, as shown;

FIG. 1B5 is a schematic representation showing the structure of a prior art GPU subsystem mounted on a graphics card or in an IGD, and comprising a GPU, and a video memory which is external to the GPU, wherein the GPU has includes two 3D engines, namely, (i) a transform bound geometry subsystem 124 for processing 3D graphics primitives 121, and (ii) and a fill bound pixel subsystem 125, and wherein the video memory shares its storage resources among a geometry buffer 122A through which all geometric (i.e. polygonal) data 121 is transferred, a commands buffer 122B, texture buffers 123, and a Frame Buffer 126;

FIG. 1C is a graphical representation illustrating a conventional process for rendering successive 3D scenes using a single GPU graphics platform to support a single graphics pipeline process, as shown in FIGS. 1A1 through 1B5;

FIG. 2A1 is a graphical representation of a prior art PC-based computing system employing a conventional dual-GPU graphic architecture comprising two external graphic cards 205 204 and two PCI-e buses, e.g. Bearlake by Intel 207, 208, wherein the primary and secondary graphics cards are connected to and driven by the North memory bridge circuit 103, while a display device 106 is attached to the primary graphics card 205, and Ethernet and mobile docking ports and other local I/O ports are driven by the South bridge circuit, as shown;

FIG. 2A2 is a graphical representation of a prior art PC-based computing system employing a conventional dual-GPU graphic architecture comprising two external graphic cards 204, 205 and two PCI-e buses (e.g. Bearlake by Intel), wherein the primary graphics card 205 is connected to and driven by the North memory bridge via the first PCI-e bus with a display device 106 is attached to the primary graphics card 205, and wherein the secondary graphics card 204 is connected to and driven by the South bridge via the second PCI-e bus;

FIG. 2A3 is a graphical representation of a conventional GPU subsystem supported on each of the graphics cards employed in the prior art PC-based computing systems of FIGS. 2A1 and 2A2;

FIG. 2A4 is a graphical representation illustrating the general software architecture of the prior art PC-based graphics systems shown in FIG. 2A1, as well as FIG. 2A2;

FIG. 2A5 is a graphical representation of a prior art PC-based computing system employing a conventional multi-core microprocessor (CPU) chip to implement multiple processing cores in a single physical package, wherein some of the cores can be potentially used as soft graphic graphics pipelines, and wherein a display device 106 is connected to and driven by the North (memory) bridge chip on the motherboard;

Figure 1C:
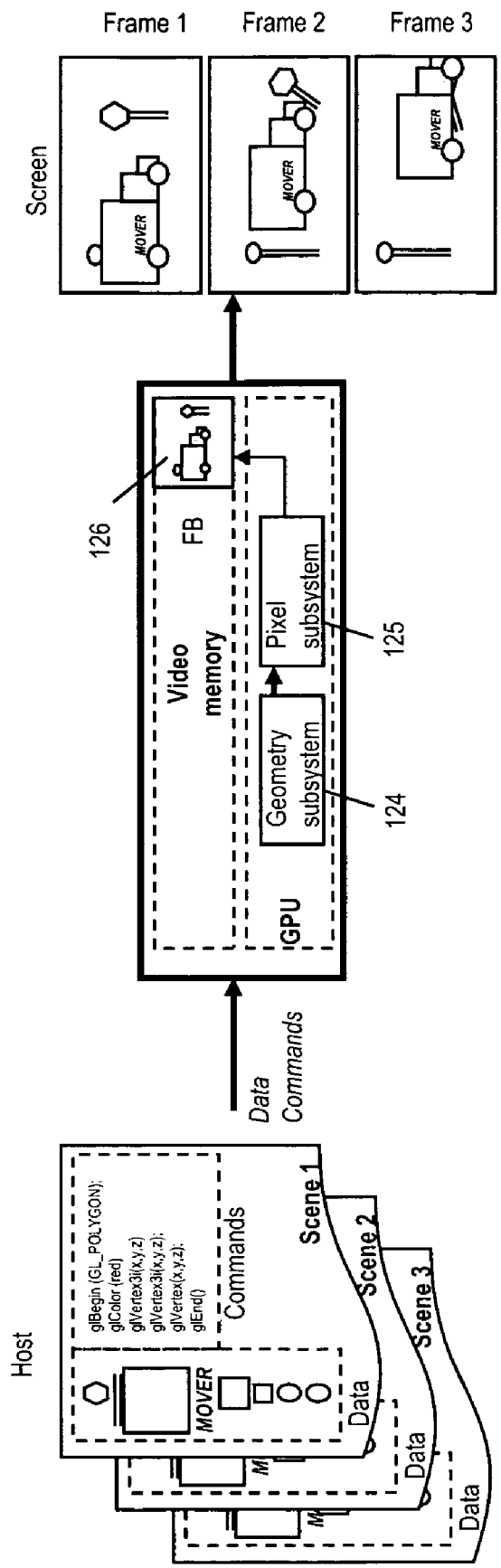
Figure 2B:
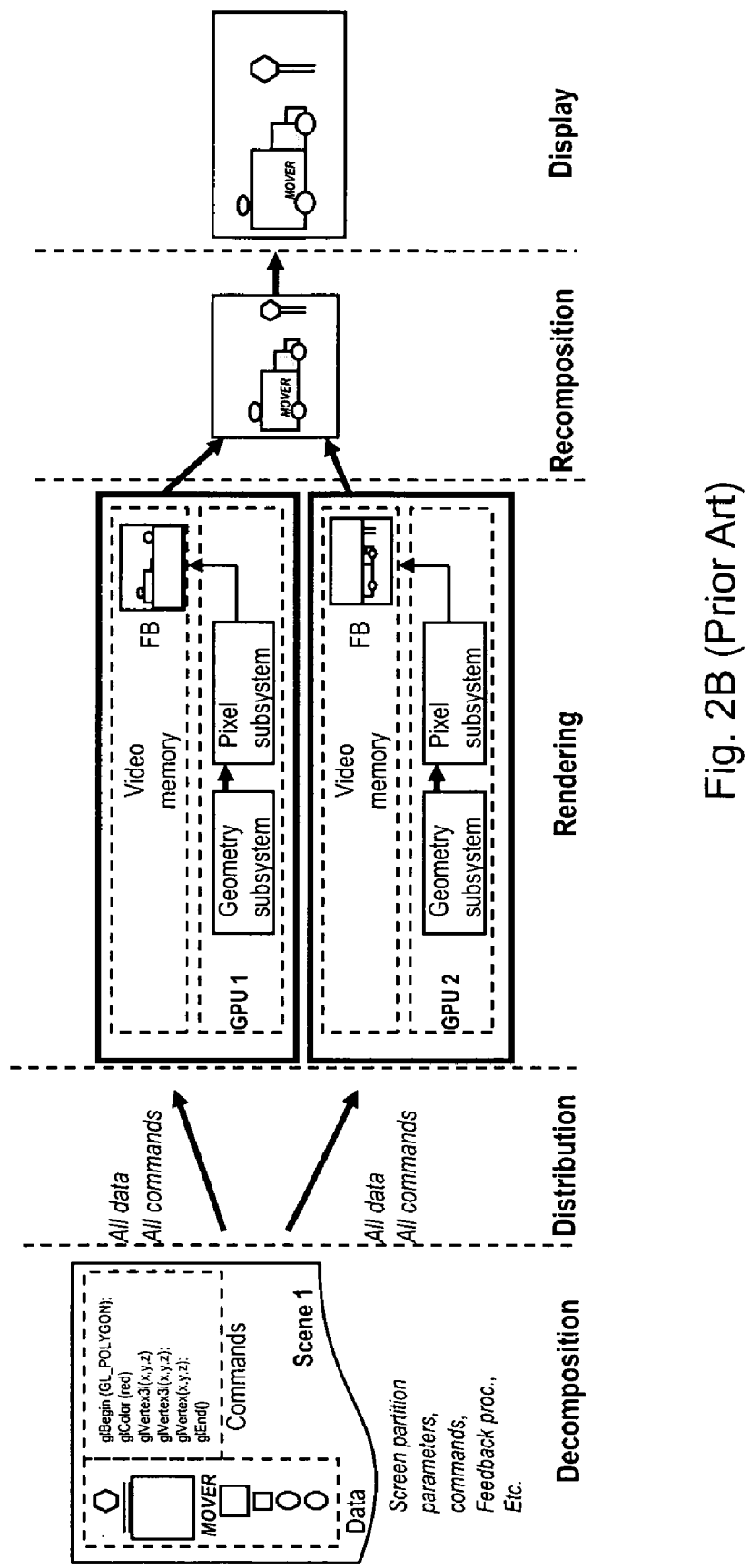
FIG. 2B is a graphical representation of a conventional parallel graphics rendering process being carried out according to the Image Division Method of parallelism using the dual GPUs provided on the prior art graphics platform illustrated in FIGS. 2A1 through 2A3.
Figure 2C:
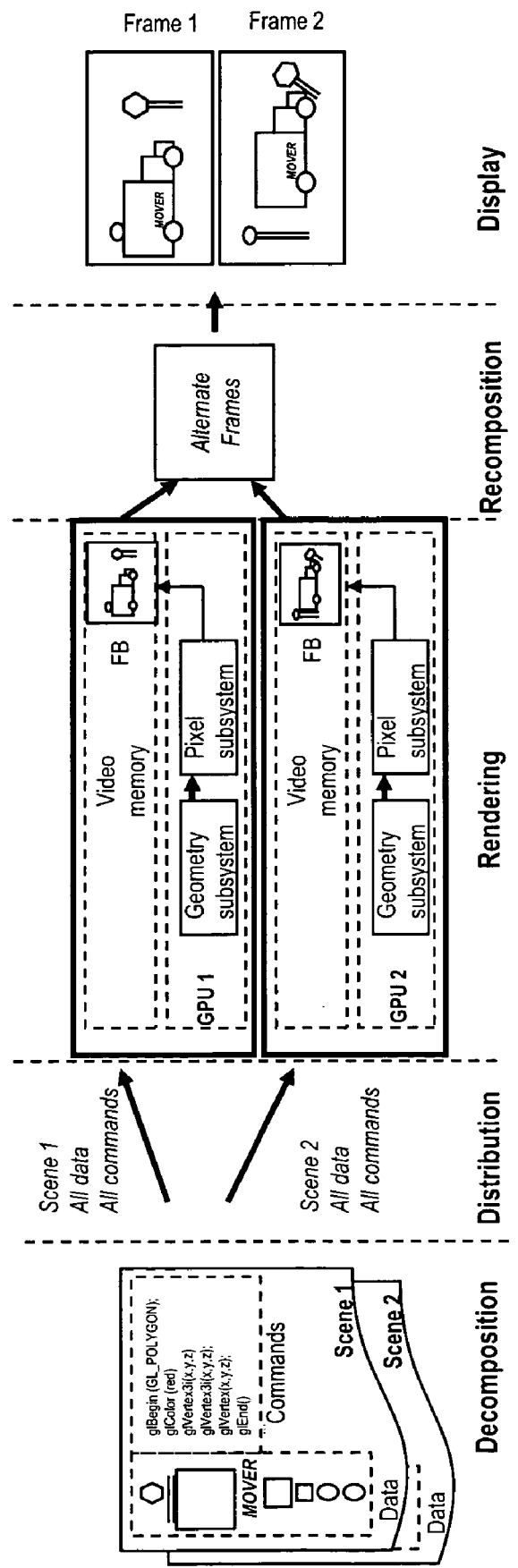
FIG. 2C is a graphical representation of a conventional parallel graphics rendering process being carried out according to the Time Division Method of parallelism using the dual GPUs provided on the prior art graphics platforms illustrated in FIGS. 2A1 through 2A5.
Figure 3A:
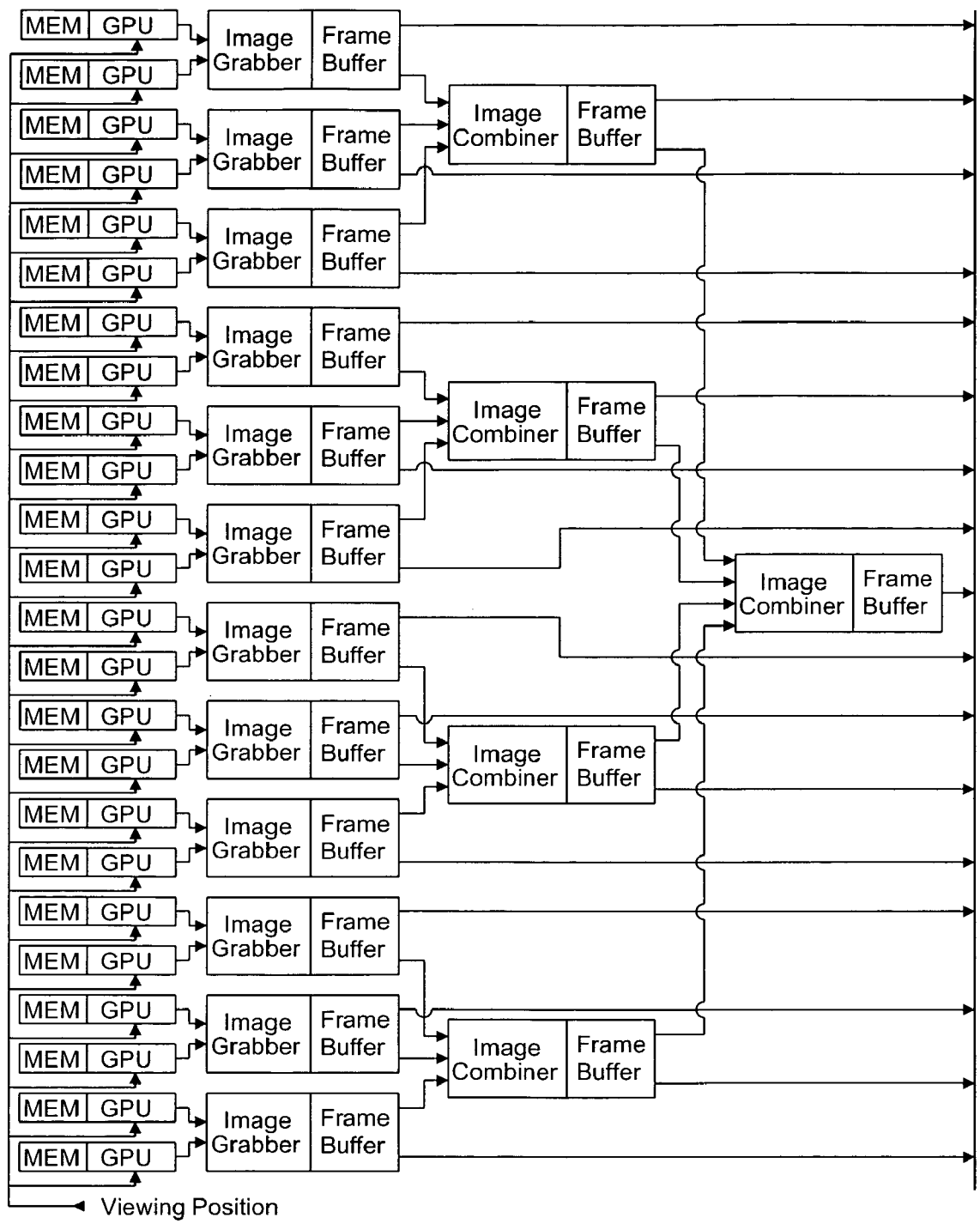
FIG. 3A is a schematic representation of a prior art parallel graphics rendering platform comprising multiple parallel graphics pipelines, each supporting video memory and a GPU, and feeding complex pixel compositing hardware for composing a final pixel-based images for display on the display device.
Figure 3B:
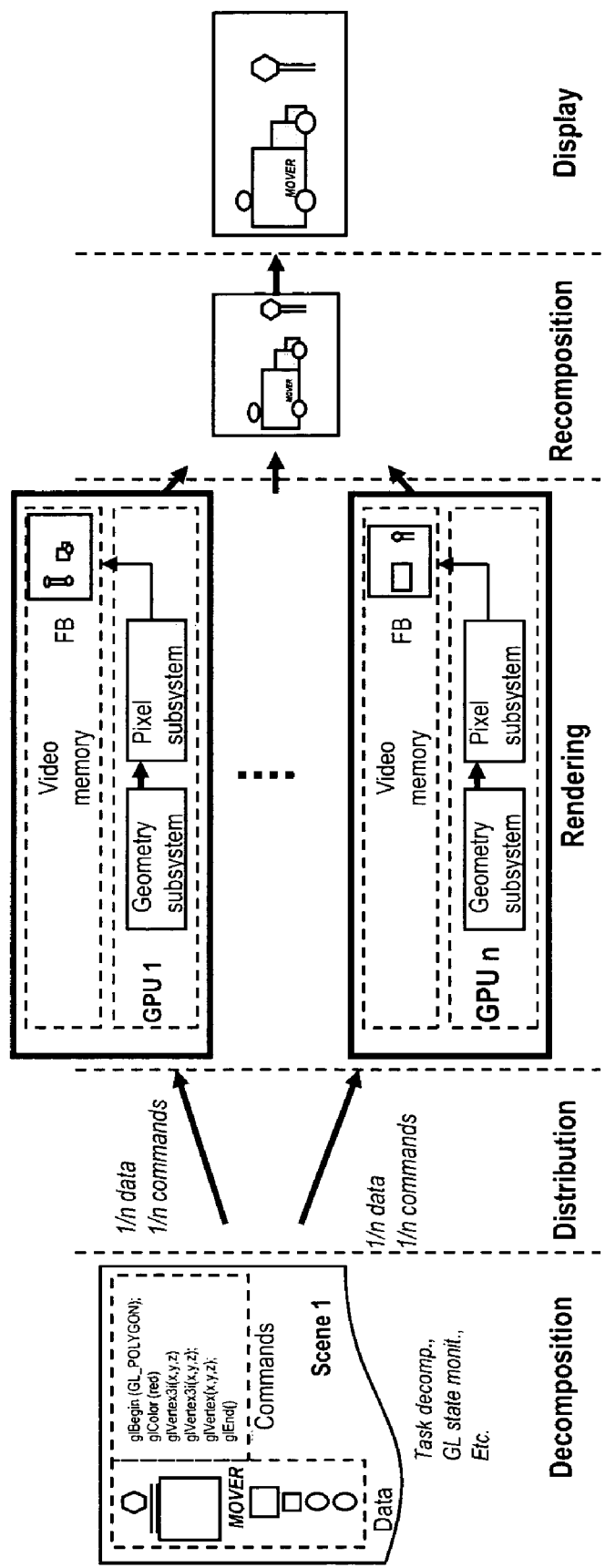
FIG. 3B is a graphical representation of a conventional parallel graphics rendering process being carried out according to the Object Division Method of parallelism using multiple OPUs on the prior art graphics platform of FIG. 3A.
Figure 4A:
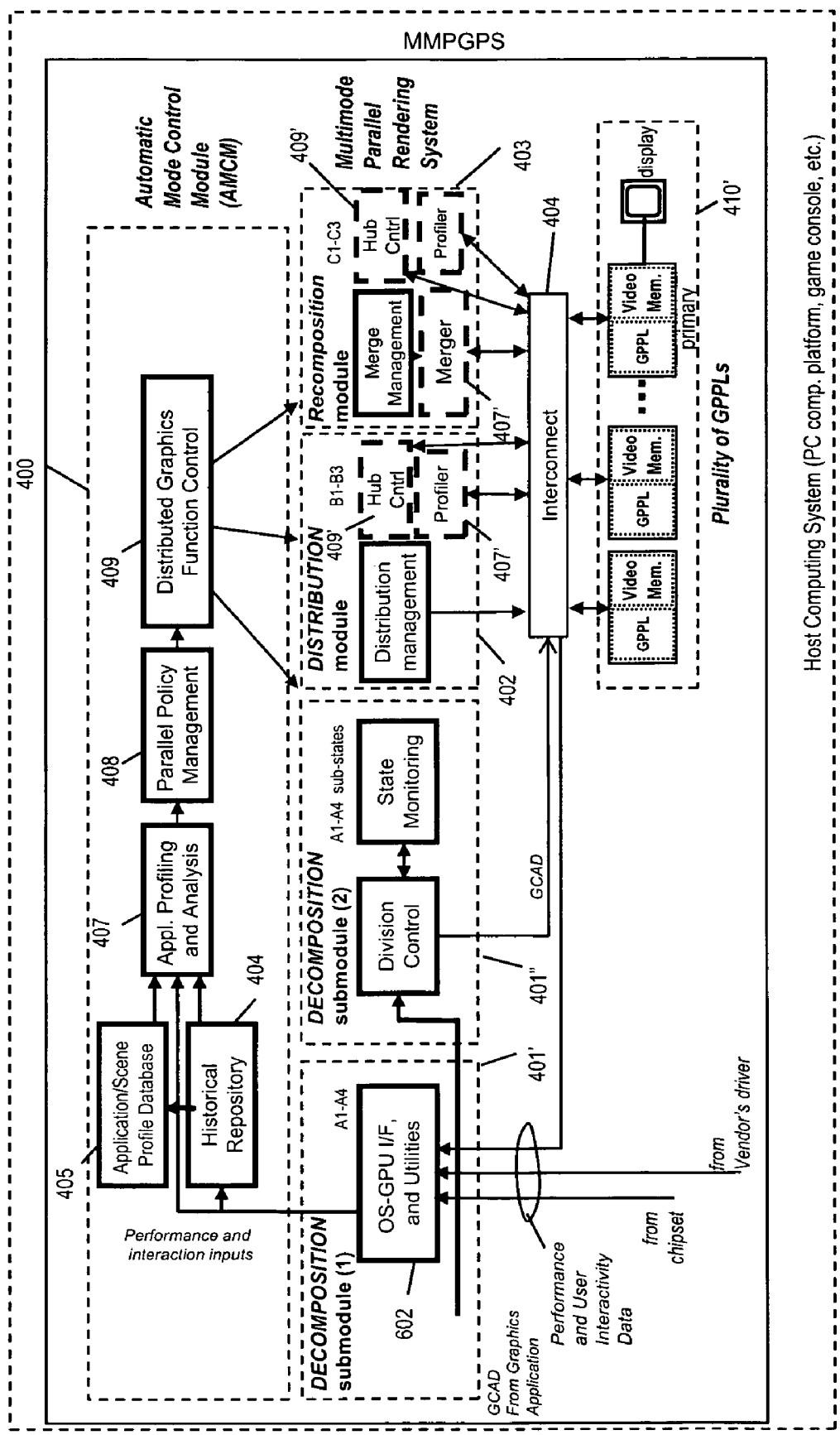
Figure 4D:
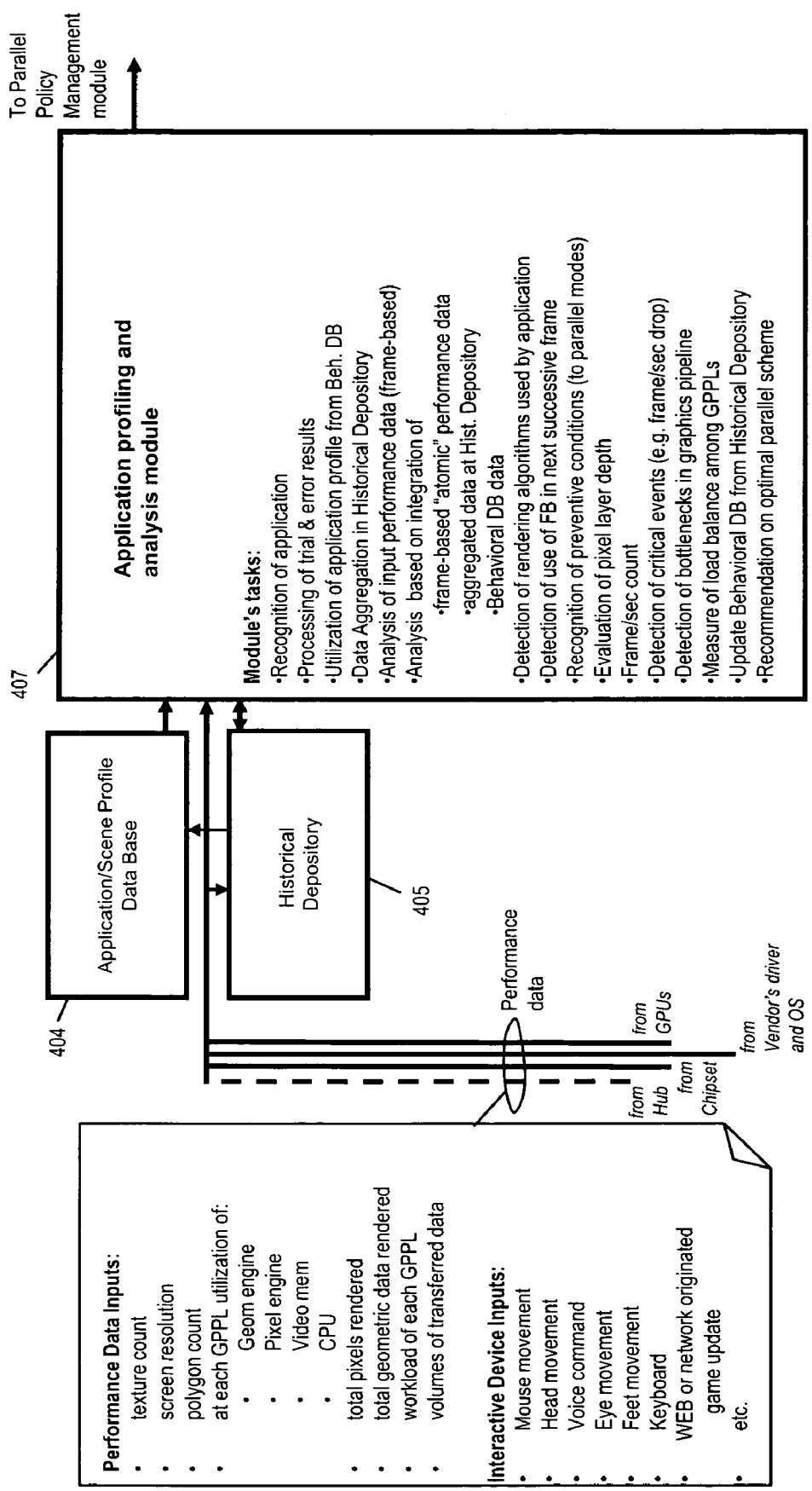
Figure 5A:
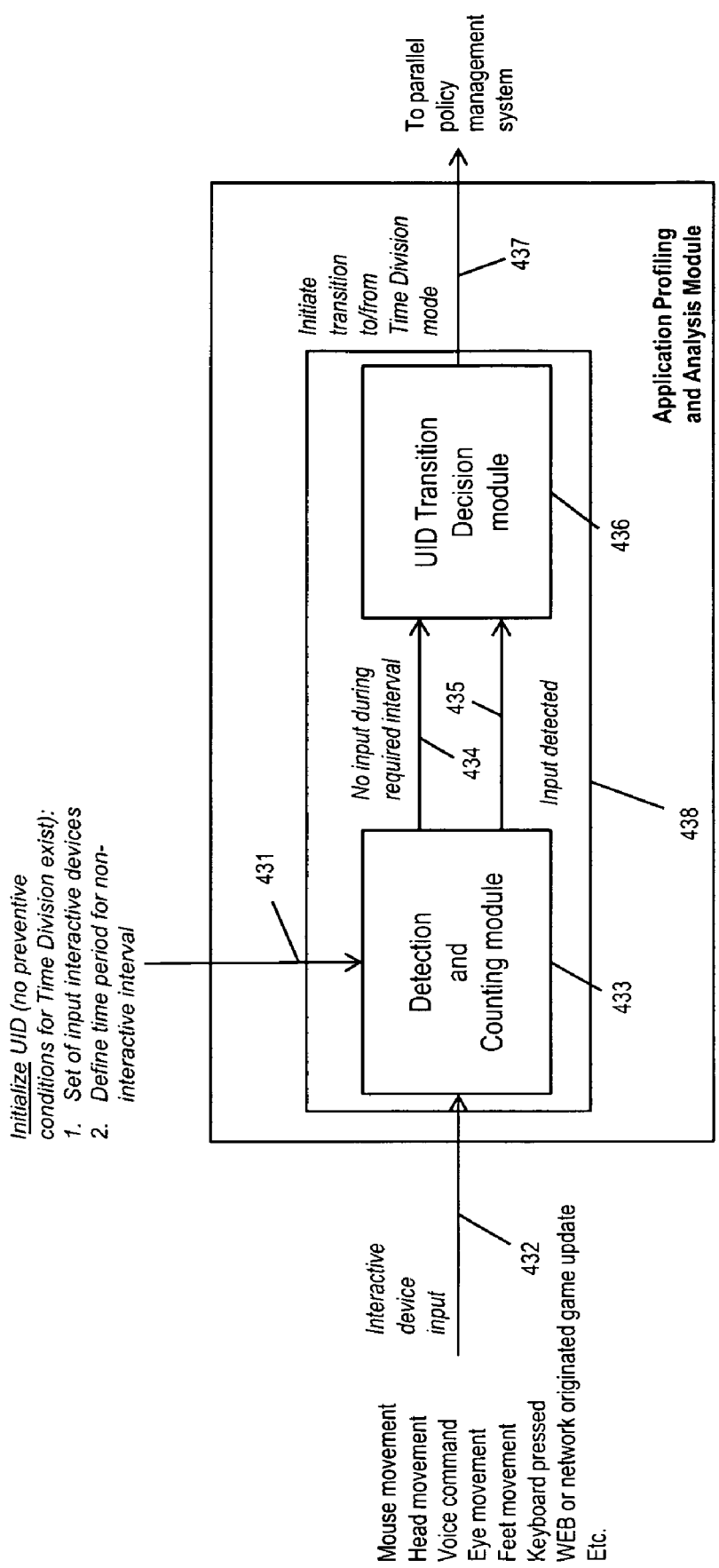
Figure 5B:
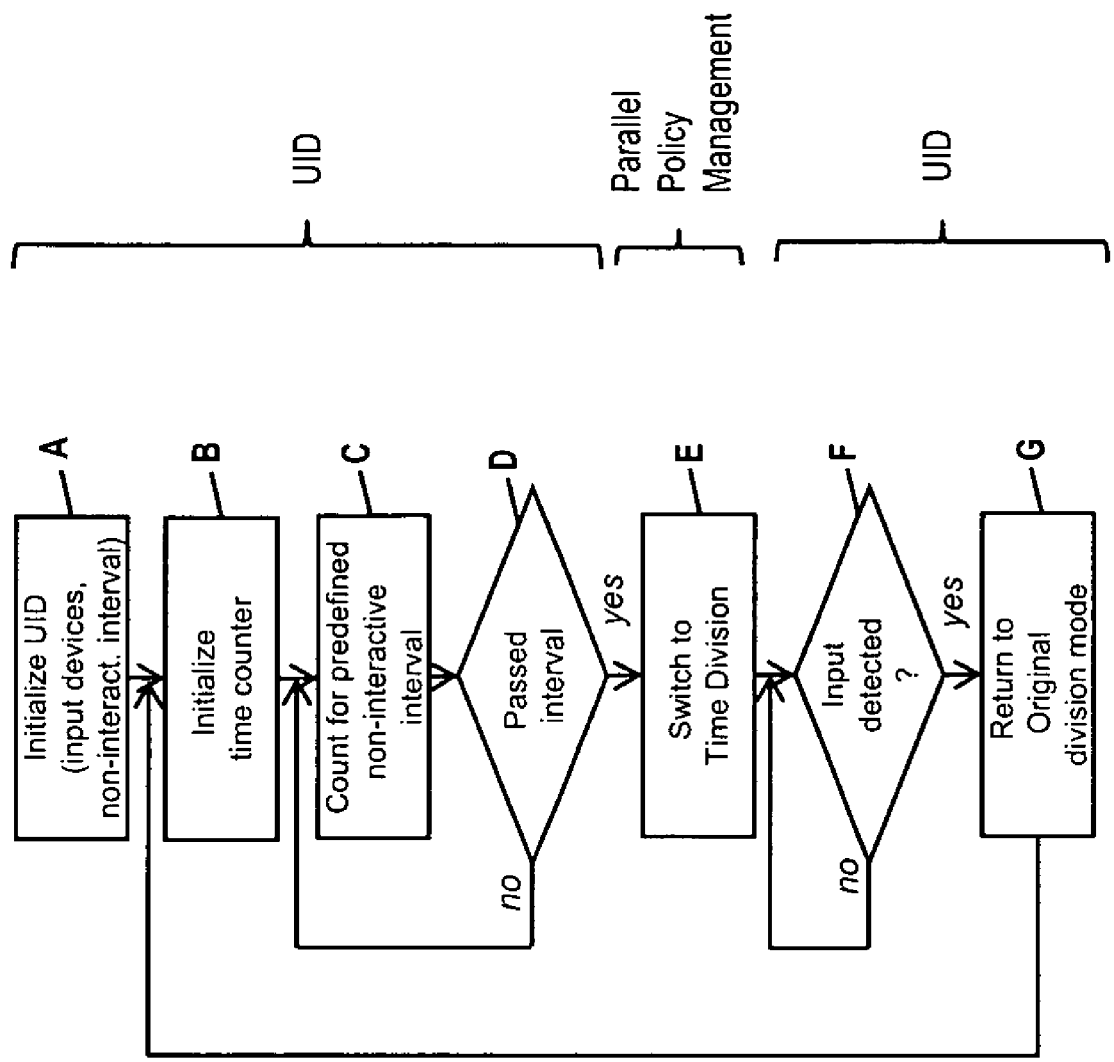
Figure 6A:
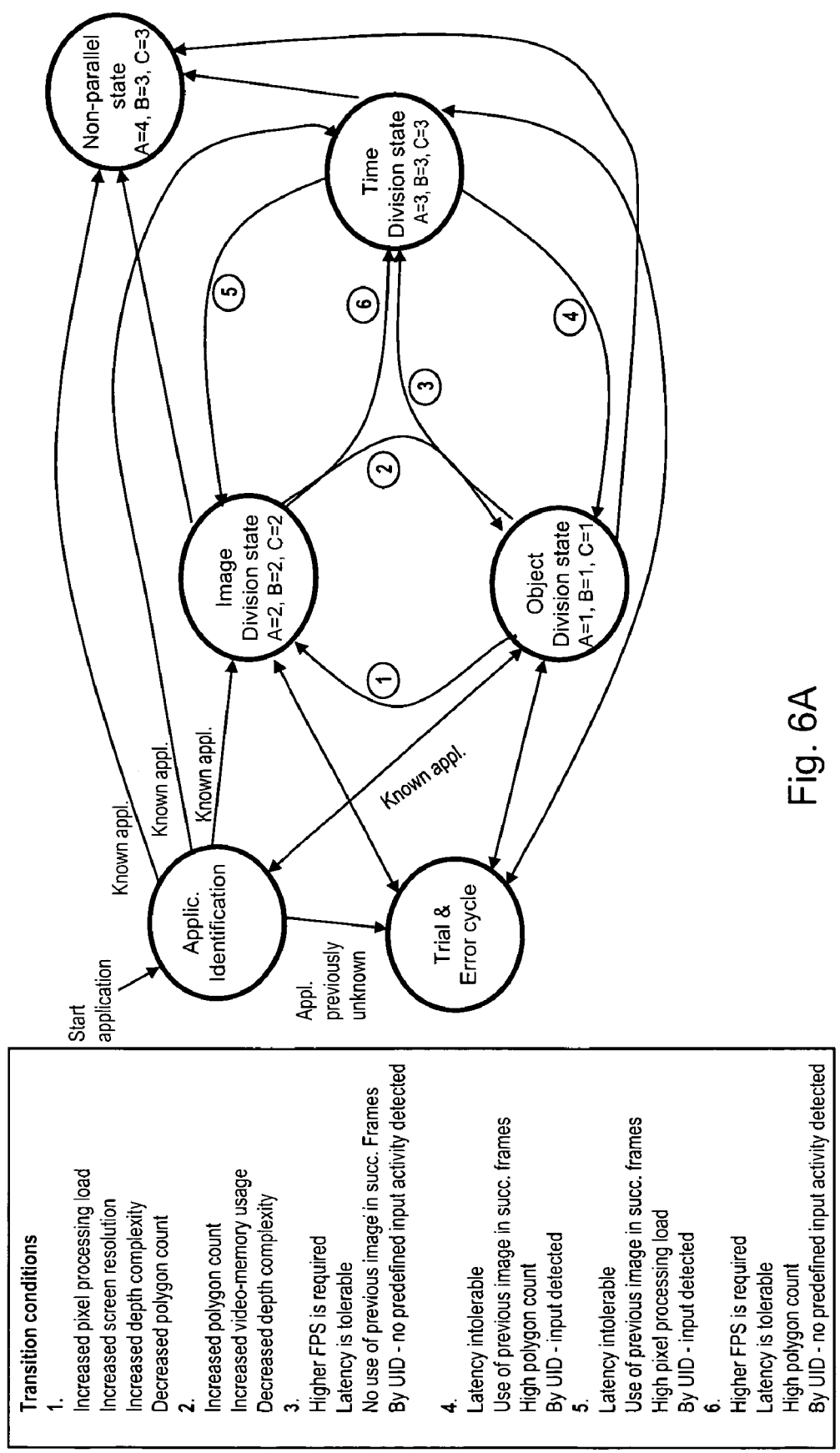
Figure 6B:
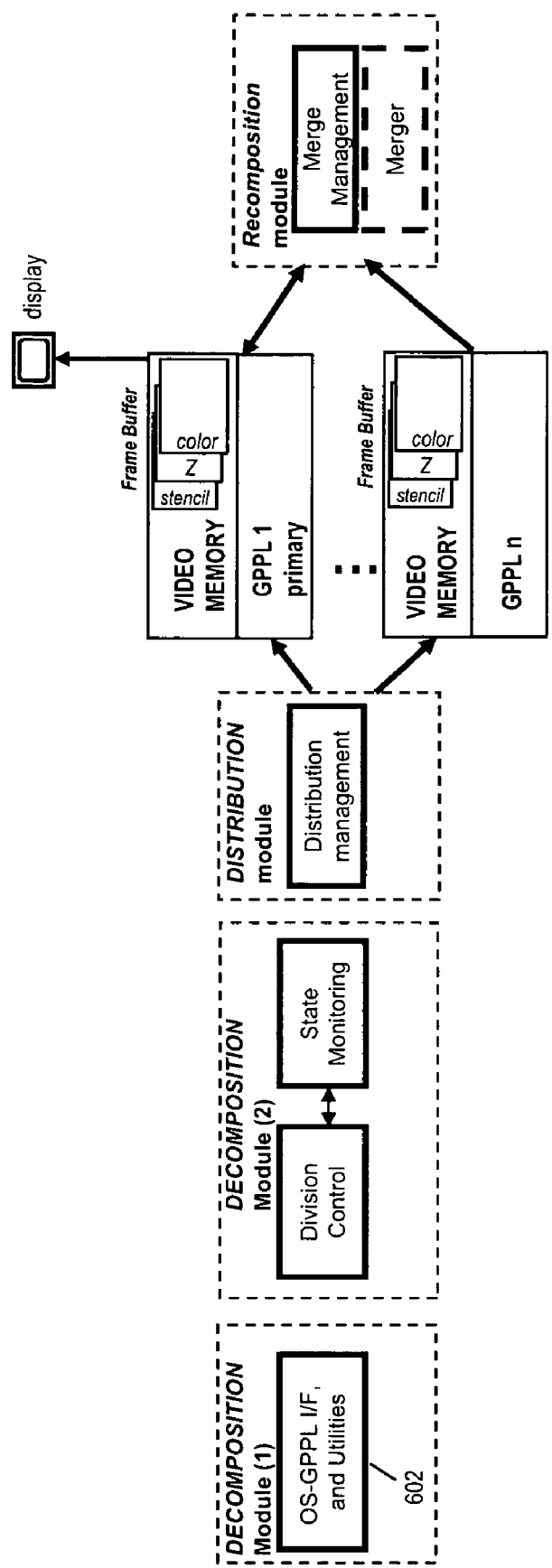
Figure 8A:
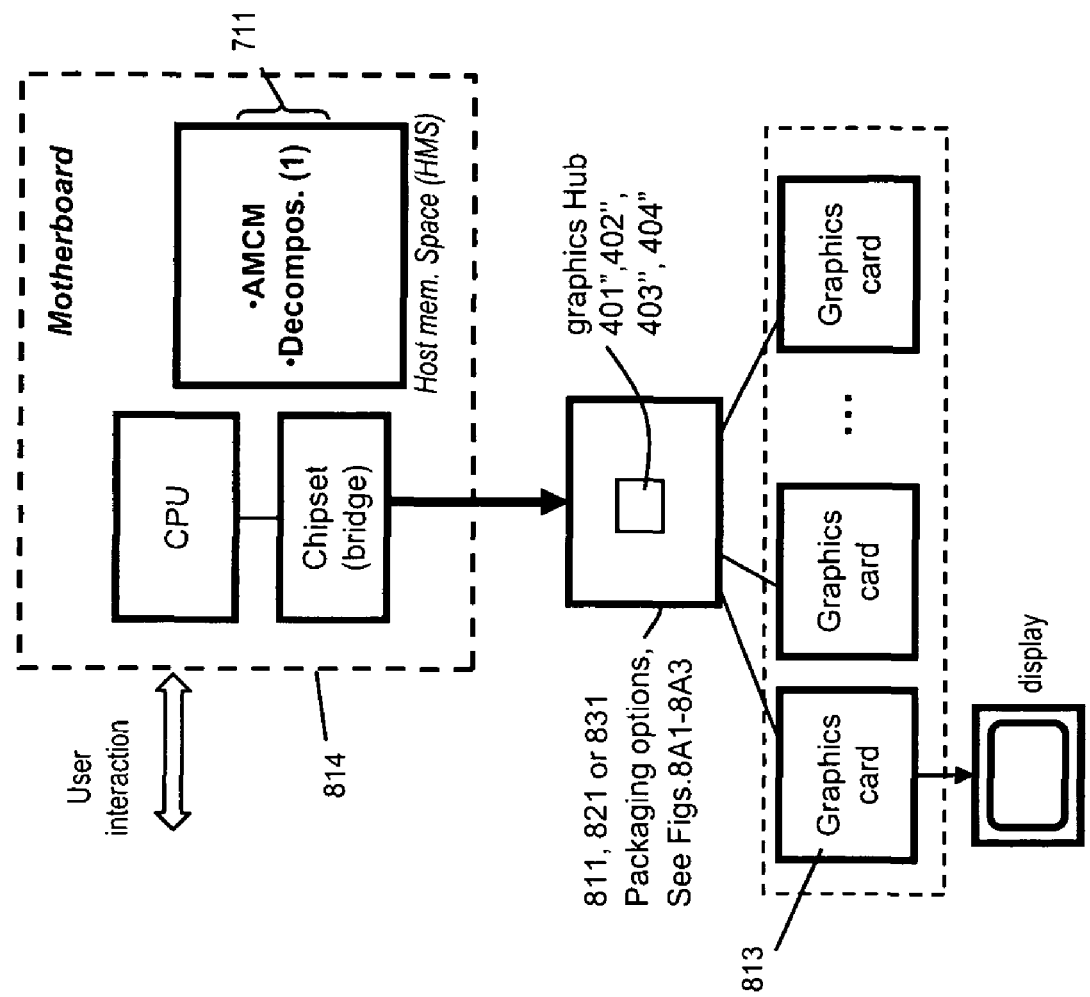
Figure 8B:
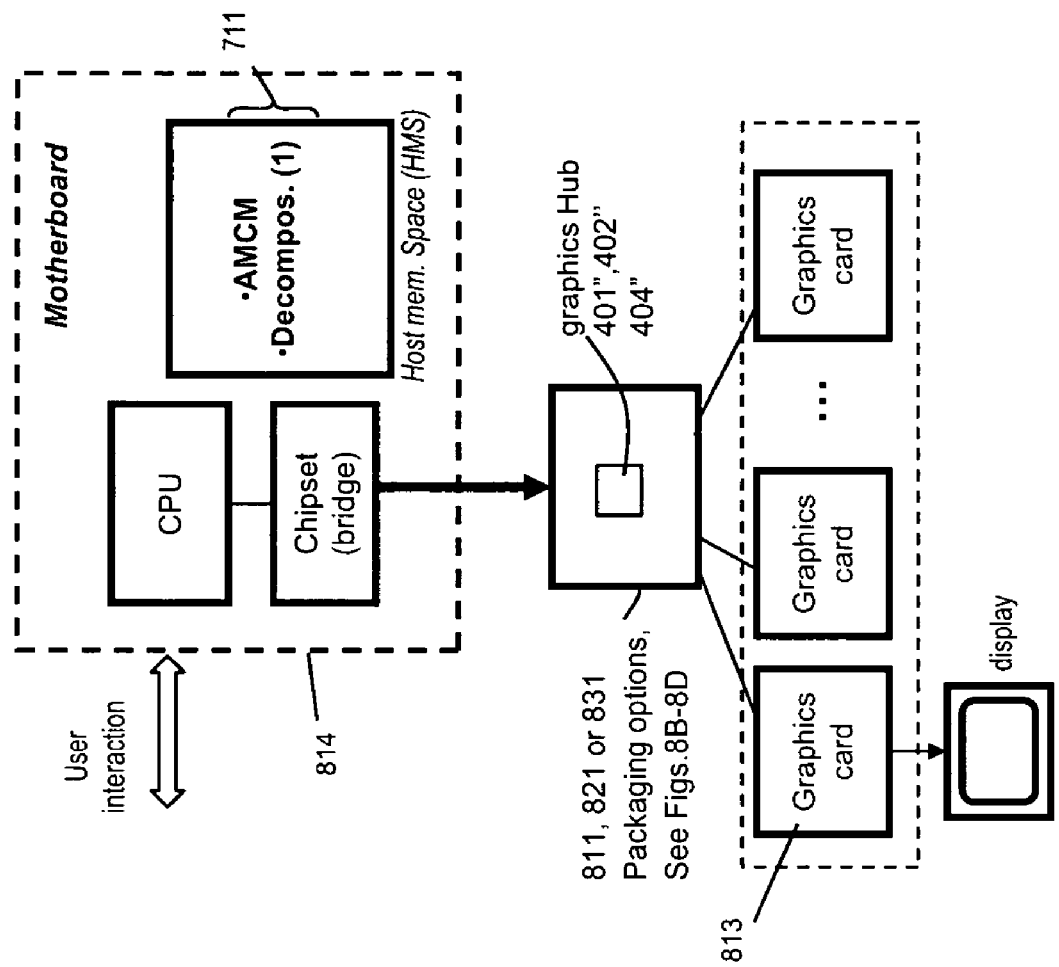
Figure 8C:
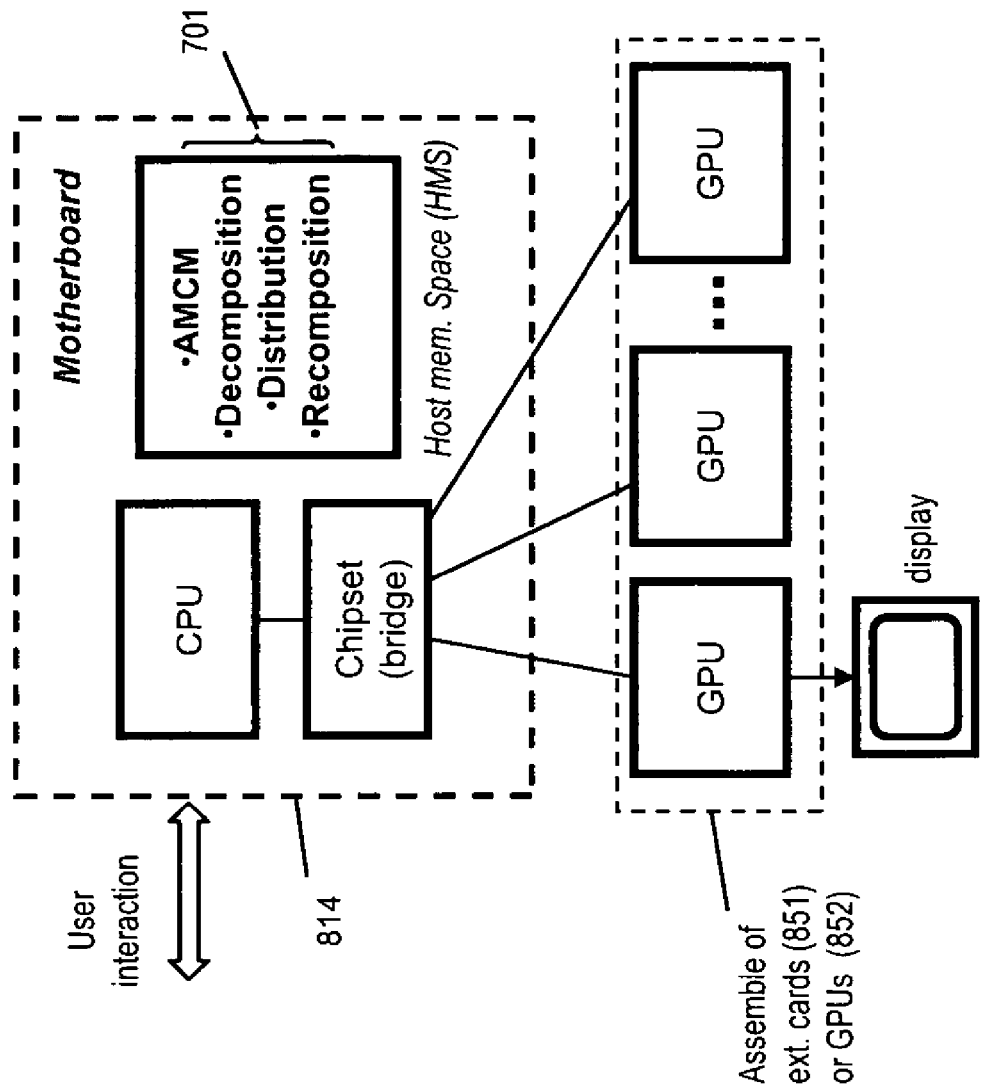
Figure 8D:
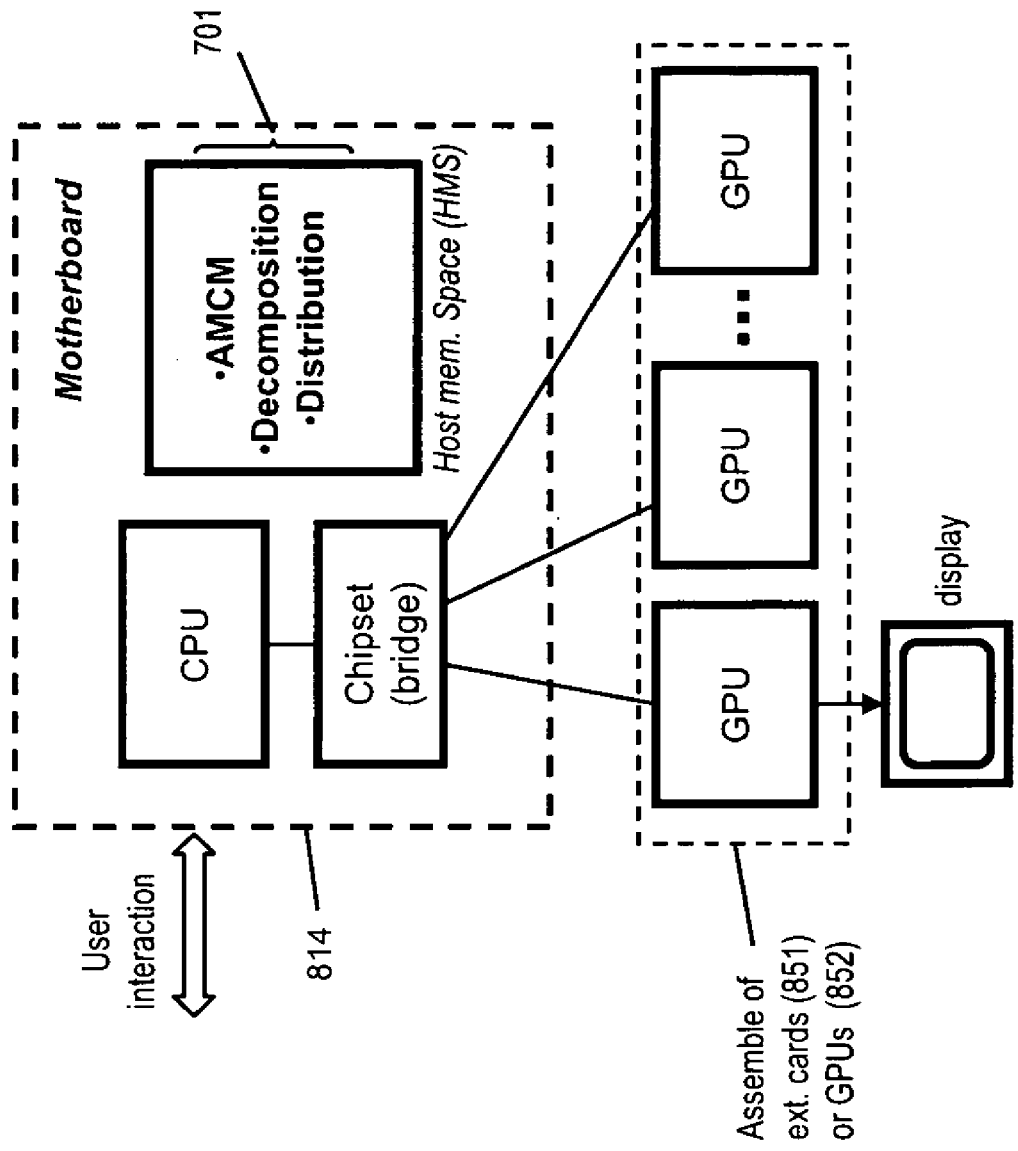
Figure 10A:
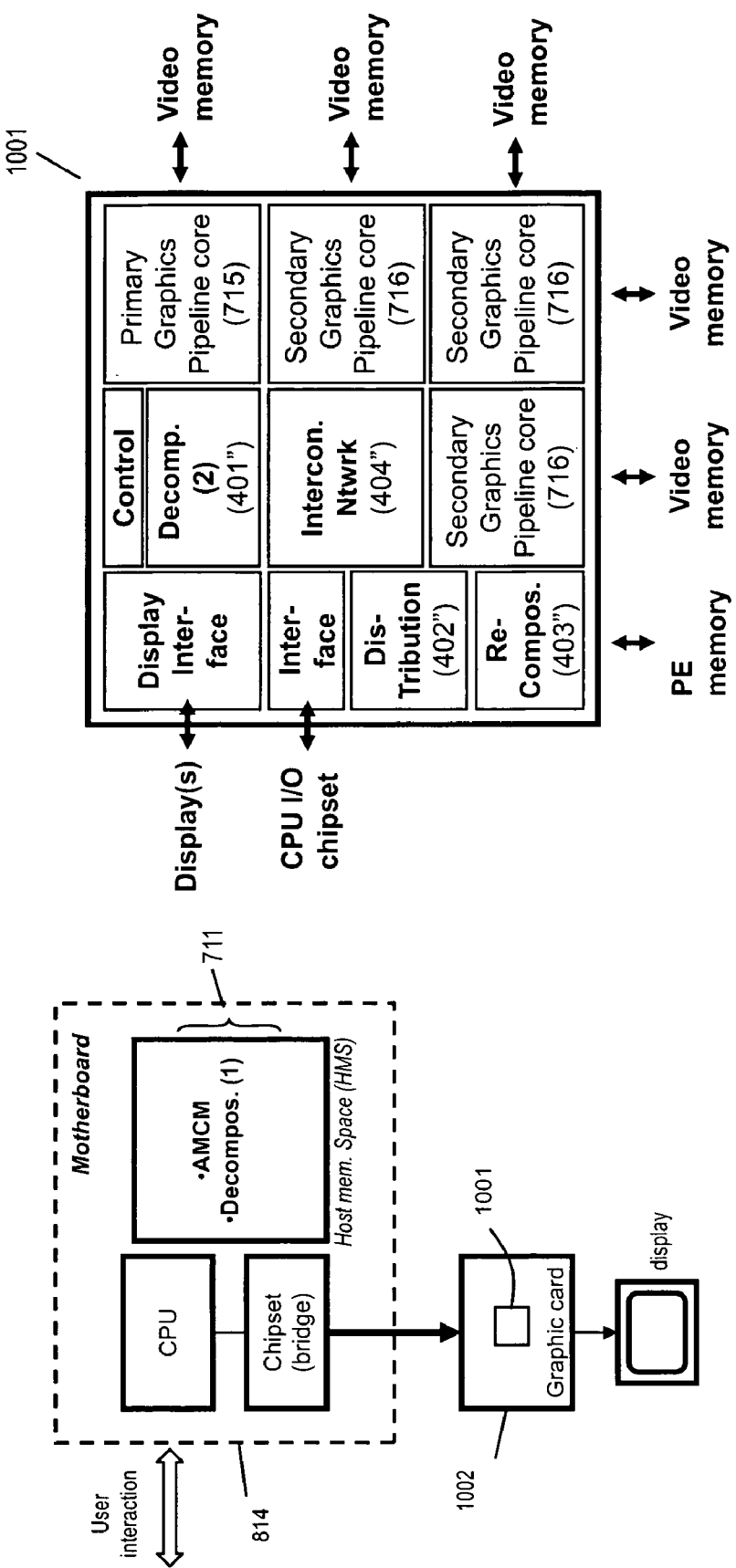
Figure 11A:
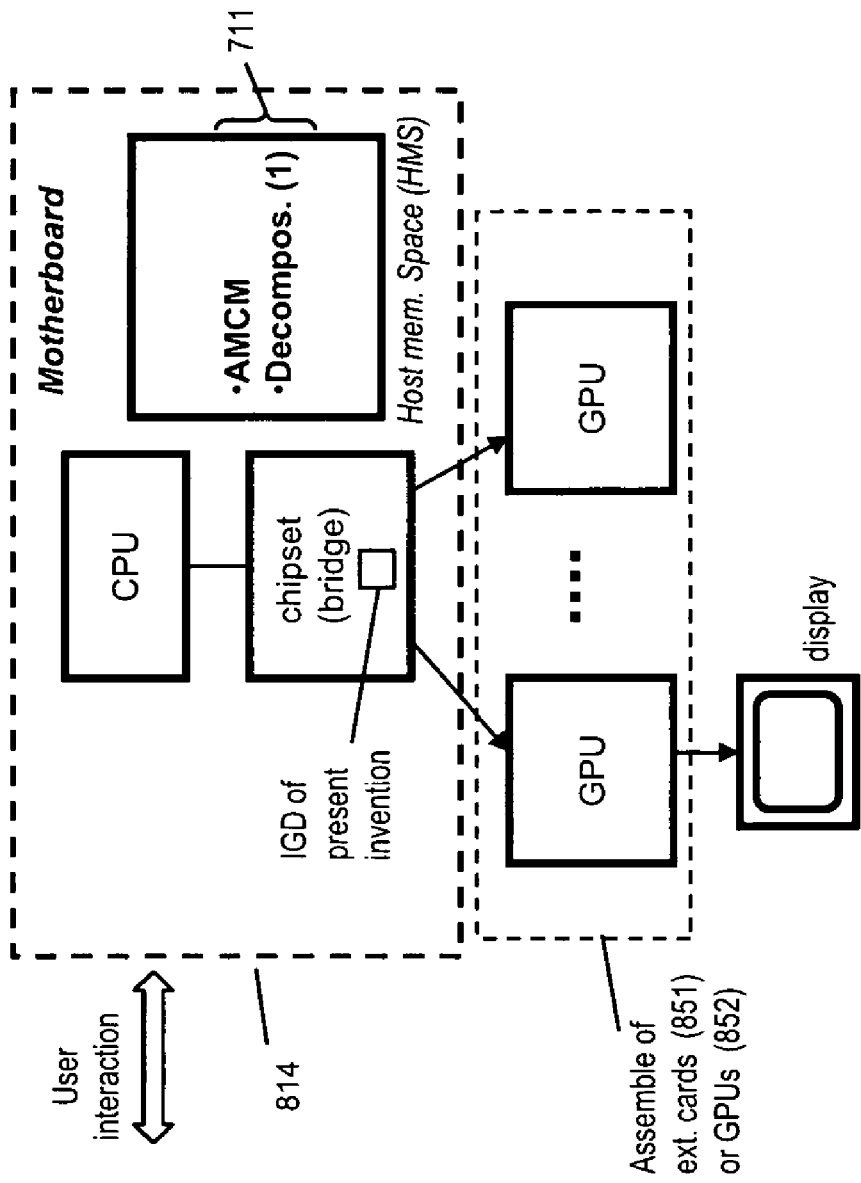
Figure 11B:
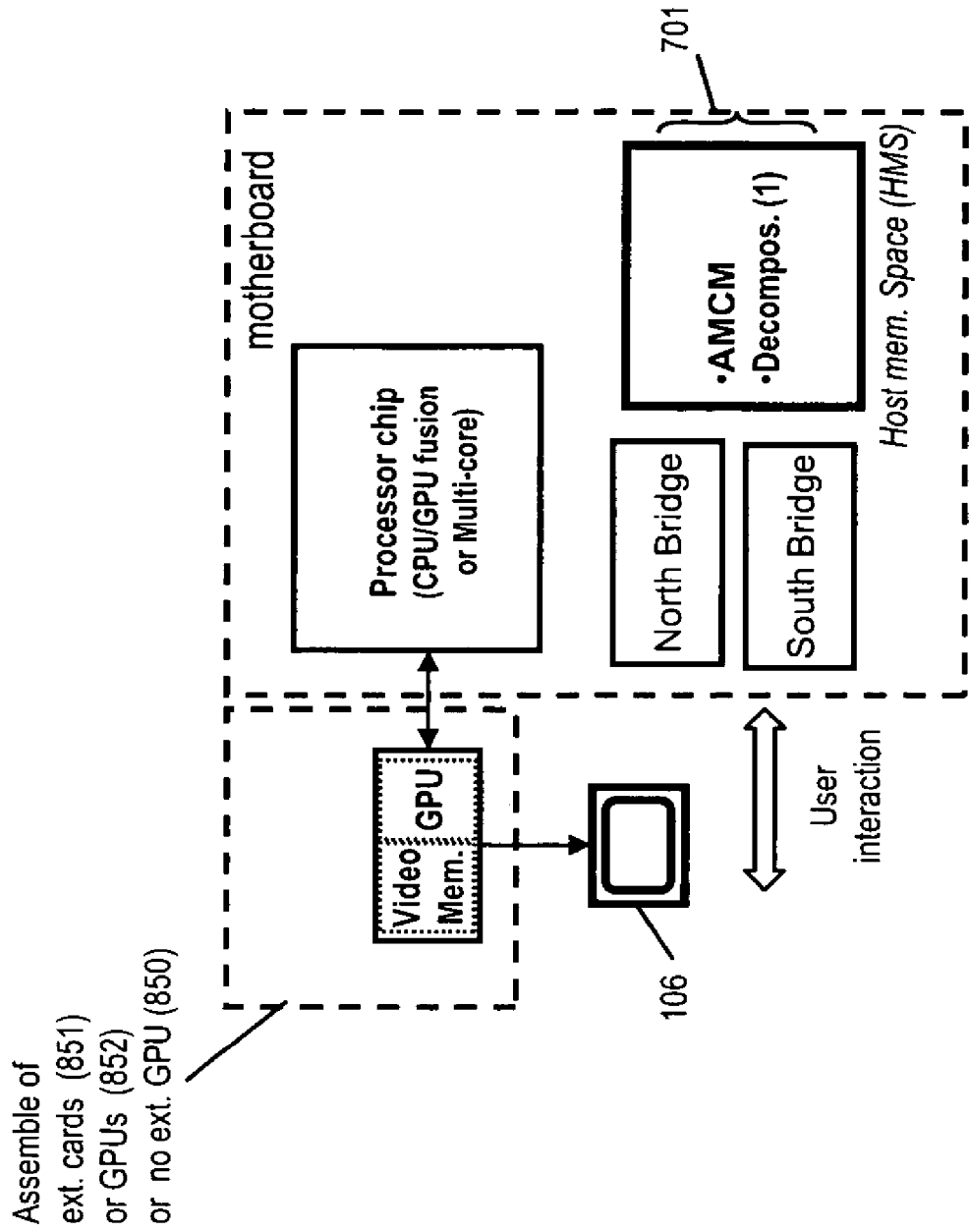

FIG. 3C1 is a schematic representation of the GPU and Video Memory structure employed in conventional multi-GPU PC-based computing systems, and illustrating the various kinds of bottlenecks (e.g. geometry limited, pixel limited, data transfer limited, and memory limited) that occur in such systems;

FIG. 3C2 is a table summarizing the kinds of bottleneck problems which conventional parallelization modes are currently capable of mitigating along the multi-GPU pipelines of conventional PC-based computing systems;

FIG. 4A is a schematic representation of a generalized embodiment of the multi-mode parallel 3D graphics rendering system (MMPGRS) of the present invention shown comprising (i) an automatic mode control module or mechanism (AMCM) 400 for supporting automatic mode control using diverse types of 3D scene profiling techniques and/or system-user interaction detection techniques, (ii) a multi-mode parallel graphics rendering subsystem 41 for supporting at least three primary parallelization stages of decomposition, distribution and recomposition implemented using the Decomposition Module 401, the Distribution Module 402 and the Recomposition Module 403, respectively, and (ii) a plurality of either GPU and/or CPU based "graphics processing pipelines (GPPLs)" 410', wherein each parallelization stage performed by its corresponding Module is configured (i.e. set up) into a "sub-state" by set of parameters, and wherein the "graphics rendering parallelism state" for the overall multi-mode parallel graphics system is established or otherwise determined by the combination of sub-states of these component stages;

FIG. 4B1 is a schematic representation of the subcomponents of a first illustrative embodiment of a GPU-based graphics processing pipeline (GPPL) that can be employed in the MMPGRS of the present invention depicted in FIG. 4A, shown comprising (i) a video memory structure supporting a frame buffer (FB) including stencil, depth and color buffers, and (ii) a graphics processing unit (GPU) supporting (1) a geometry subsystem having an input assembler and a vertex shader, (2) a set up engine, and (3) a pixel subsystem including a pixel shader receiving pixel data from the frame buffer and a raster operators operating on pixel data in the frame buffers;

FIG. 4B2 is a schematic representation of the subcomponents of a second illustrative embodiment of a GPU-based graphics processing pipeline (GPPL) that can be employed in the MMPGRS of the present invention depicted in FIG. 4A, shown comprising (i) a video memory structure supporting a frame buffer (FB) including stencil, depth and color buffers, and (ii) a graphics processing unit (GPU) supporting (1) a geometry subsystem having an input assembler, a vertex shader and a geometry shader, (2) a rasterizer, and (3) a pixel subsystem including a pixel shader receiving pixel data from the frame buffer and a raster operators operating on pixel data in the frame buffers;

FIG. 4B3 is a schematic representation of the subcomponents of a illustrative embodiment of a CPU-based graphics processing pipeline that can be employed in the MMPGRS of the present invention depicted in FIG. 4A, shown comprising (i) a video memory structure supporting a frame buffer including stencil, depth and color buffers, and (ii) a graphics processing pipeline realized by one cell of a multi-core CPU chip, consisting of 16 in-order SIMD processors, and further including a GPU-specific extension, namely, a texture sampler that loads texture maps from memory, filters them for level-of-detail, and feeds to pixel processing portion of the pipeline;

FIG. 4C is a schematic representation for the Mode Definition Table which shows the four combinations of sub-modes (i.e. sub-states) A:B:C for realizing the three (3) Parallel Modes of the MMPGRS of the present invention (i.e. Object Division Mode, Image Division Mode and Time/Alternative Division Mode), and the one (1) Single GPU (i.e. Non-Parallel Functioning) Mode of the system;

FIG. 4D is a schematic representation illustrating the various Performance and Interactive Device Data Inputs supplied to the Application Profiling and Analysis Module (within the Automatic Mode Control Module (AMCM)) employed in the MMPGRS of present invention shown in FIG. 4A, as well as the Tasks carried out by the Application Profiling and Analysis Module;

FIG. 5A is a schematic representation of the User Interaction Detection (UID) Subsystem employed within the Application Profiling and Analysis Module of the Automatic Mode Control Module (AMCM) in the MMPGRS of the present invention, wherein the UID Subsystem is shown comprising a Detection and Counting Module arranged in combination with a UID Transition Decision Module;

FIG. 5B is a flow chart representation of the state transition process between Object-Division/Image-Division Modes and the Time Division Mode initiated by the UID subsystem employed in the MMPGRS of the present invention;

FIG. 5C1 is a schematic representation of the process carried out by the Profiling and Control Cycle in the Automatic Mode Control Module (AMCM) in the MMPGRS of present invention, while the UID Subsystem is disabled;

FIG. 5C2 is a schematic representation of the process carried out by the Profiling and Control Cycle in the Automatic Mode Control Module in the MMPGRS of present invention, while the UID Subsystem is enabled;

FIG. 5C3 is a schematic representation of the process carried out by the Periodical Trial & Error Based Control Cycle in the Automatic Mode Control Module employed in the MMPGRS of present invention, shown in FIG. 4A;

FIG. 5C4 is a schematic representation of the process carried out by the Event Driven Trial & Error Control Cycle in the Automatic Mode Control Module employed in the MMPGRS of present invention, shown in FIG. 4A;

FIG. 6A is a State Transition Diagram for the MMPGRS of present invention, illustrating that a parallel state is characterized by A, B, C sub-state parameters, that the non-parallel state (single GPPL) is an exceptional state, reachable from any state by a graphics application or AMCM requirement, and that all state transitions in the system are controlled by Automatic Mode Control Module (AMCM), wherein in those cases of known and previously analyzed graphics applications, the AMCM, when triggered by events (e.g. drop in frames per second FPS rate), automatically consults the Application/Scene Profile Database during the course of the Application, or otherwise, makes decisions which are supported by continuous profiling and analysis of listed parameters, and/or trial and error event driven or periodical cycles;

FIG. 6B is a schematic representation of the MMPGRS of the present invention supporting multiple graphic processing pipelines (GPPLs), with dynamic application profiling and parallelism mode control, in accordance with the principles of the present invention;

FIG. 6C1 is a flow chart illustrating the processing of a sequence of pipelined image frames during the Image Division Mode of parallel graphics rendering supported on the MMPGRS of the present invention depicted in FIGS. 4A through 6A;

FIG. 6C2 is a flow, chart illustrating the processing of a sequence of pipelined image frames during the Time Division Mode of parallel graphics rendering supported on the MMPGRS of the present invention depicted in FIGS. 4A through 6A;

FIG. 6C3 is a flow chart illustrating the processing of a single image frame during the Object Division mode of parallel graphics rendering supported on the MMPGRS of the present invention depicted in FIGS. 4A through 6A;

FIG. 7A1-1 is a schematic representation of various possible graphics architectural spaces within which the components of the MMPGRS of the present invention can be embodied in any given application, namely: Host Memory Space (HMS), Processor/CPU Die Space, Bridge Circuit (IGD) Space, Graphics Hub Space, and External GPU Space;

FIG. 7A1-2 sets forth a table listing diverse classes of system architectures in which the MMPGRS can be embodied, expressed in terms of the different kinds of architectural spaces, identified in FIG. 7A1-1, in which the primary MMPGRS components (i.e. AMCM, Decomposition Submodule 1, Decomposition Module 2, Distribution Module, Multiple GPUs and Recomposition Module) can be embodied in each such class of MMPGRS Architecture, namely— Host Memory Space HMS (software), HMS+IGD, HMS+ Fusion, HMS+Multicore, HMS+GPU-Recomposition, HUB; HUB+GPU-Recomposition, Chipset; CPU/GPU Fusion, Multicore CPU, and Game Console;

FIG. 7A2 is a schematic representation of a first illustrative embodiment of the MMPGRS of the present invention, following the HMS Class of MMPGRS Architecture described in FIG. 7A1-2, and showing (i) that the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host Memory Space (HMS) while multiple GPUs are supported on a pair of external graphic cards 204, 205 connected to a North memory bridge chip 103 and driven in a parallelized manner under the control of the AMCM, (ii) the Decomposition Module 401 divides (i.e. splits up) the stream of graphic commands and data (GCAD) according to the required parallelization mode, operative at any instant in time, (iii) the Distribution Module 402 uses the North bridge chip to distribute graphic commands and data (GCAD) to the multiple GPUs on board the external graphics cards, (iv) the Recomposition Module 403 uses the North bridge chip to transfer composited pixel data (CPD) between the Recomposition Module (or CPU) and the multiple GPUs during the image recomposition stage, and (v) finally recomposited pixel data sets are displayed as graphical images on one or more display devices connected to the external graphics cards via a PCI-express interface (which is connected to the North bridge chip);

FIG. 7A3 is a schematic representation of a second illustrative embodiment of the MMPGRS of the present invention, following the HMS+IGD Class of MMPGRS Architecture described in FIG. 7A1-2, and showing (i) that the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host or CPU Memory Space (HMS) while multiple GPUs are supported in an IGD within the North memory bridge circuit as well as on external graphic cards connected to the North memory bridge chip and driven in a parallelized manner under the control of the AMCM, (ii) the Decomposition Module 401 divides (i.e. splits up) the stream of graphic commands and data (GCAD) according to the required parallelization mode, operative at any instant in time, (iii) the Distribution Module 402 uses the North bridge chip to distribute the graphic commands and data (GCAD) to the multiple GPUs located in the IGD and on the external graphics cards, (iv) the Recomposition Module 403 uses the North bridge chip to transfer composited pixel data (CPD) between the Recomposition Module (or CPU) and the multiple GPUs during the image recomposition stage, and (v) finally recomposited pixel data sets are displayed as graphical images on one or more display devices connected to one of the external graphics cards or the IGD;

FIG. 7A4 is a schematic representation of a third illustrative embodiment of the MMPGRS of the present invention, following the HMS+IGD Class of MMPGRS Architecture described in FIG. 7A1-2, and showing (i) that the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host Memory Space (HMS) while multiple GPUs are supported in an IGD within the South bridge circuit as well as on external graphic cards connected to the South bridge chip, and driven in a parallelized manner under the control of the AMCM, (ii) the Decomposition Module 401 divides (i.e. splits up) the stream of graphic commands and data (GCAD) according to the required parallelization mode, operative at any instant in time, (iii) that the Distribution Module 402 uses the North bridge chip to distribute graphic commands and data (CGAD) to the multiple GPUs located in the IGD and on external graphics cards, (iv) the Recomposition Module 403 uses the South bridge chip to transfer recomposited pixel data between the Recomposition Module (or CPU) and the multiple GPUs during the image recomposition stage, and (v) finally recomposited pixel data sets are displayed as graphical images on one or more display devices connected to one of the external graphics cards or the IGD;

FIG. 7A5 is a schematic representation of a fourth illustrative embodiment of the MMPGRS of the present invention, following the HMS+Fusion Class of MMPGRS Architecture described in FIG. 7A1-2, and showing (i) that the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host Memory Space (HMS) while a single GPU 1242 is supported on a CPU/GPU fusion-architecture processor die (alongside the CPU 1241) and one or more GPUs are supported on an external graphic card connected to the CPU processor die and driven in a parallelized manner under the control of the AMCM, (ii) the Decomposition Module 401 divides (i.e. splits up) the stream of graphic commands and data (GCAD) according to the required parallelization mode, operative at any instant in time, (iii) the Distribution Module 402 uses the memory controller (controlling the HMS) and the interconnect network (e.g. crossbar switch) within the CPU/GPU processor chip to distribute graphic commands and data to the multiple GPUs on the CPU/GPU die chip and on the external graphics cards, (iv) the Recomposition Module 403 uses the memory controller and interconnect (e.g. crossbar switch) within the CPU/GPU processor chip to transfer composited pixel data (CPD) between the Recomposition Module (or CPU) and the multiple GPUs during the image recomposition stage, and (v) finally recomposited pixel data sets are displayed as graphical images on one or more display devices connected to the external graphics card via a PCI-express interface (which is connected to the CPU/GPU fusion-architecture chip);

FIG. 7A6 is a schematic representation of a fifth illustrative embodiment of the MMPGRS of the present invention, following the HMS+Multicore Class of MMPGRS Architecture described in FIG. 7A1-2, and showing (i) that the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host or CPU Memory Space (HMS) while some of the CPU cores on a multi-core CPU chip are used to implement a plurality of multi-core graphics pipelines parallelized under the control of the AMCM, (ii) the Decomposition Module 401 divides (i.e. splits up) the stream of graphic commands and data (GCAD) according to the required parallelization mode, operative at any instant in time, (iii) the Distribution Module 402 uses the North memory bridge and interconnect network within the multi-core CPU chip to distribute graphic commands and data (GCAD) to the multi-core graphic pipelines implemented on the multi-core CPU chip, (iv) the Recomposition Module 403 uses the North memory bridge and interconnect network within the multi-core CPU chip to transfer composited pixel data (CPD) between the Recomposition Module (or CPU) and the multi-core graphics pipelines during the image recomposition stage, and (v) finally recomposited pixel data sets are displayed as graphical images on one or more display devices connected to the North bridge chip via a display interface;

FIG. 7A7 is a schematic representation of a sixth illustrative embodiment of the MMPGRS of the present invention, following the HMS+GPU-Recomposition Class of MMPGRS Architecture described in FIG. 7A1-2, and showing (i) that the Automatic Mode Control Module (AMCM) 400 and the Decomposition, Distribution and Recomposition Modules 401, 402 respectively, of the Multimode Parallel Graphics Rendering Subsystem resides as a software package 701 in the Host or CPU Memory Space (HMS) while multiple GPUs on external GPU cards are used to implement the Recomposition Module, and driven in parallelized manner under the control of the AMCM, (ii) the Decomposition Module 401 divides (i.e. splits up) the stream of graphic commands and data (GCAD) according to the required parallelization mode, operative at any instant in time, (iii) the Distribution Module 402 uses the North or South bridge circuit and interconnect network to distribute graphic commands and data (GCAD) to the external GPUs, (iv) the Recomposition Module uses the North memory bridge and associated system bus (e.g. PCI-express bus) to transfer composited pixel data (CPD) between the GPUs during the image recomposition stage, and (v) finally recomposited pixel data sets (recomposited within the vertex and/or fragment shaders of the primary GPU) are displayed as graphical images on one or more display devices, connected to an external graphics card via a PCI-express interface (which is connected to either the North or South bridge circuits of the host computing system);

FIG. 7A7-1 is a schematic representation of the parallel graphics rendering process supported within the MMPGRS of FIG. 7A7 during its object division mode of parallel operation;

FIG. 7A7-2 is a graphical representation of Shader code (expressed in a graphics programming language, e.g. Cg) that is used within the primary GPPL of the MMPGRS of FIG. 7A7, in order to carry out the pixel recomposition stage of the object division mode/method of the parallel graphics rendering process of the present invention, supported on the dual GPU-based parallel graphics system shown in FIG. 7A7;

FIG. 7A7-3 is a time-line representation of the process of generating a frame of pixels for an image along a specified viewing direction, during a particular parallel rendering cycle in the MMPGRS of FIG. 7A7, wherein the pixel recomposition step of the parallel rendering process is shown reusing GPU-based computational resources during its idle time, without the need for specialized or dedicated compositional apparatus required by prior art parallel graphics systems supporting an object division mode of parallel graphics rendering;

FIG. 7B1 is a schematic representation of a seventh illustrative embodiment of the MMPGRS of the present invention, following the Hub Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized within a single graphics hub device (e.g. chip) that is connected to the North memory bridge of the host computing system via a PCI-express interface and to a cluster of external GPUs 410" via an interconnect, with the GPUs being driven in a parallelized manner under the control of the AMCM, (ii) the Decomposition Submodule No. 1 transfers graphic commands and data (GCAD) to the Decomposition Submodule No. 2 via the North memory bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to the primary GPU on the graphical display card which is connected to the graphics hub chip of the present invention via the interconnect 404";

FIG. 7B2 is a schematic representation of an eighth illustrative embodiment of the MMPGRS of the present invention, following the Hub+GPU-Recomposition Class of MMPGRS Architecture described in FIG. 7A1-2, and showing (i) that the Automatic Mode Control Module (AMCM) 400 and the Decomposition Submodule No. 1 401' reside as a software package in the Host Memory Space (HMS) of the host computing system, while the Decomposition Submodule No. 2 401" and the Distribution Module 402" are realized within a single graphics hub device (e.g. chip) that is connected to the North bridge of the host computing system and a cluster of external GPUs 410", and the Recomposition Module (403" is implemented across two or more GPUs 715, 716 of the system, as taught in FIG. 7A7), and that all of the GPUs are driven in a parallelized manner under the control of the AMCM, (ii) the Decomposition Submodule No. 1 transfers graphic commands and data (GCAD) to the Decomposition Submodule No. 2 via the North bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403" transfers composited pixel data (CPD) between the GPUs during the image recomposition stage, and (vi) finally recomposited pixel data sets (recomposited within the vertex and/or fragment shaders of the primary GPU) are displayed as graphical images on one or more display devices connected to the primary GPU on the graphical display card(s) (which are connected to the graphics hub chip of the present invention);

FIG. 7B3 is a schematic representation of a ninth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the North memory bridge circuit and having a plurality of GPUs being driven in a parallelized manner under the control of the AMCM, (ii) the Decomposition Submodule No. 1 transfers graphic commands and data (GCAD) to the Decomposition Submodule No. 2 via the North bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the internal GPUs via the interconnect network, (v) the Recomposition Module 403" transfers composited pixel data (CPD) between the GPUs during the image recomposition stage, and (vi) finally recomposited pixel data sets are displayed as graphical images on one or more display devices connected to the external graphical display card or the primary GPU in the IGB;

FIG. 7B4 is a schematic representation of a tenth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the South bridge circuit of the host computing system and having a plurality of GPUs driven in a parallelized manner under the control of the AMCM, (ii) the Decomposition Submodule No. 1 transfers graphic commands and data (GCAD) to the Decomposition Submodule No. 2 via the communication interfaces of the North and South bridge circuits, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to the external graphical display card or the primary GPU in the IGB;

FIG. 7B4-1 is a schematic representation of an eleventh illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401" and Distribution Module 402" are realized (as a graphics hub) in an integrated graphics device (IGD) within the South bridge circuit of the host computing system and having a plurality of GPUs driven in a parallelized manner under the control of the AMCM, while the Recomposition Module 403" is implemented across two or more GPUs 715, 716, (ii) the Decomposition Submodule No. 1 transfers graphic commands and data (GCAD) to the Decomposition Submodule No. 2 via the communication interfaces of the North and South bridge circuits, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403", implemented within Primary GPU, transfers composited pixel data (CPD) between the GPUs during the image recomposition stage, and (vi) finally recomposited pixel data sets are displayed as graphical images on one or more display devices connected to the external graphical display card or the primary GPU in the IGB;

FIG. 7B5 is a schematic representation of an twelfth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the North memory bridge of the host computing system and having multiple GPUs being driven with a single GPU on an external graphics card in a parallelized manner under the control of the AMCM, (ii) the Decomposition Submodule No. 1 transfers graphics commands and data (GCAD) to the Decomposition Submodule No. 2 via the North bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to the external graphical display card or the primary GPU in the IGB;

FIG. 7B6 is a schematic representation of a thirteenth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the South bridge circuit of the host computing system and having a single GPU driven with a single GPU on an external graphics card in a parallelized manner under the control of the AMCM, (ii) the Decomposition Submodule No. 1 transfer graphic commands and data (GCAD) to the Decomposition Submodule No. 2 via the North and South bridge circuits, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to the external graphics card or the primary GPU in the IGB;

FIG. 7B6-1 is a schematic representation of a fourteenth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401" and Distribution Module 402" are realized (as a graphics hub) in an integrated graphics device (IGD) within the South bridge circuit of the host computing system and having multiple GPUs driven with a single GPU on an external graphics card in a parallelized manner under the control of the AMCM, while the Recomposition Module 403" is implemented across two or more GPUs 715, 716, (ii) the Decomposition Submodule No. 1 transfer graphic commands and data (GCAD) to the Decomposition Submodule No. 2 via the North and South bridge circuits, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to one of the external graphics card or the primary GPU in the IGB;

FIG. 7B7 is a schematic representation of a fifteenth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the North memory bridge of the host computing system and having a single GPU being driven with one or more GPUs on multiple external graphics cards in a parallelized manner under the control of the AMCM (or alternatively (ii) controlling a single GPU aboard the IGD for driving a display device connected to the IGD via a display interface), (ii) the Decomposition Submodule No. 1 transfers graphic commands and data (GCAD) to the Decomposition Submodule No. 2 via the North bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the internal GPU and external GPUs, (v) the Recomposition Module 403" transfers composited pixel data (CPD) between the GPUs during the image recomposition stage, and (vi) finally recomposited pixel data sets are displayed as graphical images on one or more display devices connected to one of the external graphic cards or the primary GPU in the IGB;

FIG. 7B7-1 is a schematic representation of a sixteenth illustrative embodiment of the MMPGRS of the present invention, following the Chipset Class of MMPGRS Architecture described in FIG. 7A1-2, and showing (i) that the Automatic Mode Control Module (AMCM) 400 and the Decomposition Submodule No. 1 401' reside as a software package in the Host or CPU Memory Space (HMS) while the Decomposition Submodule No. 2 401" and Distribution Module 402" are realized (as a graphics hub) in an integrated graphics device (IGD) realized within the North memory bridge chip of the host computing system, and driving (a) multiple GPUs on multiple external graphics cards in a parallelized manner under the control of the AMCM while the Recomposition Module 403" is implemented across two or more GPUs 715, 716, or alternatively (b) controlling a single GPU aboard the IGD for driving a display device connected to the IGD via a display interface, (ii) the Decomposition Submodule No. 1 transfers graphic commands and data (GCAD) to the Decomposition Submodule No. 2 via the North bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the internal GPU and external GPUs, (v) the Recomposition Module 403" implemented in the primary GPU, transfers composited pixel data (CPD) between the GPUs during the image recomposition stage, and (vi) finally recomposited pixel data sets are displayed as graphical images on one or more display devices connected to one of the external graphic cards or the primary GPU in the IGB;

FIG. 7B8-1 is a schematic representation of a seventeenth illustrative embodiment of the MMPGRS of the present invention, following the CPU/GPU_Fusion Class of MMPGRS Architecture described in FIG. 7A1-2, and showing (i) that the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) on the die of a hybrid CPU/GPU fusion-architecture chip within the host computing system and having a single GPU driven with one or more GPUs on an external graphics card (connected to the CPU/GPU chip) in a parallelized under the control of the AMCM, (ii) the Decomposition Submodule No. 1 transfers graphics commands and data (GCAD) to the Decomposition Submodule No. 2, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the internal GPU and external GPUs, (v) the Recomposition Module 403" transfers composited pixel data (CPD) between the GPUs during the image recomposition stage, and (vi) finally recomposited pixel data sets are displayed as graphical images on one or more display devices 106 connected to the external graphics card connected to the hybrid CPU/GPU chip via a PCI-express interface;

FIG. 7B8-2 is a schematic representation of an eighteenth illustrative embodiment of the MMPGRS of the present invention, following the CPU/GPU Class of MMPGRS Architecture described in FIG. 7A1-2, and showing (i) that the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) on the die of a hybrid CPU/GPU fusion-architecture chip within the host computing system and having multiple GPUs 1242" driven with one or more GPUs on an external graphics card 205 (connected to the CPU/GPU chip) in a parallelized manner under the control of the AMCM, (ii) the Decomposition Submodule No. 1 transfers graphics commands and data (GCAD) to the Decomposition Submodule No. 2, (iii) the Decomposition Submodule No. 2 divides (i.e. splits up) the stream of graphic commands and data (GCAD) according to the required parallelization mode, operative at any instant in time, (iv) the Distribution Module 402" uses the crossbar switch (i.e. interconnect) on the processor die to distribute the graphic commands and data (GCAD) to the internal GPUs and external GPUs, (v) the Recomposition Module 403" transfers composited pixel data (CPD) between the GPUs during the image recomposition stage, and (vi) finally recomposited pixel data sets are displayed as graphical images on one or more display devices 106 connected to the external graphics card connected to the hybrid CPU/GPU chip via a PCI-express interface;

FIG. 7B8-3 is a schematic representation of a nineteenth illustrative embodiment of the MMPGRS of the present invention, following the CPU/GPU Class of MMPGRS Architecture described in FIG. 7A1-2, and showing (i) that the Automatic Mode Control Module (AMCM) 400 and the Decomposition Submodule No. 1 401' reside as a software package in the Host Memory Space (HMS), (ii) the Decomposition Submodule No. 2 401" and Distribution Module 402" are realized (as a graphics hub) in on the die of a hybrid CPU/GPU fusion-architecture chip within the host computing system and having multiple GPUs 1242" driven with one or more GPUs on an external graphics card 205 (connected to the CPU/GPU chip) in a parallelized manner under the control of the AMCM, (iii) the Recomposition Module 403" is implemented across two or more GPUs 715, 716 provided on the CPU/GPU fusion chip die and external graphics cards, (iv) the Decomposition Submodule No. 1 transfers graphics commands and data (GCAD) to the Decomposition Submodule No. 2, (v) the Decomposition Submodule No. 2 divides (i.e. splits up) the stream of graphic commands and data (GCAD) according to the required parallelization mode, operative at any instant in time, (vi) the Distribution Module 402" uses the crossbar switch (i.e. interconnect) on the processor die to distribute the graphic commands and data (GCAD) to the internal GPUs and external GPUs, (vii) the Recomposition Module 403" transfers composited pixel data (CPD) between the GPUs during the image recomposition stage, and (viii) finally recomposited pixel data sets are displayed as graphical images on one or more display devices 106 connected to the external graphics card connected to the hybrid CPU/GPU chip via a PCI-express interface;

FIG. 7B9-1 is a schematic representation of a twentieth illustrative embodiment of the MMPGRS of the present invention, following the Multicore CPU Class of MMPGRS Architecture described in FIG. 7A1-2, and showing (i) that the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) in on the die of a multi-core CPU chip within the host computing system and having multiple CPU cores, some of which implement multiple soft parallel graphics pipelines ("soft GPUs") driven in a parallelized manner under the control of the AMCM, (ii) the Decomposition Submodule No. 1 transfers graphics commands and data (GCAD) to the Decomposition Submodule No. 2 via the North memory bridge circuit and interconnect network within the multi-core CPU chip, (iii) the Decomposition Submodule No. 2 divides (i.e. splits up) the stream of graphic commands and data (GCAD) according to the required parallelization mode, operative at any instant in time, (iv) the Distribution Module 402" uses the crossbar switch (i.e. interconnect) on the processor die to distribute the graphic commands and data (GCAD) to the multiple soft parallel graphics pipelines (implemented by the multiple CPU cores), (v) the Recomposition Module 403" transfers composited pixel data (CPD) between the multiple CPU cores during the image recomposition stage, and (vi) finally recomposited pixel data sets are displayed as graphical images on one or more display devices 106 connected to the North memory bridge chip via a display interface;

FIG. 7B9-2 is a schematic representation of a twenty-first illustrative embodiment of the MMPGRS of the present invention, following the Multicore CPU Class of MMPGRS Architecture described in FIG. 7A1-2, and showing (i) that the Automatic Mode Control Module (AMCM) 400 and the Decomposition Submodule No. 1 401' resides as a software package in the Host Memory Space (HMS) while the Decomposition Submodule No. 2 401", the Distribution Module 402" and the Recomposition Module 403" are realized as a graphics hub chip within a gaming console system interconnecting a multi-core CPU ship and a cluster of GPUs on the game console board, so that the GPUs are driven in a parallelized manner under the control of the AMCM, (ii) the Decomposition Submodule No. 1 transfers graphics commands and data (GCAD) to the Decomposition Submodule No. 2 via the interconnects within the North memory bridge chip and the multi-core CPU chip, (iii) the Decomposition Submodule No. 2 divides (i.e. splits up) the stream of graphic commands and data (GCAD) according to the required parallelization mode, operative at any instant in time, (iv) the Distribution Module 402" uses the interconnect (i.e. crossbar switch) in the multi-core CPU chip to distribute the graphic commands and data (GCAD) to the multiple soft graphics pipelines (e.g. soft GPUs) and the GPUs on the external graphics card 205, and (v) the Recomposition Module 403" transfers composited pixel data (CPD) between the soft graphics pipelines on the multi-core CPU chip and hard GPUs on the external graphics card during the image recomposition stage, and (vi) finally recomposited pixel data sets are displayed as graphical images on one or more display devices 106 connected to the external graphics card which is connected to the multi-core CPU chip via a PCI-express interface;

FIG. 7B10 is a schematic representation of a twenty-second illustrative embodiment of the MMPGRS of the present invention, following the Game Console Class of MMPGRS Architecture described in FIG. 7A1-2, and showing (i) that the Automatic Mode Control Module (AMCM) 400 and the Decomposition Submodule No. 1 401' are realized as a software package 711 within the Host Memory Space (HMS), while the Decomposition Submodule No. 2 401", the Distribution Module 402" and the Recomposition Module 403' are realized as a graphics hub semiconductor chip within the game console system in which multiple GPUs are driven in a parallelized manner under the control of the AMCM, (ii) the Decomposition Submodule No. 1 transfers graphics commands and data (GCAD) to the Decomposition Submodule No. 2, via the memory controller on the multi-core CPU chip and the interconnect in the graphics hub chip of the present invention, (iii) the Decomposition Submodule No. 2 divides (i.e. splits up) the stream of graphic commands and data (GCAD) according to the required parallelization mode, operative at any instant in time, (iv) the Distribution Module 402" distributes the graphic commands and data (GCAD) to the multiple GPUs, (v) the Recomposition Module 403" transfers composited pixel data (CPD) between the multiple GPUs during the image recomposition stage, and (vi) finally recomposited pixel data sets (recomposited within the vertex and/or fragment shaders of the primary GPU) are displayed as graphical images on one or more display devices 106 connected to the primary GPU 715 via a analog display interface;

FIG. 7B11 is a schematic representation of a twenty-third illustrative embodiment of the MMPGRS of the present invention, following the Game Console Class of MMPGRS Architecture described in FIG. 7A1-2, and showing (i) that the Automatic Mode Control Module (AMCM) 400 and the Decomposition Submodule No. 1 401' are realized as a software package 711 within the Host Memory Space (HMS) of the host computing system while the Decomposition Submodule No. 2 401" and Distribution Module 402' are realized as a graphics hub semiconductor chip within the game console system in which multiple GPUs are driven in a parallelized manner under the control of the AMCM, (ii) the Decomposition Submodule No. 1 transfers graphics commands and data (GCAD) to the Decomposition Submodule No. 2, via the memory controller on the multi-core CPU chip and the interconnect in the graphics hub chip of the present invention, (iii) the Decomposition Submodule No. 2 divides (i.e. splits up) the stream of graphic commands and data (GCAD) according to the required parallelization mode, operative at any instant in time, (iv) the Distribution Module 402' distributes the graphic commands and data (GCAD) to the multiple GPUs, (v) the Recomposition Module 403', realized primarily within the substructure of the primary GPU, transfers composited pixel data (CPD) between the multiple GPUs during the image recomposition stage, and (vi) finally recomposited pixel data sets (recomposited within the vertex and/or fragment shaders of the primary GPU) are displayed as graphical images on one or more display devices 106 connected to the primary GPU 715 via an analog display interface or the like;

FIG. 8A is a schematic block representation of an illustrative implementation of the MMPGRS of the present invention following the Hub Class of MMPGRS Architecture described in FIG. 7A1-2, wherein (i) the AMCM and Decomposition No. 1 Module are implemented as a software-package 701 within host memory space (HMS) of the host computing system, (ii) multiple discrete graphic cards are connected to the bridge circuit of the host computing system by way of a hardware-based graphics hub chip of the present invention 404", 402", 403", 404", (iii) hardware-based Distribution and Recomposition Modules 402" and 403" are realized on the hardware-based graphics hub chip of the present invention, and (iv) a graphics display device is connected to the primary GPU;

FIG. 8A1 is a schematic representation of a first illustrative embodiment of the MMPGRS implementation of FIG. 8A, showing a possible packaging of the Hub architecture of the present invention as an assembly comprising a Hub-extender card 811 carrying multiple (e.g. dual) graphics cards 812, 813 supported on a motherboard 814 within the host computing system;

FIG. 8A2 is a schematic representation of a second illustrative embodiment of the MMPGRS implementation of FIG. 8A, showing a possible packaging of the Hub architecture of the present invention as an external box containing a Hub chip of the present invention mounted on a PC board, that is connected to the motherboard of the host computing system via a wire harness or the like, and supporting a plurality of graphics cards 813 that are connected to the Hub chip;

FIG. 8A3 is a schematic representation of a third illustrative embodiment of the MMPGRS implementation of FIG. 8A, showing a possible packaging of the Hub architecture of the present invention realized as a graphics Hub chip of the present invention mounted on the motherboard 814 of the host computing system, which supports multiple graphics cards 813 with multiple GPUs;

FIG. 8B is a schematic block representation of an illustrative implementation of the MMPGRS of the present invention following the Hub+GPU-Recomposition Class of MMPGRS Architecture described in FIG. 7A1-2, wherein (i) the AMCM and Decomposition No. 1 Submodule are implemented as a software-package 701 within host memory space (HMS) of the host computing system, (ii) multiple discrete graphic cards are connected to a bridge chipset on the host computing system by way of a hardware-based graphics hub chip realizing the Decomposition No. 2 Submodule 401" and the Distribution Module 402", (iii) the Recomposition Module 403" is implemented across two or more GPUs 715, 716, and (iv) a graphics display device is connected to the primary GPU;

FIG. 8B1 is a schematic representation of a first illustrative embodiment of the MMPGRS implementation of FIG. 8B, showing a possible packaging of the Hub+GPU Recomposition architecture of the present invention as an assembly comprising a graphic hub-extender card 811 carrying multiple (e.g. dual) graphics cards 812, 813 supported on a motherboard 814 within the host computing system;

FIG. 8B2 is a schematic representation of a second illustrative embodiment of the MMPGRS implementation of FIG. 8B, showing a possible packaging of the Hub architecture of the present invention as an external box containing a Hub chip of the present invention mounted on a PC board, that is connected to the motherboard of the host computing system via a wire harness or the like, and supporting a plurality of graphics cards 813 that are connected to the graphics hub chip;

FIG. 8B3 is a schematic representation of a third illustrative embodiment of the MMPGRS implementation of FIG. 8B, showing a possible packaging of the Hub architecture of the present invention realized as a graphics hub chip of the present invention mounted on the motherboard 814 of the host computing system, which supports multiple graphics cards 813 with multiple GPUs;

FIG. 8C is a schematic block representation of an illustrative embodiment of the MMPGRS of the present invention following the HM Class of MMPGRS Architecture described in FIG. 7A1-2, wherein (i) the AMCM, Decomposition, Distribution and Recomposition Modules are implemented as a software-package 701 within host memory space (HMS) of the host computing system, (ii) multiple discrete GPUs on one or more graphics cards, are connected to the bridge circuit on the host computing system, and (iii) a graphics display device is connected to the primary GPU;

FIG. 8C1 is a schematic representation of a first illustrative embodiment of the MMPGRS implementation of FIG. 8C, wherein discrete multiple graphics cards 851, each supporting at least a single GPU, are interfaced with the bridge circuit chipset of the CPU motherboard by way of a PCI-express or like interface;

FIG. 8C2 is a schematic representation of a second illustrative embodiment of the MMPGRS implementation of FIG. 8C, wherein multiple GPUs are realized on a single graphics card 852 which is interfaced to bridge circuit on the CPU motherboard by way of a PCI-express or like interface;

FIG. 8C3 is a schematic representation of a third illustrative embodiment of the MMPGRS implementation of FIG. 8C, wherein multiple discrete graphics cards 851, each supporting at least a single GPU, are interfaced with the bridge circuit on a board within an external box 821 that is interfaced to the motherboard within the host computing system;

FIG. 8D is a schematic block representation of an illustrative embodiment of the MMPGRS of the present invention following the Hub+GPU-Recomposition Class of MMPGRS Architecture described in FIG. 7A1-2, wherein (i) the AMCM, Decomposition Submodule No. 1 and a Distribution Module are implemented as a software-package 701 within host memory space (HMS) of the host computing system, (ii) multiple discrete GPUs on one or more external graphics cards are connected to the bridge circuit of the host computing system, (iii) a Recomposition Module 403" is implemented across two or more GPUs 715, 716, and (iv) a graphics display device is connected to the primary GPU;

FIG. 8D1 is a schematic representation of a first illustrative embodiment of the MMPGRS implementation of FIG. 8D, wherein discrete multiple graphics cards 851, each supporting at least a single GPU, are interfaced with the bridge circuit chipset of the CPU motherboard by way of a PCI-express or like interface;

FIG. 8D2 is a schematic representation of a second illustrative embodiment of the MMPGRS implementation of FIG. 8D, wherein multiple GPUs are realized on a single graphics card 852 which is interfaced to bridge circuit on the CPU motherboard by way of a PCI-express or like interface;

FIG. 8D3 is a schematic representation of a third illustrative embodiment of the MMPGRS implementation of FIG. 8D, wherein multiple discrete graphics cards 851, each supporting at least a single GPU, are interfaced with the bridge circuit on a board within an external box 821 that is interfaced to the motherboard within the host computing system;

FIG. 9A is a schematic block representation of an illustrative implementation of the MMPGRS of the present invention following the Hub Class of MMPGRS Architecture described in FIG. 7A1-2, wherein (i) the AMCM and Decomposition Submodule No. 1 are realized as a software package 711 on the host memory space (HMS), (ii) multiple GPUs (i.e. Primary GPU 715 and Secondary GPUs 716) are assembled on a external graphics card 902 which connects the GPUs to the bridge circuit on the host computing system by way of a hardware-based graphics hub chip implementing the Decomposition Submodule No. 2 401", the Distribution Module 402" and the Recomposition Module 403", and (iii) a graphics display device is connected to the primary GPU;

FIG. 9A1 is a schematic representation of an illustrative embodiment of the MMPGRS of FIG. 9A, wherein multiple GPUs 715, 716 and hardware-based Decomposition Submodule No. 2 401", Distribution Module 402" and the Recomposition Modules 403" are implemented as a graphics hub chip or chipset 401", 402', 403," and 404" on a single graphics display card 902, which is interfaced to the bridge circuit on the motherboard 814 within the host computing system;

FIG. 10A is a schematic block representation of an illustrative implementation of the MMPGRS of the present invention following the Hub Class of MMPGRS Architecture described in FIG. 7A1-2, wherein (i) the AMCM and Decomposition Submodule No. 1 are realized as a software package 711 on the host memory space (HMS), (ii) a single SOC-based graphics chip 1001 mounted on a single graphics card 1002 is interfaced with a bridge circuit on the motherboard 1002, and supporting multiple GPUs (i.e. the primary GPU and secondary GPUs), (iii) hardware-based Decomposition Submodule No. 2, the Distribution Module and the Recomposition Module are implemented on the SOC-based graphics chip 1001, and (iv) a graphics display device is connected to the primary GPU;

FIG. 10A1 is a schematic representation of possible packaging of the SOC-based graphics hub chip 101 depicted in FIG. 10A, wherein multiple GPUs 715, 716 and hardware-based Decomposition Submodule 401", Distribution Module 402", and Recomposition Module 4-3" are realized on a single SOC implementation 1001 mounted on a single graphics card 1002;

FIG. 10B is a schematic block representation of an illustrative implementation of the MMPGRS of the present invention following the Hub+GPU-Recomposition Class of MMPGRS Architecture described in FIG. 7A1-2, wherein (i) the AMCM and Decomposition Submodule No. 1 are realized as a software package 711 on the host memory space (HMS), (ii) a single SOC-based graphics chip 1003 mounted on a single graphics card 1002 is interfaced with a bridge circuit on the motherboard 1002, and supporting multiple GPUs (i.e. the primary GPU and secondary GPUs), (iii) hardware-based Decomposition Submodule No. 2 and the Distribution Module are implemented on the SOC-based graphics hub chip 1001, (iv) the Recomposition Module is implemented across two or more GPUs 715, 716, and (v) a graphics display device is connected to the primary GPU by way of a display interface implemented on the SOC-based graphics hub chip;

FIG. 10B1 is a schematic representation of possible packaging of the SOC-based graphics hub chip 101 depicted in FIG. 10B, wherein multiple GPUs 715, 716 and hardware-based Decomposition Submodule 401", Distribution Module 402", and Recomposition Module 4-3" are realized in the primary GPU of a single SOC implementation 1003 mounted on a single graphics card 1002;

FIG. 10C is a schematic block representation of an illustrative implementation of the MMPGRS of the present invention following the HMS+GPU-Recomposition Class of MMPGRS Architecture described in FIG. 7A1-2, wherein (i) the AMCM, Decomposition Module and Distribution Module are realized as a software package 701 on the host memory space (HMS), (ii) a single multi-GPU chip 1031 mounted on a single graphics card 1002 is interfaced with a bridge circuit on the motherboard, and supporting multiple GPUs (i.e. the primary GPU and secondary GPUs), (iii) the Recomposition Module is implemented across two or more GPUs 715, 716, and (iv) a graphics display device is connected to the primary GPU by way of a display interface implemented on the multi-GPU chip;

FIG. 10C1 is a schematic representation of possible packaging of the multi-GPU chip 1031 depicted in FIG. 10C, wherein multiple GPUs 715, 716 and Recomposition Module/Process 403" are implemented in the primary GPU 715 of a multi-GPU chip 1031;

FIG. 11A is a schematic block representation of an illustrative implementation of the MMPGRS following the Chipset Class of MMPGRS Architecture described in FIG. 7A1-2, wherein (i) the AMCM and Decomposition Submodule No. 1 are realized as a software package 711 within the host memory space (HMS) of the host computing system, (ii) plurality of GPUs 852 on one or more external graphics cards 851 is connected to the bridge circuit on the host computing platform, (iii) an integrated graphics device (IGD) 1101, supporting hardware-based Decomposition Submodule No. 2, the Distribution Module 402" and Recomposition Module 403", are implemented within the bridge circuit 1101 on the motherboard 814 of the host computing system, and (iv) a display device is interfaced to the primary GPU by way of a PCI-express interface or the like;

FIG. 11A1 is a schematic representation of a first illustrative embodiment of the Chipset MMPGRS implementation of FIG. 11A, wherein multiple discrete graphics cards 851, each supporting at least a single GPU, are interfaced with the bridge circuit on a board within an external box 821 that is interfaced to the motherboard within the host computing system;

FIG. 11A2 is a schematic representation of a second illustrative embodiment of the Chipset MMPGRS implementation of FIG. 11A, wherein discrete multiple graphics cards 851, each supporting at least a single GPU, are interfaced with the bridge circuit chipset of the CPU motherboard by way of a PCI-express or like interface;

FIG. 11A3 is a schematic representation of a third illustrative embodiment of the Chipset MMPGRS implementation of FIG. 11A, wherein multiple GPUs are realized on a single graphics card 852 which is interfaced to bridge circuit on the CPU motherboard by way of a PCI-express or like interface;

FIG. 11B is schematic representation of an illustrative implementation of the MMPGRS following the CPU/GPU Fusion Class of MMPGRS Architecture or Multi-Core Class MMPGRS Architecture described in FIG. 7A1-2, wherein (i) a CPU/GPU fusion-architecture chip or a multi-core CPU chip is mounted on the motherboard of a host computing system having memory and North and South bridge circuits, (ii) the software-based AMCM and Decomposition Submodule No. 1 are realized as a software package 701 within the host memory space (HMS) of the host computing system while Decomposition Submodule No. 2, the Distribution Module and the Recomposition Module are realized on the die of the CPU/GPU fusion-architecture chip or the multi-core CPU chip, and (iii) multiple GPUs on external graphic cards or elsewhere, are interfaced to the CPU/GPU fusion-architecture chip or the multi-core CPU chip, by way of a PCI-express or like interface, and (iv) a display device is interfaced to the primary GPU by way of a PCI-express interface or the like.

Figure 12A:
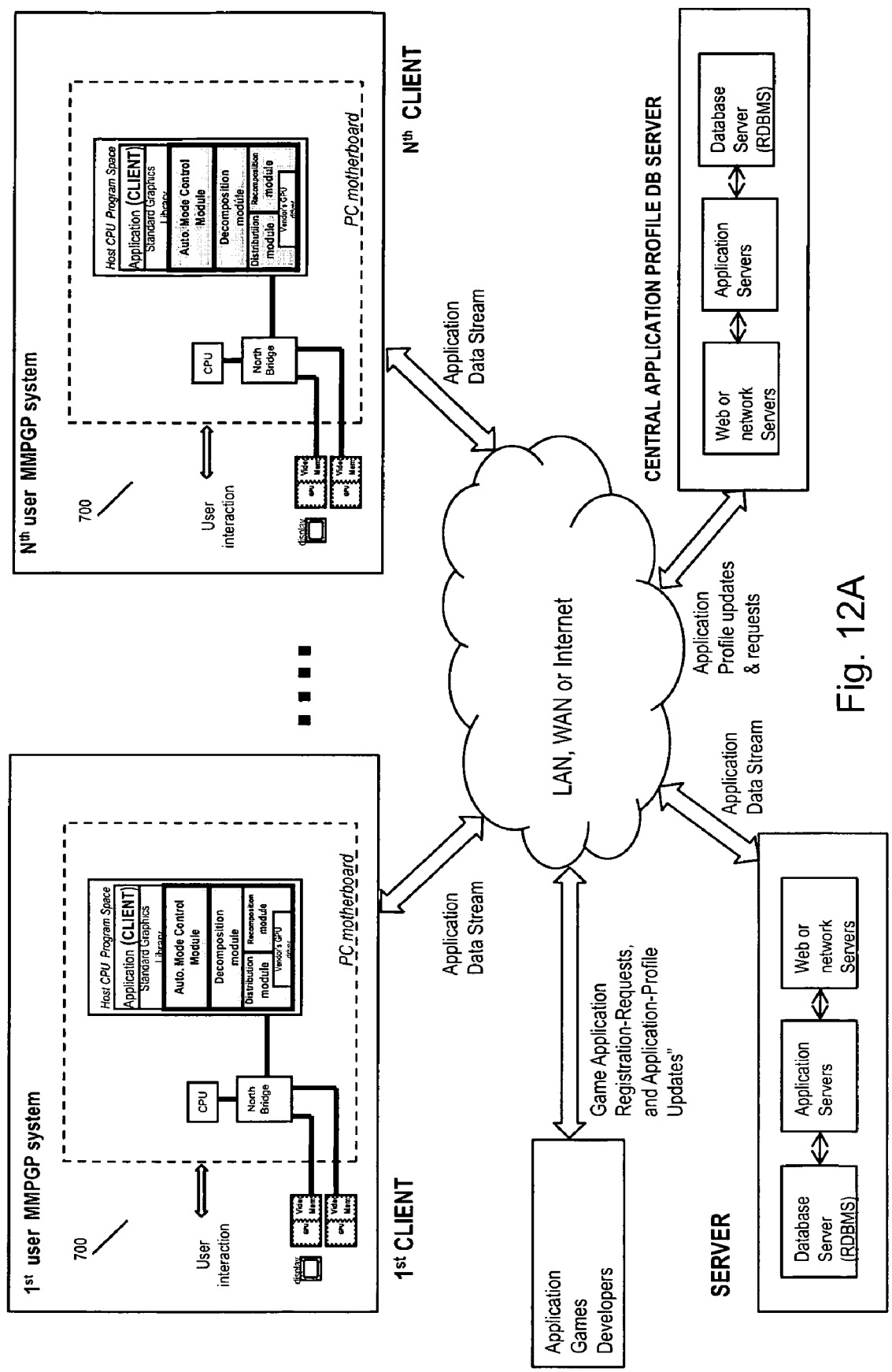
Figure 12B:
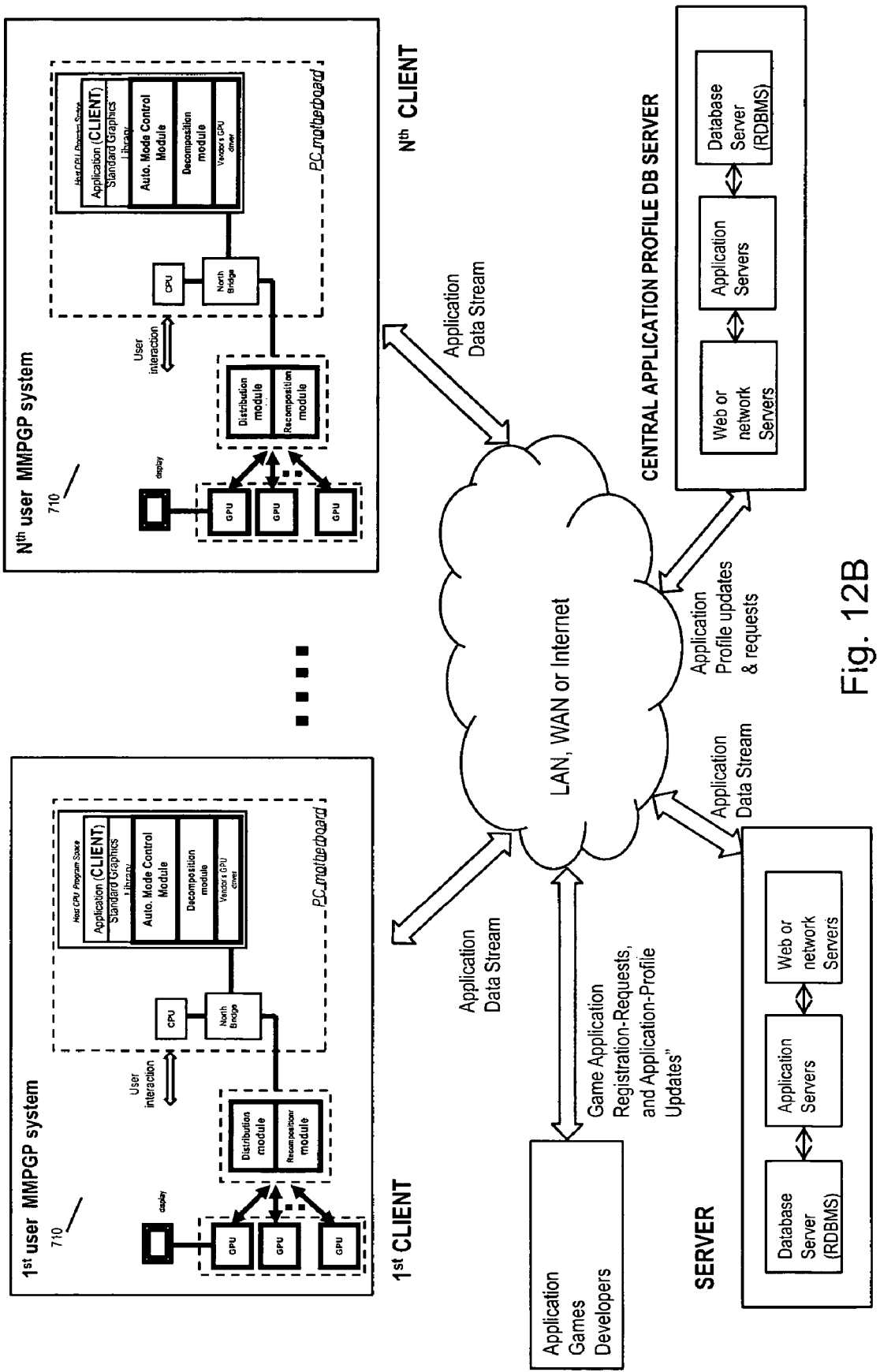

FIG. 11B1 is a schematic representation of a first illustrative embodiment of the CPU/GPU Fusion or Multi-Core MMPGRS implementation of FIG. 11B, wherein a CPU/GPU Fusion or Multi-Core chip is used to drive an assemble of graphic cards or GPUs on one or more external graphics cards 851;

FIG. 11B2 is a schematic representation of a second illustrative embodiment of the Chipset MMPGRS implementation of FIG. 11B, wherein a CPU/GPU Fusion or Multi-Core chip is used to drive an assemble of GPUs on a single external graphics card 852;

FIG. 11B3 is a schematic representation of a third illustrative embodiment of the Chipset MMPGRS implementation of FIG. 11B, wherein a CPU/GPU Fusion or Multi-Core chip is used to drive only an assemble of internal GPUs on the CPU/GPU Fusion or Multi-Core chip;

FIG. 11C is schematic representation of an illustrative implementation of the MMPGRS following the Game Console Class of MMPGRS Architecture described in FIG. 7A1-2, wherein (i) the AMCM 400 and Decomposition Submodule No. 1 401' are realized as a software package within the host memory space (HMS) of the game console system, (ii) a graphics hub chip 401", 402", 403", 404" mounted on the PC board of the game console system implements the Decomposition Submodule No. 2 401", the Distribution Module 402', the Recomposition Module 403' as well as an interconnect network (e.g. crossbar switch) 404", (iii) multiple GPUs on the PC board of the game console system are interfaced to Distribution and Recomposition Modules by way of the interconnect 404" within the graphics hub chip, and optionally, the Recomposition Module can be implemented within two or more GPUs 715, 716, and (iv) a display device 106 is interfaced to the primary GPU by way of an analog display interface or the like;

FIG. 11C1 is a schematic representation of an illustrative embodiment of the Game Console MMPGS implementation of FIG. 11D, showing its controller in combination with its game console unit;

FIG. 12A is a schematic representation of a multi-user computer network supporting a plurality of client machines, wherein one or more client machines (i) employ the MMPGRS of the present invention following any MMPGRS Architecture described in FIG. 7A1-2, and (ii) respond to user-system interaction input data streams from one or more network users who might be local to each other as over a LAN, or be remote to each other, as when operating over a WAN or the Internet infrastructure; and FIG. 12B is a schematic representation of a multi-user computer network supporting a plurality of client machines, wherein one or more client machines (i) employ the MMPGRS of the present invention following any MMPGRS Architecture described in FIG. 7A1-2, and (ii) respond to user-system interaction input data streams from one or more network users who might be local to each other as over a LAN, or be remote to each other, as when operating over a WAN or the Internet infrastructure.

DETAILED DESCRIPTION OF THE ILLUSTRATIVE EMBODIMENTS OF THE PRESENT INVENTION

Referring now to FIGS. 4A through 12B in the accompanying Drawings, the various illustrative embodiments of the Multi-Mode Parallel Graphics Rendering System (MMPGRS) and Multi-Mode Parallel Graphics Rendering Process (MMPGRP) of the present invention will now be described in great technical detail, wherein like elements will be indicated using like reference numerals.

In general, one aspect of the present invention teaches how to dynamically retain high and steady performance of a three-dimensional (3D) graphics system on conventional platforms (e.g. PCs, laptops, servers, etc.), as well as on silicon level graphics systems (e.g. graphics system on chip (SOC) implementations, integrated graphics device IGD implementations, and hybrid CPU/GPU die implementations). This aspect of the present invention is accomplished by means of a novel architecture supporting adaptive graphics parallelism having both software, hardware and hybrid embodiments.

The MMPGRS and MMPGRP of the present invention fulfills a great need in the marketplace by providing a highly-suited parallelism scheme, By virtue of the present invention, different GPPL-based parallel rendering schemes, supported on the MMPGRS, dynamically alternate throughout the course of any particular graphics application running on the host system in which the MMPGRS is embodied, and adapting the optimal parallel rendering method (e.g. Image/Frame, Time or Object Division) in real-time to meet the changing needs of the graphics application(s).

The MMPGRS of the Present Invention Employs Automatic Mode and Control Module (AMCM)

FIG. 4A shows the MMPGRS of the present invention employing automatic 3D scene profiling and multiple GPPL control, and supporting at least three different parallelization modes (e.g. Image/Frame, Time and Object Division). As shown, the MMPGRS comprises two primary subcomponents, namely:

(1) Multi-Mode Parallel Graphics Rendering Subsystem 420 including (i) a Decomposition Module 401, Distribution Module 402 and Recomposition Module 403 for supporting three stages of parallelization namely decomposition, distribution, and recomposition, and (ii) an Array or Cluster of Graphic Processing Pipelines (GPPLs) for supporting and driving Graphics Rendering and Image Display Processes; and (2) a Automatic Mode Control Module (AMCM) 400, described in FIGS. 4C through 5C4 and 6A, for dynamically profiling Graphics-based Applications running on the host computing system, and controlling the various modes of parallelism supported by the MMPGRS of the present invention.

In general, the GPPLs can be realized in various ways, including (i) Graphic Processing Units (GPUs) 407 as shown in FIGS. 4B1 and 4B2, and/or (ii) Computational Processing Units (CPUs), or CPU-cores, as shown in FIGS. 4B3 and 4B4.

As shown in FIGS. 4A and 4D, the Graphics Commands and Data (CGAD) to the MMPGRS will typically be produced and provided from the Graphics-based Application being executed by one or more CPUs and associated memory on the host computing system. In contrast, the Interaction Data will be supplied from the user or users interaction with the host computing system.

In general, the host computing system may be a PC-level computer, application server, laptop, game console system, portable computing system, or the like supporting the real-time generation and display of 3D graphics), and that the MMPGRS may be embodied within any such system in accordance with the principles of the present invention.

The Graphics Processing Pipelines (GPPLs) Employed within the MMPGRS of the Present Invention In general, each GPPL employed within the MMPGRS of the present invention can be realized in a variety of different ways. However, in general, each graphics processing pipeline (GPPL) will typically include some basic structures including for example, video memory and a computational unit such as a GPU, or CPU having multi-cores typically implementing SIMD elements. When using GPUs, the graphic processing pipelines (GPPLs) are often considered "hard" graphical processing pipelines. When using CPUs, the graphic processing pipelines are often considered "soft" graphical processing pipelines. In either case, each graphic processing pipeline (GPPL) provides sufficient computational and memory/buffering resources to carry out the execution of graphics commands and the processing of graphics data, as specified by the graphical rendering processed required by the graphics-based Application running on the host computing system, at any particular instant in time.

In FIGS. 4B1 and 4B2, two illustrative embodiments for the GPU-based graphics processing pipeline approach are shown. In FIG. 4B3, one illustrative embodiment is shown for the CPU-based graphics processing pipeline approach.

As shown in FIG. 4B1, each GPU-based graphics processing pipeline (GPPL) deployed in the MMPGRS of a first illustrative embodiment comprises: (i) video memory (e.g. a stencil memory buffer, a depth memory buffer, and a color memory buffer); and (ii) a classic shader-based GPU which includes: a geometry subsystem; a set up engine; and a pixel subsystem. As shown, the geometry subsystem further comprises a vertex shader which implements a graphics processing function that perform is 3D geometrical transformations and lighting calculations on the objects' vertex data. The Setup engine assembles primitives (lines, points, triangles) from vertices, assigns parameters to primitives, divides the primitives into tiles, and distributes these tiles to the pixel pipelines of the Pixel subsystem. The Pixel subsystem further comprises: a pixel shader for receiving input from the Setup engine and the video memory and performing shading and texturing of pixels; and a plurality of raster operators which receive output from the pixel shader and produce blending, z-buffering and antialiasing of pixels, storing them into Frame Buffer buffer. This graphics pipeline architecture can be found used in conventional graphics devices such as nVidia's GeForce 7700.

As shown in FIG. 4B2, each GPU-based graphics processing pipeline (GPPL) deployed in the MMPGRS of a second illustrative embodiment comprises: (i) video memory (e.g. a stencil memory buffer, a depth memory buffer, and a color memory buffer); and (ii) a shader-based GPU which includes: a geometry subsystem; a rasterizer; and a pixel subsystem. As shown, the geometry subsystem further comprises: an input assembler for gathering vertex data from the CPU and converting its format, and generating various index IDs that are helpful for performing various repeated operations on vertices, primitives, and scene objects; a vertex shader for performing 3D geometrical transformations and lighting calculations on the objects' vertex data; and a geometry shader permitting a range of effects and features, such as process entire primitives as inputs and generate entire primitives as output, rather than processing just one vertex at a time, as with a vertex shader, while reducing dependence on the CPU for geometry processing. The stream output permits data generated from geometry shaders to be forwarded back to the top of the pipeline to be processed again. The rasterizer assembles primitives (lines, points, triangles) from vertices, assigns parameters to primitives, and converts them into pixels for output to the Pixel subsystem. The pixel subsystem further comprises: a pixel shader for receiving input from the Setup engine and the video memory and performing shading and texturing of pixels; and a plurality of raster operators which receive output from the pixel shader and produce blending, z-buffering and anti-aliasing of pixels, storing them out into Frame Buffer (FB). This graphics pipeline architecture can be found used in conventional graphics devices such as nVidia's GeForce 8800 GTX.

As shown in FIG. 4B3, each CPU-based graphics processing pipeline (GPPL) deployed in the MMPGRS of a third illustrative embodiment comprises: (i) a video memory structure supporting a frame buffer (including stencil, depth and color buffers); (ii) a memory controller; (iii) a graphics processing pipeline realized by one cell of a multi-core CPU chip, consisting of 16 in-order SIMD processors; (iv) L2 cache memory; and (v) a GPU-specific extension, namely, a texture sampler, for loading texture maps from memory, filtering them for level-of-detail, and feeding the same to the pixel processing portion of the graphic processing pipeline (GPPL). This graphics pipeline architecture can be found used in such conventional devices as Larrabee multi-core processor by Intel.

Notably, as shown in FIG. 4A, while the array of GPPLs 407 comprises N pairs of GPU or CPU and Video Memory pipelines, only one GPPL in the array, termed "primary GPPL," is responsible for driving the display unit which may be realized as a LCD panel, an LCD or DLP Image/Video "Multi-Media" Projector, or the like. All other GPPLs in the array are deemed "secondary GPPLs."

The Multi-Mode Parallel Graphics Rendering Subsystem

In the Multi-Mode Parallel Graphics Rendering Subsystem 420, each stage (or Module) is induced or set up into a sub-state by a set of parameters managed within the MMPGRS, namely: parameter A for Module 401; parameter B for Module 402; and parameter C for Module 403. The state of parallelism of the overall MMPGRS is established by the combination of sub-state parameters A, B and C, as listed in the Mode/State Definition Table of FIG. 4C, which will be elaborated hereinafter.

The unique flexibility of the Multi-Mode Parallel Graphics Rendering Subsystem 420 stems from its ability to quickly change its sub-states, resulting in transition of the overall graphic system (i.e. MMPGS) to another parallel state of operation, namely: the Object Division State, the Image Division State or the Time Division State, as well as to other potential parallelization schemes that may be developed and readily programmed into the MMPGRS platform of the present invention.

Implementing Parallelization Modes Through a Net Combination of Sub-States (A:B:C) Among the Decomposition, Distribution and Recomposition Modules As indicated in the State Table of FIG. 4C, the net combination of all Sub-States (A:B:C) among the Decomposition Module 401, Distribution Module 402 and Recomposition Module 403, respectively, implements the various parallelization schemes (i.e. parallelization modes) supported on the MMPGRS of the present invention, which will now be described hereinbelow. Thus, the Decomposition Module 401, Distribution Module 402 and Recomposition Module 403 cooperate to carry out all functions required by the different parallelization schemes supported on the MMPGRS platform of the present invention. It is appropriate at this juncture to described how the primary modes of parallelism (i.e. Image, Time and Object Division) are implemented on the MMPGS using combinations of sub-state parameters (A:B:C).

The Image Division State of Parallel Operation:

In the Image Division State of Operation, the Decomposition Module 401 is set to the Image Decomposition Sub-State or Sub-mode (A=2), multiplicating the same command and data stream to all GPUs, and defining unique screen portion for each one, according to the specific Image Division Mode in use (e.g. split screen, or tiled screen). The Distribution Module is set in Broadcast Sub-mode B=2, to physically broadcast the stream to all GPUs. Finally, the Recomposition Module No. I set to Screen-based Sub-mode C=2, and collects all the partial images into final frame buffer, performing the screen based composition.

The Time Division State of Parallel Operation:

In the Time Division State of Operation, each GPU renders the next successive frame. The Decomposition Module is set to the Alternate Sub-mode, A=3, alternating the command and data stream among GPUs on frame basis. The Distribution Module is set to the Single Sub-mode, B=3, physically moving the stream to the designated GPU. Finally, the Recomposition Module is set to None, C=3, as no merge is needed and the frame buffer is just moved from the designated GPU to the screen for display.

The Object Division State of Parallel Operation:

In the Object Division State of operation, the Decomposition Module is set to the Object Decomposition Sub-mode, A=1, decomposing the command and data stream, and targeting partial streams to different GPUs. The Distribution Module is set to the Divide Sub-mode, B=1, physically delivering the partial commands and data to GPUs. Finally the Recomposition Module is set to Test-Based Sub-mode, C=1, compositing the frame buffer color components of GPUs, based on depth and/or stencil tests.

The Single GPPL State of Operation:

While the Single GPPL State of Operation is a non-parallel state of operation, it is allowed and supported in the system of the present invention as this state of operation is beneficial in some exceptional cases. In the Single GPPL State, the Decomposition, Distribution, and Recomposition Modules are set on Single (A=4), Single (B=3) and None (C=3), respectively. Only one GPPL, among all pipelines supported by the MMPGRS, is used in the single GPPL state of operation.

Description of the Decomposition Module of the MMPGRS of the Present Invention

The primary function of the Decomposition Module 401 is to divide (i.e. split up) the stream of graphic commands and data (GCAD) according to the required parallelization mode, operative at any instant in time. In general, the typical graphic processing s pipeline is fed by stream of graphic commands and data from the application and graphics library (OpenGL or Direct 3D). This stream, which is sequential in nature, has to be properly handled and eventually partitioned, according to parallelization mode (i.e. method) used. Under the AMCM 400, the Decomposition Module can be set to different decomposing sub-states (A=1 through A=4), according to FIG. 4C, namely: Object Decomposition Sub-state A=1 during the Object Division State; Image Decomposition Sub-state A=2 during the Image Division State; Alternate Decomposition Sub-state A=3 during the Time Division State; and the Single Sub-state A=4 during the Single GPPL (Non-Parallel) State. Each one of these parallelization states (i.e. Object, Image, Time and Single/Non-Parallel States) will be described in great technical detail below.

As shown in FIG. 4A, the Decomposition Module 401 is preferably implemented using two submodules, namely: (i) a Decomposition Submodule No. 1 including an OS-GPU Interface and Utilities Module; and (ii) a Decomposition Submodule No. 2, including a Division Control Module and a State Monitoring Module. The subcomponents of these submodules will be described in detail below.

The OS-GPU Interface and Utilities Module

The OS-GPU Interface and Utilities Module performs all the functions associated with interaction with the Operating System (OS), Graphics Library (e.g. OpenGL or DirectX), and interfacing with GPUs or CPU-cores, as the case may be. The OS-GPU Interface and Utilities Module is responsible for interception of the graphic commands from the standard graphic library, forwarding and creating graphic commands to the Vendor's GPU Driver, controlling registry, installations, OS services and utilities. Another task performed by this module is reading Performance Data from different sources (e.g. GPUs, vendor's driver, and chipset) and forwarding the Performance Data to the Automatic Mode Control Module (AMCM). Also, the OS-GPU Interface and Utilities Module includes software drivers that drive subcomponents within the Decomposition, Distribution and/or Recomposition Modules that are implemented in system architectures (e.g. Hub, Chipset, etc identified in FIG. 4A1-2 and shown in FIGS. 7B1 through 7B11) in which both the Decomposition and Distribution Modules are not implemented as software packages within the Host Memory Space (HMS) of the host computing system in which the MMPGRS is embodied.

The Division Control Module

In the Division Control Module, all graphics commands and data are processed for decomposition and marked for division. However, these commands and data are sent in a single stream into the Distribution Module for physical distribution. The Division Control Module controls the division parameters and data to be processed by each GPU, according to parallelization scheme instantiated at any instant of system operation (e.g. division of data among GPUs in the Object Division Mode, or the partition of the image screen among GPUs in the Image Division Mode).

In the Image Division Mode, the Division Control Module assigns for duplication all the geometric data and common rendering commands to all GPUs. However specific rendering commands to define clipping windows corresponding to image portions at each GPU, are assigned separately to each GPU.

In the Object Division Mode, polygon division control involves sending each polygon (in the scene) randomly to a different GPU within the MMPGRS. This is an easy algorithm to implement, and it turns out to be quite efficient. There are different variations of this basic algorithm, as described below.

Polygon Division Control by Distribution of Vertex Arrays

According to this method, instead of randomly dividing the polygons, the vertex-arrays can be maintained in their entirety and sent to different GPUs, as the input might be in the form of vertex arrays, and dividing it may be too expensive.

Polygon Division Control by Dynamic Load Balancing

According to this method, GPU loads are detected at real time and the next polygon is sent to the least loaded GPU. Dynamic load balancing is achieved by building complex objects (out of polygons). GPU loads are detected at real time and the next object is sent to the least loaded GPU.

Handling State Validity Across the MMPGRS by State Monitoring

The graphic libraries (e.g. OpenGL and DirectX) are state machines. Parallelization must preserve a cohesive state across all of the GPU pipelines in the MMPGRS. According to this method, this is achieved by continuously analyzing all incoming graphics commands, while the state commands and some of the data is duplicated to all graphics pipelines in order to preserve the valid state across all of the graphic pipelines in the MMPGRS. This function is exercised mainly in Object Division Mode, as disclosed in detail in Applicant's previous International Patent PCT/IL04/001069, now published as WIPO International Publication No. WO 2005/050557, incorporated herein by reference in its entirety.

The Description of the Distribution Module of the Present Invention

The primary function of the Distribution Module 402 is to physically distribute the streams of graphics data and commands to the cluster of GPUs supported on the MMPGRS platform. Under the AMCM 400, the Distribution Module can be set to different distribution sub-states (B=1 through B=3), according to FIG. 4C, namely: the Divide Sub-state B1 during the Object Division State; the B=2 Sub-state (i.e. the Broadcast Sub-state) during the Image Division State; and the B3 Sub-state (i.e. Single GPU Sub-state) during the Time Division and Single GPU (i.e. Non-Parallel system) States. As shown in FIG. 4A, an additional source of Performance Data (i.e. beyond the GPUs, vendor's driver, and chipset) includes the internal Profiler employed in the Distribution Module in Hub-based embodiments of the present invention.

As shown in FIG. 4A, the Distribution Module is implemented by the following components: (i) the Distribution Management Module, which addresses the streams of graphics commands and data to the different GPPLs via chipset outputs, according to needs of the parallelization schemes instantiated by the MMPGRS; (iii) Profiler module used in graphics hub type system architectures, as illustrated in FIGS. 7B1 through 7B12, so as to provide an additional source of Performance Data (i.e. beyond the GPUs, vendor's driver, and chipset); and (iv) a Hub Control module, operating under control of the Distributed Graphics Function Control Module 409 within the AMCM 400, in graphics hub type system architectures, as illustrated in FIGS. 7B1 through 7B12, for configuring the Interconnect Network 404 according to the various parallelization modes and to coordinate the overall functioning of hardware components within the Recomposition Module across the graphics hub device (GHD) of the present invention.

As shown in FIG. 4A, the Distribution Module 402" comprises three functional units: the Distribution Management, the Profiler, and the Hub Control modules. The Distribution Management activates the Interconnect network 404 to transfer command and data stream to the GPPLs. The Interconnect network serves to (i) transfer command and data stream from the CPU to GPPLs, (ii) transfer raster data from GPPLs to the Recomposition Module, (iii) transfer raster data among GPPUs for an alternative GPPL-based Recomposition, and (iv) conduct other communication tasks, such as profiling data, control, etc. among the various system components.

An exemplary embodiment of Interconnect for a cluster of 4 GPPLs is a configurable switch with 5 way PCI express×16 lanes, having one upstream path between Hub and CPU, and 4 downstream paths between Hub and four GPUs. It receives upstream of commands and data from the CPU, and transfers them downstream to GPPLs, under the control of Distribution Management unit (of Distribution module), following the data division scheme generated by the Division Control block of Decomposition submodule (2), according to ongoing parallel division mode. The switch can be set into one of the following possible transfer sub-states: Divide, Broadcast, and Single. The Divide sub-state is set when the MMGPRS is operating in its Object Division Mode. The Broadcast sub-state is set when the MMGPRS is operating in its Image Division Mode. The Single sub-state is set when the MMG-PRS is operating in its Time Division Mode, or in Single mode.

Within the Distribution Module, the Profiler Unit 407' has several functions in system architectures employing graphics hub device (GHD)s as illustrated in FIG. 7B1 through 7B12, namely: (i) to deliver to Division Control its own generated profiling data; (ii) to forward the profiling data from GPUs to Division Control, due the fact that the GPUs are not directly connected to the host computing system in graphics hub based system architectures, whereas they are in system architectures illustrated in FIGS. 7A2 through 7A7-3; and (iii) to forward the Hub pre-GPU profiling data to the Division Control block within the Decomposition Module. Being close to the raw data passing by the GPUs, the Profiler 403 monitors the stream of geometric data and commands, for graphics hub profiling purposes. Such monitoring operations involve polygon, command, and texture count and quantifying data structures and their volumes for load balance purposes. The collected data is mainly related to the performance of the geometry subsystem employed in each GPU.

Within the Distribution Module of system architectures employing the graphics hub device (GHD) of the present invention, illustrated in FIGS. 7B1 through 7B12, the Hub Controller Module 409', operates under control of the Distributed Graphics Function Control Module 409 within the Automatic Mode Control Module 400. The primary function performed by this Hub Controller Module 409' is to configure the Inteconnect Network 404 according to the various parallelization modes and to coordinate the overall functioning of hardware components across the Distribution Module of the graphics hub device (GHD) of the present invention.

The Description of the Recomposition Module of the Present Invention

The primary function of the Recomposition Module 403 is to merge together, the partial results of multiple graphics pipelines, according to parallelization mode that is operative at any instant in time. The resulting or final Frame Buffer (FB) is sent to the display device (via primary GPU, or directly Under the AMCM 400, the Recomposition Module can be set to three different decomposing sub-states (C=1 through C=3), according to FIG. 4C, namely: The Test Based Sub-state C=1; the Screen Based Sub-state C=2; and the None State C=3. The Test based sub-state carries out re-composition based on a test performed on partial frame buffer pixels. Typically, these tests include the depth test, the stencil test, or combination thereof. The Screen based sub-state combines together parts of the final frame buffers, in a puzzle like fashion, creating a single image. The None sub-state, or sub-mode, makes no merges, just moves one of the pipeline frame buffers to the display, as required in time division parallelism or in single GPU (Non-Parallel) mode of operation.

The Test-Based Compositing suits compositing during the Object Division Mode. According to this method, sets of Z-buffer, stencil-buffer and color-buffer are read back from the GPU FBs to host's memory for compositing. The pixels of color-buffers from different GPUs are merged into single color-buffer, based on per pixel comparison of depth and/or stencil values (e.g. at given x-y position only the pixel associated with the lowest z value is let out to the output color-buffer). This is a software technique to perform hidden surface elimination among multiple frame buffers required for the Object Division Mode. Frame buffers are merged based on depth and stencil tests. Stencil tests, with or without combination with depth test, are used in different multi-pass algorithms. The final color-buffer is down-loaded to the primary GPU for display.

Screen-Based Compositing Suits Compositing During the Image Division Mode

The Screen-Based compositing involves a puzzle-like merging of image portions from all GPUs into a single image at the primary GPU, which is then sent out to the display. This method is a much simpler procedure than the Test-Based Compositing Method, as no tests are needed. While the primary GPU is sending its color-buffer segment to display, the Merger Module reads back other GPUs color-buffer segments to host's memory, for downloading them into primary GPU's FB for display.

The None Sub-state is a non-compositing option which involves moving the incoming Frame Buffer to the display. This option is used when no compositing is required. In the Time Division Mode, a single color-buffer is read back from a GPU to host's memory and downloaded to primary GPU for display. In the Non-Parallel Mode (e.g. employing a single GPPL), usually the primary GPPL is employed for rendering, so that no host memory transit is needed.

In the illustrative embodiments, the Recomposition Module is realized by several modules: (i) the Merge Management Module which handles the reading of frame buffers and the compositing during the Test-Based, Screen-Based And None Sub-States; (ii) the Merger Module which is an algorithmic module that performs the different compositing algorithms, namely, Test Based Compositing during the Test-Based Sub-state, and Screen Based Compositing during the Screen-Based Sub-state; (iii) Profiler module used in graphics hub type system architectures, as illustrated in FIGS. 7B1 through 7B12, so as to provide an additional source of Performance Data (i.e. beyond the GPUs, vendor's driver, and chipset); and (iv) a Hub Control module, operating under control of the Distributed Graphics Function Control Module 409 within the AMCM 400, in graphics hub type system architectures, as illustrated in FIGS. 7B1 through 7B12, for configuring the Inteconnect Network 404 according to the various parallelization modes and to coordinate the overall functioning of hardware components within the Recomposition Module across the graphics hub device (GHD) of the present invention.

In the case where the Interconnect needs to interconnect a cluster of 4 GPPLs, a configurable switch can be used having 5 way PCI express ×16 lanes, with one upstream path between the Hub and CPU, and 4 downstream paths between Hub and four GPUs. Under the local control of the Merge Management and the Hub Controller in the Recomposition Module, the Interconnect (e.g. switch) also performs the following functions: (i) transferring read-back FB raster data from GPPLs to the Merger block of Recomposition Module and returning composited image to primary GPPL, all under orchestration of the Merge Management block; (ii) transferring the read-back FB raster data among GPPLs for GPPL-based recomposition, so that the finally recomposited pixel data in final image is composited in the primary GPPL; (iii) transferring additional data, e.g. profiler data, to Decomposition module; and (iv) transferring control commands across the MMPGRS system.

Within the Recomposition Module, the Profiler unit 403 has several functions in system architectures employing graphics hub device (GHD)s as illustrated in FIG. 7B1 through 7B12, namely: (i) to deliver to Division Control its own generated profiling data; (ii) to forward the profiling data from GPUs to Division Control, due the fact that the GPUs are not directly connected to the host computing system in graphics hub based system architectures, whereas they are in system architectures illustrated in FIGS. 7A2 through 7A7-3; and (iii) to forward the Hub post-GPU profiling data to the Division Control block within the Decomposition Module. Being close to the raw data passing by the GPUs, the Profiler 403 monitors the stream of geometric data and commands, for graphics hub profiling purposes. Such monitoring operations involve polygon, command, and texture count and quantifying data structures and their volumes for load balance purposes. The collected data is mainly related to the performance of the geometry subsystem employed in each GPU.

Another function performed by the Profiler 403 within the Recomposition Module is to profile the merge process and monitor the task completion of each GPU for load balancing purposes. In graphics hub device (GHD) class of system architecture illustrated in FIGS. 7B1 through 7B12, both Profilers 407' and 403', in the Distribution and Recomposition Modules, unify their collected Performance Data and deliver the unified performance data, as feedback, to the Automatic Mode Control Module (AMCM) via the Decomposition Module, as shown in FIG. 4A. Notably, the communication linkage between the two Profiling blocks is achieved using the Interconnect network 404. In some illustrative embodiments, the two "pre-GPU" and "post-GPU" units of the graphics hub device (GHD), formed by the components within the Distribution and Recomposition Modules of system architectures illustrated in FIGS. 7B1 through 7B12, may reside on the same silicon chip, having many internal interconnections, whereas in other illustrative embodiments, these subcomponents may be realized on different pieces of silicon or functionally like semiconductor material, used to fabricate the graphics hub device (GHD)s of the present invention within diverse embodiments of the MMPGRS of the present invention.

Within the Recomposition Module of system architectures employing the graphics hub device (GHD) of the present invention, illustrated in FIGS. 7B1 through 7B12, the Hub Controller Module 409', operates under control of the Distributed Graphics Function Control Module 409 within the AMCM 400. The primary function performed by this Hub Controller Module 409' is to configure the Inteconnect Network 404 according to the various parallelization modes and to coordinate the overall functioning of hardware components across the Recomposition Module of the graphics hub device (GHD) of the present invention.

Notably, in some illustrative embodiments of the present invention, the Hub Controllers 409', in the Distribution and Recomposition Modules in system architectures embraced by the graphics hub device (GHD) of the present invention, can be realized as a single device or unit, on the same piece of silicon or like semiconductor material. In other embodiments, the Hub Controllers 409' can be realized as discrete units, on the same piece of silicon or like semiconductor material, or on separate pieces of silicon material (e.g. on different chips sets).

Description of the Automatic Mode Control Module (AMCM) 400 within the MMPGRS of the Present Invention During the run-time of any graphics-based application on the host computing system, the MMPGRS renders and displays the graphics environment being generated by the application, which typically will include many dynamically changing scenes, where the plot unfolds, and each scene typically involves a sequence of many image frames. Such scenes could involve virtually anything, including a forest with many leaves moving in the wind, a lake with many reflections, or a closed space in a castle with many light sources. Such scenes require parallel rendering, and the role of the MMPGS is to automatically determine which mode of parallel operation will result in optimal performance on the host computing system.

As shown in FIG. 4A, the Automatic Mode Control Module (AMCM) 400 comprises three algorithmic modules, namely: an Application Profiling and Analysis Module 407; a Parallel Policy Management Module 408; and a Distributed Graphics Function Control.

In the preferred embodiment shown in FIG. 4B, the AMCM also comprises two data stores: a Historical Repository 404; and a Application/Scene Profile Database 405. The primary function of the AMCM is to control the state of Multi-mode Parallel Rendering Subsystem 410 by virtue of its flexible multi-state behavior and fast interstate transition capabilities.

As shown in FIG. 4C, the AMCM 400 comprises a User Interaction Detection (UID) Subsystem 438 which includes a Detection and Counting Module 433 in combination with a UID Transition Decision Module 436. These subsystems and modules will be described in greater detail hereinbelow.

Overview on the Automatic Mode Control Module (AMCM) in the MMPGRS of the Present Invention When implementing the Automatic Mode Control Module or Mechanism (AMCM) in the MMPGRS of the present invention, there are several classes of techniques which can be usefully applied, to determine when and how to switch into, out of, and transition between modes of parallel operation on the MMPGRS platform, during the run-time of a particular graphics-based application, and optimize system performance, namely: Mode Control Techniques Based On Scene/Application Profiling; and Mode Control Techniques Based On System-User Interaction Detection. It is appropriate at this juncture to provide an overview on the various techniques that the AMCM can use to best determine how to automatically control the mode of parallel operation on the MMPGRS Platform, and optimize system performance.

Description of Mode Control Techniques Employed within the AMCM Based on Scene/Application Profiling (1) Real-Time Profiling of Scenes (on a Frame-by-Frame Basis):

This method involves collecting and analysis of Performance Data, during application run-time, in order to construct scene profiles for image frames associated with particular scenes in a particular graphics-based application, and maintaining these scene profiles in the Scene/Application Profile Database within the AMCM. This way, during run-time, the AMCM can access and use these scene profiles so as to best determine how to dynamically control the modes of parallel operation of the MMPGRS to optimize system performance. As will be described in greater detail hereinafter, this technique can be practiced using the Application Profiling and Analysis Module 407 and Parallel Policy Management Module 408 illustrated in FIGS. 4A, 4D, 5C1, 5C2, 5C3, and 5C4, in the context of highly diverse MMPGRS system architectures, as well as within multi-user application environments supported over distributed network environments, as shown in FIGS. 12A and 12B.

(2) Real-Time Detection of Scene Profile Indices Directly Programmed within Pre-Profiled Scenes of Particular Applications:

This technique involves analyzing, prior to run-time, the scenes of a particular application, and then indexing the scene with Scene Profile Indices and storing corresponding Mode Control Parameters (MCPs) (e.g. Switch to Object Division Mode) within the local Scene/Application Profile Database within the AMCM, or other data storage device that is accessible in real-time by the AMCM during application run-time. Then during run-time, the AMCM automatically detects the scene, and consults the Scene Profile Indices for the corresponding MCPs from the Scene/Application Profile Database so as to best determine how to dynamically control the modes of parallel operation of the MMPGRS to optimize system performance.

(3) Real-Time Detection of Mode Control Command (MCCs) Directly Programmed within Pre-Profiled Scenes of Particular Applications:

This technique involves, prior to run-time (e.g. during game application development), analyzing the scenes of a particular application, and the directly programming Mode Control Commands (MMCs) (e.g. Switch to Object Division Mode) within the individual image frames of each scene, following standards to be established and followed by developers in the computer graphics industry. Then during run-time, the MCM automatically detects these MCCs along the graphics command and data stream, and use these commands so as to best determine how to dynamically control the modes of parallel operation of the MMPGRS to optimize system performance.

Description of Mode Control Techniques Employed within the AMCM Based on System-User Interaction Detection This approach, which can be used in conjunction with any of the above Scene/Application Profiling Techniques, involves automatically detecting the users interaction with the host computing system (e.g. mouse device movement, keyboard depressions, etc) and providing this Interaction Data to the AMCM so that it can best determine how to dynamically control the modes of parallel operation of the MMPGRS to optimize system performance, given the user's interaction with the host computing system, or application running thereon, at any instance in time. As will be described in greater detail hereinafter, this technique can be practiced using the UID Subsystem 438 illustrated in FIGS. 5A, 5B and 5C2.

The Application Profiling and Analysis Module

As shown in FIG. 4D, the Application Profiling and Analysis Module 407 monitors and analyzes Performance and Interactive data streams continuously acquired by profiling the Application while its running. In FIG. 5D, the Performance Data inputs provided to the Application Profiling and Analysis Module include: texture count; screen resolution; polygon count; utilization of geometry engine, pixel engine, video memory and GPPL; the total pixels rendered, the total geometric data rendered; the workload of each GPPL; the volumes of transferred data. The System-User Interactive (Device) Data inputs provided to the Application Profiling and Analysis Module include: mouse movement; head movement; voice commands; eye movement; feet movement; keyboard; LAN, WAN or Internet (WWW) originated application (e.g. game) updates.

The Tasks performed by the Application Profiling and Analysis Module include: Recognition of the Application; Processing of Trial and Error Results; Utilization of Application Profile from Application/Scene Profile Database; Data Aggregation in the Historical Depository; Analysis of input performance data (frame-based); Analysis based on integration of frame-based "atomic" performance data, aggregated data at Historical Depository, and Application/Scene Profile Database data; Detection of rendering algorithms used by Application; Detection of use of FB in next successive frame; Recognition of preventative conditions (to parallel modes); Evaluation of pixel layer depth; Frame/second count; Detection of critical events (e.g. frames/sec/drop); Detection of bottlenecks in graphics pipeline; Measure of load balance among GPUs; Update Application/Scene Profile Database from the Historical Depository; and Recommendation on optimal parallel scheme.

The Application Profiling and Analysis Module performs its analysis based on the following:

(1) The Performance Data collected from several sources, such as vendor's driver, GPUs, chipset, and optionally—from the graphics Hub embodiments of the present invention, described in greater detail hereinafter;

(2) Historical repository 404 which continuously stores up the acquired data (i.e. this data having historical depth, and being used for constructing behavioral profile of ongoing application); and (3) Knowledge based Application/Scene Profile Database 405 which is an application profile library of prior known graphics applications (and further enriched by newly created profiles based on data from the Historical Depository).

In the MMGPRS of the illustrative embodiment, the choice of parallel rendering mode at any instant in time involves profiling and analyzing the system's performance by way of processing both Performance Data Inputs and Interactive Device Inputs, which are typically generated from a several different sources within MMPGRS, namely: the GPUs, the vendor's driver, the chipset, and the graphic Hub (optional).

Performance Data needed for estimating system performance and locating casual bottlenecks, includes:

(I) Texture Count;
(Ii) Screen Resolution;
(Iii) Polygon Volume;
(iv) at each GPPL, utilization of
  (a) the Geometry Engine
  (b) the Pixel engine, and
  (c) Video memory;
(v) Utilization of the CPU;
(vi) total pixels rendered;
(vii) total geometric data rendered;
(viii) workload of each GPU; and
(ix) volumes of transferred data.

As shown in FIG. 4D, this Performance Data is fed as input into the Application Profiling and Analysis Module for real-time processing and analysis Application Profiling and Analysis Module. In the illustrative embodiment, the Application Profiling and Analysis Module performs the following tasks:

(1) Recognition of Application (e.g. video game, simulation, etc.);
(2) Processing of trial & error results produced by the processes described in FIGS. 5C3 and 5C4;
(3) Utilization of the Application Profile from data in the Application/Scene Profile Database;
(4) Aggregation of Data in the Historical Repository;
(5) Analysis of Performance Data Inputs;
(6) Analysis based on the integration of
  (a) Frame-based "atomic" Performance Data,
  (b) Aggregated data within the Historical Repository, and
  (c) Data stored in the Application/Scene Profile Database;
(7) Detection of rendering algorithms used by Application
(8) Detection of use of the FB in next successive frame as a preventive condition for Time Division Mode;
(9) Recognition of preventive conditions for other parallel modes;
(10) Evaluation of pixel layer depth at the pixel subsystem of GPU;
(11) Frame/sec count;
(12) Detection of critical events (e.g. frame/sec drop);
(13) Detection of bottlenecks in graphics pipeline;
(14) Measure and balance of load among the GPUs;
(15) Update Application/Scene Profile Database from data in the Historical Depository; and
(16) Selection of the optimal parallel graphics rendering mode of operation for the MMPGRS.

The Parallel Policy Management Module

Parallel Policy Management Module 408 makes the final decision regarding the preferred mode of parallel graphics rendering used at any instant in time within the MMPGRS, and this decision is based on the profiling and analysis results generated by the Application Profiling and Analysis Module. The decision is made on the basis of some number N of graphics frames. As shown above, the layer depth factor, differentiating between the effectiveness of the Object Division vs. Image Division Mode, can be evaluated by analyzing the relationship of geometric data vs. fragment data at a scene, or alternatively can be found heuristically. Illustrative control policies have been described above and in FIGS. 5C1 through 5C3.

The Distributed Graphic Function Control Module

Distributed Graphic Function Control Module 409 carries out all the functions associated with the different parallelization modes, according to the decision made by the Parallel Policy Management Module. The Distributed Graphic Function Control Module 409 drives directly the configuration sub-states of the Decomposition, Distribution and Recomposition Modules, according to the parallelization mode. Moreover, Application Profiling and Analysis includes drivers needed for hardware components such as graphic Hub, described hereinafter in the present patent Specification.

State Transitions within the MMPGRS of the Illustrative Embodiment of the Present Invention As shown in the state transition diagram of FIG. 6A, the MMPGRS of the illustrative embodiment has six (6) system states. Three of these system states are parallel graphics rendering states, namely: the Image Division State, which is attained when the MMPGRS is operating in its Image Division Mode; the Object Division State, which is attained when the MMPGRS is operating in its Object Division Mode; and the Time Division State, which is attained when the MMPGRS is operating in its Time Division Mode. The system also includes a Non-Parallel Graphics Rendering State, which is attained only when a single GPPL is operational during the graphics rendering process. There is also an Application Identification State, and a Trial & Error Cycle State. As illustrated in FIG. 4C and FIG. 6A, each parallelization state is characterized by sub-state parameters A, B, C. As shown in the state transition diagram of FIG. 6A, the Non-Parallel (i.e. Single GPPL) State is reachable from any other state of system operation.

In accordance with the principles of the present invention, profiles of all previously analyzed and known graphics-based Applications are stored in the Application/Scene Profile Database 405 of the MMPGRS. Whenever the graphics-based application starts, the system enters Application Identification State, and the AMCM attempts to automatically identify whether this application is previously known to the system. In the case of a previously known application, the optimal starting state is recommended by the Database, and the system transitions to that system state. Further on, during the course of the application, the AMCM is assisted by the Application/Scene Profile Database to optimize the inter-state tracking process within the MMPGRS. In the case of an application previously unknown to the MMPGRS, the Trial & Error Cycle State is entered, and attempts to run all three parallelization schemes (i.e. Modes) are made for a limited number of cycles.

During the course of the Application, the decision by the system as to which mode of graphics rendering parallelization to employ (at any instant in time) is supported either by continuous profiling and analysis, and/or by trial and error. The Trial and Error Process is based on comparing the results of a single, or very few cycles spent by the system at each parallelization state.

During the course of continuous profiling and analysis by the Application Profiling and Analysis Module 407, the following parameters are considered and analyzed by the AMCM with respect to each state/mode transition decision:

Pixel processing load
Screen resolution
Depth complexity of the scene

Polygon count
Video-memory usage
Frame/second rate
Change of frames/second rate
Tolerance of latency
Use of the same FB in successive frame
(10) User-System Interaction during the running of the Application.

User-Interactivity Driven Mode Selection within the MMPGRS of the Present Invention Purely in terms of "frames/second" rate, the Time Division Mode is the fastest among the parallel graphics rendering modes of the MMGRS, and this is by virtue of the fact that the Time Division Mode works favorably to reduce geometry and fragment bottlenecks by allowing more time. However, the Time Division Mode (i.e. method) of parallelization does not solve video memory bottlenecks. Also, the Time Division Mode suffers from other problems, namely: (i) CPU bottlenecks; (ii) the unavailability of GPU-generated frame buffers to each other, in cases where the previous frame is required as a start point for the successive frame; and also (iii) from pipeline latency. Automatic transition of the MMGPRS to its Object-Division Mode effectively releases the system from transform and video memory loads. In many applications, these problems provide reasons not for the MMPGS to use or enter into its Time Division Mode. However, for some other applications, the Time Division Mode may be suitable and perform better than other parallelization schemes available on the MMGPRS of the present invention (e.g. Object-Division Mode and Image-Division Mode).

During the Time Division Mode, the pipeline latency problem arises only when user-system interaction occurs. Also, in many interactive gaming applications (e.g. video games), often there are 3D scenes with intervals of user-system interactivity during the Time Division Mode. Thus, in order to achieve the highest performance mode of parallel graphics rendering at runtime, the MMPGRS of the present invention employs a User Interaction Detection (UID) Subsystem 438 which enables automatic and dynamic detection of the user's interaction with the system. Absent preventive conditions (such as CPU bottlenecks and need for the same FB in successive frames), the UID subsystem 438 enables timely automated implementation of the Time Division Mode only when no user-system interactivity is detected so that system performance is automatically optimized.

These and other constraints are taken into account during the inter-modal transition process, as illustrated in the State Transition Diagram of FIG. 6A, and described below:

Transition from Object Division to Image Division follows a combination of one or more of the following conditions:
  Increase in pixel processing load
  Increase in screen resolution
  Increase in scene depth complexity
  Decrease in polygon count Transition from Image Division to Object Division follows a combination of one or more of the following conditions:
  Increase of polygon count
  Increase of video memory footprint
  Decrease of scene depth complexity Transition from Object Division to Time Division follows a combination of one or more of the following conditions:
  Demand for higher frame/second rate
  Higher latency is tolerated
  There is no use of the FB for successive frame
  No predefined input activity detected by the UID Subsystem Transition from Time Division to Object Division follows a combination of one or more of the following conditions:
  Latency is not tolerable
  FB is used for successive frame
  High polygon count
  Input activity detected by the UID Subsystem Transition from Time Division to Image Division follows a combination of one or more of the following conditions:
  Latency is not tolerable
  FB is used for successive frame
  High pixel processing load
  Input activity detected by the UID Subsystem Transition from Image Division to Time Division follows a combination of one or more of the following conditions:
  Demand for higher frame/second rate
  Latency is tolerable
  High polygon count
  No predefined input activity detected by the UID Subsystem.

In the illustrative embodiment, this capacity of the MMPGRS is realized by the User Interaction Detection (UID) Subsystem 438 provided within the Application Profiling and Analysis Module 407 in the Automatic Mode Control Module of the system. As shown in FIG. 5A, the UID subsystem 438 comprises: a Detection and Counting Module 433 in combination with a UID Transition Decision Module 436.

As shown in FIGS. 5A and 4D, the set of interactive devices which can supply User Interactive Data to the UID subsystem can include, for example, a computer mouse, a keyboard, eye-movement trackers, head-movement trackers, feet-movement trackers, voice command subsystems, Internet, LAN, WAN and/or Internet originated user-interaction or game updates, and any other means of user interaction detection, and the like.

As shown in FIG. 5A, each interactive device input 432 supported by the computing system employing the MMPGRS feeds User Interaction Data to the Detection and Counting Module 433 which automatically counts the elapsed passage of time for the required non-interactive interval. When such a time interval is counted or has elapsed (i.e. without detection of user-system interactivity), the Detection and Counting Module 433 automatically generates a signal indicative of this non-interactivity (434) which is transmitted to the UID Transition Decision Module 436. Thereafter, UID Transition Decision Module 436 issues a state transition command (i.e. signal) to the Parallel Policy Management Module 408, thereby causing the MMPGRS to automatically switch from its currently running parallel mode of graphics rendering operation, to its Time Division Mode of operation. During the newly initiated Time Division Mode, whenever system-user interactivity from the interactive device is detected 432 by the Detection and Counting Module 433, an system-user interactivity signal 435 is transferred to the UID Transition Decision Module 436, thereby initiating the system to return from the then currently Time Division Mode, to its original parallel mode of operation (i.e. the Image or Object Division Mode, as the case may be).

As shown in FIG. 5A, an Initialization Signal 431 is provided to the Detection and Counting Module 433 when no preventive conditions for Time Division exist. The function of the Initialization Signal 431 is to (1) define the set of input (interactive) devices supplying interactive inputs, as well as (2) define the minimum elapsed time period with no interactive activity required for transition to the Time Division Mode (termed non-interactive interval). The function of the UID Transition Decision Module 436 is to receive detected inputs 435 and no inputs 434 during the required interval, and, produce and provide as output, a signal to the Parallel Policy Management System, initiating a transition to or from the Time Division Mode of system operation, as shown.

In applications dominated by Image Division or Object Division Modes of operation, with intervals of non-interactivity, the UID Subsystem 438 within the MMGPRS can automatically initiate a transition into its Time Division Mode upon detection of user-interactivity, without the system experiencing user lag. Then as soon as the user is interacting with the application, the UID Subsystem of the MMGPRS can automatically transition (i.e. switch) the system back into its dominating mode (i.e. the Image Division or Object Division). The benefits of this method of automatic "user-interaction detection (UID)" driven mode control embodied within the MMGRPS of the present invention are numerous, including: best performance; no user-lag; and ease of implementation.

Notably, the automated event detection functions described above can be performed using any of the following techniques: (i) detecting whether or not a mouse movement or keyboard depression has occurred within a particular time interval (i.e. a strong criterion); (ii) detecting whether or not the application (i.e. game) is checking for such events (i.e. a more subtle criterion); or (iii) allowing the application's game engine itself to directly generate a signal indicating that it is entering an interactive mode.

The state transition process between Object-Division/Image-Division Modes and the Time Division Mode initiated by the UID subsystem of the present invention is described in the flow-chart shown in FIG. 5B. As shown therein, at Block A, the UID subsystem is initialized. At Block B, the time counter of the Detection and Counting Module 433 is initialized. At Block C, the UID subsystem counts for the predefined non-interactive interval, and the result is repeatedly tested at Block D. When the test is positively passed, the parallel mode is switched to the Time-Division at Block E by the Parallel Policy Management Module. At Block F, the UID subsystem determines whether user interactive input (interactivity) has been detected, and when interactive input has been detected, the UID subsystem automatically returns the MMPGRS to its original Image or Object Division Mode of operation, at Block G of FIG. 5B.

As will be described in greater detail below, the entire process of User-Interactivity-Driven Mode Selection occurs within the MMPGRS of the present invention when N successive frames according control policy are run in either the Object Division or Image Division Mode of operation, as shown during Blocks I and J of FIGS. 5C1 and 5C2.

Operation of the Automatic Mode Control Cycle within the MMPGRS of the Present Invention Referring to FIG. 5C1, the Profiling and Control Cycle Process within the MMPGRS will now be described in detail, wherein each state transition is based on above listed parameters (i.e. events or conditions) (1) through (6) listed above, and the UID Subsystem is disabled. In this process, Steps A through C test whether the graphics application is listed in the Application/Scene Profile Database of the MMPGRS. If the application is listed in the Application/Scene Profile Database, then the application's profile is taken from the Database at Step E, and a preferred state is set at Step G. During Steps I-J, N successive frames are rendered according to Control Policy, under the control of the AMCM with its UID Subsystem disabled. At Step K, Performance Data is collected, and at Step M, the collected Performance Data is added to the Historical Repository, and then analyzed for next optimal parallel graphics rendering state at Step F. Upon conclusion of application, at Step L, the Application/Scene Profile Database is updated at Step N using Performance Data collected from the Historical Repository.

Referring to FIG. 5C2, the Profiling and Control Cycle Process within the MMPGRS will now be described in detail, with the UID Subsystem is enabled. In this process, Steps A through C test whether the graphics application is listed in the Application/Scene Profile Database of the MMPGRS. If the application is listed in the Application/Scene Profile Database, then the application's profile is taken from the Database at Step E, and a preferred state is set at Step G. During Steps I-J, N successive frames are rendered according to Control Policy under the control of the AMCM with its UID Subsystem enabled and playing an active role in Parallel Graphics Rendering State transition within the MMPGRS. At Step K, Performance Data is collected, and at Step M, the collected Performance Data is added to the Historical Repository, and then analyzed for next optimal parallel graphics rendering state at Step F. Upon conclusion of application, at Step L, the Application/Scene Profile Database is updated at Step N using Performance Data collected from the Historical Repository.

Operation of the Periodical Trial & Error Process of the Present Invention within the MMPGRS of the Present Invention As depicted in FIG. 5C3, the Periodical Trial & Error Process differs from the Profiling and Control Cycle Process/Method described above, based on its empirical approach. According the Periodical Trial & Error Process, the best parallelization scheme for the graphical application at hand is chosen by a series of trials described at Steps A through M in FIG. 5C3. After N successive frames of graphic data and commands are processed (i.e. graphically rendered) during Steps N through O, another periodical trial is performed at Steps A through M. In order to omit slow and unnecessary trials, a preventive condition for any of the parallelization schemes can be set and tested during Steps B, E, and H, such as used by the application of the Frame Buffer FB for the next successive frame, which prevents entering the Time Division Mode of the MMPGRS.

In the flowchart of FIG. 5C4, a slightly different Periodical Trial & Error Process (also based on an empirical approach) is disclosed, wherein the tests for change of the parallel graphics rendering state (i.e. mode) are done only in response to, or upon the occurrence of a drop in the frame-rate-per-second (FPS), as indicated during Steps O, and B through M.

Conditions for Transition Between Object and Image Division Modes of Operation in the MMPGRS of the Present Invention In a well-defined case, Object Division Mode supersedes the Image Division Mode in that it reduces more bottlenecks. In contrast to the Image Division Mode that reduces only the fragment/fill bound processing at each GPU, the Object Division Mode relaxes bottleneck across the pipeline: (i) the geometry (i.e. polygons, lines, dots, etc) transform processing is offloaded at each GPU, handling only I/N of polygons (N—number of participating GPUs); (ii) fill bound processing is reduced since less polygons are feeding the rasterizer; (iii) less geometry memory is needed; and (iv) less texture memory is needed.

Automated transition to the Object Division State of operation effectively releases the MMPGRS of the present invention from transform and video memory loads. However, for fill loads, the Object Division State of operation will be less effective than the Image Division State of operation.

At this juncture it will be helpful to consider under what conditions a transition from the Object Division State to the Image Division State can occur, so that the parallel graphics system of the present invention will perform better "fill loads", especially in higher resolution.

Notably, the duration of transform and fill phases differ between the Object and Image Division Modes (i.e. States) of operation. For clarity purposes, consider the case of a dual-GPU graphics rendering system. Rendering time in the Image Division Mode is given by:

$$T_{ObjDiv} = \text{Transform} + \text{Fill}/2 \tag{1}$$

whereas in Object Division Mode, the fill load does not reduce in the same factor as transform load.
The render time is:

$$T_{ImgDiv} = \text{Transform}/2 + \text{DepthComplexity} \cdot \text{Fill}/2 \tag{2}$$

The fill function Depth Complexity in Object Division Mode depends on depth complexity of the scene. Depth complexity is the number of fragment replacements as a result of depth tests (the number of polygons drawn on every pixel). In the ideal case of no fragment replacement (e.g. all polygons of the scene are located on the same depth level), the second component of the Object Division Mode reduces to:

$$T_{ImgDiv} = \text{Transform}/2 + \text{Fill}/2 \tag{2.1}$$

However, when depth complexity becomes high, the advantage of the Object Division Mode drops significantly, and in some cases the Image Division Mode may even perform better (e.g. in Applications with small number of polygons and high volume of textures).

The function DepthComplexity denotes the way the fill time is affected by depth complexity:

$$DepthComplexity = \frac{2E(L/2)}{E(L)} \tag{3}$$

where E(L) is the expected number of fragments drawn at pixel for L total polygon layers.
In ideal case DepthComplexity=1. In this case, E is given by:

$$E(m) = 1 + \frac{1}{m}\left(\sum_{i=1}^{m-1} E(i)\right) \tag{3.1}$$

For a uniform layer-depth of L throughout the scene, the following algorithm is used to find conditions for switching from the Object Division Mode to the Image Division Mode:

In order to choose between the Image Division and the Object Division Mode, an algorithm is used which detects which transform and fill bound processing is smaller. Once the layer-depth reaches some threshold value throughout the scene, the Object Division Mode will not minimize the Fill function any more.

EXAMPLE

Consideration of a General Scene

Denote the time for drawing n polygons and p pixels as Render(n,p), and allow P to be equal to the time taken to draw one pixel. Here the drawing time is assumed to be constant for all pixels (which may be a good approximation, but is not perfectly accurate). Also, it is assumed that the Render function, which is linearly dependent on p (the number of pixels actually drawn), is independent of the number of non-drawings that were calculated. This means that if the system has drawn a big polygon that covers the entire screen surface first, then for any additional n polygons: Render(n,p)=p×P.

$$Render(n, p) = \sum_{i=1}^{\infty} P \times |\{x | LayerDepth(x) = i\}| \times E(i) \tag{5}$$

The screen space of a general scene is divided into sub-spaces based on the layer-depth of each pixel. This leads to some meaningful figures.

For example, suppose a game engine generates a scene, wherein most of the screen (90%) has a depth of four layers (the scenery) and a small part is covered by the player (10%) with a depth of 20 layers. Without Object Division Mode support, the value of Render function is given by:

Render(n,p)=p×0.9×E(4)+p×0.1×E(20)=
2.2347739657143681×p

With Object Division Mode support, the value of the Render function is:

Render(n/2, p)=p×0.9×E(4/2)+p×0.1×E(20/2)=
1.6428968253968255×p

Notably, in this case, the improvement factor when using Object Division Mode support is 1.3602643398952217. On the other hand, a CAD engine might have a constant layer depth of 4. The improvement factor for interesting cases is shown in a table set forth in copending application Ser. No. 11/789,039, supra.

It is easily seen from that table that when the layer depth DepthComplexity becomes larger, the Object Division Mode does not improve the rendering time by a large amount, and if rendering time is the bottleneck of the total frame calculation procedure, then the Image Division Mode might be a better approach. The analysis results by the Application Profiling and Analysis Module are passed down to the next module of Parallel Policy Management Module.

$$\text{chose\_div\_mode}(Transform, Fill) = \begin{cases} ObjectDivision & Transform + \frac{Fill}{2} > \frac{Transform}{2} + \frac{Fill}{2} \times DepthComplexity \\ ImageDivision & otherwise \end{cases} \tag{4}$$

Parallel Graphics Rendering Process of the Present Invention Performed During Each Mode of Parallelism on the MMPGRS The parallel graphics rendering process performed during each mode of parallelism on the MMPGRS will now be described with reference to the Parallel Graphics Processing Pipeline Model of FIG. 6B and flowcharts set forth in FIGS. 6C1, 6C2 and 6C3, for the Image, Time and Object Division Modes, respectively.

Parallel Graphics Rendering Process for a Single Frame During the Image Division Mode of the MMPRS of the Present Invention In FIG. 6C1, the parallel graphics rendering process for a single frame is described in connection with the Image Division Mode of the MMPRS of the present invention. In the Image Division Mode, the Decomposition, Distribution and Recomposition Modules are set as follows: the Decomposition Module is set on sub-state A-2, the Distribution Module is set on sub-state B-2, and the Recomposition Module is set on sub-state C-2. The Decomposition Module splits up the image area into sub-images and prepares partition parameters for each GPPL 6120. Typically, the partition ratio is dictated by the Automatic Mode Control Module based on load balancing considerations. The physical distribution of these parameters among multiple GPPLs is done by the Distribution Module (6124). From this point on the stream of commands and data (6121) is broadcasted to all GPPLs for rendering (6123), unless end-of-frame is encountered (6122). When rendering of frame is accomplished, each GPPL holds a different part of the entire image. Compositing of these parts into final image is done by the Recomposition Module moving all partial images (i.e. color-FB) from secondary GPPLs to the primary GPPL (6125), merging the sub-images into final color-FB (6126), and displaying the FB on the display screen (6127).

Parallel Graphics Rendering Process for a Single Frame During the Time Division Mode of the MMPRS of the Present Invention In FIG. 6C2, the parallel graphics rendering process for a single frame is described in connection with the Time Division Mode of the MMPRS of the present invention. In the Time Division Mode, the Decomposition, Distribution and Recomposition Modules are set as follows: the Decomposition Module is set on sub-state A-3, the Distribution Module is set on sub-state B-3, and the Recomposition Module is set on sub-state C-3. The Decomposition Module aligns a queue of GPPLs 6130, appoints the next frame to the next available GPPL 6131, and monitors the stream of commands and data to all GPPLs 6132. The physical distribution of that GCAD stream is performed by the Distribution Module 6134. Upon detection of an end-of-frame command 6133 at one of the GPPLs, the control moves to the Recomposition Module which moves the color-FB of the completing secondary GPPL, to the primary GPPLs 6135. The primary GPPL then displays the recomposited image in the FB on the display screen 6136 of the display device.

Parallel Graphics Rendering Process for a Single Frame During the Object Division Mode of the MMPRS of the Present Invention In FIG. 6C3, the parallel graphics rendering process for a single frame is described in connection with the Object Division Mode of the MMPRS implemented according to the software-based architecture of the present invention. In the Object Division Mode, the Decomposition, Distribution and Recomposition Modules are set as follows: the Decomposition Module is set on sub-state A-1, the Distribution Module is set on sub-state B-1, and the Recomposition Module is set on sub-state C-1. The Decomposition Module activity starts with interception of graphics commands 6140 on their way between standard graphics library (e.g. OpenGL, Direct3D) and vendor's GPU driver. Each graphics command is tested for blocking mode 6142, 6143 and state operation class 6144. Blocking operations are exceptional in that they require a composed valid FB data, thus in the Object Division Mode, they have an inter-GPPL effect. Therefore, whenever one of the blocking operations is issued, all the GPPLs must be synchronized. Each frame has at least 2 blocking operations: Flush and Swap, which terminate the frame. State operations (e.g. definition of light source) have an across the board effect on all GPPLs. In both cases the command must be duplicated to all GPPLs, rather than delivered to one of them. Therefore the Distribution Module physically sends the command to all GPPLs 6150. On the other hand, a regular command that passed the above tests is designated to a single target GPPL 6145, and sent by Distribution Module to that GPPL 6151.

When a blocking mode command is detected 6143, a blocking flag is set on 6147 indicating blocking state. At this point, a composition of all frame buffers must occur and its result be duplicated to all GPPL. The rendering of upcoming commands is mirrored (duplicated) at all of the GPPL, unless an end-of-blocking mode is detected. The compositing sequence includes issuing of a flushing command 6149 to empty the pipeline. Such a command is sent to all GPPLs 6152. Then at each GPPL the color and Z Frame Buffer are read back to host memory 6154, and all color Frame Buffers are composited based on Z and stencil buffers 6156. Finally, the resulting Frame Buffer is sent to all GPPLs 6160. All successive graphics commands will be duplicated (i.e. replicated) to all GPPLs generating identical rendering results, unless the blocking mode flag is turned off. When the end-of-blocking mode is detected 6146, the blocking flag is turned off 6148 and regular object division is resumed.

When detected 6144 by the Decomposition Module, state operation commands (e.g. glLight, glColor) are being duplicated to all GPPLs 6150. Upon End-of-frame detection 6141, a compositing process is taking place 6153, 6155, 6157, 6158, very similar to that of blocking mode. However the merging result is sent to the display screen connected to the primary GPPL.

Illustrative Designs for the Multi-Mode Parallel Graphics Rendering System (MMPGRS) of the Present Invention Having Diverse System Architectures Parallelizing the Operation of Multiple Graphics Processing Pipelines (GPPLs)

FIG. 7A1-1 sets forth a schematic diagram that illustrates different environments for practicing the embodiments of the MMPGRS of the present invention, namely: Host Memory Space (HMS), Processor/CPU Die Space, Bridge Circuit (IGD) Space, Graphics Hub Space, and External GPU Space.

In FIG. 7A1-2, the table describes eleven (11) different Classes of MMPGRS Architecture, defined in terms of the Architectural Spaces specified in FIG. 7A1-1 in which the primary MMPGRS components are embodied in any particular Class of MMPGRS Architecture, namely: Host Memory Space HMS (software); HMS+IGD; HMS+Fusion; HMS+Multicore; HMS+GPU-Recomposition; HUB; HUB+GPU-Recomposition; Chipset; CPU/GPU Fusion; Multicore CPU; and Game Console.

The MMPGRS Architecture Table (i.e. Map) of the illustrative embodiments of the present invention illustrates several things.

First, within each MMPGRS Architecture, illustrated in FIG. 7A1-2, the Automatic Mode Control Module (AMCM) 400 and Modules and Submodules of the Multimode Parallel Graphics Rendering Subsystem 401, 402, 403 may reside in the different kinds of Architectural Space specified in FIG. 7A1-1, while multiple GPPLs, distributed in various ways in such environment, are driven multiple modes of parallelism that are dynamically managed in accordance with the principles of the present invention. Secondly, each Class of MMPGRS Architecture will typically have numerous implementation options, with the illustrative embodiments shown in FIGS. 8A through 11D1 simply being just a handful of possible implementation options.

Thirdly, the MMPGRS Architecture Table set forth in FIG. 7A1-2 is by no means a list of all possible Classes of the MMPGRS Architecture, but rather is an exemplary listing of the primary classes which comes to mind of the Inventors at the time of filing the present Application, and that it is expected, in the future, that other architectural spaces will evolve or be developed, thereby providing additional environments in which the MMPGRS of the present invention may be embodied or otherwise practiced. Various examples of how the MMPGRS of the present invention can be practiced will be described in greater detail below.

Illustrative Embodiment of the MMPGRS of the Present Invention Having a System Architecture Capable of Parallelizing the Operation of Multiple GPUs Supported on External Graphics Cards In FIG. 7A2, the first illustrative embodiment of the MMPGRS of the present invention 700 is shown embodied within the HMS Class of MMPGRS Architecture described in FIG. 7A1-2. As shown, the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host Memory Space (HMS) while multiple GPUs are supported on a pair of external graphic cards 204, 205 connected to a North memory bridge chip (103) and driven in a parallelized manner by the modules of the multi-mode parallel graphics rendering subsystem, under the control of the AMCM. During operation, (i) the Decomposition Module 401 divides (i.e. splits up) the stream of graphic commands and data (GCAD) according to the required parallelization mode, operative at any instant in time, (ii) the Distribution Module 402 uses the North bridge chip to distribute graphic commands and data (GCAD) to the multiple GPUs on board the external graphics cards, (iii) the Recomposition Module 403 uses the North bridge chip to transfer composited pixel data (CPD) between the Recomposition Module (or CPU) and the multiple GPUs during the image recomposition stage, and (iv) finally recomposited pixel data sets are displayed as graphical images on one or more display devices connected to the external graphics cards via a PCI-express interface, which is connected to the North bridge chip.

Illustrative Embodiment of the MMPGRS of the Present Invention Having a System Architecture Capable of Parallelizing the Operation of GPU Supported on Integrated Graphics Device (IGD) and Multiple GPUs Supported on External Graphics Cards In FIG. 7A3, the second illustrative embodiment of the MMPGRS of the present invention is shown embodied within the HMS+IGD Class of MMPGRS Architecture described in FIG. 7A1-2. As shown, the Automatic Mode Control Module (AMCM) 400 and the Decomposition, Distribution and Recomposition Modules 401, 402, 403, respectively, of the Multimode Parallel Graphics Rendering Subsystem reside as a software package 701 in the Host or CPU Memory Space (HMS), while multiple GPUs are supported in an IGD within the North memory bridge circuit as well as on external graphic cards connected to the North memory bridge chip and driven in a parallelized manner by the modules of the multi-mode parallel graphics rendering subsystem, under the control of the AMCM. During operation (i) the Decomposition Module 401 divides (i.e. splits up) the stream of graphic commands and data (GCAD) according to the required parallelization mode, operative at any instant in time, (ii) the Distribution Module 402 uses the North bridge chip to distribute the graphic commands and data (GCAD) to the multiple GPUs located in the IGD and on the external graphics cards, (iii) the Recomposition Module 403 uses the North bridge chip to transfer composited pixel data (CPD) between the Recomposition Module (or CPU) and the multiple GPUs during the image recomposition stage, and (iv) finally recomposited pixel data sets are displayed as graphical images on one or more display devices connected to one of the external graphics cards or the IGB, as shown.

Illustrative Embodiment of the MMPGRS of the Present Invention Having a System Architecture Capable of Parallelizing the Operation of GPU Supported on Integrated Graphics Device (IGD) and Multiple GPUs Supported on External Graphics Cards In FIG. 7A4, the third MMPGRS of the present invention is shown embodied within the HMS+IGD Class of MMPGRS Architecture described in FIG. 7A1-2. As shown, the Automatic Mode Control Module (AMCM) 400 and the Decomposition, Distribution and Recomposition Modules 401, 402, 403, respectively, of the Multimode Parallel Graphics Rendering Subsystem reside as a software package 701 in the Host Memory Space (HMS) while multiple GPUs are supported in an IGD within the South bridge circuit as well as on external graphic cards connected to the South bridge chip, and driven in a parallelized manner by the modules of the multi-mode parallel graphics rendering subsystem, under the control of the AMCM. During operation, (i) the Decomposition Module 401 divides (i.e. splits up) the stream of graphic commands and data (GCAD) according to the required parallelization mode, operative at any instant in time, (ii) the Distribution Module 402 uses the North bridge chip to distribute graphic commands and data (CGAD) to the multiple GPUs located in the IGD and on external graphics cards, (iii) the Recomposition Module 403 uses the South bridge chip to transfer recomposited pixel data between the Recomposition Module (or CPU) and the multiple GPUs during the image recomposition stage, and (iv) finally recomposited pixel data sets are displayed as graphical images on one or more display devices connected to one of the external graphics cards or the IGB, as shown.

Illustrative Embodiment of the MMPGRS of the Present Invention Having a System Architecture Capable of Parallelizing the Operation of GPU Supported on Hybrid CPU/GPU Fusion Chip and GPUs Supported on External Graphics Cards In FIG. 7A5, the fourth illustrative embodiment of the MMPGRS of the present invention is shown embodied within the HMS+Fusion Class of MMPGRS Architecture described in FIG. 7A1-2. As shown, the Automatic Mode Control Module (AMCM) 400 and the Decomposition, Distribution and Recomposition Modules 401, 402, 403, respectively, of the Multimode Parallel Graphics Rendering Subsystem resides as a software package 701 in the Host Memory Space (HMS) while a single GPU (1242) is supported on a CPU/GPU fusion-architecture processor die (alongside the CPU 1241) and one or more GPUs are supported on an external graphic card connected to the CPU processor die and driven in a parallelized manner by the modules of the multi-mode parallel graphics rendering subsystem, under the control of the AMCM. During operation, (i) the Decomposition Module

401 divides (i.e. splits up) the stream of graphic commands and data (GCAD) according to the required parallelization mode, operative at any instant in time, (ii) the Distribution Module 402 uses the memory controller and interconnect (e.g. crossbar switch) within the CPU/GPU processor chip to distribute graphic commands and data to the multiple GPUs on the CPU/GPU die chip and on the external graphics cards, (iii) the Recomposition Module 403 uses the memory controller and interconnect (e.g. crossbar switch) within the CPU/GPU processor chip to transfer composited pixel data (CPD) between the Recomposition Module (or CPU) and the multiple GPUs during the image recomposition stage, and (iv) finally recomposited pixel data sets are displayed as graphical images on one or more display devices connected to the external graphics card via a PCI-express interface, which is connected to the CPU/GPU fusion-architecture chip.

Illustrative Embodiment of the MMPGRS of the Present Invention Having a System Architecture Capable of Parallelizing the Operation of Multiple Graphics Pipelines Supported on Multi-Core CPU Chip In FIG. 7A6, the fifth illustrative embodiment of the MMPGRS of the present invention is shown embodied within the HMS+Multicore Class of MMPGRS Architecture described in FIG. 7A1-2. As shown, the Automatic Mode Control Module (AMCM) 400 and the Decomposition, Distribution and Recomposition Modules 401, 402, 403, respectively of the Multimode Parallel Graphics Rendering Subsystem resides as a software package 701 in the Host or CPU Memory Space (HMS) while some of the CPU cores on a multi-core CPU chip are used to implement a plurality of multi-core graphics pipelines parallelized by the modules of the software package 701 of the multi-mode parallel graphics rendering subsystem, under the control of the AMCM. During operation, (i) the Decomposition Module 401 divides (i.e. splits up) the stream of graphic commands and data (GCAD) according to the required parallelization mode, operative at any instant in time, (ii) the Distribution Module 402 uses the North memory bridge and interconnect network within the multi-core CPU chip to distribute graphic commands and data (GCAD) to the multi-core graphic pipelines implemented on the multi-core CPU chip, (iii) the Recomposition Module 403 uses the North memory bridge and interconnect network within the multi-core CPU chip to transfer composited pixel data (CPD) between the Recomposition Module (or CPU) and the multi-core graphics pipelines during the image recomposition stage, and (iv) finally recomposited pixel data sets are displayed as graphical images on one or more display devices connected to the North bridge chip via a display interface.

Illustrative Embodiment of the MMPGRS of the Present Invention Having a System Architecture Capable of Parallelizing the Operation of Multiple GPUs Supported on External Graphics Cards, and Carrying Out Pixel Image Recomposition within External GPUs In FIG. 7A7, the sixth illustrative embodiment of the MMPGRS of the present invention is shown embodied within the HMS+GPU-Recomposition Class of MMPGRS Architecture described in FIG. 7A1-2, and in copending U.S. patent application Ser. No. 11/648,160 incorporated herein by reference. As shown, the Automatic Mode Control Module (AMCM) 400 and the Decomposition, Distribution and Recomposition Modules 401, 402 respectively, of the Multimode Parallel Graphics Rendering Subsystem resides as a software package 701 in the Host or CPU Memory Space (HMS) while multiple GPUs on external GPU cards are driven in a parallelized manner by the modules of the software package 701 of the multi-mode parallel graphics rendering subsystem, under the control of the AMCM, and two or more GPUs 715, 716 are used to implement the Recomposition Module. During operation, (i) the Decomposition Module 401 divides (i.e. splits up) the stream of graphic commands and data (GCAD) according to the required parallelization mode, operative at any instant in time, (ii) the Distribution Module 402 uses the North or South bridge circuit and interconnect network to distribute graphic commands and data (GCAD) to the external GPUs, (iii) the Recomposition Module uses the North memory bridge and associated system bus (e.g. PCI-express bus) to transfer composited pixel data (CPD) between the GPUs during the image recomposition stage, and (iv) finally recomposited pixel data sets are displayed as graphical images on one or more display devices, connected to an external graphics card via a PCI-express interface which is connected to either the North or South bridge circuits of the host computing system.

During the Time Division Mode of this MMPGRS, each non-primary GPU, during its assigned time slot, moves its full-color composited image to the frame buffer (FB) of the primary GPU for display on the display screen of the display device.

Considering the case of a dual-GPU MMPGRS, for simplicity of explanation, during the Image Division Mode of this MMPGRS, the primary GPU outputs one/half of the color image in its frame buffer (FB) to the display device, while the secondary GPU moves one/half of the image in its FB to the primary GPU. Then the primary GPU does the same with the second part of the image in its frame buffer (FB). Thus, during the Image Division Mode, the recomposition involves a coordinated output of two image halves, that have been composited within the frame buffers (FBs) of two GPUs, to the frame buffer of the primary GPU (for recompositioning) and ultimately display to the display device. In this mode, there is no merge function between the pixels of these two image halves involved in the recompositioning process. In the case of multiple GPUs, the process is essentially the same, except that each GPU moves its 1/n part of the image to the frame buffer of the primary GPU for recompositioning and subsequent display.

During the Object Division Mode of this MMPGRS, the merging of pixel data in the FBs of the GPUs is much more complicated, involving compositing within the vertex and/or fragment shaders of the primary GPU, as will be described in great detail below.

Referring to FIG. 7A7-1, the innovative pixel recompositioning process supported within the MMPGRS of FIG. 7A7 during its Object Division Mode will now be described in great technical detail.

In general, the recompositioning phase/stage of the present invention involves moving the pixel Depth and Color values from the frame buffers (FB) in the secondary GPPL, to the FB in the primary GPPL (via inter-GPPL communication), and then merging these pixel values with their counterparts at the primary GPPL by means of programmable Fragment Shader supported in the pixel processing subsystem (211). FIG. 7A7-2 describes the compositing process carried out by programmable Fragment Shader for the case where the MMPGRS employs dual GPPLs (i.e. GPUs). It is understood, however, that if more GPPLs are involved, then the (re)compositing process will repeat accordingly for each additional "secondary" GPPL, until the final step when the partially composited pixel data in the frame buffer (FB) in the last secondary GPPL, is finally recomposited with the pixel data within the frame buffer (FB) of the primary GPPL.

As shown in FIG. 7A7-1, the pixel frame generating pipeline includes three basic steps, namely: the decompose 402, distribute 403, and render 404 stages. Towards the end of the graphics processing pipeline (GPPL), the recompose step 405 is carried out for final FB, which is finally displayed to the display device 405.

During the Decompositioning step 402, graphics commands and data stream are decomposed into well load balanced sub-streams in the Decompositioning Module 504, keeping state consistency of the graphics libraries.

The Distributing step 403 is supervised by the Distribution module 505. Decomposed graphics commands and data elements are sent to the Vendor's GPU Driver (506) and memory bridge (203), and delivered for rendering the primary 205 and secondary 204 graphics cards, via separate PCIexpress buses 207, 208.

Rendering (step 404) is done simultaneously 602, 603 in both GPPLs, creating two partial FBs.

The compositing process (step 405) comprises the following substeps:

Step (606): The color FB is read back from the secondary GPPL, and moved via memory bridge (203) to the primary GPPL's Texture memory (218) as a texture tex1.

Step (607)L The Z-buff is read back from the secondary GPPL, and moved via memory bridge (203) to the primary GPPL's Texture memory (218) as a texture dep1.

Step (604): Color FB of primary GPPL is copied to texture memory as texture tex2.

Step (605): Z-buffer of primary GPPL is copied to texture memory as texture dep2.

Step (608): Shader code for recomposition (described in FIG. 7B7-2) is downloaded and exercised on four textures tex1, tex2, dep1, dep2 as follows:

Step (609): The two depth textures are compared pixel by pixel for their depth values. Assuming the rule that the closest pixel is the one to be transferred to the final FB, at each x,y location the two depth textures are compared for lowest depth value, the lowest is chosen, and the color value at x,y of its correspondent color texture is moved to the x,y location in the final texture.

Step (610): The resulting texture is copied back to the primary color FB.

To complete rendering (step 404b), the following substeps are performed:

Step (611): All transparent objects of the scene and overlays (such as score titles) are essentially kept by applications for the very last data to be rendered. Therefore, once all opaque objects have been rendered in parallel at separate GPPLs and composed back to the primary's FB, the additional and final phase of a non-parallel rendering of transparent objects takes place in the primary GPPL.

Step (612): The final FB is sent to the display device for display on its display screen.

In step 405, the detailed shader program is used to composite two color textures based on the depth test conducted between the two depth textures, as shown in FIG. 7B7-2. While the above illustrative embodiment discloses the use of the Fragment Shader in the pixel processing subsystem/engine within the primary GPPL, to carry out the composition process in the dual GPPL-based graphics platform of the present invention, it is understood that other computational resources within the GPPL can be used in accordance with the scope and spirit of the present invention. In particular, in an alternative illustrative embodiment, the recompositioning phase/stage can involve moving the pixel Depth and Color values from the frame buffers (FBs) in the secondary GPPLs, to the FB in the primary GPPL (via inter-GPPL communication), and then merging these pixel values with their counterparts at the primary GPPL by means of the programmable Vertex Shader provided in the geometry processing subsystem 210 of the primary GPPL. And in yet another illustrative embodiment of the present invention, the recompositioning phase/stage can involve moving the pixel Depth and Color values from the frame buffers FB in the secondary GPPLs, to the FB in the primary GPPL (via inter-GPPL communication), and then merging these pixel values with their counterparts at the primary GPPL by the means of both programmable Vertex and Fragment Shaders provided in the geometry and pixel processing subsystems in the primary GPPL. Such modifications will become readily apparent to those skilled in the art having the benefit of the present inventive disclosure.

In the general case of MMPGRS having n GPPLs, the pixel data contained in the Frame Buffers (FB) associated with the secondary GPPLs are moved to the primary GPPL by way of an inter-GPPL communication process (e.g. the Interconnect network 404 implemented by multiple-lane PCI Express™ buses), and then processed within the local FB of the primary GPPL, to perform pixel image (re)composition. The pixel composition result is then sent to display device, and alternatively, also returned to the secondary GPPLs, if required in some applications as a basis of the next pixel frame.

As shown in FIGS. 7A7, 7A7-1 and 7A7-2 and described in detail above, the GPPL-based recomposition process of the present invention can be implemented across two or more GPPLs using software that (i) controls the computational machinery within the GPPLs of the MMPGRS platform, and (ii) exploits the Shader (pixel) processing capabilities in the primary GPPL, with no need for any external hardware. Alternatively, however, the GPPL-based recomposition process of the present invention can be implemented across two or more GPPLs using hardware circuitry and/or firmware (within a graphics hub architecture of the present invention) that (i) controls the computational machinery within the GPPLs of the MMPGRS platform, and (ii) exploits the Shader (pixel) processing capabilities in the primary GPPL, as shown in FIGS. 7B2, 7B4-1, 7B6-1, 7B7-1, 7B8-3, and 7B1, and described below.

FIG. 7A7-3 illustrates the time-line of one complete composited pixel frame, including time slots associated with the different steps of object division rendering. As shown, the reuse of GPPL resources for recompositioning occurs during a time slot, where the GPPL resources are generally idle during the recompose step. Thus, by virtue of the present invention, GPPL resources are used "for free" during recomposition, without sacrificing system performance.

The Graphics Hub Structure of the Present Invention Expressed in Different Ways in Different MMPGRS System Architectures While FIGS. 7B1 through 7B11 illustrate that the graphics hub device (GHD) of the present invention can be expressed in different ways in different MPGRS system architectures, it should be pointed out that, within each such system architecture, the function of the graphics hub device (GHD) is essentially the same, namely: (i) to interconnect the graphics-based application in memory space, with the cluster of GPUs or CPU-cores along the parallelized GPPLs; and (ii) to support the basic functionalities of the Distribution Module 402 and the Recomposition Module 403 in such MMPGRS system architectures.

Also, it should be noted that from a functional point of view, the Distribution Module resides before the cluster of GPUs or CPU-cores, delivering graphics commands and data (GCAD) for rendering (and thus functioning as a "pre GPU unit" of sorts), whereas the Recomposition Module functions logically after the cluster of GPUs, and collects post rendering data ("post GPU unit"). However, both the Distribution Module and the Recomposition Module typically share the same physical hardware unit (e.g. silicon chip). Various examples of the graphics hub device (GHD) of the present invention will now be described in great detail in FIGS. 7B1 through 7B11, for various types of MMGPRS system architectures indicated in FIG. 7A1-2.

At this juncture, the two major advantages should be pointed out when using the "graphics hub device" architecture approach of the present invention, illustrated in FIGS. 7B13 through 7B11.

The first advantage of the "graphics hub device" architecture is that the number of driven GPPLs in the MMPGRS is no longer limited by the number of buses provided by the memory bridge circuit employed in the CPU-based host computing system. The Interconnect Network 404 employed in the graphics hub device (GD) of the present invention allows (theoretically) for the connection of an unlimited number of GPUs to the Host CPU.

The second advantage of the "graphics hub device" architecture is the high performance achieved during image recomposition using the graphic hub device architecture, thereby eliminating the need of moving the Frame Buffer (FB) pixel data from multiple GPPLs to the host or CPU memory for merging, as it is done in the system architectures illustrated in FIGS. 7A2 through 7A7. During GPU-based Recomposition process of the present invention, the merge function is performed by fast, highly specialized hardware within the GPUs, independent of other tasks that are concurrently trying to access the main memory of the host computing system, which occurs in a multi-tasking system architectures illustrated in FIGS. 7A2 through 7A7.

Illustrative Embodiment of the MMPGRS of the Present Invention Having a System Architecture Capable of Parallelizing the Operation of Multiple GPUs Supported on External Graphics Cards Connected to Graphics Hub Device of the Present Invention In FIG. 7B1, the seventh illustrative embodiment of the MMPGRS of the present invention is shown embodied within the Hub Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized within a single graphics hub device (e.g. chip) that is connected to the North memory bridge of the host computing system via a PCI-express interface and to a cluster of external GPUs 410" via an interconnect, with the GPUs being driven in a parallelized manner by the modules of the multi-mode parallel graphics rendering subsystem, under the control of the AMCM, (ii) the Decomposition Submodule No. 1 transfers graphic commands and data (GCAD) to the Decomposition Submodule No. 2 via the North memory bridge circuit, (iii) the Decomposition Submodule No. 2 divides (i.e. splits up) the stream of graphic commands and data (GCAD) according to the required parallelization mode, operative at any instant in time, (iv) the Distribution Module 402" distributes graphic commands and data (GCAD) to the external GPUs, (v) the Recomposition Module 403" transfers composited pixel data (CPD) between the GPUs during the image recomposition stage, and (vi) finally recomposited pixel data sets are displayed as graphical images on one or more display devices connected to the primary GPU on the graphical display card which is connected to the graphics hub chip of the present invention via the interconnect 404".

Illustrative Embodiment of the MMPGRS of the Present Invention Having a System Architecture Capable of Parallelizing the Operation Multiple GPUs Supported on External Graphics Cards and Carrying Out Image Recomposition Across Two or More of Said GPUs In FIG. 7B2, the eighth illustrative embodiment of the MMPGRS of the present invention is shown embodied within the Hub+GPU-Recomposition Class of MMPGRS Architecture described in FIG. 7A1-2. As shown, the Automatic Mode Control Module (AMCM) 400 and the Decomposition Submodule No. 1 401' reside as a software package in the Host Memory Space (HMS) of the host computing system, while the Decomposition Submodule No. 2 401" and the Distribution Module 402" are realized within a single graphics hub device (e.g. chip) that is connected to the North bridge of the host computing system and a cluster of external GPUs 410", and the Recomposition Module 403" is implemented across two or more GPUs 715, 716, as taught in FIG. 7A7, and that all of the GPUs are driven in a parallelized manner, under the control of the AMCM. During operation, (i) the Decomposition Submodule No. 1 transfers graphic commands and data (GCAD) to the Decomposition Submodule No. 2 via the North bridge circuit, (ii) the Decomposition Submodule No. 2 divides (i.e. splits up) the stream of graphic commands and data (GCAD) according to the required parallelization mode, operative at any instant in time, (iii) the Distribution Module 402" distributes graphic commands and data (GCAD) to the external GPUs, (iv) the Recomposition Module 403", implemented within the primary GPU 715, transfers composited pixel data (CPD) between the GPUs during the image recomposition stage, and (v) finally recomposited pixel data sets (recomposited within the vertex and/or fragment shaders of the primary GPU) are displayed as graphical images on one or more display devices connected to the primary GPU on the graphical display card(s), which are connected to the graphics hub chip of the present invention.

Illustrative Embodiment of the MMPGRS of the Present Invention Having a System Architecture Capable of Parallelizinz the Operation Multiple GPUs Supported on an Integrated Graphics Device (IGD) Within a North Memory Bridge Chip In FIG. 7B3, the ninth illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the North memory bridge circuit and having a plurality of GPUs being driven in a parallelized manner by the modules of the multi-mode parallel graphics rendering subsystem, under the control of the AMCM. During operation, (i) the Decomposition Submodule No. 1 transfers graphic commands and data (GCAD) to the Decomposition Submodule No. 2 via the North bridge circuit, (ii) the Decomposition Submodule No. 2 divides (i.e. splits up) the stream of graphic commands and data (GCAD) according to the required parallelization mode, operative at any instant in time, (iii) the Distribution Module 402" distributes graphic commands and data (GCAD) to the internal GPUs via the interconnect network, (iv) the Recomposition Module 403" transfers composited pixel data (CPD) between the GPUs during the image recomposition stage, and (v) finally recomposited pixel data sets are displayed as graphical images on one or more display devices connected to the external graphical display card, or the primary GPU in the IGB, as shown.

Illustrative Embodiment of the MMPGRS of the Present Invention Having a System Architecture Capable of Parallelizing the Operation Multiple GPUs Supported on an Integrated Graphics Device (IGD) Within a South Bridge Chip In FIG. 7B4, the tenth illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the South bridge circuit of the host computing system and having a plurality of GPUs driven in a parallelized manner by the modules of the multi-mode parallel graphics rendering subsystem, under the control of the AMCM. During operation, (i) the Decomposition Submodule No. 1 transfers graphic commands and data (GCAD) to the Decomposition Submodule No. 2 via the communication interfaces of the North and South bridge circuits, (ii) the Decomposition Submodule No. 2 divides (i.e. splits up) the stream of graphic commands and data (GCAD) according to the required parallelization mode, operative at any instant in time, (iii) the Distribution Module 402" distributes graphic commands and data (GCAD) to the external OPUs, (iv) the Recomposition Module 403" transfers composited pixel data (CPD) between the GPUs during the image recomposition stage, and (v) finally recomposited pixel data sets are displayed as graphical images on one or more display devices connected to the external graphical display card, or the primary GPU in the IGB, as shown.

Illustrative Embodiment of the MMPGRS of the Present Invention Having a System Architecture Capable of Parallelizing the Operation Multiple GPUs Supported on an Integrated Graphics Device (IGD) Within a South Bridge Chip, Wherein Recomposition is Implemented Across Two or More GPUs In FIG. 7B4-1, the eleventh illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401" and the Distribution Module 402" 403" are realized (as a graphics hub) in an integrated graphics device (IGD) within the South bridge circuit of the host computing system and having a plurality of GPUs driven in a parallelized manner by the modules of the multi-mode parallel graphics rendering subsystem, under the control of the AMCM, while the Recomposition Module 403" is implemented across two or more GPUs 715, 716. During operation, (i) the Decomposition Submodule No. 1 transfers graphic commands and data (GCAD) to the Decomposition Submodule No. 2 via the communication interfaces of the North and South bridge circuits, (ii) the Decomposition Submodule No. 2 divides (i.e. splits up) the stream of graphic commands and data (GCAD) according to the required parallelization mode, operative at any instant in time, (iii) the Distribution Module 402" distributes graphic commands and data (GCAD) to the external GPUs, (iv) the Recomposition Module 403", implemented at the Primary GPU, transfers composited pixel data (CPD) between the GPUs during the image recomposition stage, and (v) finally recomposited pixel data sets are displayed as graphical images on one or more display devices connected to the external graphical display card, or the primary GPU in the IGB, as shown.

Illustrative Embodiment of the MMPGRS of the Present Invention Having a System Architecture Capable of Parallelizing the Operation of Multiple GPUs Supported on an Integrated Graphics Device (IGD) Within a North Memory Bridge Chip, and GPUs on an External Graphics Card In FIG. 7B5, the twelfth illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the North memory bridge of the host computing system and having multiple GPUs being driven with a single GPU on an external graphics card in a parallelized manner by the modules of the multi-mode parallel graphics rendering subsystem, under the control of the AMCM. During operation, (i) the Decomposition Submodule No. 1 transfers graphics commands and data (GCAD) to the Decomposition Submodule No. 2 via the North bridge circuit, (ii) the Decomposition Submodule No. 2 divides (i.e. splits up) the stream of graphic commands and data (GCAD) according to the required parallelization mode, operative at any instant in time, (iii) the Distribution Module 402" distributes graphic commands and data (GCAD) to the external GPUs, (iv) the Recomposition Module 403" transfers composited pixel data (CPD) between the GPUs during the image recomposition stage, and (v) finally recomposited pixel data sets are displayed as graphical images on one or more display devices connected to the external graphical display card, or the primary GPU in the IGB, as shown.

Illustrative Embodiment of the MMPGRS of the Present Invention Having a System Architecture Capable of Parallelizinz the Operation of a Single GPU Supported on an Integrated Graphics Device (IGD) Within a South Bridge Chip, and Multiple GPUs Supported on an External Graphics Card In FIG. 7B6, the thirteenth illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) within the South bridge circuit of the host computing system and having multiple GPUs driven with a single GPU on an external graphics card in a parallelized manner by the modules of the multi-mode parallel graphics rendering subsystem, under the control of the AMCM. During operation, (i) the Decomposition Submodule No. 1 transfer graphic commands and data (GCAD) to the Decomposition Submodule No. 2 via the North and South bridge circuits, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the external GPUs, (iv) the Recomposition Module 403" transfers composited pixel data (CPD) between the GPUs during the image recomposition stage, and (v) finally recomposited pixel data sets are displayed as graphical images on one or more display devices connected to the external graphics card, or the primary GPU in the IGB, as shown.

Illustrative Embodiment of the MMPGRS of the Present Invention Having a System Architecture Capable of Parallelizing the Operation of a Single GPU Supported on an Integrated Graphics Device (IGD) Within a South Bridge Chip, and Multiple GPUs Supported on an External Graphics Card with the Recomposition Module Implemented Across Two or More GPUs In FIG. 7B6-1, the fourteenth illustrative embodiment of the MMPGRS of the present invention is shown embodied within the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401" and Distribution Module 402" are realized (as a graphics hub) in an integrated graphics device (IGD) within the South bridge circuit of the host computing system and having multiple GPUs driven with a single GPU on an external graphics card in a parallelized manner by the modules of the multi-mode parallel graphics rendering subsystem, under the control of the AMCM, while the Recomposition Module 403" is implemented across two or more GPUs 715, 716. During operation, (i) the Decomposition Submodule No. 1 transfer graphic commands and data (GCAD) to the Decomposition Submodule No. 2 via the North and South bridge circuits, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the external GPUs, (iv) the Recomposition Module 403" transfers composited pixel data (CPD) between the GPUs during the image recomposition stage, and (v) finally recomposited pixel data sets are displayed as graphical images on one or more display devices connected to the external graphics card, or the primary GPU in the IGB, as shown.

Illustrative Embodiment of the MMPGRS of the Present Invention Having a System Architecture Employing an Integrated Graphics Device (IGD) within a Bridge Chip Capable of Parallelizing the Operation of Multiple GPUs Supported on Multiple External Graphics Cards, or Controlling a Single GPU Within the IGD of the Present Invention for Driving an Display Device Connected Thereto In FIG. 7B7, the fifteenth illustrative embodiment of the MMPGRS of the present invention is shown embodied within the following the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401", Distribution Module 402" and Recomposition Module 403" are realized (as a graphics hub) in an integrated graphics device (IGD) realized within the North memory bridge chip of the host computing system, and driving (i) multiple GPUs on multiple external graphics cards in a parallelized manner by the modules of the multi-mode parallel graphics rendering subsystem, under the control of the AMCM, or alternatively (ii) controlling a single GPU aboard the IGD for driving a display device connected to the IGD via a display interface. During operation, (i) the Decomposition Submodule No. 1 transfers graphic commands and data (GCAD) to the Decomposition Submodule No. 2 via the North bridge circuit, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the internal GPU and external GPUs, (iv) the Recomposition Module 403" transfers composited pixel data (CPD) between the GPUs during the image recomposition stage, and (v) finally recomposited pixel data sets are displayed as graphical images on one or more display devices connected to one of the external graphic cards or the primary GPU in the IGB, as shown.

Illustrative Embodiment of the MMPGRS of the Present Invention Having a System Architecture Employing an Integrated Graphics Device (IGD) within a Bridge Chip Capable of (i) Parallelizing the Operation of Multiple GPUs Supported on Multiple External Graphics Cards with the Recomposition Module Implemented Across Two or More GPUs, or (ii) Controlling a Single GPU within the IGD of the Present Invention for Driving an Display Device Connected Thereto In FIG. 7B7-1, the sixteenth illustrative embodiment of the MMPGRS of the present invention is shown embodied within the following the Chipset Class of MMPGRS Architecture described in FIG. 7A1-2. As shown, the Automatic Mode Control Module (AMCM) 400 and the Decomposition Submodule No. 1 401' reside as a software package in the Host or CPU Memory Space (HMS) while the Decomposition Submodule No. 2 401" and Distribution Module 402" are realized (as a graphics hub) in an integrated graphics device (IGD) realized within the North memory bridge chip of the host computing system, and driving (i) multiple GPUs on multiple external graphics cards in a parallelized manner by the modules of the multi-mode parallel graphics rendering subsystem, under the control of the AMCM, or alternatively (ii) controlling a single GPU aboard the IGD for driving a display device connected to the IGD via a display interface, while the Recomposition Module 403" is implemented across two or more GPUs (715, 716). During operation, (i) the Decomposition Submodule No. 1 transfers graphic commands and data (GCAD) to the Decomposition Submodule No. 2 via the North bridge circuit, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the internal GPU and external GPUs, (iv) the Recomposition Module 403" transfers composited pixel data (CPD) between the GPUs during the image recomposition stage, and (v) finally recomposited pixel data sets are displayed as graphical images on one or more display devices connected to one of the external graphic cards or the primary GPU in the IGB, as shown.

Illustrative Embodiment of the MMPGRS of the Present Invention Having a System Architecture Employing a CPU/GPU Fusion-Type Chip Capable of Parallelizing the Operation of an Internal GPU and Multiple GPUs Supported on an External Graphics Card In FIG. 7B8-1, the seventeenth illustrative embodiment of the MMPGRS of the present invention is shown embodied within the following the CPU/GPU Fusion Class of MMPGRS Architecture described in FIG. 7A1-2. As shown, the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) on the die of a hybrid CPU/GPU fusion-architecture chip within the host computing system and having a single GPU driven with one or more GPUs on an external graphics card (connected to the CPU/GPU chip) in a parallelized manner by the modules of the multi-mode parallel graphics rendering subsystem under the control of the AMCM. During operation, (i) the Decomposition Submodule No. 1 transfers graphics commands and data (GCAD) to the Decomposition Submodule No. 2, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the internal GPU and external GPUs, (iv) the Recomposition Module 403" transfers composited pixel data (CPD) between the GPUs during the image recomposition stage, and (v) finally recomposited pixel data sets are displayed as graphical images on one or more display devices 106 connected to the external graphics card connected to the hybrid CPU/GPU chip via a PCI-express interface.

Illustrative Embodiment of the MMPGRS of the Present Invention Having a System Architecture Employing a CPU/GPU Fusion-Type Chip Capable of Parallelizing the Operation of Multiple Internal GPUs and Multiple GPUs Supported on an External Graphics Card In FIG. 7B8-2, the eighteenth illustrative embodiment of the MMPGRS of the present invention is shown embodied within the following the CPU/GPU Fusion Class of MMPGRS Architecture described in FIG. 7A1-2. As shown, the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) on the die of a multi-core CPU chip within the host computing system and having multiple CPU cores, some of which implement multiple soft parallel graphics pipelines ("soft GPUs") driven in a parallelized manner by the modules of the multi-mode parallel graphics rendering subsystem under the control of the AMCM. During operation, (i) the Decomposition Submodule No. 1 transfers graphics commands and data (GCAD) to the Decomposition Submodule No. 2 via the North memory bridge circuit and interconnect network within the multi-core CPU chip, (ii) the Decomposition Submodule No. 2 divides (i.e. splits up) the stream of graphic commands and data (GCAD) according to the required parallelization mode, operative at any instant in time, (iii) the Distribution Module 402" uses the crossbar switch (i.e. interconnect) on the processor die to distribute the graphic commands and data (GCAD) to the multiple soft parallel graphics pipelines (implemented by the multiple CPU cores), (v) the Recomposition Module 403" transfers composited pixel data (CPD) between the multiple CPU cores during the image recomposition stage, and (vi) finally recomposited pixel data sets are displayed as graphical images on one or more display devices 106 connected to the North memory bridge chip via a display interface.

Illustrative Embodiment of the MMPGRS of the Present Invention Having a System Architecture Employing a CPU/GPU Fusion-Type Chip Capable of Parallelizing the Operation of Multiple Internal GPUs and Multiple GPUs Supported on an External Graphics Card, with the Recomposition Module Being Implemented Across Two of More of Said GPUs In FIG. 7B8-3 the nineteenth illustrative embodiment of the MMPGRS of the present invention is shown embodied within the following the CPU/GPU Fusion Class of MMPGRS Architecture described in FIG. 7A1-2. As shown, (i) the Automatic Mode Control Module (AMCM) 400 and the Decomposition Submodule No. 1 401' reside as a software package in the Host Memory Space (HMS), (ii) the Decomposition Submodule No. 2 401" and Distribution Module 402" are realized (as a graphics hub) on the die of a hybrid CPU/GPU fusion-architecture chip within the host computing system and having multiple GPUs 1242" driven with one or more GPUs on an external graphics card 205 (connected to the CPU/GPU chip) in a parallelized manner by the modules of the multi-mode parallel graphics rendering subsystem under the control of the AMCM, and (iii) the Recomposition Module 403" is implemented across two or more GPUs 715, 716 provided on the CPU/GPU fusion chip die and external graphics cards. During operation, (iv) the Decomposition Submodule No. 1 transfers graphics commands and data (GCAD) to the Decomposition Submodule No. 2, (v) the Decomposition Submodule No. 2 divides (i.e. splits up) the stream of graphic commands and data (GCAD) according to the required parallelization mode, operative at any instant in time, (vi) the Distribution Module 402" uses the crossbar switch (i.e. interconnect) on the processor die to distribute the graphic commands and data (GCAD) to the internal GPUs and external GPUs, (vii) the Recomposition Module 403" transfers composited pixel data (CPD) between the GPUs during the image recomposition stage, and (viii) finally recomposited pixel data sets are displayed as graphical images on one or more display devices 106 connected to the external graphics card connected to the hybrid CPU/GPU chip via a PCI-express interface.

Illustrative Embodiment of the MMPGRS of the Present Invention Having a System Architecture Capable of Parallelizing the Operation of Multiple Graphics Pipelines Implemented on a Multi-Core CPU Chip of the Present Invention, and Driving a Display Device Connected to the North Memory Bridge Chip of the Host Computing System In FIG. 7B9-1, the twentieth illustrative embodiment of the MMPGRS of the present invention is shown embodied within the following the Multicore CPU Class of MMPGRS Architecture described in FIG. 7A1-2. As shown, the Automatic Mode Control Module (AMCM) 400 and the Decomposition Submodule No. 1 401' reside as a software package in the Host Memory Space (HMS) while the Decomposition Submodule No. 2 401", Distribution Module 402" and Recomposition Module 403" are realized (as a graphics hub) on the die of a multi-core CPU chip within the host computing system. As shown, some of the CPU cores are used to implement multiple soft parallel graphics pipelines ("soft GPUs") that are driven in a parallelized manner by the modules of the multi-mode parallel graphics rendering subsystem under the control of the AMCM. During operation, (i) the Decomposition Submodule No. 1 transfers graphics commands and data (GCAD) to the Decomposition Submodule No. 2 via the North memory bridge circuit and interconnect network within the multi-core CPU chip, (ii) the Decomposition Submodule No. 2 divides (i.e. splits up) the stream of graphic commands and data (GCAD) according to the required parallelization mode, operative at any instant in time, (iii) the Distribution Module 402" uses the crossbar switch (i.e. interconnect) on the processor die to distribute the graphic commands and data (GCAD) to the multiple soft parallel graphics pipelines (implemented by the multiple CPU cores), (iv) the Recomposition Module 403" transfers composited pixel data (CPD) between the multiple CPU cores during the image recomposition stage, and (v) finally recomposited pixel data sets are displayed as graphical images on one or more display devices 106 connected to the North memory bridge chip via a display interface implemented therein, as shown.

Illustrative Embodiment of the MMPGRS of the Present Invention Having a System Architecture Capable of Parallelizing the Operation of Multiple Soft Graphics Pipelines Implemented on a Multi-Core CPU Chip, and One or More GPUs Supported on an External Graphics Card Interfaced to the Multi-Core CPU Chip In FIG. 7B9-2, the twenty-first illustrative embodiment of the MMPGRS of the present invention is shown embodied within the following the Multicore CPU Class of MMPGRS Architecture described in FIG. 7A1-2. The shown, the Automatic Mode Control Module (AMCM) 400 and the Decomposition Submodule No. 1 401' resides as a software package 711 in the Host Memory Space (HMS) while the Decomposition Submodule No. 2 401", the Distribution Module 402" and the Recomposition Module 403" are realized as a graphics hub within a multi-core CPU chip employed within the host computing system, having a plurality of CPU cores, some of which implement multiple soft graphics pipelines which, along with multiple GPUs supported on an external graphics card 205, are driven in a parallelized manner by the modules of the multi-mode parallel graphics rendering subsystem under the control of the AMCM. During operation, (i) the Decomposition Submodule No. 1 transfers graphics commands and data (GCAD) to the Decomposition Submodule No. 2 via the interconnects within the North memory bridge chip and the multi-core CPU chip, (ii) the Decomposition Submodule No. 2 divides (i.e. splits up) the stream of graphic commands and data (GCAD) according to the required parallelization mode, operative at any instant in time, (iii) the Distribution Module 402" uses the interconnect (i.e. crossbar switch) in the multi-core CPU chip to distribute the graphic commands and data (GCAD) to the multiple soft graphics pipelines (e.g. soft GPUs) and the GPUs on the external graphics card 205, and (iv) the Recomposition Module 403" transfers composited pixel data (CPD) between the soft graphics pipelines on the multi-core CPU chip and hard GPUs on the external graphics card during the image recomposition stage, and (v) finally recomposited pixel data sets are displayed as graphical images on one or more display devices 106 connected to the external graphics card which is connected to the multi-core CPU chip via a PCI-express interface.

Illustrative Embodiment of the MMPGRS of the Present Invention Having a System Architecture Employing a Graphics Hub Device Capable of Parallelizing the Operation of Multiple GPUs Supported on a Game Console Board In FIG. 7B10, the twenty-second illustrative embodiment of the MMPGRS of the present invention is shown embodied within the following the Game Console Class of MMPGRS Architecture described in FIG. 7A1-2. As shown, the Automatic Mode Control Module (AMCM) 400 and the Decomposition Submodule No. 1 401' are realized as a software package 711 within the Host Memory Space (HMS), while the Decomposition Submodule No. 2 401", the Distribution Module 402" and the Recomposition Module 403' are realized as a graphics hub semiconductor chip within the game console system in which multiple GPUs are driven in a parallelized manner by the modules of the multi-mode parallel graphics rendering subsystem under the control of the AMCM. During operation, (i) the Decomposition Submodule No. 1 transfers graphics commands and data (GCAD) to the Decomposition Submodule No. 2, via the memory controller on the multi-core CPU chip and the interconnect in the graphics hub chip of the present invention, (ii) the Decomposition Submodule No. 2 divides (i.e. splits up) the stream of graphic commands and data (GCAD) according to the required parallelization mode, operative at any instant in time, (iii) the Distribution Module 402" distributes the graphic commands and data (GCAD) to the multiple GPUs, (iv) the Recomposition Module 403" transfers composited pixel data (CPD) between the multiple GPUs during the image recomposition stage, and (v) finally recomposited pixel data sets (recomposited within the vertex and/or fragment shaders of the primary GPU) are displayed as graphical images on one or more display devices 106 connected to the primary GPU 715 via a analog display interface.

Illustrative Embodiment of the MMPGRS of the Present Invention Having a System Architecture Employing a Graphics Hub Device Capable of Parallelizing the Operation of Multiple GPUs Supported on a Game Console Board, with the Recomposition Module Realized Across Two or More GPUs In FIG. 7B11, the twenty-third illustrative embodiment of the MMPGRS of the present invention is shown embodied within the following the Game Console Class of MMPGRS Architecture described in FIG. 7A1-2. As shown, the Profiling and Control Automatic Mode Control Module (AMCM) 400 and the Decomposition Submodule No. 1 401' are realized as a software package 711 within the Host Memory Space (HMS) of the host computing system while the Decomposition Submodule No. 2 401" and Distribution Module 402' are realized as a graphics hub semiconductor chip within the game console system in which multiple GPUs are driven in a parallelized manner by the modules of the multi-mode parallel graphics rendering subsystem under the control of the AMCM, while the Recomposition Module 403' is implemented across two or more GPUs 715, 716. During operation, (i) the Decomposition Submodule No. 1 transfers graphics commands and data (GCAD) to the Decomposition Submodule No. 2, via the memory controller on the multi-core CPU chip and the interconnect in the graphics hub chip of the present invention, (ii) the Decomposition Submodule No. 2 divides (i.e. splits up) the stream of graphic commands and data (GCAD) according to the required parallelization mode, operative at any instant in time, (iii) the Distribution Module 402' distributes the graphic commands and data (GCAD) to the multiple GPUs, (iv) the Recomposition Module 403', realized primarily within the substructure of the primary GPU, transfers composited pixel data (CPD) between the multiple GPUs during the image recomposition stage, and (v) finally recomposited pixel data sets (recomposited within the vertex and/or fragment shaders of the primary GPU) are displayed as graphical images on one or more display devices 106 connected to the primary GPU 715 via an analog display interface.

Various Options for Implementing the MMPGRS of the Present Invention

There are numerous options for implementing the various possible designs for the MMPGRS of the present invention taught herein. Also, as the inventive principles of the MMPGRS can be expressed using software and hardware based system architectures, the possibilities for the MMPGS are virtually endless.

In FIGS. 8A through 11D1, there is shown a sampling of the illustrative implementations that are possible for the diverse MMPGRS designs of the present invention disclosed, taught and suggested herein.

FIG. 8A shows an illustrative implementation of the MMPGRS of the present invention following the Hub Class of MMPGRS Architecture described in FIG. 7A1-2. As shown in this MMGPRS implementation, (i) the AMCM and Decomposition Submodule No. 1 are implemented as a software-package 701 within host memory space (HMS) of the host computing system, (ii) multiple discrete graphic cards are connected to the bridge circuit of the host computing system by way of a hardware-based graphics hub chip of the present invention 404", 402", 403", 404", (iii) hardware-based Distribution and Recomposition Modules 402" and 403" are realized on the hardware-based graphics hub chip of the present invention, and (iv) a graphics display device is connected to the primary GPU.

FIG. 8A1 shows a first illustrative embodiment of the MMPGRS implementation of FIG. 8A, wherein a possible packaging of the Hub architecture of the present invention employs an assembly comprising a Hub-extender card 811 carrying multiple (e.g. dual) graphics cards 812, 813 supported on a motherboard 814 within the host computing system.

FIG. 8A2 shows a second illustrative embodiment of the MMPGRS implementation of FIG. 8A, wherein a possible packaging of the Hub architecture of the present invention employs an external box containing a Hub chip of the present invention mounted on a PC board, that is connected to the motherboard of the host computing system via a wire harness or the like, and supporting a plurality of graphics cards 813 that are connected to the Hub chip.

FIG. 8A3 shows a third illustrative embodiment of the MMPGRS implementation of FIG. 8A, wherein a possible packaging of the Hub architecture of the present invention employs a graphics hub chip of the present invention mounted on the motherboard 814 of the host computing system, which supports multiple graphics cards 813 with multiple GPUs.

FIG. 8B shows an illustrative implementation of the MMPGRS of the present invention following the Hub+GPU-Recomposition Class of MMPGRS Architecture described in FIG. 7A1-2. As shown in this MMPGRS implementation, (i) the AMCM and Decomposition Submodule No. 1 are implemented as a software-package 701 within host memory space (HMS) of the host computing system, (ii) multiple discrete graphic cards are connected to a bridge chipset on the host computing system by way of a hardware-based graphics hub chip realizing the Decomposition No. 2 Submodule 401" and the Distribution Module 402", (iii) the Recomposition Module 403" is implemented across two or more GPUs 715, 716, and (iv) a graphics display device is connected to the primary GPU.

FIG. 8B1 shows a first illustrative embodiment of the MMPGRS implementation of FIG. 8B, wherein a possible packaging of the Hub+GPU Recomposition architecture of the present invention employs an assembly comprising a Hub-extender card 811 carrying multiple (e.g. dual) graphics cards 812, 813 supported on a motherboard 814 within the host computing system.

FIG. 8B2 shows a second illustrative embodiment of the MMPGRS implementation of FIG. 8B, wherein a possible packaging of the Hub architecture of the present invention employs an external box containing a Hub chip of the present invention mounted on a PC board, that is connected to the motherboard of the host computing system via a wire harness or the like, and supporting a plurality of graphics cards 813 that are connected to the Hub chip.

FIG. 8B3 shows a third illustrative embodiment of the MMPGRS implementation of FIG. 8B, wherein a possible packaging of the Hub architecture of the present invention employs a graphics hub chip of the present invention mounted on the motherboard 814 of the host computing system, which supports multiple graphics cards 813 with multiple GPUs.

FIG. 8C shows an illustrative embodiment of the MMPGRS of the present invention following the HM Class of MMPGRS Architecture described in FIG. 7A1-2. As shown in this MMPGRS implementation, (i) the AMCM, Decomposition, Distribution and Recomposition Modules are implemented as a software-package 701 within host memory space (HMS) of the host computing system, (ii) multiple discrete GPUs on one or more graphics cards are connected to the bridge circuit on the host computing system, and (iii) a graphics display device is connected to the primary GPU.

FIG. 8C1 shows a first illustrative embodiment of the MMPGRS implementation of FIG. 8C, wherein discrete multiple graphics cards 851, each supporting at least a single GPU, are interfaced with the bridge circuit chipset of the CPU motherboard by way of a PCI-express or like interface.

FIG. 8C2 shows a second illustrative embodiment of the MMPGRS implementation of FIG. 8C, wherein multiple GPUs are realized on a single graphics card 852 which is interfaced to bridge circuit on the CPU motherboard by way of a PCI-express or like interface.

FIG. 8C3 shows a third illustrative embodiment of the MMPGRS implementation of FIG. 8C, wherein multiple discrete graphics cards 851, each supporting at least a single GPU, are interfaced with the bridge circuit on a board within an external box 821 that is interfaced to the motherboard within the host computing system.

FIG. 8D shows an illustrative embodiment of the MMPGRS of the present invention following the Hub+GPU-Recomposition Class of MMPGRS Architecture described in FIG. 7A1-2. As shown in this MMPGRS implementation, (i) the AMCM, Decomposition Submodule No. 1 and the Distribution Module are implemented as a software-package 701 within host memory space (HMS) of the host computing system, (ii) multiple discrete GPUs on one or more external graphics cards are connected to the bridge circuit of the host computing system, (iii) the Recomposition Module 403" is implemented across two or more GPUs, and (iv) a graphics display device is connected to the primary GPU.

FIG. 8D1 shows a first illustrative embodiment of the MMPGRS implementation of FIG. 8D, wherein discrete multiple graphics cards 851, each supporting at least a single GPU, are interfaced with the bridge circuit chipset of the CPU motherboard by way of a PCI-express or like interface.

FIG. 8D2 shows a second illustrative embodiment of the MMPGRS implementation of FIG. 8D, wherein multiple GPUs are realized on a single graphics card 852 which is interfaced to bridge circuit on the CPU motherboard by way of a PCI-express or like interface.

FIG. 8D3 shows a third illustrative embodiment of the MMPGRS implementation of FIG. 8D, wherein multiple discrete graphics cards 851, each supporting at least a single GPU, are interfaced with the bridge circuit on a board within an external box 821 that is interface to the motherboard within the host computing system.

FIG. 9A shows an illustrative implementation of the MMPGRS of the present invention following the Hub Class of MMPGRS Architecture described in FIG. 7A1-2. As shown in this MMPGRS implementation, (i) the AMCM and Decomposition Submodule No. 1 are implemented as a software package 711 on the host memory space (HMS), (ii) multiple GPUs (i.e. Primary GPU 715 and Secondary GPUs 716) are assembled on a external graphics card 902 which connects the GPUs to the bridge circuit on the host computing system by way of a hardware-based graphics hub chip implementing the Decomposition Submodule No. 2 401", the Distribution Module 402" and the Recomposition Module 403", and (iii) a graphics display device is connected to the primary GPU.

FIG. 9A1 shows an illustrative embodiment of the MMPGRS of FIG. 9A, wherein multiple GPUs (715, 716) and hardware-based Decomposition Submodule No. 2 401", Distribution Module 402" and the Recomposition Modules 403" are implemented as a graphics hub chip or chipset 401", 402', 403," and 404" on a single graphics display card 902, which is interfaced to the bridge circuit on the motherboard 814 within the host computing system.

FIG. 10A shows an illustrative implementation of the MMPGRS of the present invention following the Hub Class of MMPGRS Architecture described in FIG. 7A1-2. As shown in this MMGPRS implementation, (i) the AMCM and Decomposition Submodule No. 1 are implemented as a software package 711 on the host memory space (HMS), (ii) a single SOC-based graphics chip 1001 is mounted on a single graphics card 1002 interfaced with a bridge circuit on the motherboard 1002, and supporting multiple GPUs (i.e. the primary GPU and secondary GPUs), (iii) hardware-based Decomposition Submodule No. 2, the Distribution Module and the Recomposition Module are implemented on the SOC-based graphics chip 1001, and (iv) a graphics display device is connected to the primary GPU.

FIG. 10A shows a possible packaging of the SOC-based graphics hub chip (101) depicted in FIG. 10A, wherein multiple GPUs 715, 716 and hardware-based Decomposition Submodule 401", Distribution Module 402", and Recomposition Module (4-3") are realized on a single SOC implementation 1001 mounted on a single graphics card 1002.

FIG. 10B shows an illustrative implementation of the MMPGRS of the present invention following the Hub+GPU-Recomposition Class of MMPGRS Architecture described in FIG. 7A1-2. As shown in this MMPGRS implementation, (i) the AMCM and Decomposition Submodule No. 1 are implemented as a software package 711 on the host memory space (HMS), (ii) a single SOC-based graphics chip 1003 is mounted on a single graphics card 1002 interfaced with a bridge circuit on the motherboard 1002, and supporting multiple GPUs (i.e. the primary GPU and secondary GPUs), (iii) hardware-based Decomposition Submodule No. 2 and the Distribution Module are implemented on the SOC-based graphics hub chip 1001, (iv) the Recomposition Module is implemented across two or more GPUs 715, 716, and (v) a graphics display device is connected to the primary GPU by way of a display interface implemented on the SOC-based graphics hub chip.

FIG. 10B1 shows a possible packaging of the SOC-based graphics hub chip 101 depicted in FIG. 10B, wherein multiple GPUs 715, 716 and hardware-based Decomposition Submodule 401", Distribution Module 402" are implemented in single SOC implementation 1003 mounted on a single graphics card 1002, with the Recomposition Module (4-3") being implemented across two or more of the GPUs (e.g. on the same piece of silicon).

FIG. 10C shows an illustrative implementation of the MMPGRS of the present invention following the HMS+GPU-Recomposition Class of MMPGRS Architecture described in FIG. 7A1-2. IN this MMPGRS implementation, (i) the AMCM, Decomposition Module and Distribution Module are implemented as a software package 701 on the host memory space (HMS), (ii) a single multi-GPU chip 1031 is mounted on a single graphics card 1002 that is interfaced with a bridge circuit on the motherboard, and supporting multiple GPUs (i.e. the primary GPU and secondary GPUs), (iii) the Recomposition Module is implemented within two or more GPU, and (iv) a graphics display device is connected to the primary GPU by way of a display interface implemented on the multi-GPU chip.

FIG. 10C1 shows a possible packaging of the multi-GPU chip (1031) depicted in FIG. 10C, wherein multiple GPUs 715, 716 and Recomposition Module 403" is implemented across two or more GPUs 715, 716 of a multi-GPU chip (1031).

FIG. 11A shows an illustrative implementation of the MMPGRS following the Chipset Class of MMPGRS Architecture described in FIG. 7A1-2. In this MMPGRS implementation, (i) the AMCM and Decomposition Submodule No. 1 are realized as a software package 711 within the host memory space (HMS) of the host computing system, (ii) plurality of GPUs 852 on one or more external graphics cards 851 are connected to the bridge circuit on the host computing platform, (iii) an integrated graphics device (IGD) 1101, supporting hardware-based Decomposition Submodule No. 2, the Distribution Module 402" and Recomposition Module 403", are implemented within the bridge circuit 1101 on the motherboard 814 of the host computing system, and (iv) a display device is interfaced to the primary GPU by way of a PCI-express interface or the like.

FIG. 11A1 shows a first illustrative embodiment of the Chipset MMPGRS implementation of FIG. 1A, wherein multiple discrete graphics cards 851, each supporting at least a single GPU, are interfaced with the bridge circuit on a board within an external box 821 that is interface to the motherboard within the host computing system.

FIG. 11A1 shows a second illustrative embodiment of the Chipset MMPGRS implementation of FIG. 11A, wherein discrete multiple graphics cards 851, each supporting at least a single GPU, are interfaced with the bridge circuit chipset of the CPU motherboard by way of a PCI-express or like interface.

FIG. 11A3 shows a third illustrative embodiment of the Chipset MMPGRS implementation of FIG. 11A, wherein multiple GPUs are realized on a single graphics card 852 which is interfaced to the bridge circuit on the CPU motherboard by way of a PCI-express or like interface.

FIG. 11B shows an illustrative implementation of the MMPGRS following the CPU/GPU Fusion Class of MMPGRS Architecture or Multi-Core Class MMPGRS Architecture described in FIG. 7A1-2. As shown in this MMPGRS implementation, (i) a CPU/GPU fusion-architecture chip or a multi-core CPU chip is mounted on the motherboard of a host computing system having memory and North and South bridge circuits, (ii) AMCM and Decomposition Submodule No. 1 are realized as a software package 701 within the host memory space (HMS) of the host computing system while Decomposition Submodule No. 2, the Distribution Module and the Recomposition Module are realized/implemented on the die of the CPU/GPU fusion-architecture chip or the multi-core CPU chip, and (iii) multiple GPUs on external graphic cards or elsewhere, are interfaced to the CPU/GPU fusion-architecture chip or the multi-core CPU chip, by way of a PCI-express or like interface, and (iv) a display device is interfaced to the primary GPU by way of a PCI-express interface or the like.

FIG. 11B1 shows a first illustrative embodiment of the CPU/GPU Fusion or Multi-Core MMPGRS implementation of FIG. 11B, wherein a CPU/GPU Fusion or Multi-Core chip is used to drive an assemble of graphic cards or GPUs on one or more external graphics cards 851.

FIG. 11B2 shows a second illustrative embodiment of the Chipset MMPGRS implementation of FIG. 11B, wherein a CPU/GPU Fusion or Multi-Core chip is used to drive an assemble of GPUs on a single external graphics card 852.

FIG. 11B3 shows a third illustrative embodiment of the Chipset MMPGRS implementation of FIG. 11B, wherein a CPU/GPU Fusion or Multi-Core chip is used to drive only an assemble of internal GPUs on the CPU/GPU Fusion or Multi-Core chip.

FIG. 11C shows an illustrative implementation of the MMPGRS following the Game Console Class of MMPGRS Architecture described in FIG. 7A1-2. As shown in this MMPGRS implementation, (i) the AMCM 400 and Decomposition Submodule No. 1 401' are realized as a software package within the host memory space (HMS) of the game console system, (ii) a graphics hub chip 401'', 402'', 403'', 404'', mounted on the PC board of the game console system, implements the Decomposition Submodule No. 2 401'', the Distribution Module 402', the Recomposition Module 403' as well as the interconnect network (e.g. crossbar switch) 404'', (iii) multiple GPUs on the PC board of the game console system are interfaced to Distribution and Recomposition Modules by way of the interconnect network 404'' within the graphics hub chip, and optionally, the Recomposition Module can be implemented across two or more GPUs 715, 716, and (iv) a display device 106 is interfaced to the primary GPU by way of an analog display interface or the like.

FIG. 11C1 shows an illustrative embodiment of the Game Console MMPGS implementation of FIG. 11D, showing its controller in combination with its game console unit.

The MMPGRS of the Present Invention Deployed in Client Machines on Multi-User Computer Networks In the illustrative embodiments described above, the graphics-based applications (e.g. games, simulations, business processes, etc.) supporting 3D graphics processes which are rendered using the parallel computing principles of the present invention, have been shown as being supported on single CPU-based host computing platforms, as well as multi-core CPU platforms. It is understood, however, that the parallel graphics rendering processes carried out using the principles of the present invention can stem from applications supported on (i) multi-CPU host computing platforms, as well as (ii) single and multiple CPU based network-based application servers.

In the case of network-based application servers, streams of graphics commands and data (GCAD) pertaining to the graphics-based application at hand can be generated by application server(s) in response to one or more multiple users (e.g. players) who may be either local or remote with respect to each other. The application servers would transmit streams of graphics commands and data to the participants (e.g. users or players) of a multi-player game. The client-based computing machine of each user would embody one form of the MMPGRS of the present invention, and receive the graphics commands and data streams support the client-side operations of either (i) a client-server based application (running at the remote application servers), and/or (ii) a Web-based application generated from http (Web) servers interfaced to application servers, driven by Database servers, as illustrated in FIGS. 12A and 12B. In such multi-user computer network environments, the MMPGRS aboard each client machine on the network would support its parallel graphics rendering processes, as described in great detail hereinabove, and composited images will be displayed on the display device of the client machine. Display devices available to the users of a particular graphics-based application can include LCD panels, plasma display panels, LCD or DLP based multi-media projectors and the like.

FIG. 12A shows a first illustrative embodiment of the multi-user computer network according to the present invention, comprising a plurality of client machines, wherein one or more client machines embody the MMPGRS of the present invention designed using the software-based system architecture of FIG. 7A. In FIG. 12B, a second illustrative embodiment of the multi-user computer network of the present invention, is shown comprising a plurality of client machines, wherein one or more client machines embody the MMPGRS of the present invention designed using the hardware-based system architecture of FIG. 7B. In either network design, the application server(s), driven by one or more Database servers (RDBMS) on the network, and typically supported by a cluster of communication servers (e.g. running http), respond to user-system interaction input data streams that have been transmitted from one or more network users on the network. Notably, these user (e.g. gamers or players) might be local each other as over a LAN, or be remote to each other as over a WAN or the Internet infrastructure. In response to such user-system interaction, as well as Application profiling carried out in accordance with the principles of the present invention, the MMPGRs aboard each client machine will automatically control, in real-time, the mode of parallel graphics rendering supported by the client machine, in order to optimize the graphics performance of the client machine.

Using a Central Application Profile Database Server System to Automatically Update Over the Internet, Graphic Application Profiles (Gaps) within the MMPGRS of Client Machines It is with the scope and spirit of the present invention to ensure that each MMPGRS is optimally programmed at all possible times so that it quickly and continuously offers users high graphics performance through its adaptive multi-modal parallel graphics operation. One way to help carry out this objective is to set up a Central Application/Scene Profile Database Server System on the Internet, as shown in FIGS. 12A and 12B, and support the various Internet-based application registration and profile management and delivery services, as described hereinbelow.

As shown in FIGS. 12A and 12B, the Central Application/Scene Profile Database Server System of the illustrative embodiment comprises a cluster of Web (http) servers, interfaced with a cluster of application servers, which in turn are interfaced with one or more Database servers (supporting RDBMS software), well known in the art. The Central Application/Scene Profile Database Server System would support a Web-based Game Application Registration and Profile Management Application, providing a number of Web-based services, including:

(1) the registration of Game Application Developers within the RDBMS of the Server;

(2) the registration of game applications with the RDBMS of the Central Application/Scene Profile Database Server System, by registered game application developers;

(3) registration of each MMPGRS deployed on a client machine or server system having Internet-connectivity, and requesting subscription to periodic/automatic Graphic Application Profile (GAP) Updates (downloaded to the MMPGRS over the Internet) from the Central Application Profile Database Server System; and (4) registration of each deployed MMPGRS requesting the periodic uploading of its Game Application Profiles (GAPS)—stored in Application/Scene Profile Database 405 and Historical Repository 404—to the Central Application/Scene Profile Database Server System for the purpose of automated analysis and processing so as to formulate "expert" Game Application Profiles (GAPs) that have been based on robust user-experience and which are optimized for particular client machine configurations.

Preferably, the Web-based Game Application Registration and Profile Management Application of the present invention would be designed (using UML techniques) and implemented (using Java or C+) so as to provide an industrialstrength system capable of serving potentially millions of client machines embodying the MMPGRS of the present invention.

Using the Central Application/Scene Profile Database Server System of the present invention, it is now possible to automatically and periodically upload, over the Internet, Graphic Application Profiles (GAPs) within the Application/Scene Profile Database 405 of the MMPGRS of registered client machines. By doing so, graphic application users (e.g. gamers) can immediately enjoy high performance graphics on the display devices of their client machines, without having to develop a robust behavioral profile based on many hours of actual user-system interaction, but rather, automatically periodically uploading in their MMPGRSs, "expert" GAPs generated by the Central Application/Scene Profile Database Server System by analyzing the GAPs of thousands of game application users connected to the Internet.

For MMPGRS users subscribing to this Automatic GAP Management Service, supported by the Central Application/Scene Profile Database Server System of the present invention, it is understood that such MMPGRSs would use a different type of Application Profiling and Analysis than that disclosed in FIGS. 5C1 and 5C2.

For Automatic GAP Management Service subscribers, the MMPGRS would preferably run an application profiling and analysis algorithm that uses the most recently downloaded expert GAP loaded into its AMCM, and then allow system-user interaction, user behavior, and application performance to modify and improve the expert GAP profile over time until the next automated update occurs.

Alternatively, the Application Profiling and Analysis Module in each MMGPRS subscribing to the Automatic GAP Management Service, will be designed to that it modifies and improves the downloaded expert GAP within particularly set limits and constraints, and according to particular criteria, so that the expert GAP is allowed to evolve in an optimal manner, without performance regression.

For users, not subscribing to the Automatic GAP Management Service, Application Profiling and Analysis will occur in their MMPGRSs according to general processes described in FIGS. 5C1 and 5C2.

Variations of the Present Invention which Readily Come to Mind in View of the Present Invention Disclosure While the illustrative embodiments of the present invention have been described in connection with various PC-based computing system applications and video game consoles and systems, it is understood that that multi-modal parallel graphics rendering subsystems, systems and rendering processes of the present invention can also be used in mobile computing devices, e-commerce and POS displays and the like.

While Applicants have disclosed such subsystems, systems and methods in connection with Object, Image and Time Division methods being automatically instantiated in response to the graphical computing needs of the application(s) running on the host computing system at any instant in time, it is understood, however, that the MMPGRS of the present invention can be programmed with other modes of 3D graphics rendering (beyond traditional Object, Image and Time Division Modes), and that these new and/or extended mode of parallel operation can be based on novel ways of dividing and/or quantizing: (i) objects and/or scenery being graphically rendered; (ii) the graphical display screen (on which graphical images of the rendered object/scenery are projected); (iii) temporal aspects of the graphical rendering process; (iv) the illumination sources used during the graphical rendering process using parallel computational operations; as well as (v) various hybrid combinations of these components of the 3D graphical rendering process.

It is understood that the multi-modal parallel graphics rendering technology employed in computer graphics systems of the illustrative embodiments may be modified in a variety of ways which will become readily apparent to those skilled in the art and having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A computing system capable of parallelizing the operation of one or more GPUs supported on a hybrid CPU/GPU fusion chip and one or more GPUs supported on one or more external graphics cards, said computing system comprising:

CPU memory space for storing one or more graphics-based applications and a graphics library for generating graphics commands and data (GCAD) during the execution of said one or more graphics-based applications;

a CPU/GPU fusion-architecture chip having one or more GPUs, an interconnect network, and a memory controller for controlling access to said CPU memory space;

one or more external graphics cards supporting one or more GPUs, and operably connected to said interconnect network by way of a data communication interface;

wherein said one or more external graphics cards are connected to said CPU/GPU fusion-architecture chip by way of a data communication interface;

a multi-mode parallel graphics rendering subsystem supporting multiple modes of parallel operation selected from the group consisting of object division, image division, and time division, and wherein each mode of parallel operation includes at least three stages, namely, decomposition, distribution and recomposition;

wherein said multi-mode parallel graphics rendering subsystem further includes:
(i) a decomposition module for supporting the decomposition stage of parallel operation;
(ii) a distribution module for supporting the distribution stage of parallel operation; and
(iii) a recomposition module for supporting the recomposition stage of parallel operation;

a plurality of graphic processing pipelines (GPPLs), implemented using said GPUs, and supporting a parallel graphics rendering process that employs one or more of said multiple modes of parallel operation in order to execute graphic commands, process graphics data, and render pixel-composited images containing graphics for display on a display device during the run-time of said one or more graphics-based applications, and said display device being connectable to at least one of said one or more external graphics cards; and an automatic mode control module for automatically controlling the switching into, out of, and transitioning between said multiple modes of parallel operation during the run-time of said one or more graphics-based applications so that said GPUs are driven in a parallelized manner during the run-time of said one or more graphics-based applications;

wherein said decomposition module divides up said stream of graphic commands and data (GCAD) according to the mode of parallel operation controlled by said automatic mode control module;

wherein said distribution module distributes said stream of graphics commands and data to one or more of said GPUs according to the mode of parallel operation controlled by said automatic mode control module;

wherein one or more of said GPUs execute said graphics commands using said graphics data, and generate partial pixel data sets associated with frames of images of said 3D scene to be composited, according to the mode of parallel operation controlled by said automatic mode control module; and wherein said recomposition module merges together partial pixel data sets produced from one or more of said GPUs, according to said mode of parallel operation and controlled by said automatic mode control module, and producing a final pixel data set for display on said display device.

2. The computing system of claim 1, wherein said automatic mode control module employs said real-time profiling of scenes in said one or more graphics-based applications involving (i) collecting and analyzing performance data associated with said multi-mode parallel graphics rendering subsystem and said computing system, during the run-time of said one or more graphics-based applications, (ii) constructing scene profiles for the image frames associated with particular scenes in said one or more graphics-based applications, so that and (iii) maintaining said scene profiles in an application/scene profile database that is accessible to said automatic mode control module during said run-time, so that during the run-time of said one or more graphics-based applications, said automatic mode control module can access and use said scene profiles maintained in said application/scene profile database and determine how to dynamically control the modes of parallel operation of said multi-mode parallel graphics rendering subsystem to optimize system performance.

3. The computing system of claim 1, wherein said automatic mode control module employs real-time detection of scene profile indices programmed within pre-profiled scenes of said one or more graphics-based applications;

wherein said pre-profiled scenes are analyzed prior to run-time, and indexed with said scene profile indices; and wherein mode control parameters (MCPs) corresponding to said scene profile indices, are stored within an application/scene profile database accessible to said automatic mode control module during the run-time of said one or more graphics-based applications, so that said automatic mode control module can access and use said MCPs maintained in said application/scene profile database and determine how to dynamically control the modes of parallel operation of said multi-mode parallel graphics rendering subsystem to optimize system performance.

4. The computing system of claim 1, wherein said automatic mode control module employs a user interaction detection (UID) mechanism for real-time detection of the user's interaction with said computing system, and said automatic mode control module uses the detected user interaction to determine how to dynamically control the modes of parallel operation of the multi-mode parallel graphics rendering subsystem to optimize system performance, at any instance in time during the run-time of said one or more graphics-based applications.

5. The computing system of claim 1, wherein said hybrid CPU/GPU fusion-architecture chip has only one GPU.

6. The computing system of claim 1, wherein said hybrid CPU/GPU fusion-architecture chip has multiple GPUs.

7. The computing system of claim 1, wherein said display device is a device selected from the group consisting of an flat-type display panel, a projection-type display panel, and other image display devices.

8. The computing system of claim 1, wherein said computing system is a machine selected from the group consisting of a PC-level computer, information server, laptop, game console system, portable computing system, and any computational-based machine supporting the real-time generation and display of 3D graphics.

9. The computing system of claim 1, wherein said decomposition module comprises first and second decomposition submodules, and wherein said automatic mode control module and said first decomposition submodule are each implemented as a software package in said CPU memory space; and wherein said second decomposition submodule, said distribution module and said recomposition module are each implemented within said hybrid CPU/GPU fusion-architecture chip, and are in operable communication with said automatic mode control module in said CPU memory space by way of said interconnect network and a memory controller.

10. The computing system of claim 9, wherein said each said software package is implemented in said CPU memory space.

11. The computing system of claim 9, wherein during operation,
(i) said first decomposition submodule divides the stream of graphic commands and data according to the required parallelization mode, operative at any instant in time;
(ii) said second decomposition submodule receives the stream of graphic commands and data from said first decomposition submodule;
(iii) said distribution module uses said interconnect network to distribute graphic commands and data to said multiple GPUs,
(iv) said recomposition module uses said interconnect network to transfer composited pixel data between said recomposition module and said multiple GPUs during said recomposition stage, and
(v) finally recomposited pixel data sets are displayed as graphical images on said display device.

* * * * *